(12) United States Patent
Rothbaum et al.

(10) Patent No.: US 9,445,178 B2
(45) Date of Patent: Sep. 13, 2016

(54) CORD MANAGEMENT SYSTEM

(71) Applicant: CJD LLC, New York, NY (US)

(72) Inventors: Wayne Philip Rothbaum, New York, NY (US); Allison S. Conner, Brooklyn, NY (US); Robert B. Curtis, New York, NY (US); Jonas K. Damon, New York, NY (US); Daniel A. Sanchez, Brooklyn, NY (US)

(73) Assignee: CJD LLC, New York, NY (US)

( * ) Notice: Subject to any disclaimer, the term of this patent is extended or adjusted under 35 U.S.C. 154(b) by 181 days.

(21) Appl. No.: 14/140,389

(22) Filed: Dec. 24, 2013

(65) Prior Publication Data

US 2014/0262864 A1    Sep. 18, 2014

Related U.S. Application Data

(63) Continuation of application No. 12/908,256, filed on Oct. 20, 2010, now Pat. No. 8,615,849, which is a continuation of application No. PCT/US2010/053244, filed on Oct. 19, 2010, which is a continuation-in-part of application No. PCT/US2010/031087, filed on Apr. 14, 2010.

(51) Int. Cl.
*H04R 1/10* (2006.01)
*H01F 7/02* (2006.01)
*H04M 1/15* (2006.01)

(52) U.S. Cl.
CPC .......... *H04R 1/1033* (2013.01); *H01F 7/0263* (2013.01); *H04M 1/15* (2013.01);
(Continued)

(58) Field of Classification Search
CPC ............. A45F 2200/0508; A45F 2200/05162; A45C 2011/001; A45C 2011/002; H04R 1/1033; H01F 7/0263; H04M 1/15; Y10T 24/39; Y10T 24/34; Y10T 24/14; Y10T 24/3497; Y10T 24/3987; Y10T 24/32; Y10T 24/2708

See application file for complete search history.

(56) References Cited

U.S. PATENT DOCUMENTS

D39,960 S    5/1909  Mussillon
1,485,994 A  3/1924  Salisbury
(Continued)

FOREIGN PATENT DOCUMENTS

AU   2005100726   10/2005
CN   201352845    11/2009
(Continued)

OTHER PUBLICATIONS

BlueLounge cableyoyo Ultra-Thin Cord Manager, www.ilounge.com/index.php/reviews/entry/bluelounge-cableyoy . . . , printed Jun. 7, 2010, 4 pages.
(Continued)

*Primary Examiner* — Robert J Sandy
(74) *Attorney, Agent, or Firm* — Morgan, Lewis & Bockius LLP

(57) ABSTRACT

A cord management system includes a case and a strap. The strap has a first attachment point at a first location on the strap and a second attachment point a second location on the strap. The strap also includes at least two modes of operation. In a first mode of operation, the first attachment point is attached to the second attachment point so that a first segment of the strap located between the first attachment point and the second attachment point forms a loop configured to secure a cord that is wrapped around the case. In a second mode of operation, the first attachment point is detached from the second attachment point so that the first segment no longer forms the loop. In some embodiments, the strap is permanently attached to the case, while in other embodiments the strap is semi-permanently attached to the case.

15 Claims, 143 Drawing Sheets

(52) U.S. Cl.
CPC ............ *Y10T 24/14* (2015.01); *Y10T 24/2708* (2015.01); *Y10T 24/32* (2015.01); *Y10T 24/34* (2015.01); *Y10T 24/3497* (2015.01); *Y10T 24/39* (2015.01); *Y10T 24/3987* (2015.01); *Y10T 29/49826* (2015.01)

(56) References Cited

U.S. PATENT DOCUMENTS

| | | |
|---|---|---|
| 1,544,386 A | 6/1925 | Fridolph |
| 1,722,498 A | 7/1929 | Fridolph |
| 2,160,961 A | 6/1939 | Dorman |
| 2,386,000 A | 10/1945 | McQuiston |
| 2,522,072 A | 9/1950 | Tierney, Jr. |
| 2,585,054 A | 2/1952 | Stachura |
| 2,795,641 A | 6/1957 | Rowell |
| 2,826,796 A | 3/1958 | Davis |
| 2,880,008 A | 3/1959 | Stoner |
| 2,946,839 A | 7/1960 | Horning |
| 3,038,558 A | 6/1962 | Plummer |
| 3,041,697 A | 7/1962 | Budreck |
| 3,068,316 A | 12/1962 | Witt |
| 3,209,061 A | 9/1965 | Mier et al. |
| D206,401 S | 12/1966 | Fisher |
| 3,373,954 A | 3/1968 | Hilsinger, Jr. |
| 3,597,803 A | 8/1971 | Van Neil |
| D224,960 S | 10/1972 | Wilson |
| 3,741,376 A | 6/1973 | Brown et al. |
| 3,994,048 A | 11/1976 | Rosenthal |
| 4,052,911 A | 10/1977 | Feldstein |
| 4,558,495 A | 12/1985 | Olsen |
| 4,586,675 A | 5/1986 | Brown |
| 4,631,783 A | 12/1986 | Hayashi |
| 4,770,332 A | 9/1988 | Pomerantz |
| 4,815,172 A | 3/1989 | Ward |
| 4,939,778 A | 7/1990 | Tomberlin |
| 4,940,427 A | 7/1990 | Pearson |
| 4,957,232 A | 9/1990 | Sprague |
| 4,991,788 A | 2/1991 | Pattison |
| 5,005,697 A | 4/1991 | Jimbo et al. |
| 5,014,946 A | 5/1991 | Gruber |
| 5,024,402 A | 6/1991 | Hamel |
| 5,027,864 A | 7/1991 | Conti et al. |
| 5,048,158 A | 9/1991 | Koerner |
| 5,130,899 A | 7/1992 | Larkin et al. |
| 5,142,743 A | 9/1992 | Hahn |
| 5,168,603 A | 12/1992 | Reed |
| 5,388,155 A | 2/1995 | Smith |
| 5,397,243 A | 3/1995 | MacMurdo, Sr. |
| D357,739 S | 4/1995 | Stewart et al. |
| 5,402,971 A | 4/1995 | Bower |
| D364,850 S | 12/1995 | Estrada et al. |
| 5,502,877 A | 4/1996 | Yocum |
| 5,517,838 A | 5/1996 | Moore |
| 5,518,214 A | 5/1996 | Spencer |
| 5,535,787 A | 7/1996 | Howell |
| 5,571,160 A | 11/1996 | Nyman |
| 5,572,773 A | 11/1996 | Bauer |
| 5,573,422 A | 11/1996 | Lawliss |
| 5,584,452 A | 12/1996 | Koike |
| 5,600,098 A | 2/1997 | Kazaks |
| 5,604,961 A | 2/1997 | Cole |
| 5,619,569 A | 4/1997 | McVay |
| D384,942 S | 10/1997 | Vinuela |
| 5,682,653 A | 11/1997 | Berglof et al. |
| 5,710,812 A | 1/1998 | Fogel |
| D390,447 S | 2/1998 | Colen, Jr. |
| 5,722,126 A | 3/1998 | Reiter |
| 5,732,445 A | 3/1998 | Stodolka et al. |
| D396,882 S | 8/1998 | Neal, Jr. |
| 5,802,676 A | 9/1998 | Tolan |
| D401,137 S | 11/1998 | Boelling |
| 5,832,098 A | 11/1998 | Chen |
| 5,895,018 A | 4/1999 | Rielo |
| 5,927,235 A | 7/1999 | Olaiz |
| 5,933,926 A | 8/1999 | Reiter |
| 5,983,464 A | 11/1999 | Bauer |
| 5,992,807 A | 11/1999 | Tarulli |
| 6,044,525 A | 4/2000 | Sastre et al. |
| 6,050,587 A | 4/2000 | Panhausen |
| 6,076,790 A | 6/2000 | Richter |
| 6,085,393 A | 7/2000 | Tsui et al. |
| 6,087,594 A | 7/2000 | Chou |
| 6,131,200 A | 10/2000 | McNamara |
| 6,233,345 B1 | 5/2001 | Urwyler |
| 6,265,039 B1 | 7/2001 | Drinkwater et al. |
| 6,293,509 B1 | 9/2001 | Richter |
| 6,301,754 B1 | 10/2001 | Grunberger et al. |
| 6,302,347 B1 | 10/2001 | Amirault |
| 6,344,021 B1 | 2/2002 | Juster et al. |
| 6,386,238 B1 | 5/2002 | Hestetune |
| 6,405,983 B1 | 6/2002 | Goj |
| D461,477 S | 8/2002 | Pentz |
| 6,427,290 B1 | 8/2002 | Liu |
| 6,466,299 B1 | 10/2002 | Lehtiniemi et al. |
| 6,467,132 B1 | 10/2002 | Robley |
| D467,247 S | 12/2002 | Pentz |
| 6,490,767 B2 | 12/2002 | Haiduk |
| 6,499,199 B2 | 12/2002 | Frazier |
| 6,543,094 B2 | 4/2003 | D'Addario |
| 6,581,885 B2 | 6/2003 | Polad |
| 6,588,074 B2 | 7/2003 | Galkiewicz et al. |
| 6,685,502 B2 | 2/2004 | Wheeler |
| 6,690,808 B2 | 2/2004 | Urwyler |
| 6,698,560 B2 | 3/2004 | Reardon et al. |
| 6,701,580 B1 | 3/2004 | Bandyopadhyay |
| D488,374 S | 4/2004 | Hussaini et al. |
| 6,755,656 B2 | 6/2004 | Jelinek et al. |
| 6,763,554 B1 | 7/2004 | Torrey et al. |
| 6,833,507 B2 | 12/2004 | Arkin et al. |
| 6,880,270 B2 | 4/2005 | Prather |
| 6,893,153 B2 | 5/2005 | Hoffer et al. |
| 6,942,173 B1 * | 9/2005 | Abramov ........... B65H 75/4476 191/12 R |
| 6,972,780 B2 | 12/2005 | Bjorkman et al. |
| D513,617 S | 1/2006 | Tierney |
| 7,039,958 B2 | 5/2006 | Henricksen |
| 7,078,615 B2 | 7/2006 | Gladfelter et al. |
| D525,986 S | 8/2006 | Kim |
| 7,096,544 B2 | 8/2006 | Lusardi |
| D539,277 S | 3/2007 | Okada et al. |
| 7,202,414 B2 | 4/2007 | Johnson |
| 7,204,734 B2 | 4/2007 | Kawasaki |
| 7,213,278 B2 | 5/2007 | Peterson et al. |
| 7,222,796 B2 | 5/2007 | Taras |
| D556,681 S | 12/2007 | Kim |
| 7,318,521 B2 | 1/2008 | Lau |
| 7,327,841 B2 | 2/2008 | Schreiber et al. |
| D567,630 S | 4/2008 | Brassard |
| D567,631 S | 4/2008 | Brassard |
| D572,156 S | 7/2008 | Payne |
| 7,402,045 B2 | 7/2008 | Schwartzbart et al. |
| D574,819 S | 8/2008 | Andre et al. |
| D575,056 S | 8/2008 | Tan |
| 7,436,974 B2 | 10/2008 | Harper |
| D581,151 S | 11/2008 | Aipa |
| D581,255 S | 11/2008 | Calvin |
| D582,149 S | 12/2008 | Tan |
| D582,405 S | 12/2008 | Andre |
| D584,738 S | 1/2009 | Kim et al. |
| D586,805 S | 2/2009 | Shi |
| D587,267 S | 2/2009 | Wang |
| 7,516,591 B2 | 4/2009 | Wolner et al. |
| 7,543,359 B2 | 6/2009 | Moughelbay et al. |
| D597,515 S | 8/2009 | Kim |
| D598,887 S | 8/2009 | Xiao et al. |
| D599,196 S | 9/2009 | Ruffin et al. |
| D603,603 S | 11/2009 | Laine et al. |
| 7,612,997 B1 | 11/2009 | Diebel |
| 7,622,670 B1 | 11/2009 | Sanderson et al. |
| D606,751 S | 12/2009 | Andre et al. |
| D608,772 S | 1/2010 | Du et al. |
| 7,644,895 B2 | 1/2010 | Tseng |
| 7,648,027 B2 | 1/2010 | Lin et al. |
| D609,463 S | 2/2010 | Bullen |

(56) References Cited

U.S. PATENT DOCUMENTS

| | | |
|---|---|---|
| D610,807 S | 3/2010 | Bau |
| D613,137 S | 4/2010 | Wieberdink et al. |
| D613,722 S | 4/2010 | Kaneta |
| 7,699,198 B2 | 4/2010 | Sirichai et al. |
| D615,077 S | 5/2010 | Richardson et al. |
| D615,078 S | 5/2010 | Bradley |
| D615,526 S | 5/2010 | Andre et al. |
| D615,536 S | 5/2010 | Richardson et al. |
| D616,361 S | 5/2010 | Huang |
| 7,712,696 B2 | 5/2010 | Loh |
| D617,784 S | 6/2010 | Richardson et al. |
| D618,230 S | 6/2010 | Brown et al. |
| D619,130 S | 7/2010 | Fellig |
| D619,361 S | 7/2010 | Andre et al. |
| D619,574 S | 7/2010 | Richardson et al. |
| D619,884 S | 7/2010 | Hansort |
| D620,000 S | 7/2010 | Bau |
| D621,821 S | 8/2010 | Richardson et al. |
| D622,716 S | 8/2010 | Andre et al. |
| 7,781,674 B2 | 8/2010 | Kassab |
| 7,782,610 B2 | 8/2010 | Diebel |
| D623,180 S | 9/2010 | Diebel |
| D623,640 S | 9/2010 | Freeman |
| D624,064 S | 9/2010 | Esposito |
| D624,065 S | 9/2010 | Bosch et al. |
| D624,304 S | 9/2010 | Danze et al. |
| D624,532 S | 9/2010 | Huskinson |
| D624,533 S | 9/2010 | Richardson et al. |
| D624,908 S | 10/2010 | Huskinson |
| D624,909 S | 10/2010 | Huskinson |
| D625,579 S | 10/2010 | Lee et al. |
| D626,119 S | 10/2010 | Fellig |
| 7,817,002 B2 | 10/2010 | Fullerton et al. |
| D626,538 S | 11/2010 | Brown et al. |
| D626,539 S | 11/2010 | Brown et al. |
| D626,746 S | 11/2010 | Roman |
| D626,936 S | 11/2010 | Yeo et al. |
| D627,755 S | 11/2010 | Yang |
| D627,771 S | 11/2010 | Smith et al. |
| D627,778 S | 11/2010 | Akana et al. |
| D628,374 S | 12/2010 | Lee et al. |
| D628,994 S | 12/2010 | Griffin, Jr. et al. |
| D629,786 S | 12/2010 | Andre et al. |
| D630,614 S | 1/2011 | Lee |
| D633,885 S | 3/2011 | Kim |
| D636,659 S | 4/2011 | Rothbaum et al. |
| D637,590 S | 5/2011 | Michie et al. |
| D637,592 S | 5/2011 | Magness et al. |
| D638,005 S | 5/2011 | Richardson et al. |
| D638,006 S | 5/2011 | Chang |
| D639,963 S | 6/2011 | Kase |
| D640,246 S | 6/2011 | Liu et al. |
| D641,345 S | 7/2011 | Gonzalez |
| D641,348 S | 7/2011 | Kim et al. |
| D642,169 S | 7/2011 | Andre et al. |
| D642,170 S | 7/2011 | Johnson et al. |
| D643,029 S | 8/2011 | Feng |
| 8,002,159 B2 | 8/2011 | Cragg |
| D645,333 S | 9/2011 | Rothbaum et al. |
| D646,266 S | 10/2011 | Kim et al. |
| D647,519 S | 10/2011 | Rothbaum et al. |
| D652,829 S | 1/2012 | Kim et al. |
| 8,103,352 B2 | 1/2012 | Fried et al. |
| D654,052 S | 2/2012 | Lee et al. |
| D654,490 S | 2/2012 | Weller et al. |
| D654,931 S | 2/2012 | Lemelman et al. |
| 8,167,127 B2 | 5/2012 | Martin et al. |
| 8,261,416 B2 | 9/2012 | Rothbaum et al. |
| 8,800,762 B2 | 8/2014 | Fathollahi |
| 8,827,074 B2 * | 9/2014 | Law ................ A45C 11/00 206/320 |
| 2001/0010727 A1 | 8/2001 | Urwyler |
| 2001/0035242 A1 | 11/2001 | Hughs et al. |
| 2002/0065115 A1 | 5/2002 | Lindholm |
| 2002/0073516 A1 | 6/2002 | Behar |
| 2002/0112323 A1 | 8/2002 | Nire |
| 2003/0167605 A1 | 9/2003 | Schultz |
| 2003/0229974 A1 | 12/2003 | Zemer et al. |
| 2004/0003487 A1 | 1/2004 | Reiter |
| 2005/0016760 A1 | 1/2005 | Vasichek |
| 2005/0025329 A1 | 2/2005 | Lee |
| 2005/0072872 A1 | 4/2005 | Shack et al. |
| 2005/0194454 A1 | 9/2005 | Ferber et al. |
| 2005/0220319 A1 | 10/2005 | Chan et al. |
| 2005/0255898 A1 | 11/2005 | Huang |
| 2006/0008106 A1 | 1/2006 | Harper |
| 2006/0121962 A1 | 6/2006 | Kohli |
| 2006/0178041 A1 | 8/2006 | Lund et al. |
| 2006/0185873 A1 | 8/2006 | Johnson |
| 2006/0186150 A1 | 8/2006 | Willows et al. |
| 2006/0262578 A1 | 11/2006 | Farrar et al. |
| 2007/0023559 A1 | 2/2007 | Scapillato et al. |
| 2007/0086617 A1 | 4/2007 | Loh |
| 2007/0096913 A1 | 5/2007 | Marin Palacios et al. |
| 2007/0099681 A1 | 5/2007 | Kielland |
| 2007/0151750 A1 | 7/2007 | Dean |
| 2007/0152008 A1 | 7/2007 | Case |
| 2007/0165371 A1 | 7/2007 | Brandenburg |
| 2007/0182367 A1 | 8/2007 | Partovi |
| 2007/0187544 A1 | 8/2007 | Proebstle |
| 2007/0279072 A1 | 12/2007 | Fagrenius et al. |
| 2008/0023508 A1 | 1/2008 | Harchol |
| 2008/0041897 A1 | 2/2008 | Malhotra |
| 2008/0083096 A1 | 4/2008 | Wilkinson |
| 2008/0121407 A1 | 5/2008 | Kassab |
| 2008/0134474 A1 | 6/2008 | Uryasov |
| 2008/0149679 A1 | 6/2008 | Case et al. |
| 2008/0164157 A1 | 7/2008 | Sween et al. |
| 2008/0206498 A1 | 8/2008 | Allen |
| 2008/0222861 A1 | 9/2008 | Son |
| 2008/0224655 A1 | 9/2008 | Tilley et al. |
| 2008/0266773 A1 | 10/2008 | Szolyga et al. |
| 2008/0271299 A1 | 11/2008 | Kilbarger |
| 2008/0289151 A1 | 11/2008 | Chan |
| 2009/0013504 A1 | 1/2009 | Crespo |
| 2009/0016559 A1 | 1/2009 | Cleary |
| 2009/0052654 A1 | 2/2009 | Hyun et al. |
| 2009/0094799 A1 | 4/2009 | Ashel |
| 2009/0114556 A1 | 5/2009 | Tai et al. |
| 2009/0284732 A1 | 11/2009 | Vitale |
| 2009/0314515 A1 | 12/2009 | Bevirt et al. |
| 2009/0323162 A1 | 12/2009 | Fanton et al. |
| 2010/0150370 A1 | 6/2010 | Bales et al. |
| 2010/0163542 A1 | 7/2010 | Kwon et al. |
| 2010/0168526 A1 | 7/2010 | Nishimura et al. |
| 2010/0203931 A1 | 8/2010 | Hynecek et al. |
| 2010/0300909 A1 | 12/2010 | Hung |
| 2010/0302716 A1 | 12/2010 | Gandhi |
| 2011/0034220 A1 | 2/2011 | Lee |
| 2011/0073505 A1 | 3/2011 | Stiehl |
| 2011/0210026 A1 | 9/2011 | Zhao et al. |
| 2011/0253571 A1 | 10/2011 | Rothbaum |

FOREIGN PATENT DOCUMENTS

| | | |
|---|---|---|
| FR | 2865860 | 8/2005 |
| GB | 869275 | 5/1961 |
| GB | 2420552 | 5/2006 |
| JP | 63-125493 | 8/1988 |
| JP | 8-195120 A | 7/1996 |
| JP | 11-317995 | 11/1999 |
| JP | 2001-169381 | 6/2001 |
| JP | 2002-025356 A | 1/2002 |
| JP | 2003-230418 | 8/2003 |
| JP | 2003-319484 | 11/2003 |
| JP | 2003-324784 A | 11/2003 |
| JP | 2006-081130 | 3/2006 |
| JP | 2006-222712 A | 8/2006 |
| JP | 2009-212918 | 9/2009 |
| KR | 10-0470798 | 8/1999 |
| KR | 2002-0040678 | 5/2002 |
| KR | 2002-0027357 | 1/2003 |

(56) References Cited

FOREIGN PATENT DOCUMENTS

| WO | WO 2004/071056 | | 8/2004 |
|---|---|---|---|
| WO | WO 2007/138392 | A1 | 12/2007 |

OTHER PUBLICATIONS

Brighthand, BoxWave Nokia E61i Armor Accessories: Armor Case, downloaded Jan. 5, 2011, 2 pgs., http://forum.brighthand.com/press-releases-announcements/241361-boxwave-nokia-e61i-armour-accessories-armor-case.html.
*Earbud Clips*, www.wetjetset.com/store/item/42, printed Jun. 7, 2010, 3 pages.
*Evolution Review from Treo Central*, SCOTTeVEST, Jun. 25, 2008, 1 page.
*Headphone Cable Tidy—Pack of 3—Accessories for PDA, Srnartphone* . . . , www.proporta.com/F02/PPF02P05.php?t_id=4452&t_mode=des . . . printed Jun. 7, 2010, 2 pages.
*Hook Industries Budfrog*,www.ilounge.com/index.php/reviews/entry/hook-industries-budf . . . , printed Jun. 7, 2010, 4 pages.
International Search Report and Written Opinion, PCT/US2009/067927, Jul. 14, 2010, 8 pages.
International Search Report and Written Opinion for Related Application No. PCT/US2010/031087, Apr. 29, 2011, 23 pages.
International Search Report and Written Opinion for Related Application No. PCT/US2010/053244, Jun. 24, 2011, 22 pages.
*Magneat Universal Magnetic Headphone Cord and Wire Manager*, www.koyono.com/ProductDetails.asp?ProductCode=EAN13& . . . , printed Jun. 7, 2010, 4 pages.
*Magneat*, www.askmen.com/entertainment/gadget/magneat.html, printed Jun. 7, 2010, 2 pages.
*Magnetic Lanyard Pen*, 2008, 1 page.
*Marware Sidewinder for iPhone 1G*, www.techng.com/Marware-Sidewinder-for-iPhone-1G/M/B00 . . . , printed Jun. 7, 2010, 2 pages.
*Metal iPhone 4 Cover Protects Your iPhone 4 Without the Bulk of a Case*, gizmodo.com/5666388/metal-iphone-4-cover-protects-your-iphone, Oct. 18, 2010, 2 pages.
Palm Pre's Touchstone Charging Kit Should be a Hit, Mobile Gadget News:: Making Your Mobile Life Simpler > General > Home Page News, downloaded Jan. 5, 2011, 2 pgs., http:/www.mobilegadgetnews.com/index.ph . . . .
Palm Touchstone Charger Teardown, downloaded Dec. 3, 2010, 4 pgs., http://www.ifixit.com/Teardown/Palm-Touchstone-Charger-Teardown/810/1.
*Power Support Cord Gatherer*, www.ilounge.com/index.php/reviews/entry/power-support-cord . . . , printed Jun. 7, 2010, 3 pages.
Rothbaum, Final Office Action, U.S. Appl. No. 13/093,748, Feb. 11, 2014, 12 pgs.
Rothbaum, Office Action, U.S. Appl. No. 12/908,216, May 22, 2014, 10 pgs.
Rothbaum, Notice of Allowance, U.S. Appl. No. 12/908,256, Aug. 2, 2013, 8 pgs.
Rothbaum, Office Action, U.S. Appl. No. 12/908,256, Dec. 4, 2012, 14 pgs.
Rothbaum, Office Action, U.S. Appl. No. 13/093,748, Jul. 2, 2013, 17 pgs.
Rothbaum, Office Action, U.S. Appl. No. 13/093,748, Sep. 5, 2014, 11 pgs.
Rothbaum, Final Office Action, U.S. Appl. No. 13/093,748, Feb. 25, 2015, 13 pgs.
*SeV Magnetism*, SCOTTeVEST, 1 page.
*Smart iPod Management*, www.livevideo.com/video/7B9D626D1FDE433184C32A8B5 . . . , printed Jun. 7, 2010, 2 pages.
*Sumajin Smart Wrap Earphone Cord Manager*, www.ilounge.com/index.php/reviews/entry/sumajin-smartwrap . . . , printed Jun. 7, 2010, 3 pages.
*Tunewear TuneClip Cable Winder for Earphones and Headphones*, www.ilounge.com/index.php/reviews/entry/tunewear-tuneclip-c . . . , printed Jun. 7, 2010, 3 pages.
*Use Magnetic Paper Clips to Keep Cords from Tangling*, www.geeksugar.com/Use-Magnetic-Paper-Clips-Keep-Cords-From-Tangling, printed Jun. 7, 2010, 5 pages.
Yanko Design, iPhone 4 Metal Case by Ryan Glasgow for LtdTools, downloaded Dec. 28, 2010, 2 pgs., http://www.yankodesign.com/2010/08/10hannibal-lectos-iphone-4/.
Yanko Design, Sheet Metal iPhone Case by Ryan Glasgow for LtdTools, downloaded Dec. 28, 2010, 2 pgs., http://www.yankodesign.com2010/03/10/sexy-steel-case-for-iphone/.
Apple iPhone 4 Bumper-White-Apple . . ., store.apple.com/us/product/MC668ZM/B, printed May 4, 2011, 2 pgs.
Blaze Series Metal Hard iPhone 4/4S Case—White, Jul. 26, 2012, 1 pg.
CJD LLC, Office Action, CA 139808, Mar. 5, 2012, 2 pgs.
CJD LLC, Office Action, CA 139808, Dec. 16, 2011, 2 pgs.
gizmodo.com, Metal iPhone 4 Cover Protects Your iPhone 4 Without the Bulk of a Case, Oct. 18, 2010, 2 pgs.
Gordon, Gizmodo review of metal iPhone 4 cover, gizmodo.com/5666388/metal-iphone-4-cover-protects-your-iphone, Oct. 18, 2010, 1 pg.
Gordon, Metal iPhone 4 cover protects your iPhone 4 without the bulk of a case, lifehacker.com/5666069/metal-iphone-4-cover-protects-your-iphone-4-without-the-bulk-of-a-case, Oct. 17, 2010, 3 pgs.
Guy, 2012 iPhone + iPod Buyer's Guide, Apple iPhone 4 Bumpers, Mar. 9, 2011, 16 pgs.
iLounge review of Apple iPhone 4 Bumpers, www.ilounge.com/index.php/reviews/entry/apple-iphone-4-bumper, retrieved Jul. 1, 2011, 9 pgs.
Replacement polished stainless steel back cover w/metal tabs for Apple iPhone 4, cnn.cn/shop/replacement-polished-stainless-steel-back-cover-metal-tabs-apple-iphone-hexagonal-pattern-p=12406.html, retr. Jul. 1, 2011, 2 pgs.
Rothbaum, Notice of Allowance, U.S. Appl. No. 29/378,118, Jul. 5, 2012, 8 pgs.
Rothbaum, Notice of Allowance, U.S. Appl. No. 29,377,921, Jul. 9, 2012, 8 pgs.
Rothbaum, Notice of Allowance, U.S. Appl. No. 29/375,648, Jul. 18, 2011, 11 egs.
Rothbaum, Notice of Allowance, U.S. Appl. No. 29/375,649, Jun. 12, 2012, 7 pgs.
Rothbaum, Notice of Allowance, U.S. Appl. No. 29/375,651, Jun. 6, 2012, 7 pgs.
Rothbaum, Notice of Allowance, U.S. Appl. No. 29/376,041, Nov. 8, 2012, 6 pgs.
Rothbaum, Notice of Allowance, U.S. Appl. No. 29/376,428, Jul. 12, 2012, 8 pgs.
Rothbaum, Notice of Allowance, U.S. Appl. No. 29/376,527, Apr. 8, 2011, 8 pgs.
Rothbaum, Notice of Allowance, U.S. Appl. No. 29/377,918, Jul. 9, 2012, 8 pgs.
Rothbaum, Notice of Allowance, U.S. Appl. No. 29/377,919, Jul. 16, 2012, 8 pgs.
Rothbaum, Notice of Allowance, U.S. Appl. No. 29/378,110, Nov. 27, 2012, 5 pgs.
Rothbaum, Notice of Allowance, U.S. Appl. No. 29/378,119, Jul. 9, 2012, 8 pgs.
Rothbaum, Notice of Allowance, U.S. Appl. No. 29/382,637, Jul. 18, 2012, 8 pgs.
Rothbaum, Office Action, U.S. Appl. No. 29/376,041, Jun. 19, 2012, 4 pgs.
Rothbaum, Office Action, U.S. Appl. No. 29/378,110, Aug. 6, 2012, 9 pgs.
Rothbaum, Office Action, U.S. Appl. No. 29/385,172, Sep. 6, 2011, 11 pgs.
Rothbaum, Office Action, U.S. Appl. No. 29/385,172, May 16, 2012, 6 pgs.
Rothbaum, Quayle Office Action, U.S. Appl. No. 29/385,174, Sep. 2, 2011, 8 pgs.
Rothbaum, Office Action, U.S. Appl. No. 29/385,174, Feb. 10, 2012, 7 pgs.
Rothbaum, Office Action, U.S. Appl. No. 29/385,175, Sep. 16, 2011, 12 pgs.

\* cited by examiner

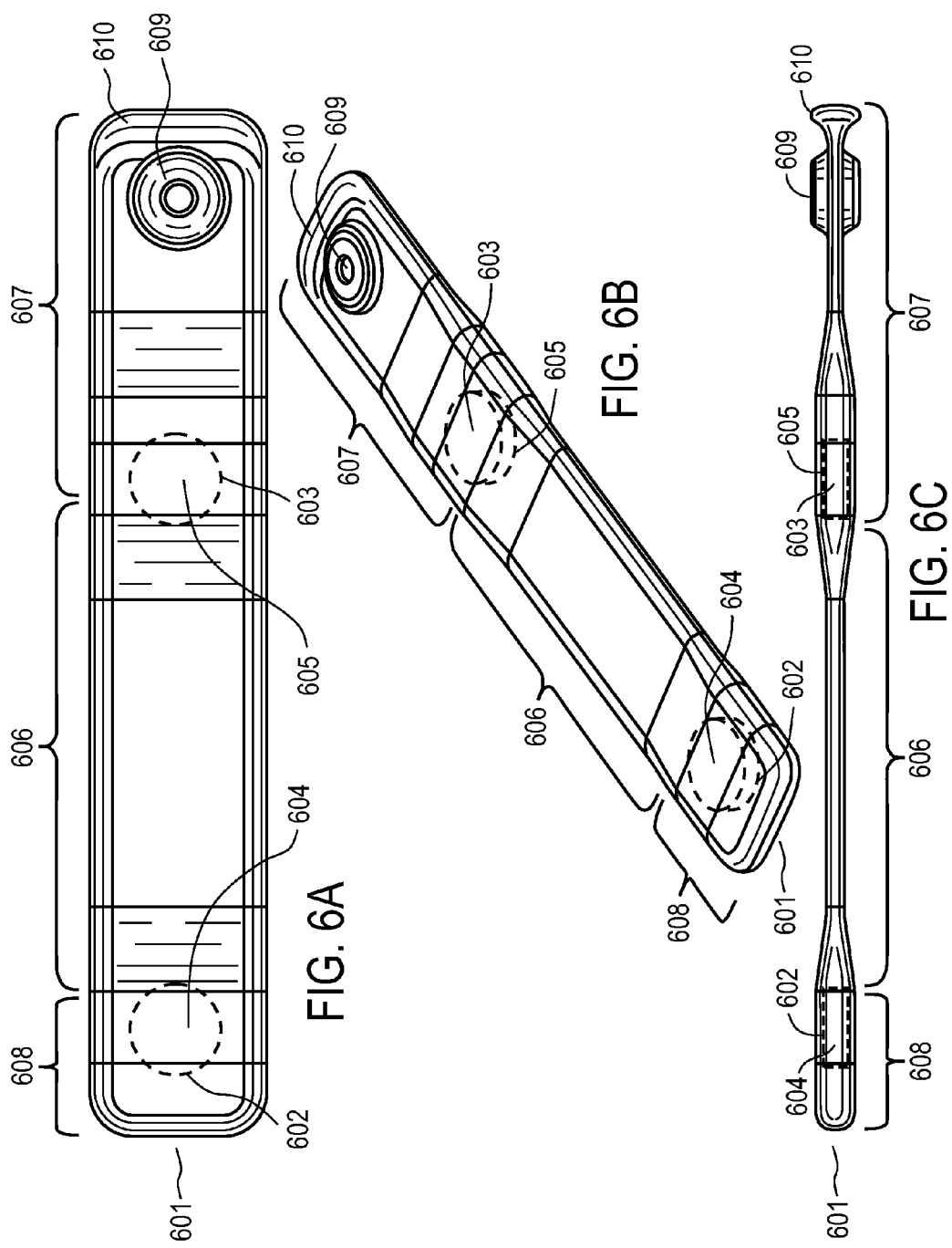

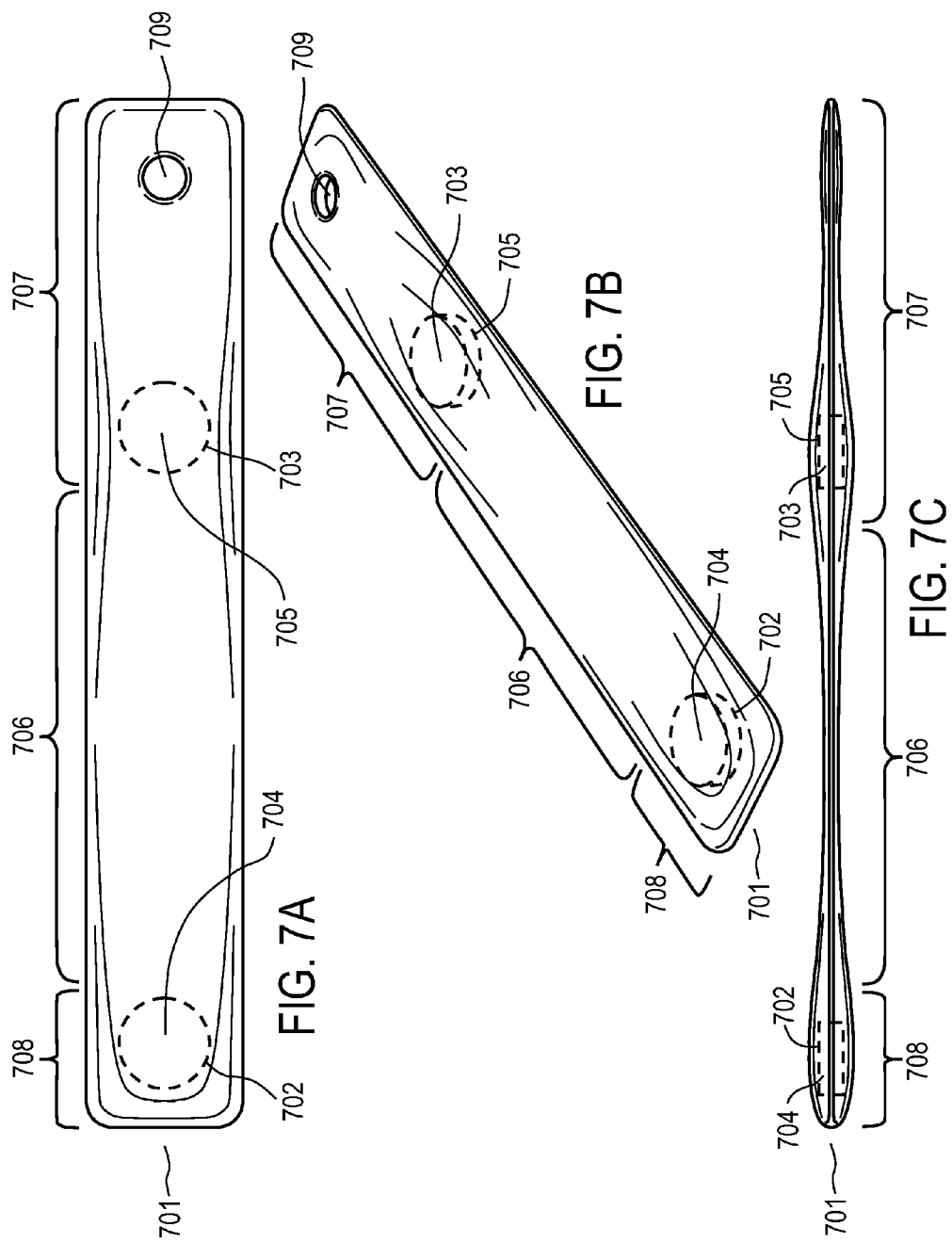

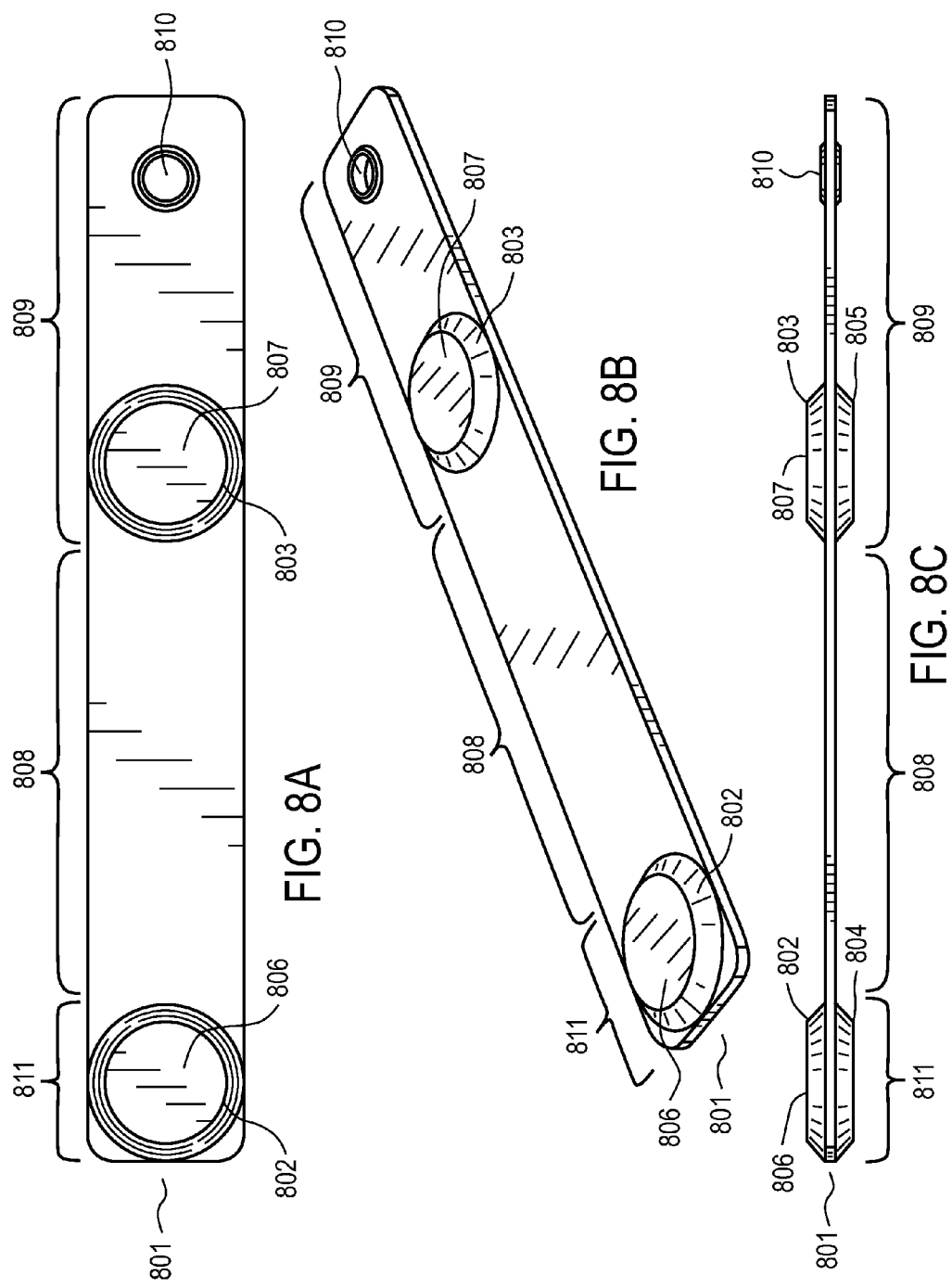

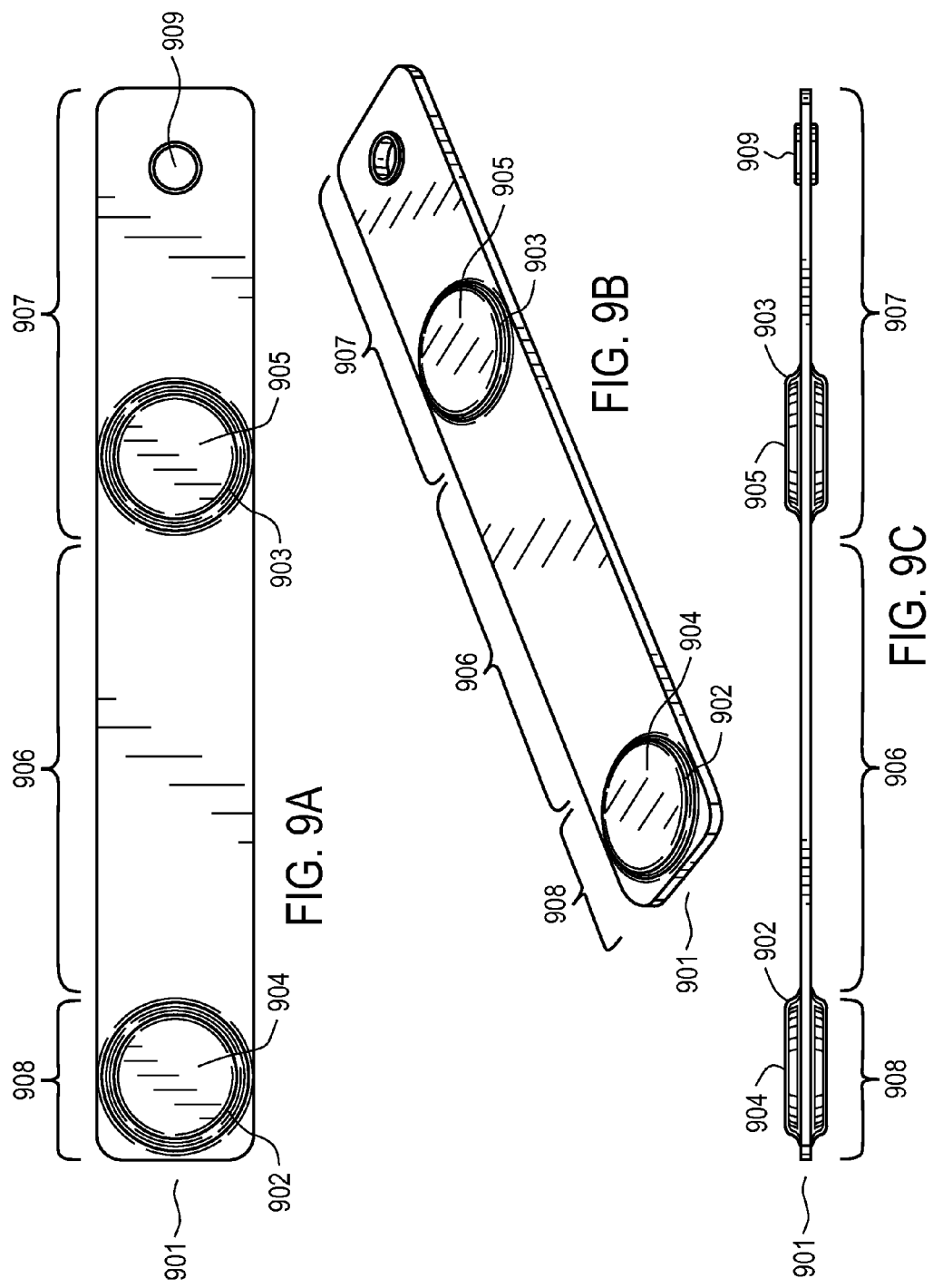

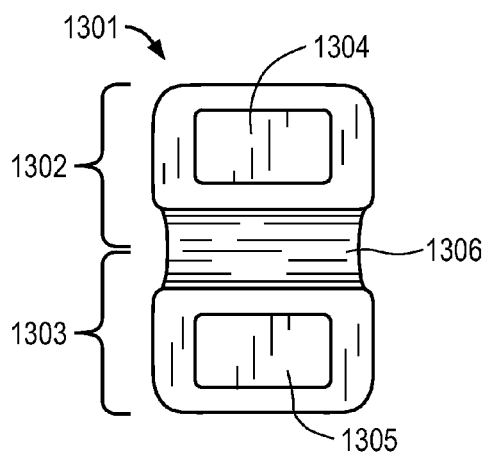
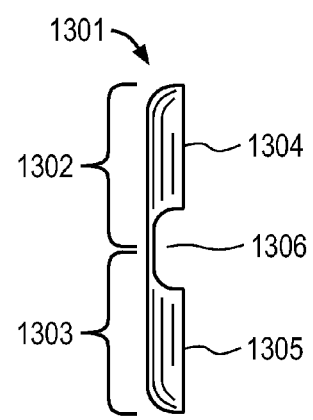
FIG. 13A          FIG. 13B
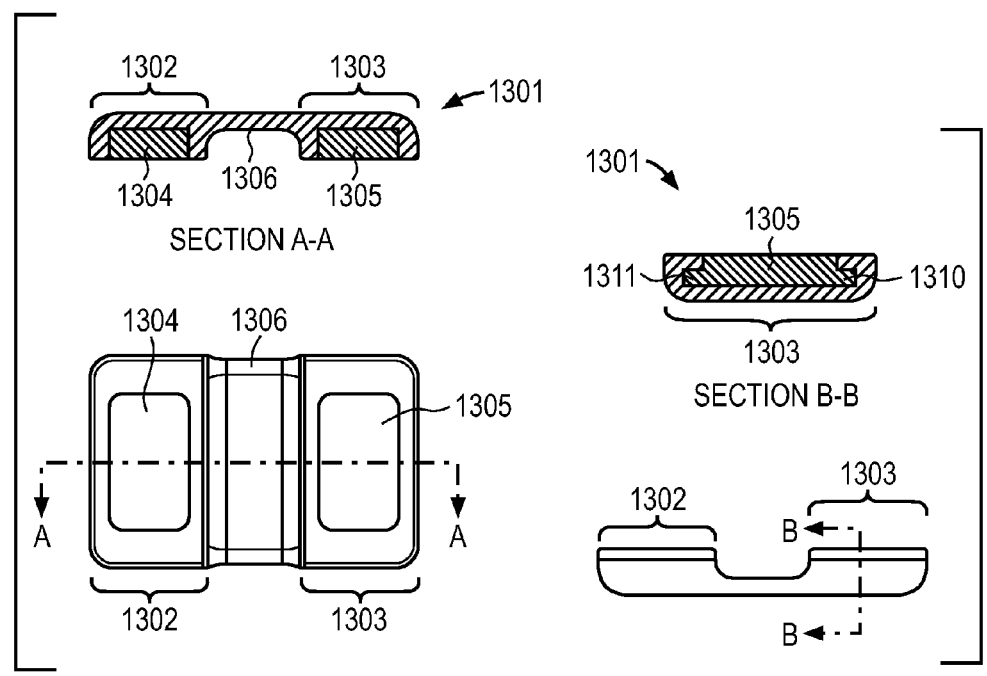
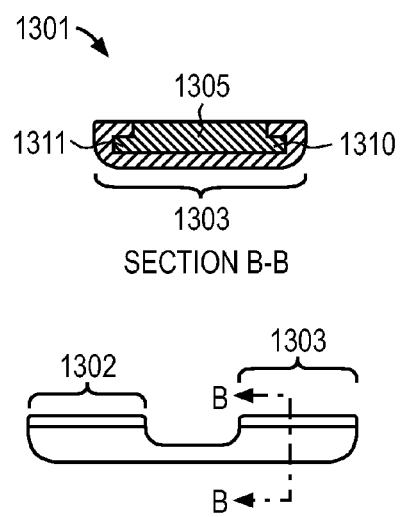
FIG. 13C          FIG. 13D

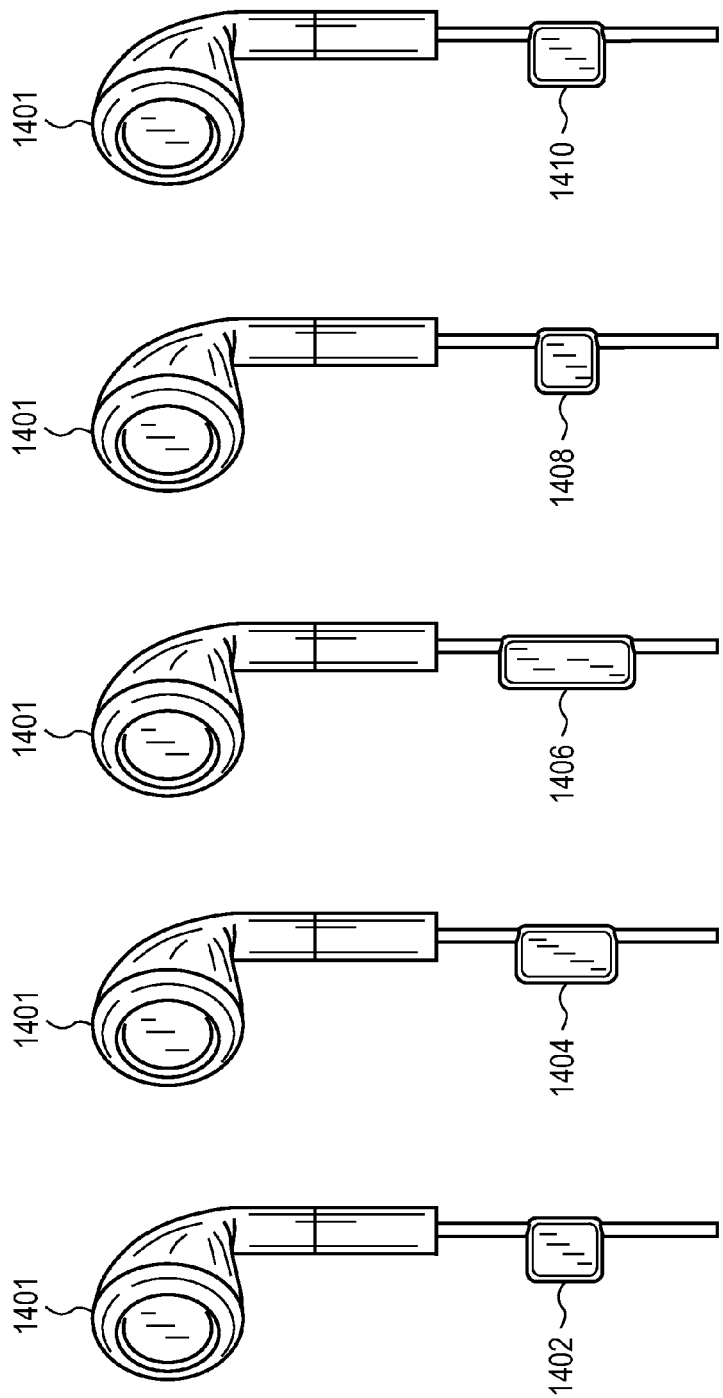

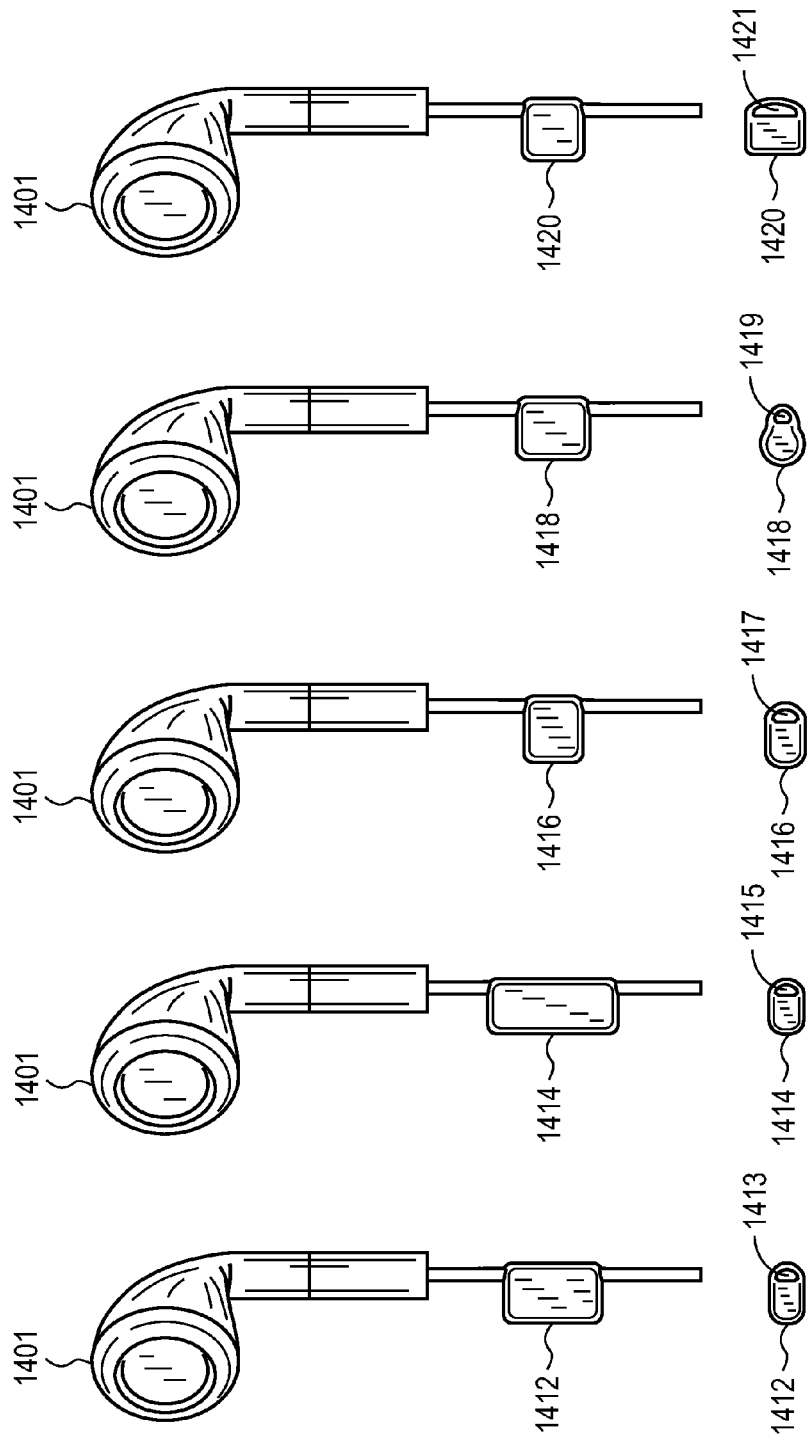

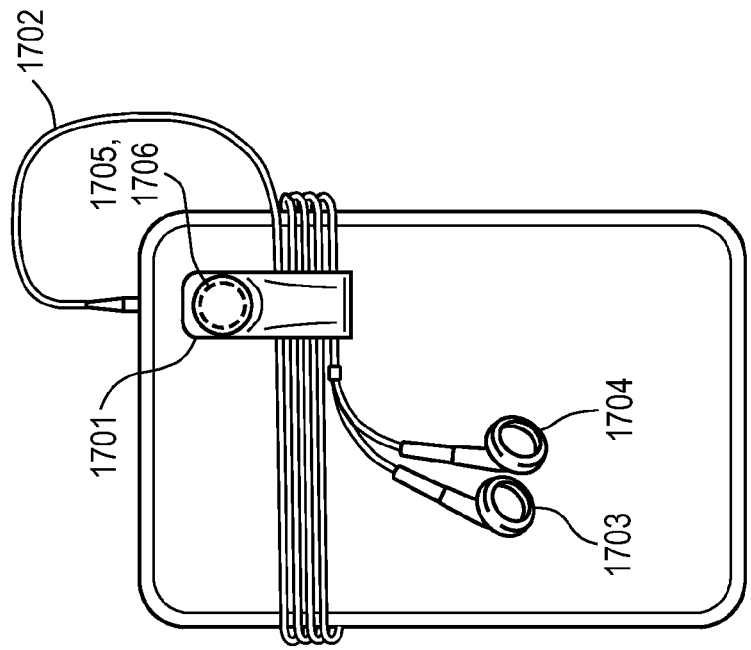
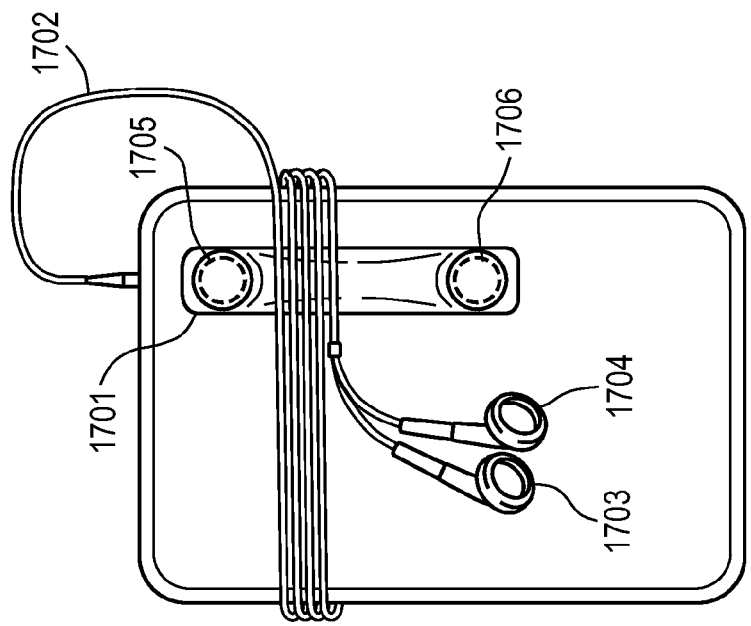
FIG. 17B
FIG. 17A

3700

3702 — Form a case for an object, the case having a front, a back, a bottom, a top, a first side, and a second side; wherein at least a portion of the back is made of a magnetic material; and wherein at least a portion of at least one of the front, bottom, top, first side, and second side is made of one or more non-magnetic materials.

3704 — Form a cord-attachment mechanism; one or more button covers; and one or more holes.

FIG. 37

CORD MANAGEMENT SYSTEM

RELATED APPLICATIONS

This application is a continuation of U.S. application Ser. No. 12/908,256, filed Oct. 20, 2010, now U.S. Pat. No. 8,615,849, which is a continuation of U.S. Application No. PCT/US2010/053244, filed Oct. 19, 2010 which is a continuation-in-part of PCT Patent Application No. PCT/US2010/031087, which was filed on Apr. 14, 2010, which applications are incorporated by reference herein in their entireties.

This application is related to U.S. patent application Ser. No. 12/908,216, filed on 20 Oct. 2010, entitled "Cord Management System." This application is also related to U.S. Design Pat. application No. 29/376,257, filed Oct. 4, 2010, now U.S. Design Pat. No. D671,101, and to U.S. Design Pat. application No. 29/376,428 filed Oct. 6, 2010, now U.S. Design Pat. No. D671,102, entitled "Case with Metal Back and Band Edge for a Cord Management System," and to U.S. Design Pat. application No. 29/376,430 filed Oct. 6, 2010, now U.S. Design Pat. No. D671,103, entitled "Case with Metal Back and Band Edge for a Cord Management System," and to U.S. Design Pat. application No. 29/375,648, entitled "Case with Metal Back for a Cord Management System," filed Sep. 24, 2010, now U.S. Design Pat. No. D647,519, and to U.S. Design Pat. application No. 29/375,649 filed Sep. 24, 2010, now U.S. Design Pat. No. D669,062, entitled "Case with Metal Back for a Cord Management System," and to U.S. Design Pat. application No. 29/375,651 filed Sep. 24, 2010, now U.S. Design Pat. No. D669,063, entitled "Case with Metal Back for a Cord Management System," and to U.S. Design Pat. application No. 29/376,041 filed Sep. 30, 2010, now U.S. Design Pat. No. D676,033, entitled "Case with Metal Back for a Cord Management System," the disclosures of which are all incorporated herein by reference in their entirety.

TECHNICAL FIELD

The disclosed embodiments relate generally to a system and a method for managing cords.

BACKGROUND

Many portable electronic devices (e.g., as mobile phones, audio players, video players, etc.) generate audio output. To maintain privacy (e.g., for phone calls, etc.) and/or to improve user experience (e.g., for music and/or video playback, for noisy environments, etc.), a user may choose to use headphones. Although some portable electronic devices support wireless headphones that receive audio signals wirelessly (e.g., Bluetooth, etc.), many users of electronic devices still use wired headphones that receive audio signals through an audio cord connected to an audio port of the portable electronic device. Unfortunately, wired headphones can become easily tangled when the portable electronic device is not being used. For example, the cord of the wired headphone may become tangled when the portable electronic device is stored in a bag or a purse. Similarly, other electronic devices may use video cables, audio cables, and/or power cords that present similar cord management issues to the user.

One solution to this problem is to detach the cord of the wired headphone from the portable electronic device and to store the wired headphones separately. For example, the wired headphones may be stored in a special pouch or container. Similarly, the cord of the wired headphones may be wrapped around itself so that the cord does not become tangled. However, detaching the cord from the portable electronic device is cumbersome because the cord must be reattached (and possibly removed from a container or unwound) prior to being able to use the wired headphones with the portable electronic device. Furthermore, the headphones may become lost or may be forgotten if the headphones are detached from the portable electronic device Another solution to this problem is to wrap the cord of the wired headphones around the portable electronic device without detaching the cord from the portable electronic device. However, the cord of the wired headphone may become unwrapped and tangled. Furthermore, although the cord may be organized when it is wrapped around the portable electronic device, once the cord is detached from the portable electronic device, the cord may become unwrapped.

Thus, a cord management system that solves the aforementioned problems is desirable.

SUMMARY

Some embodiments provide a cord management system that includes a strap. The strap has a first set of magnets attached to a first location on the strap and a second set of magnets attached to a second location on the strap. The strap also includes at least two modes of operation. In a first mode of operation, the first set of magnets is magnetically attached to the second set of magnets so that a first segment of the strap located between the first set of magnets and the second set of magnets forms a loop configured to secure a cord that is wrapped around the strap. In a second mode of operation, the first set of magnets is magnetically detached from the second set of magnets so that the first segment no longer forms the loop. The strap is also configured to be coupled to an object.

In some embodiments, the strap includes a cord-attachment mechanism configured to attach the strap to a cord and/or a connector for the cord.

In some embodiments, the cord management system includes a plurality of magnets configured to be attached to the cord.

In some embodiments, the cord management system includes a magnetic material configured to be attached to an object.

Some embodiments provide a cord management system including a strap. The strap has a first magnetic material attached to a first location on the strap and a second magnetic material attached to a second location on the strap. The strap also includes at least two modes of operation. In a first mode of operation, the first magnetic material is magnetically attached to the second magnetic material so that a first segment of the strap located between the first magnetic material and the second magnetic material forms a loop configured to secure a cord that is wrapped around the strap. In a second mode of operation, the first magnetic material is magnetically detached from the second magnetic material so that the first segment no longer forms the loop. The strap is also configured to be coupled to an object.

In some embodiments, the first magnetic material and the second magnetic material are selected from the group consisting of a magnet, paramagnetic material, and a ferromagnetic material.

Some embodiments provide a cord management system including a strap. The strap has a first attachment mechanism at a first location on the strap and a second attachment mechanism at a second location on the strap. The strap also includes at least two modes of operation. In a first mode of operation, the first attachment mechanism is attached to the second attachment mechanism so that a first segment of the strap located between the first attachment mechanism and the second attachment mechanism forms a loop configured to secure a cord that is wrapped around the strap. In a second mode of operation, the first attachment mechanism is detached from the second attachment mechanism so that the first segment no longer forms the loop. The strap is also configured to be coupled to an object.

In some embodiments, the first attachment mechanism and the second attachment mechanism is selected from the group consisting of: magnets, Velcro, adhesives, suction cups, and a van der Waals force attachment mechanism.

Some embodiments provide a method for managing a cord. The cord is wrapped around a strap, wherein the strap includes a first set of magnets attached to a first location on the strap and a second set of magnets attached to a second location on the strap. The strap is folded so that the strap forms a loop around the cord. The loop is secured by coupling the first set of magnets and the second set of magnets.

Some embodiments provide a system, a computer-readable storage medium including instructions and a computer-implemented method for manufacturing a cord management system. A strap is formed. A first set of magnets is attached to a first location on the strap and a second set of magnets is attached to a second location on the strap. The strap includes at least two modes of operation. In a first mode of operation, the first set of magnets is magnetically attached to the second set of magnets so that a first segment of the strap located between the first set of magnets and the second set of magnets forms a loop configured to secure a cord that is wrapped around the strap. In a second mode of operation, the first set of magnets is magnetically detached from the second set of magnets so that the first segment no longer forms the loop. The strap is also configured to be coupled to an object.

Some embodiments provide a cord management system having a case for an object and a strap permanently attached to the case. The strap comprises a first attachment point at a first location on the strap, a second attachment point at a second location on the strap. The strap also includes at least two modes of operation. In the first mode of operation, the first attachment point is attached to the second attachment point. In a second mode of operation, the first attachment point is detached from the second attachment point.

In some embodiments, the first mode of operation is when a first segment of the strap located between the first attachment point and the second attachment point forms a loop.

In some embodiments, the second mode of operation is where the first segment of the strap located between the first attachment point and the second attachment point no longer forms a loop.

In some embodiments, the strap is configured to secure a cord wrapped around the case when in the first mode of operation.

In some embodiments, the second mode of operation is used when a cord is not wrapped around the case.

In some embodiments, when deploying a cord wrapped around the case, the cord is pulled away from the strap. The force exerted on the cord when the cord is pulled away from the strap decouples the first attachment point from the second attachment point.

In some embodiments, the first and second attachment points are selected from a group comprising magnets, magnetic materials, snaps, hook and loop fasteners, buttons and button holes, and the like.

In some embodiments, the case comprises a cord-attachment mechanism located on the case.

In some embodiments, the cord-attachment mechanism is a hole, where the hole includes a grommet or a plurality of slits.

In some embodiments, the hole can be in an elastic portion of the case, where the hole is configured to expand when a cord is inserted into the hole. When the cord is in the hole, the hole is configured to exert a predetermined force against the cord to removably attach the cord to the case.

In some embodiments, the case has button covers configured to protect the buttons of the object, while allowing the buttons to be operable.

In some embodiments, at least one button cover is a first color and a portion of the case distinct from the button cover is a second color distinct from the first color.

In some embodiments, the strap is a first color and at least a portion of the case is a second color distinct from the first color.

In some embodiments, a first portion of the case is a first color and a second portion of the case is a color distinct from the first color.

In some embodiments, the case comprises one or more holes configured to expose one or more elements of the object, including a camera lens of the object.

In some embodiments, the camera hole includes a lens therein.

Some embodiments provide a cord management system having a case for an object and a strap semi-permanently attached to the case. The case comprises a semi-permanent case attachment element at a first location on the case. The strap comprises a semi-permanent strap attachment element at a first location on the strap, where the semi-permanent strap attachment element is configured to semi-permanently attach to the semi-permanent case attachment element. The strap also comprises a first attachment point at a second location on the strap and a second attachment point at a third location on the strap. The strap further includes at least two modes of operation. In a first mode of operation, the first attachment point is attached to the second attachment point. In a second mode of operation, the first attachment point is detached from the second attachment point.

In some embodiments, the semi-permanent case attachment element and the semi-permanent strap attachment element are selected from a group comprising magnets, magnetic materials, zippers, hook and loop fasteners, snaps, buttons and button holes, and the like.

Some embodiments provide a cord management system comprising a case for an object, where the case has a front, a back, a bottom, a top, a first side, and a second side. The case has at least a portion of its back made of a magnetic material, and at least a portion of at least one of the front, bottom, top, first side, and second side are made of one or more non-magnetic materials.

In some embodiments, the case also has a cord attachment mechanism, one or more button covers; and one or more holes.

In some embodiments, substantially all of the back is made of a magnetic material.

In some embodiments, the back is made of one or more of a group comprising magnetic metal, ferromagnetic material, and paramagnetic material.

In some embodiments, the back is made of a pliable material which encapsulates small magnetic material elements within the pliable material.

In some embodiments, the small magnetic material elements are magnets.

In some embodiments, the pliable material is waterproof and/or scratch resistant.

In some embodiments, the cord management system includes a strap having a magnet to magnetically attach the strap to the case back.

In some embodiments, at least one of the front, bottom, top, first side, and second side of the case are made of a pliable, non-magnetic material.

In some embodiments, the back is held in place by one or more of a group comprising a rim of encapsulating material around the edge of the back, a pocket in the case, or one or more tracks in the case.

In some embodiments, the back of the case is at least partially coated with a coating material.

In some embodiments, a first portion of the back of the case is covered with a coating material having a first color. A second portion of the back is a second color distinct from the first color.

In some embodiments, the first portion of the back indicates a suggested spot for a magnetic strap.

In some embodiments, the back includes an indentation, where the indentation indicates a suggested spot for a magnetic strap.

Some embodiments provide a system, a computer-readable storage medium including instructions, and a computer-implemented method for manufacturing a cord management system. A case for an object is formed. A strap permanently attached to the case is formed. The strap comprises at least one first attachment point at a first location on the strap, and at least one second attachment point at a second location on the strap. The strap includes at least two modes of operation. In a first mode of operation, the first attachment point is attached to the second attachment point. In a second mode of operation, the first attachment point is detached from the second attachment point.

Some embodiments provide a system, a computer-readable storage medium including instructions, and a computer-implemented method for manufacturing a cord management system. A case is formed. The case has a semi-permanent case attachment mechanism at a first location. A strap for semi-permanently attaching to the case is formed. The strap has at least one semi-permanent strap attachment element at a first location on the strap, the semi-permanent strap attachment element configured to semi-permanently attach to the semi-permanent case attachment element. The strap also has at least one first attachment point at a second location on the strap, and at least one second attachment point at a third location on the strap. The strap includes at least two modes of operation. In a first mode of operation, the first attachment point is attached to the second attachment point. In a second mode of operation, the first attachment point is detached from the second attachment point.

Some embodiments provide a system, a computer-readable storage medium including instructions, and a computer-implemented method for manufacturing a cord management system. A case is formed. The case has a front, a back, a bottom, a top, a first side, and a second side. At least a portion of the back is made of a magnetic material, and at least a portion of at least one of the front, bottom, top, first side, and second side is made of one or more non-magnetic materials.

BRIEF DESCRIPTION OF THE DRAWINGS

FIG. 6A illustrates a top view of a magnetic strap, according to some embodiments.

FIG. 6B illustrates a perspective view of the magnetic strap illustrated in FIG. 6A, according to some embodiments.

FIG. 6C illustrates a side view of the magnetic strap illustrated in FIG. 6A, according to some embodiments.

FIG. 7A illustrates a top view of a magnetic strap, according to some embodiments.

FIG. 7B illustrates a perspective view of the magnetic strap illustrated in FIG. 7A, according to some embodiments.

FIG. 7C illustrates a side view of the magnetic strap illustrated in FIG. 7A, according to some embodiments.

FIG. 8A illustrates a top view of a magnetic strap, according to some embodiments.

FIG. 8B illustrates a perspective view of the magnetic strap illustrated in FIG. 8A, according to some embodiments.

FIG. 8C illustrates a side view of the magnetic strap illustrated in FIG. 8A, according to some embodiments.

FIG. 9A illustrates a top view of a magnetic strap, according to some embodiments.

FIG. 9B illustrates a perspective view of the magnetic strap illustrated in FIG. 9A, according to some embodiments.

FIG. 9C illustrates a side view of the magnetic strap illustrated in FIG. 9A, according to some embodiments.

FIG. 13A illustrates a top view of a magnetic bead, according to some embodiments.

FIG. 13B illustrates a side view of the magnetic bead, according to some embodiments.

FIG. 13C illustrates a cross-section view of the magnetic bead, according to some embodiments.

FIG. 13D illustrates another cross-section view of the magnetic bead, according to some embodiments.

FIG. 14A illustrates a magnetic bead, according to some embodiments.

FIG. 14B illustrates another magnetic bead, according to some embodiments.

FIG. 14C illustrates another magnetic bead, according to some embodiments.

FIG. 14D illustrates another magnetic bead, according to some embodiments.

FIG. 14E illustrates another magnetic bead, according to some embodiments.

FIG. 14F illustrates another magnetic bead, according to some embodiments.

FIG. 14G illustrates another magnetic bead, according to some embodiments.

FIG. 14H illustrates another magnetic bead, according to some embodiments.

FIG. 14J illustrates another magnetic bead, according to some embodiments.

FIG. 14K illustrates another magnetic bead, according to some embodiments.

FIG. 17A illustrates a magnetic strap attached to an object, according to some embodiments.

FIG. 17B illustrates the magnetic strap of FIG. 17A folded to form a loop, according to some embodiments.

FIG. 28F illustrates the magnetic strap of FIG. 28E folded to form a loop, according to some embodiments.

FIG. 28G illustrates the magnetic strap securing a cord and attached to the object, according to some embodiments.

Table 1 presents exemplary dimensions of the magnetic beads illustrated in FIGS. 14A to 14K.

Figure 29A:
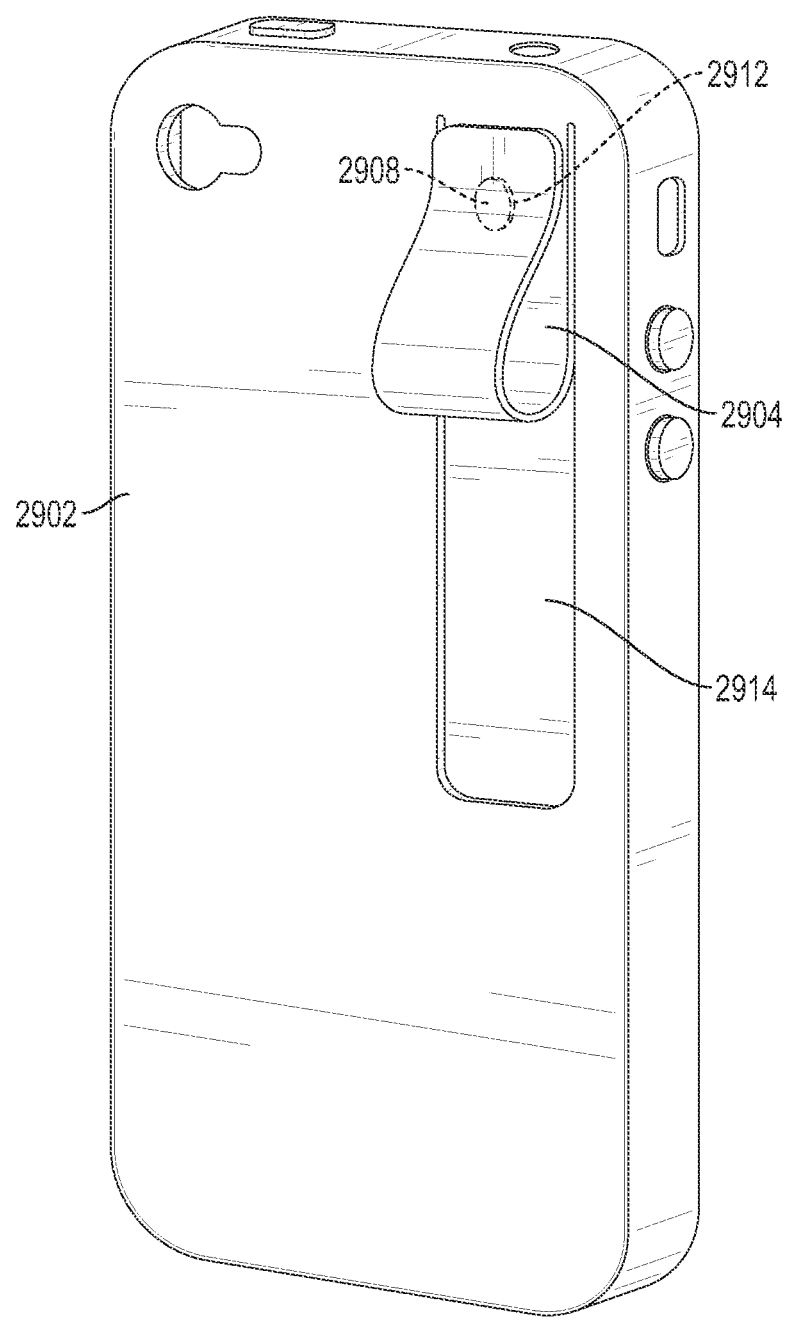

FIG. 29A illustrates a case with an integrated strap, according to some embodiments.

Figure 29B:
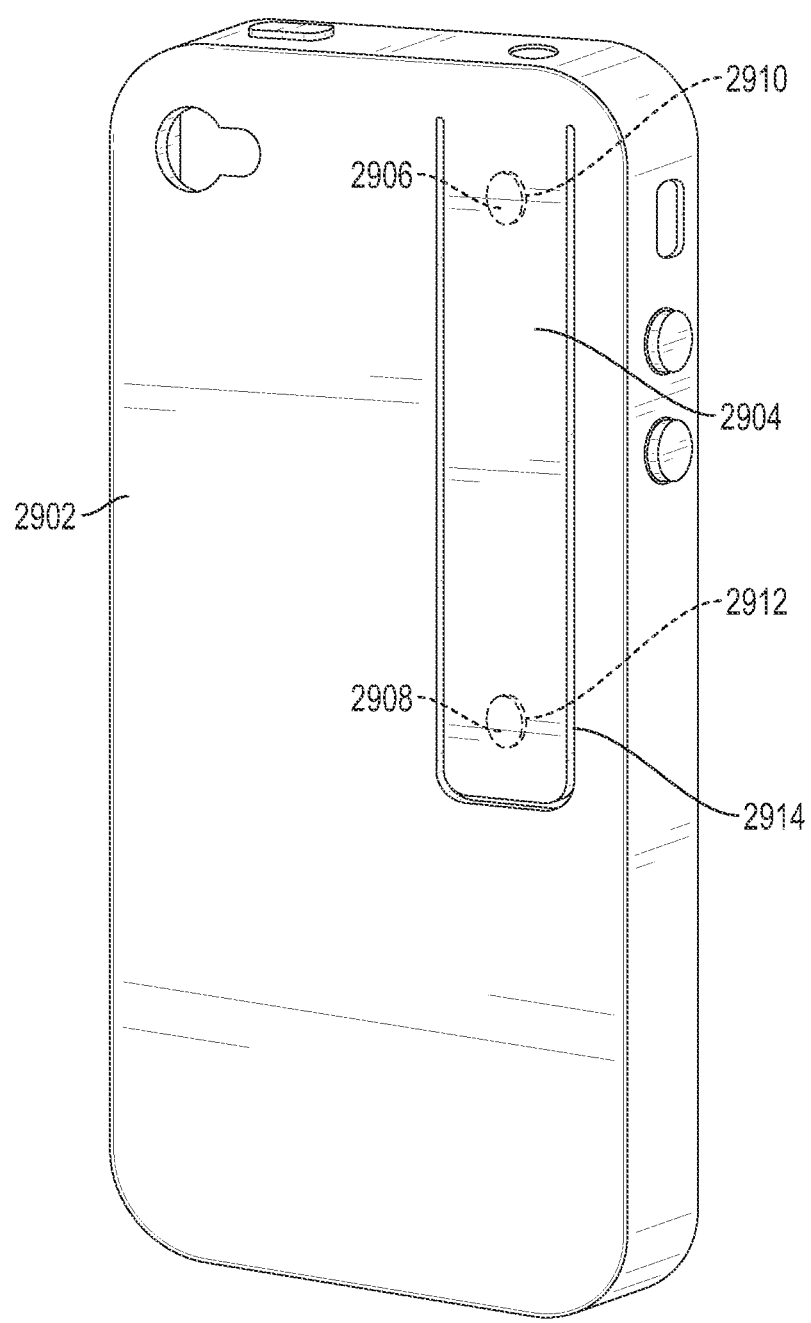

FIG. 29B illustrates another case with an integrated strap, according to some embodiments.

Figure 29C:
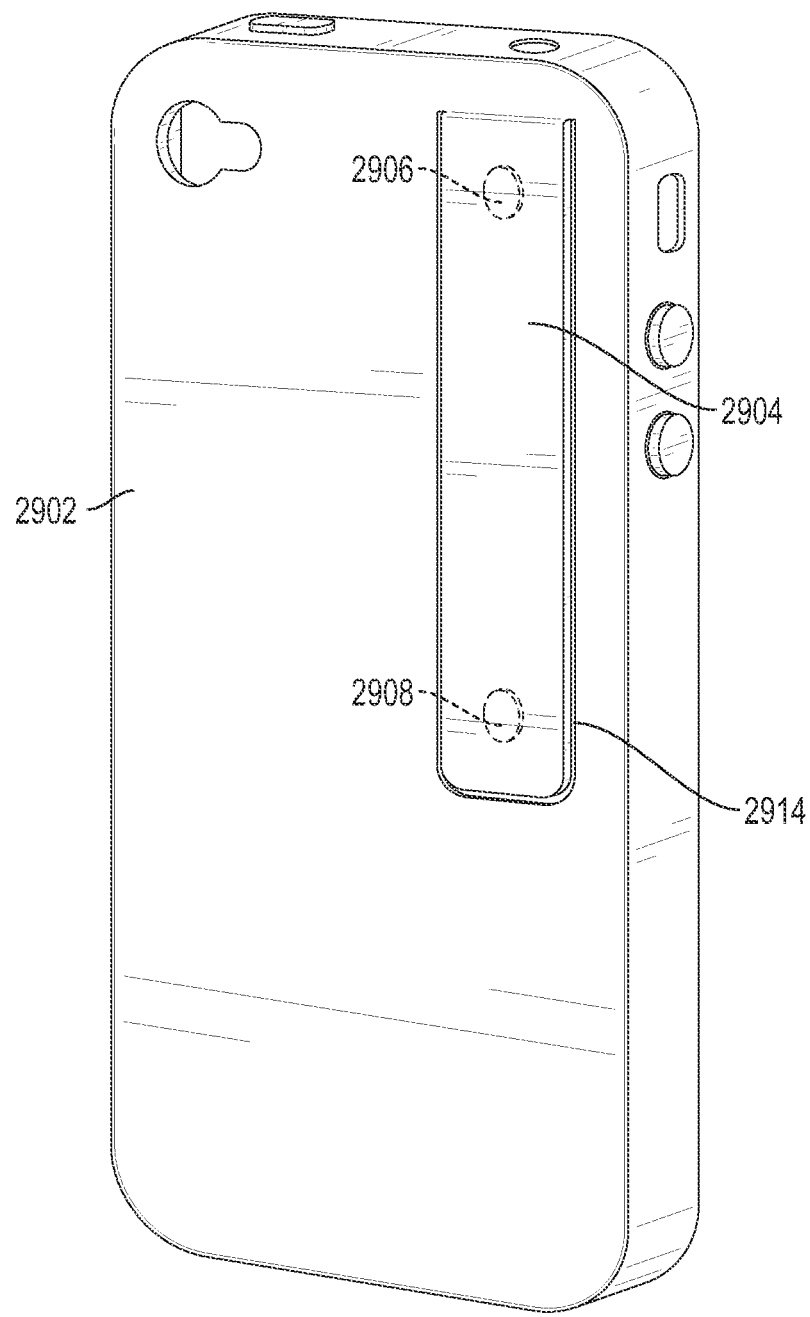

FIG. 29C illustrates another case with an integrated strap, according to some embodiments.

Figure 29D:
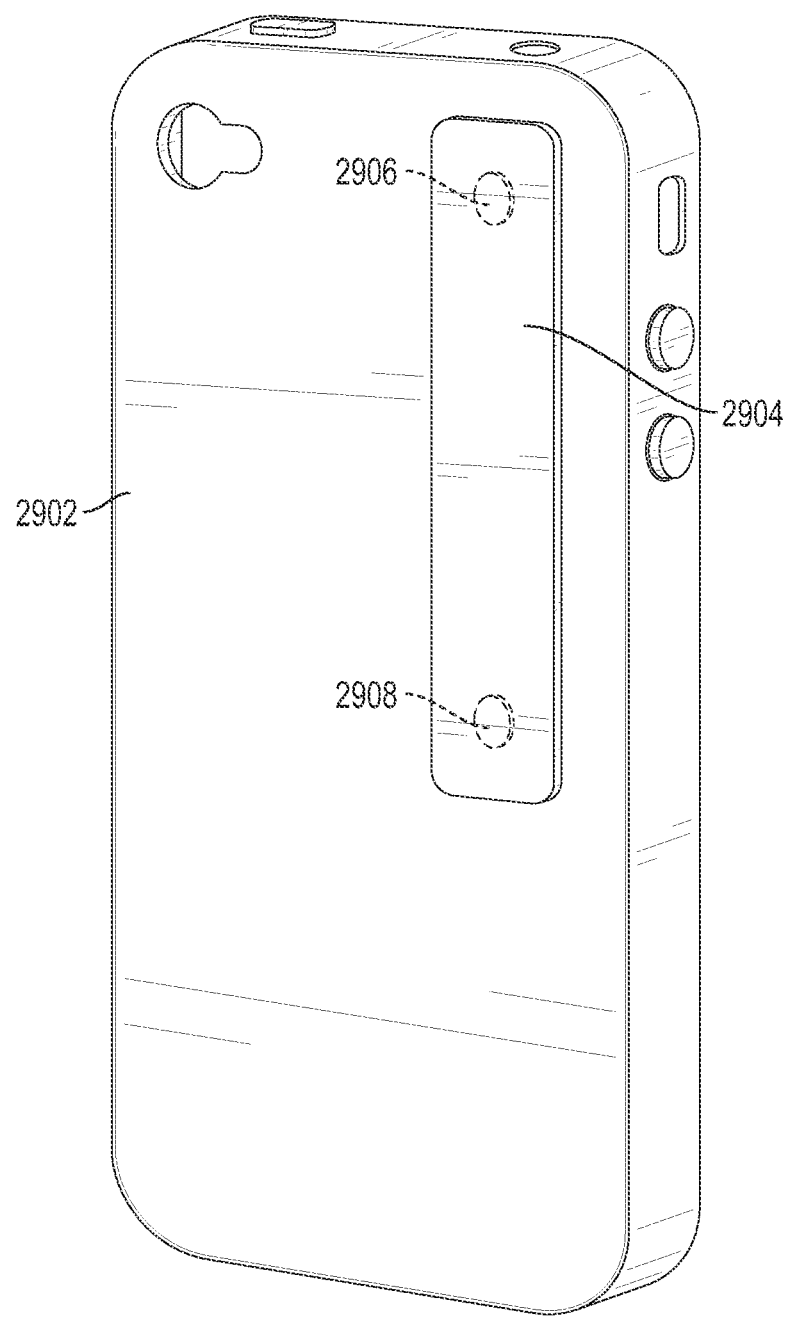

FIG. 29D illustrates a case with a strap, according to some embodiments.

Figure 29E:
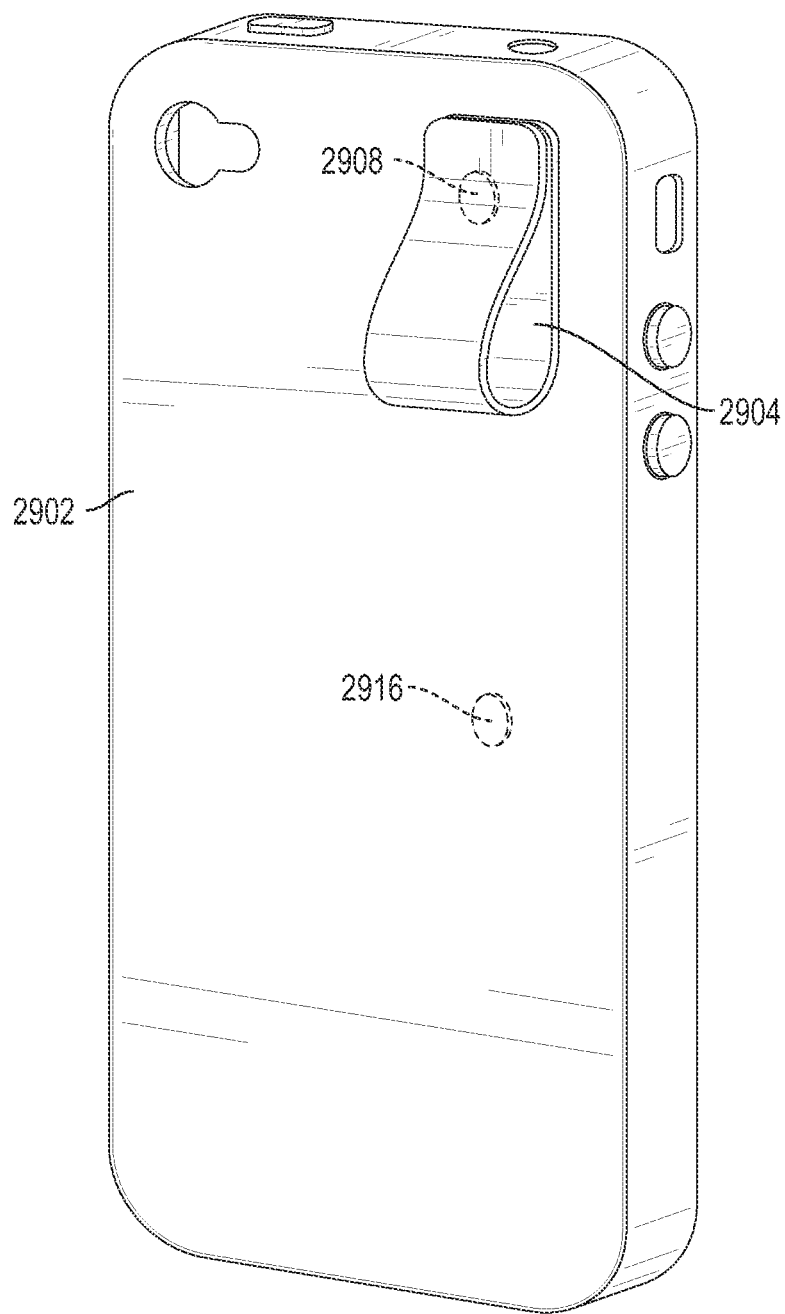

FIG. 29E illustrates another case with a strap, according to some embodiments.

Figure 29F:
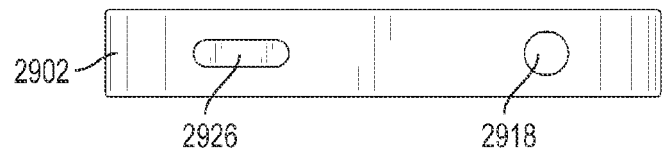

FIG. 29F illustrates a top view of a case, according to some embodiments.

Figure 29G:
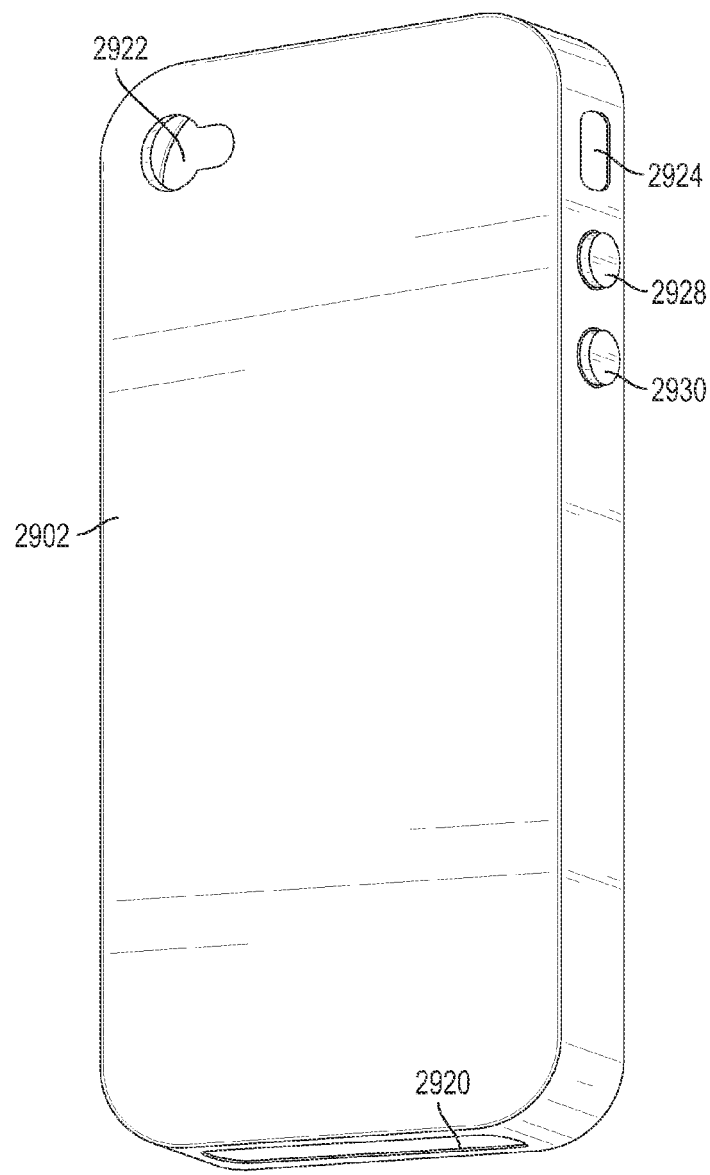

FIG. 29G illustrates a back view of a case, according to some embodiments.

Figure 29H:
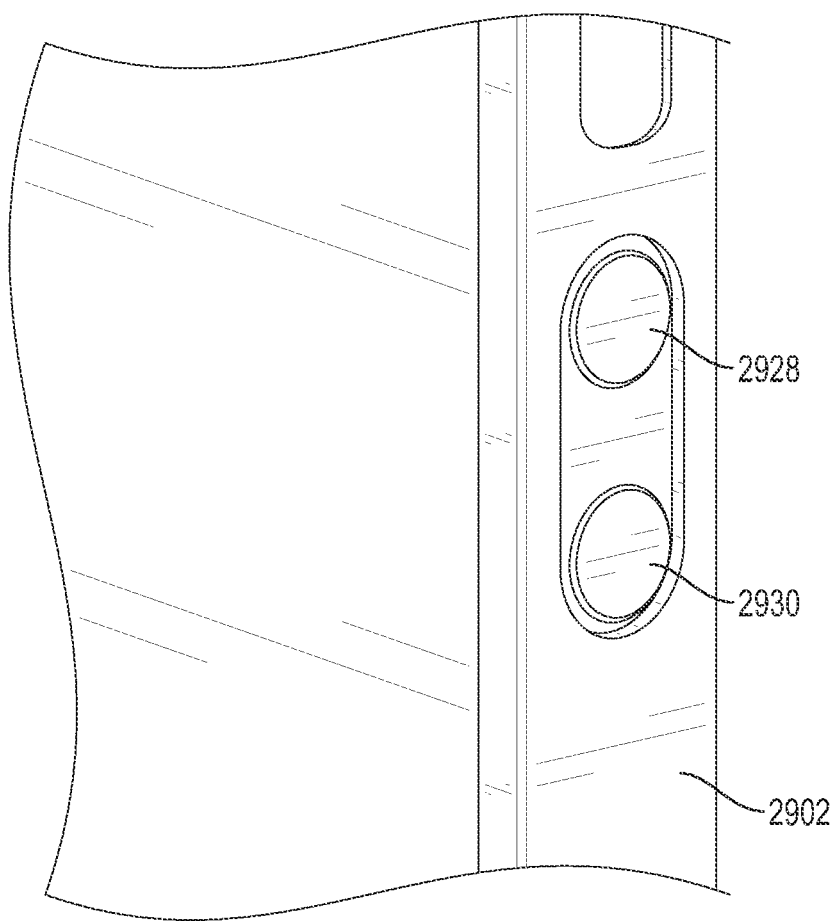

FIG. 29H illustrates a close up perspective view of a portion of a case, according to some embodiments.

Figure 29I:
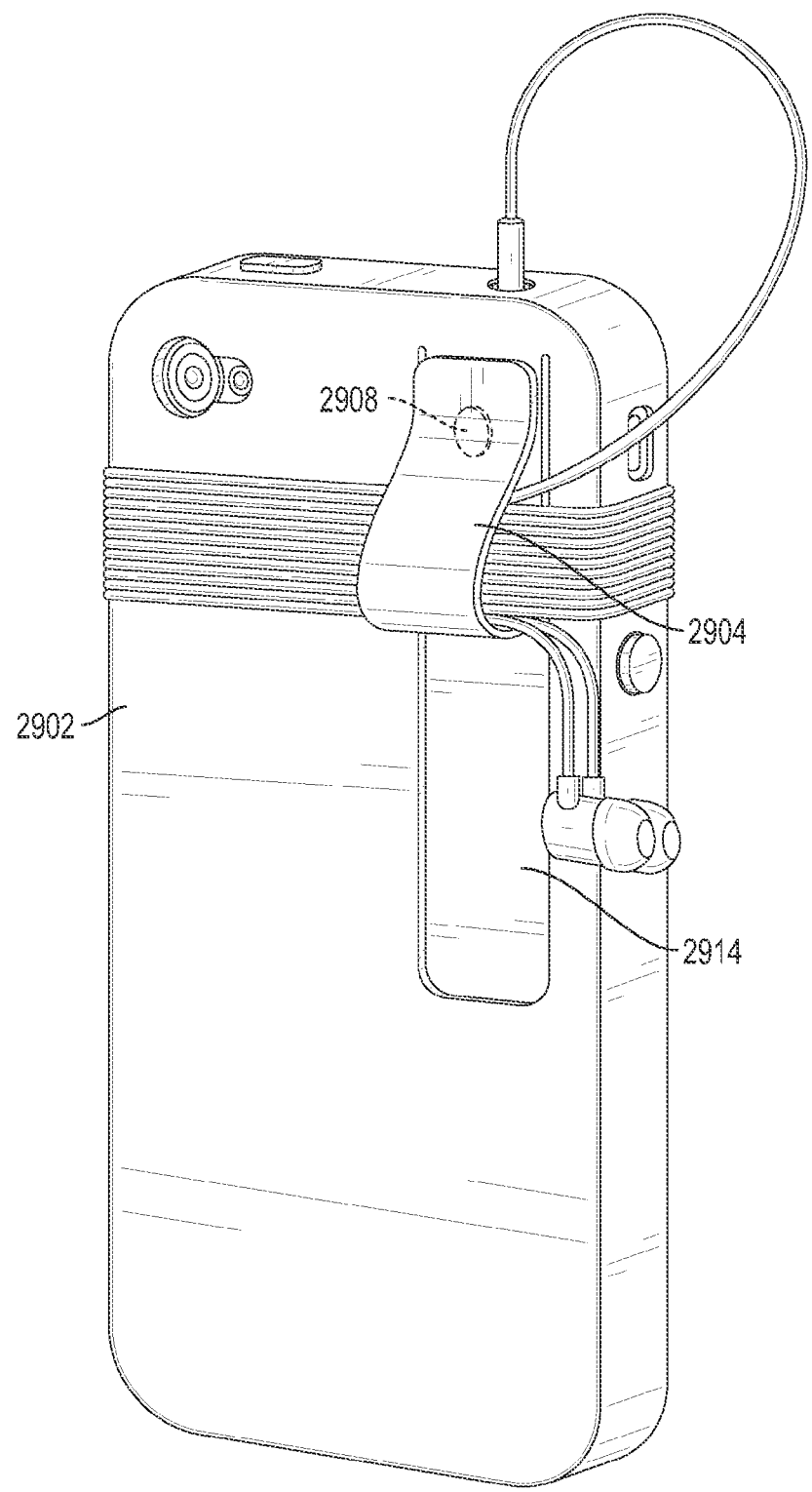
Figure 30A:
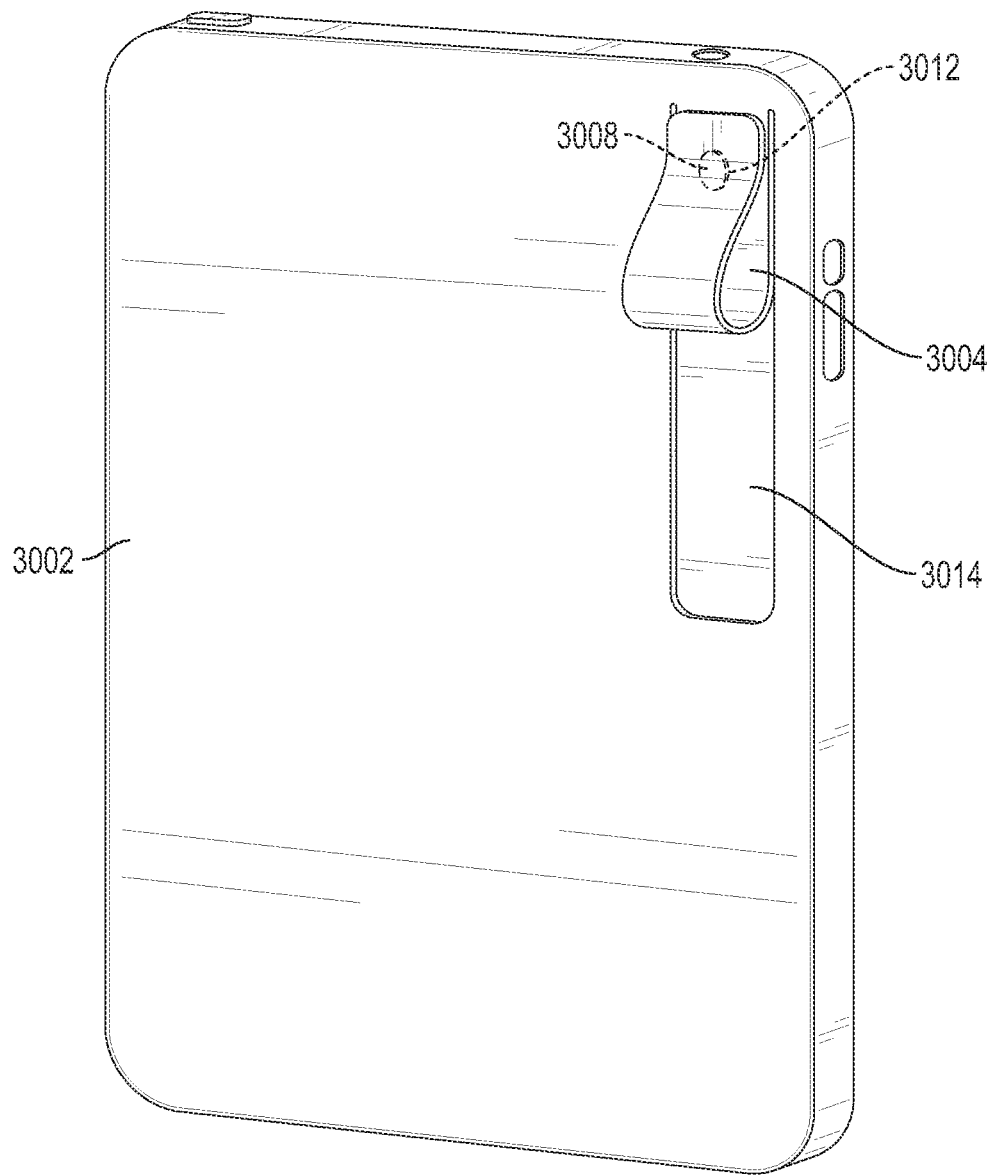
Figure 30B:
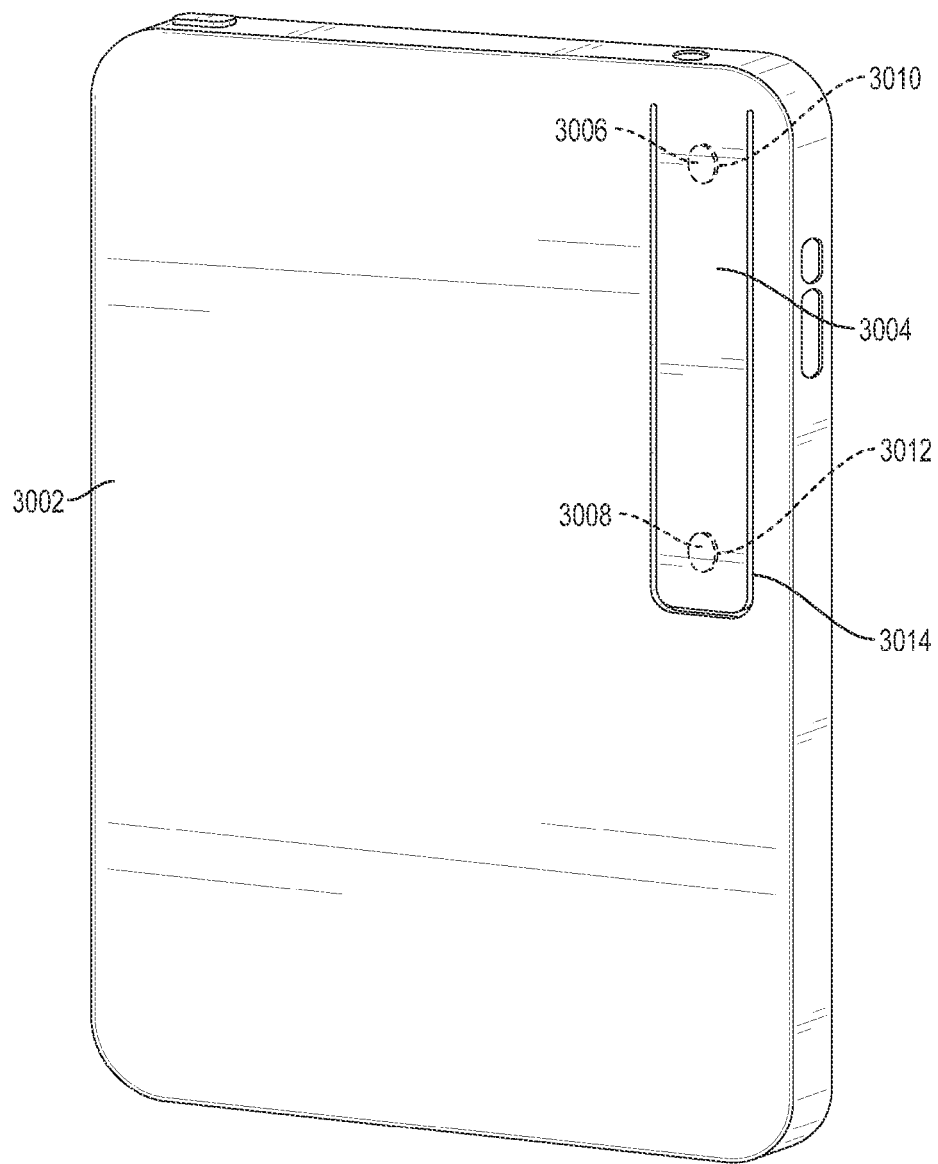
Figure 30C:
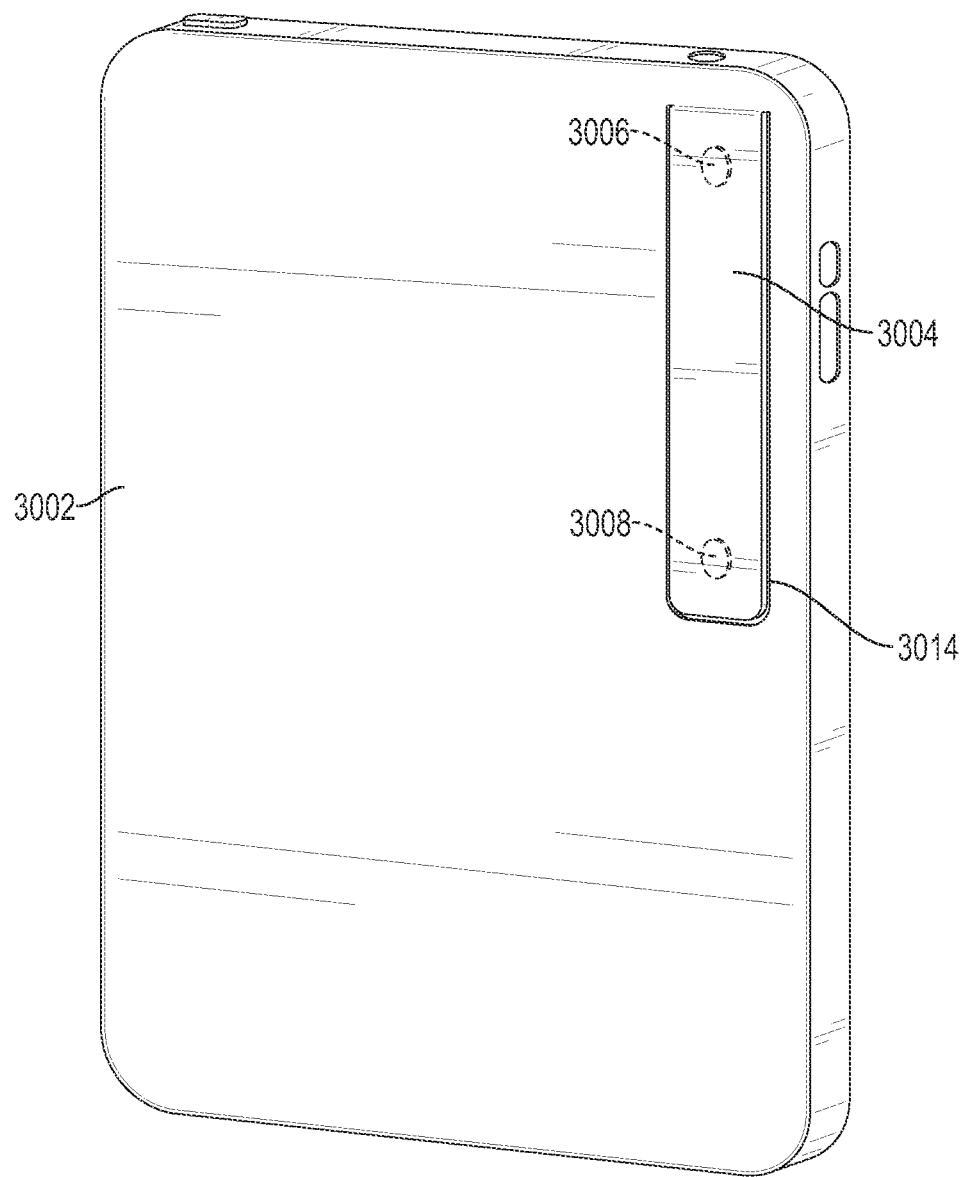
Figure 30D:
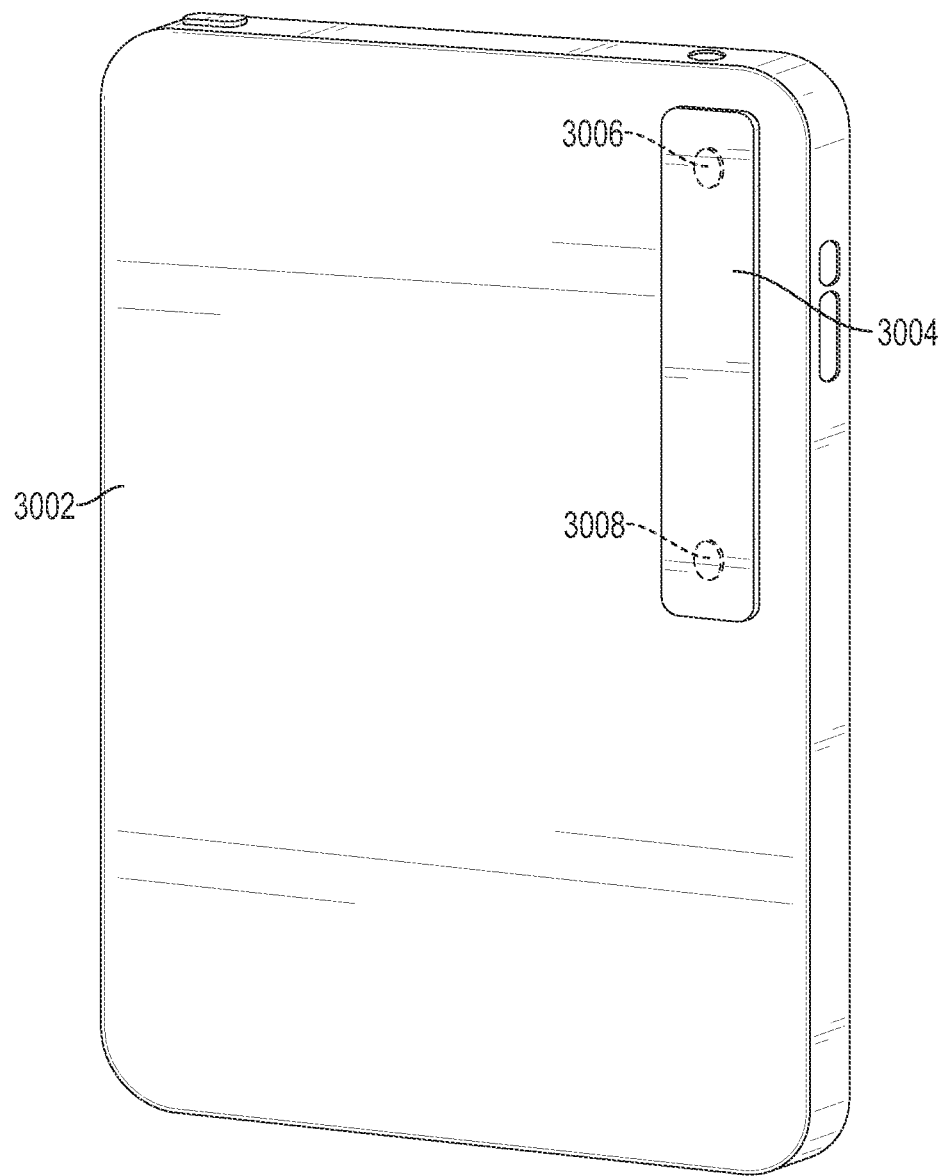
Figure 30E:
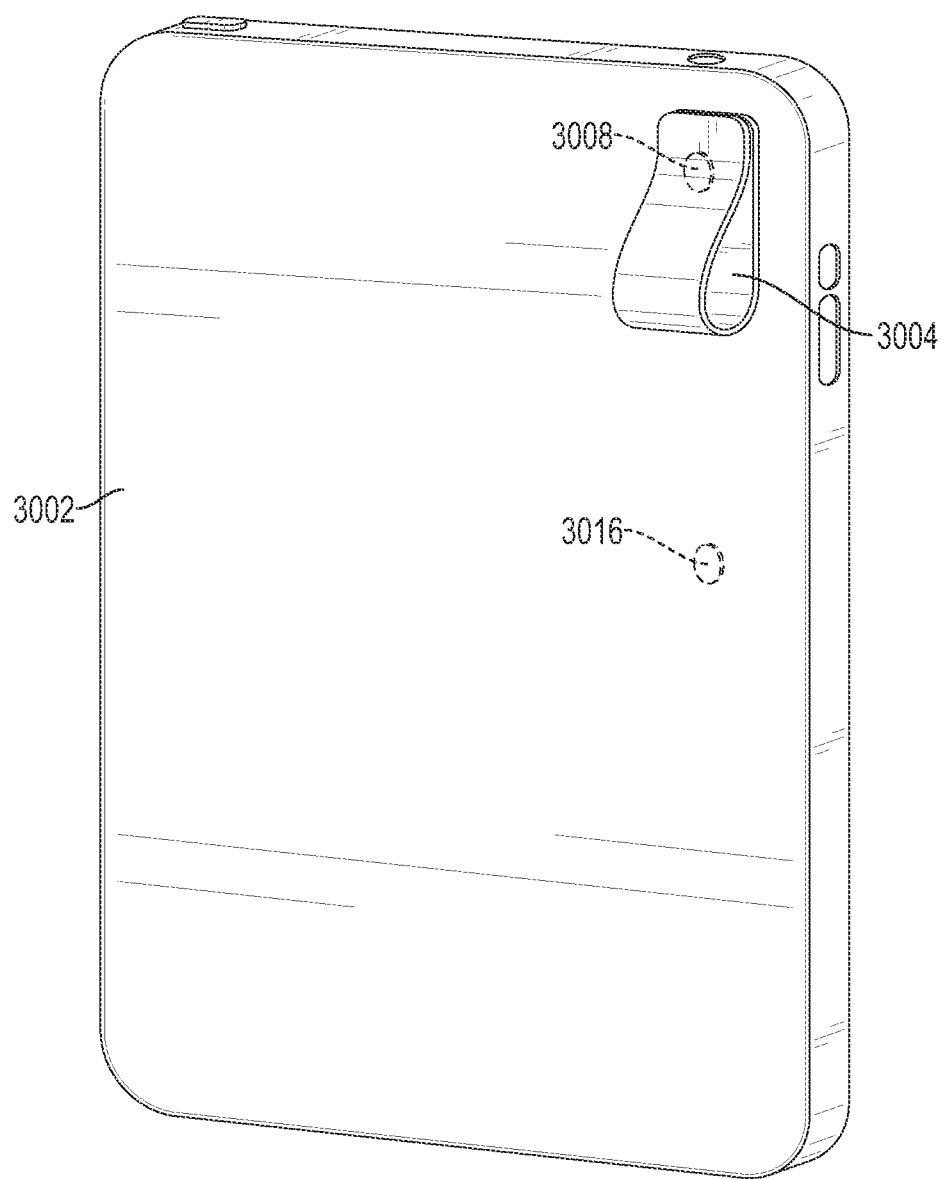
Figure 30F:
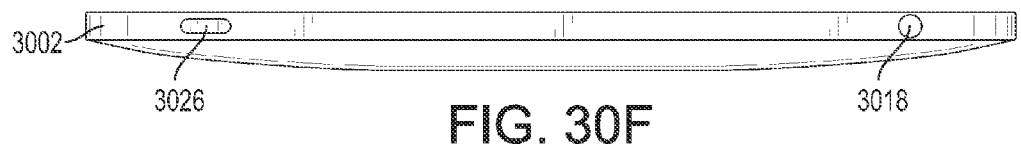
Figure 30G:
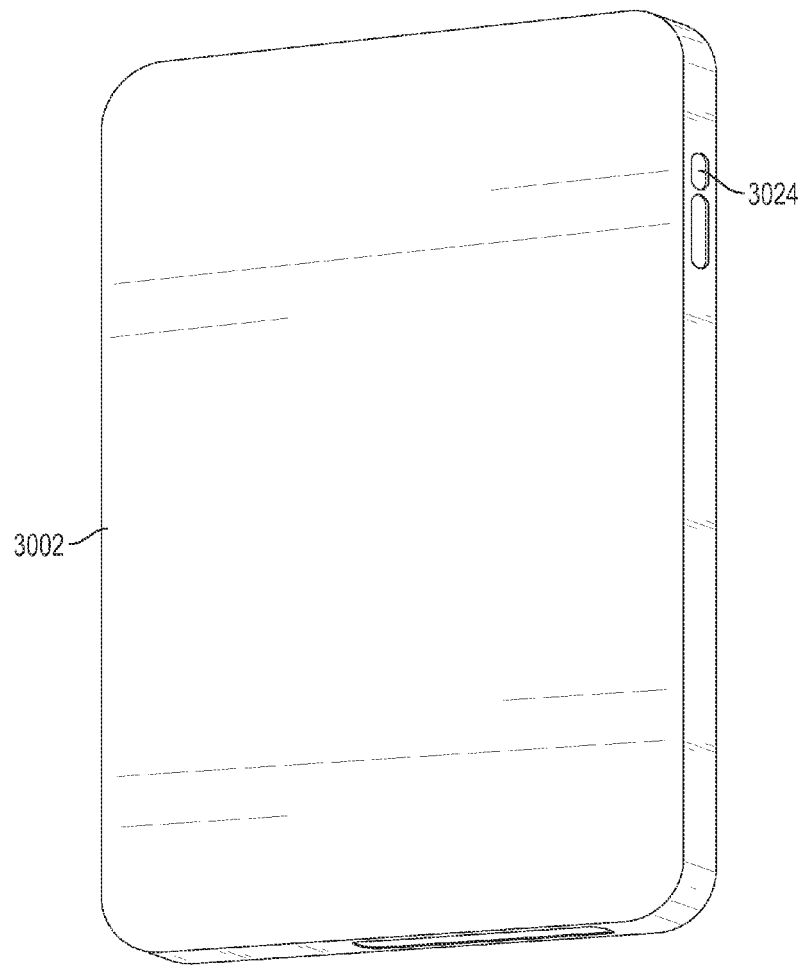
Figure 30H:
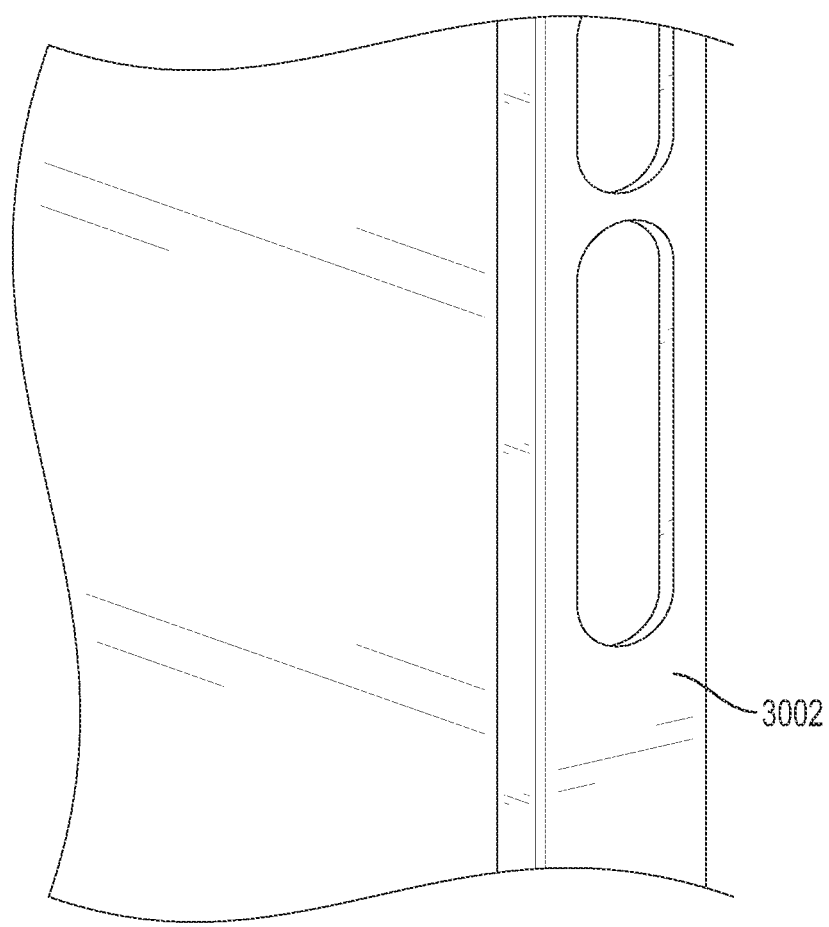
Figure 30I:
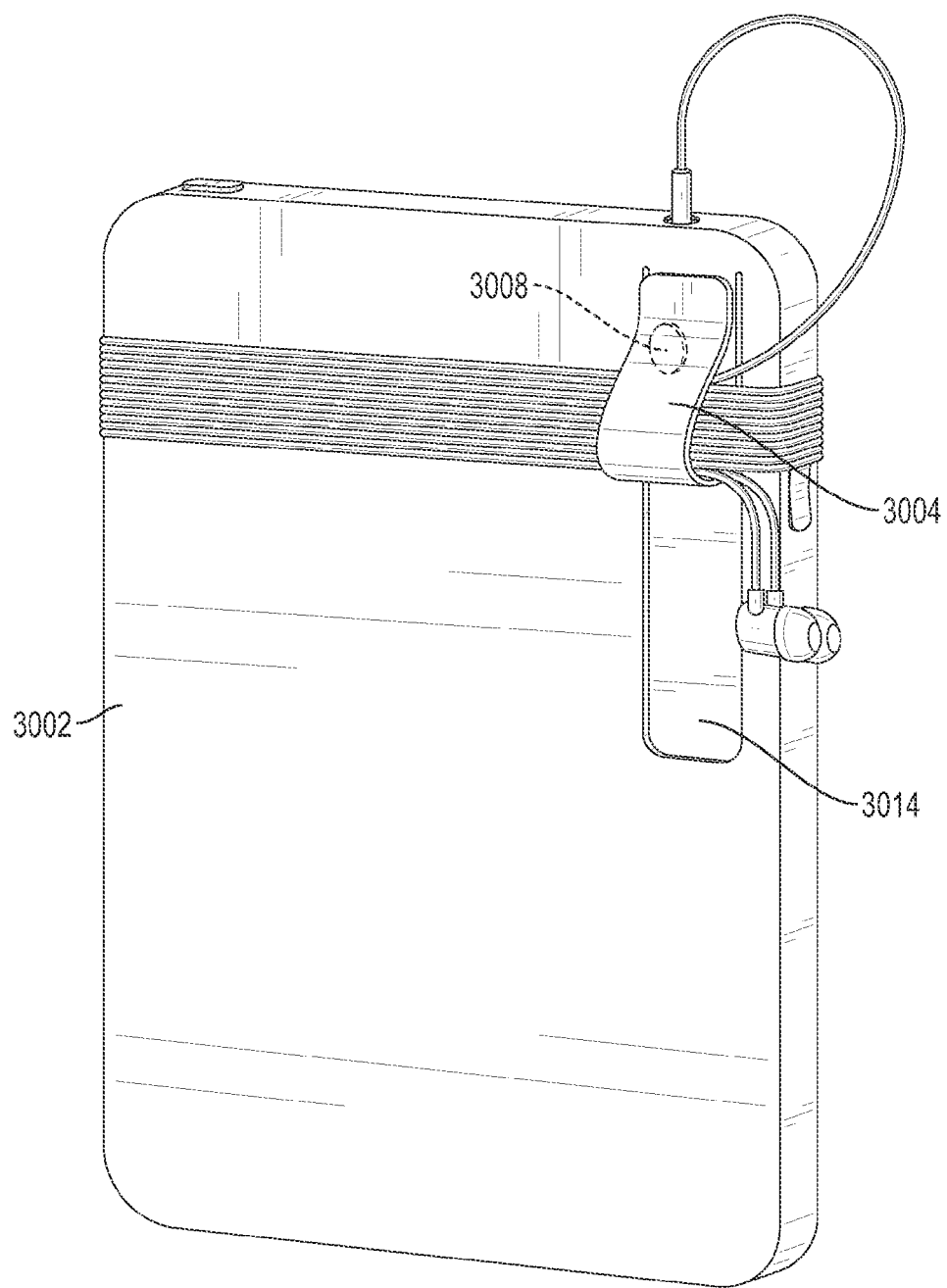

FIG. 29I illustrates an integrated strap folded into a loop and securing a cord wrapped around a case, according to some embodiments.

FIGS. 30A-30I illustrate embodiments of cases similar to those in FIGS. 29A-29I.

Figure 31A:
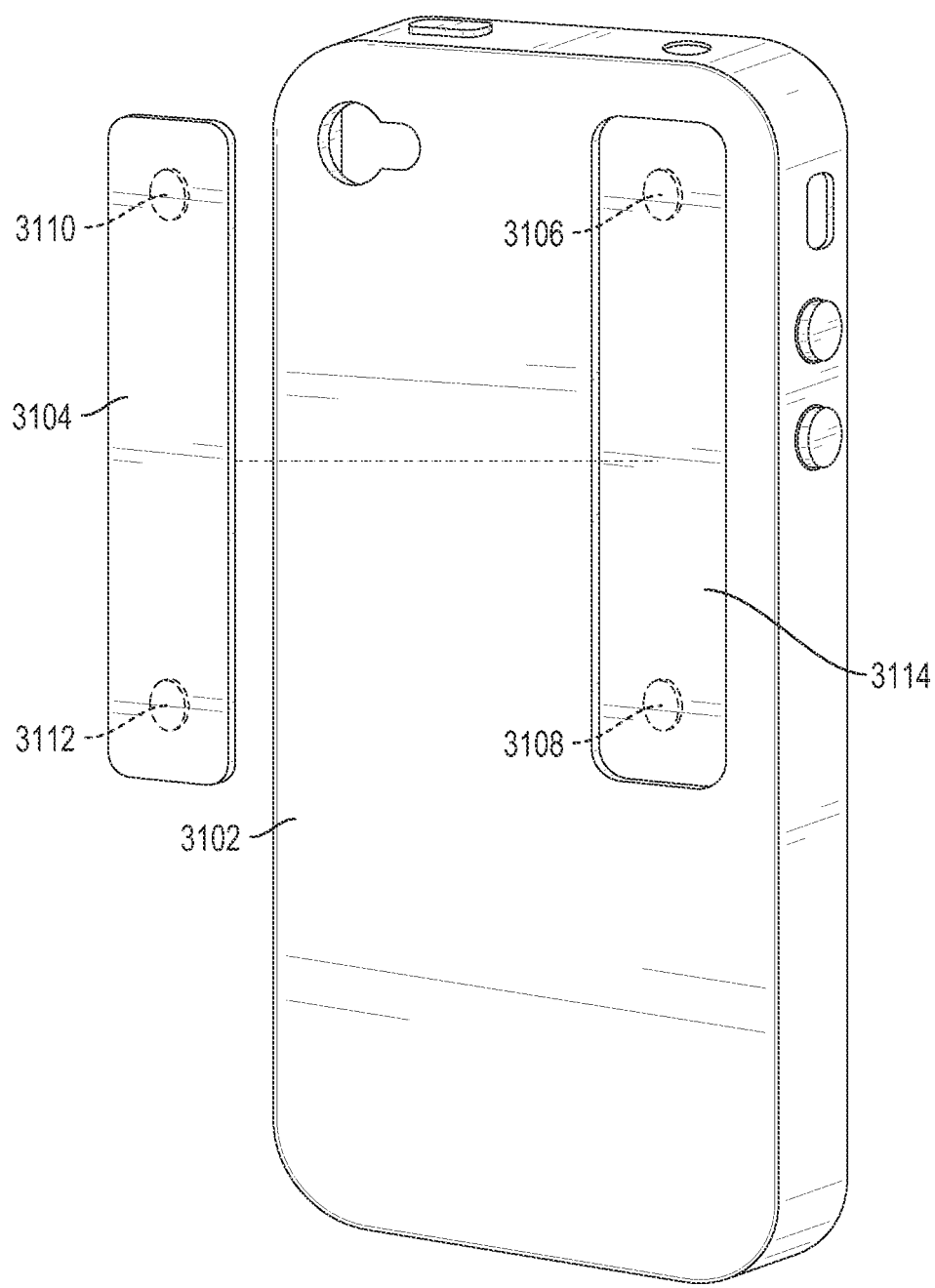

FIG. 31A illustrates a case with a semi-permanently attached strap with the strap detached, according to some embodiments.

Figure 31B:
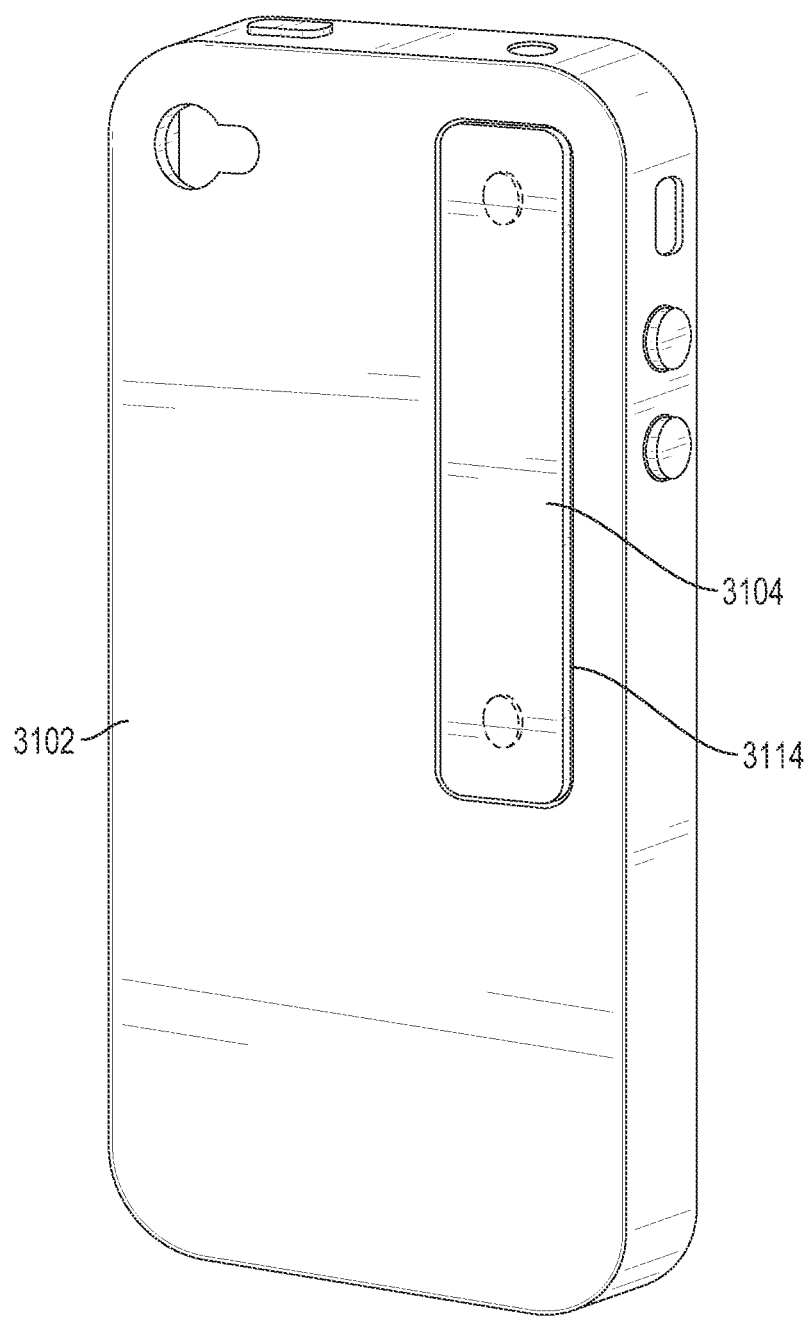

FIG. 31B illustrates a case with a semi-permanently attached strap, according to some embodiments.

Figure 31C:
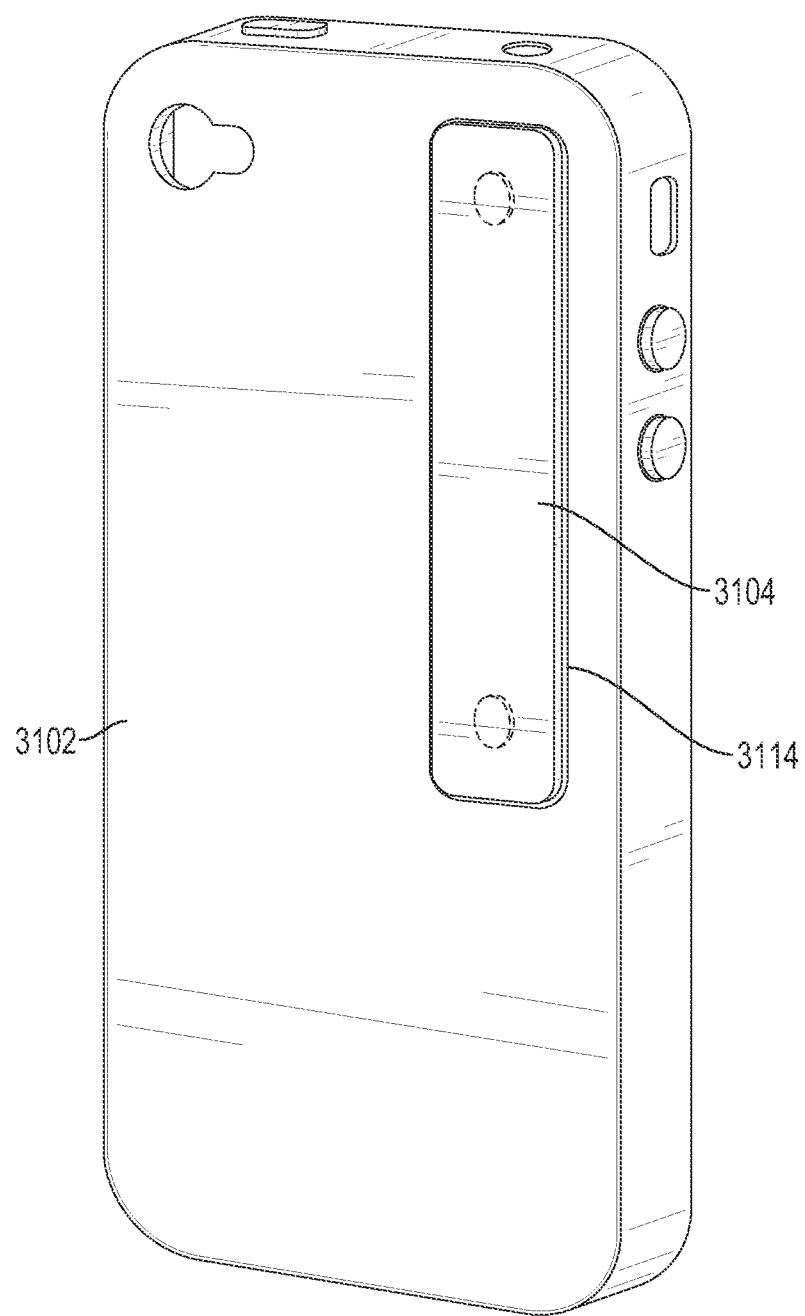

FIG. 31C illustrates another case with a semi-permanently attached strap, according to some embodiments.

Figure 31D:
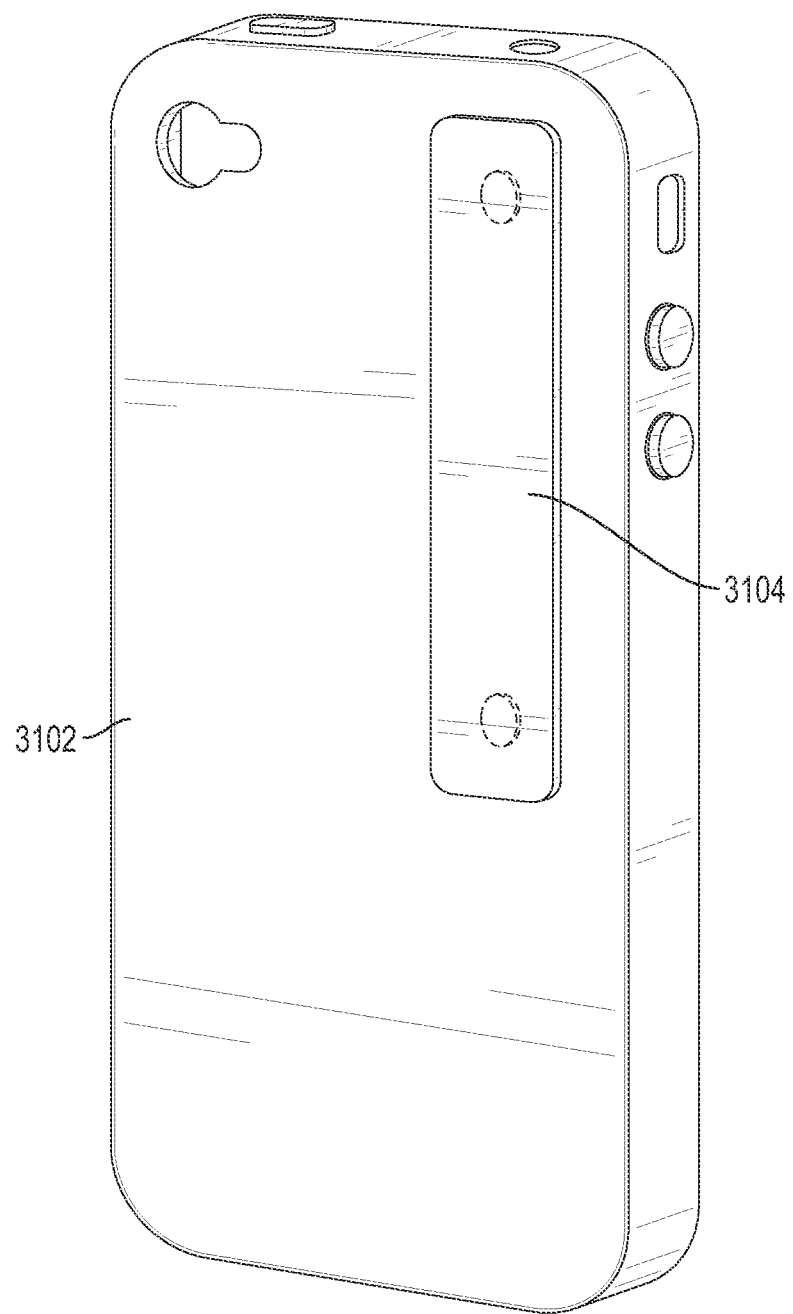

FIG. 31D illustrates another case with a semi-permanently attached strap, according to some embodiments.

Figure 31E:
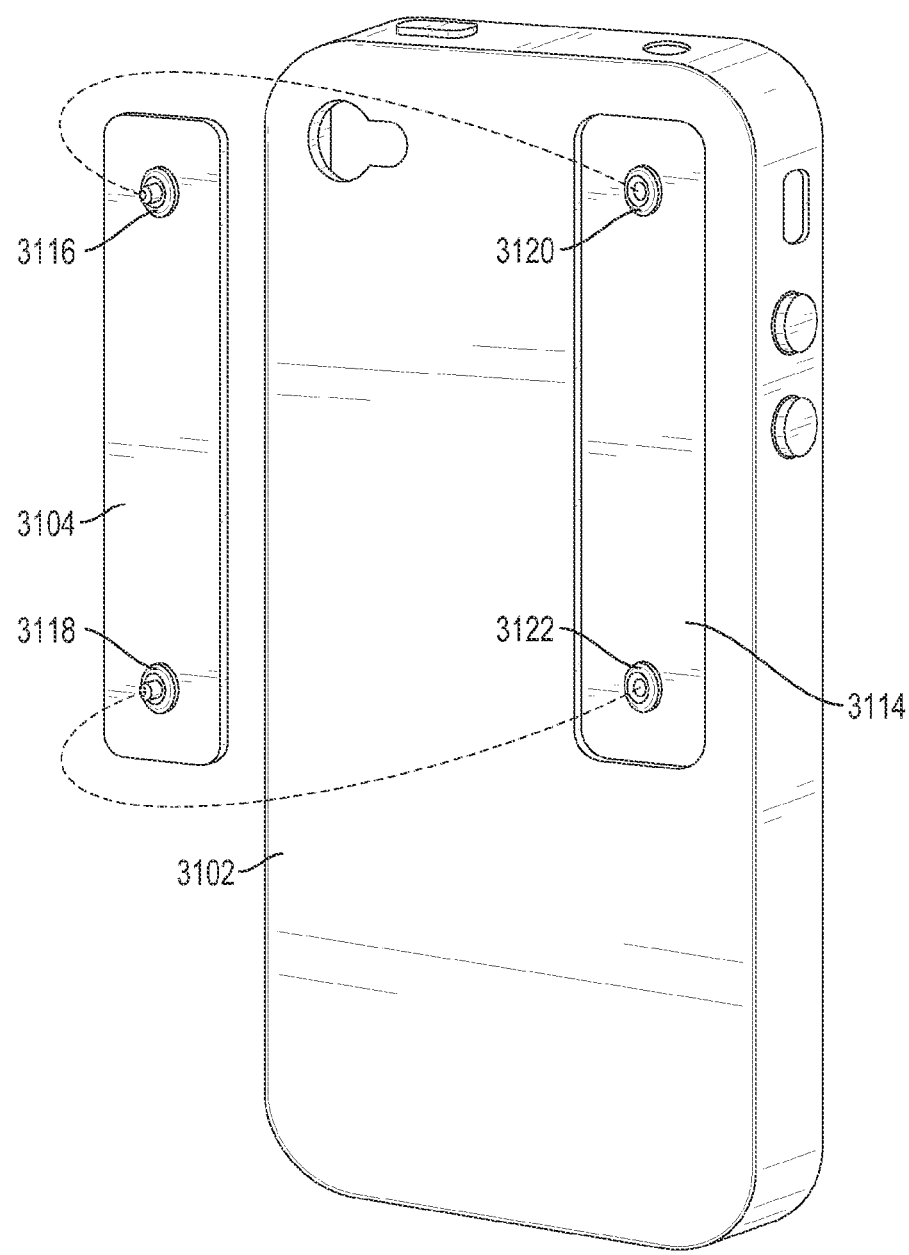

FIG. 31E illustrates another case with a semi-permanently attached strap with the strap detached, according to some embodiments.

Figure 31F:
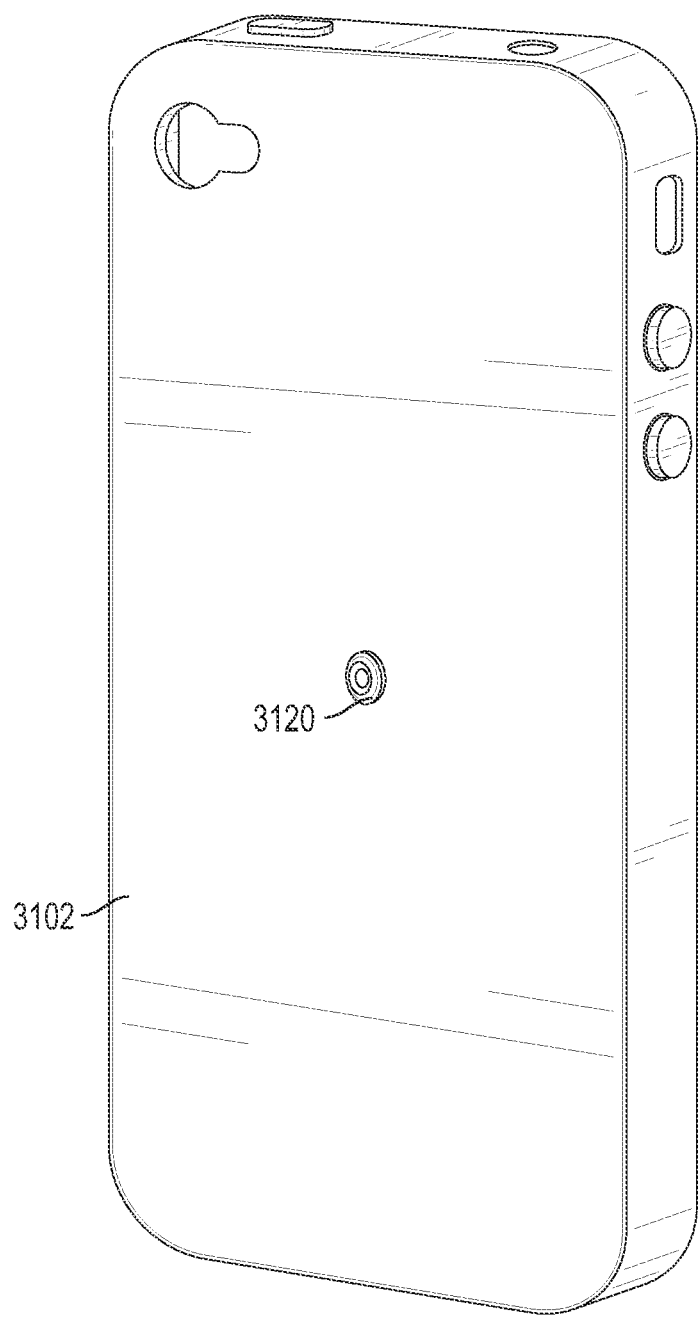

FIG. 31F illustrates a case with a non-magnetic attachment area, according to some embodiments.

Figure 31G:
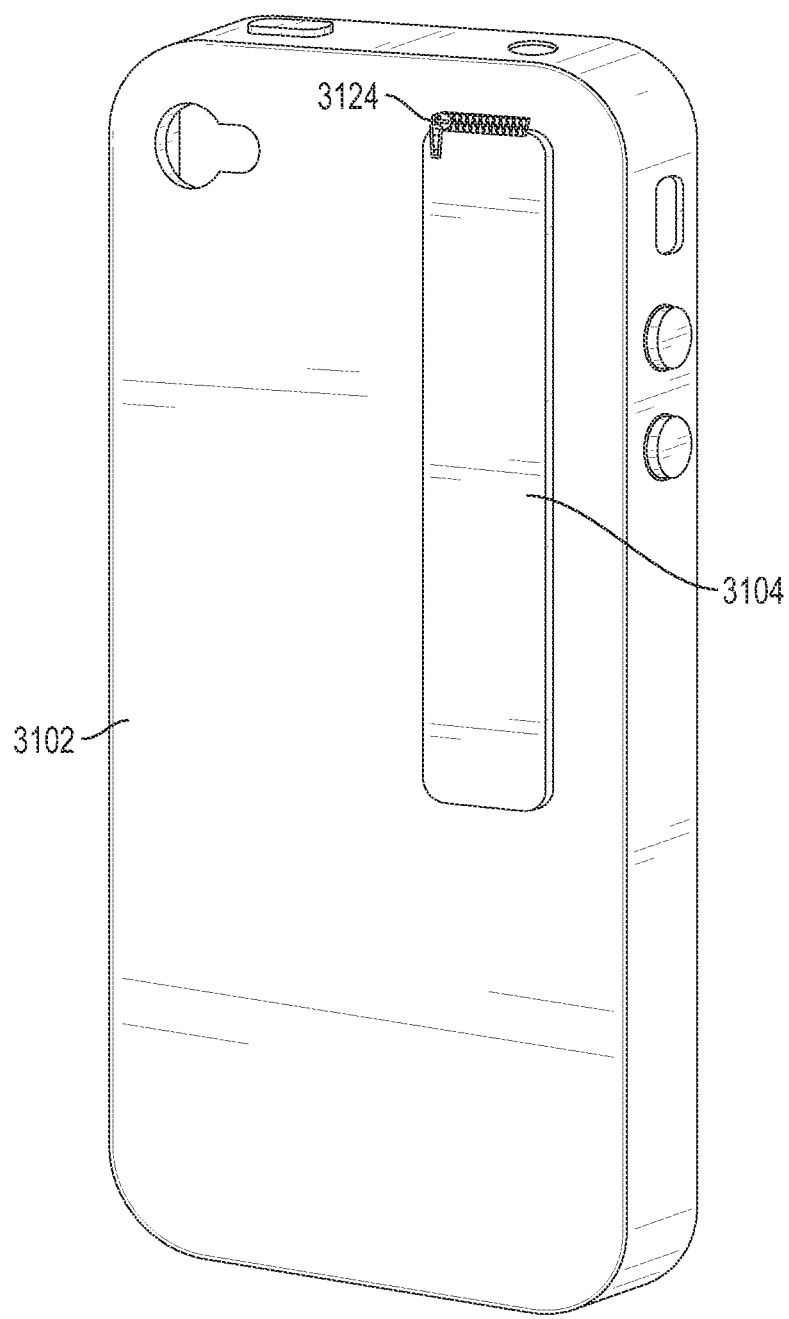

FIG. 31G illustrates another case with a semi-permanently attached strap, according to some embodiments.

Figure 31H:
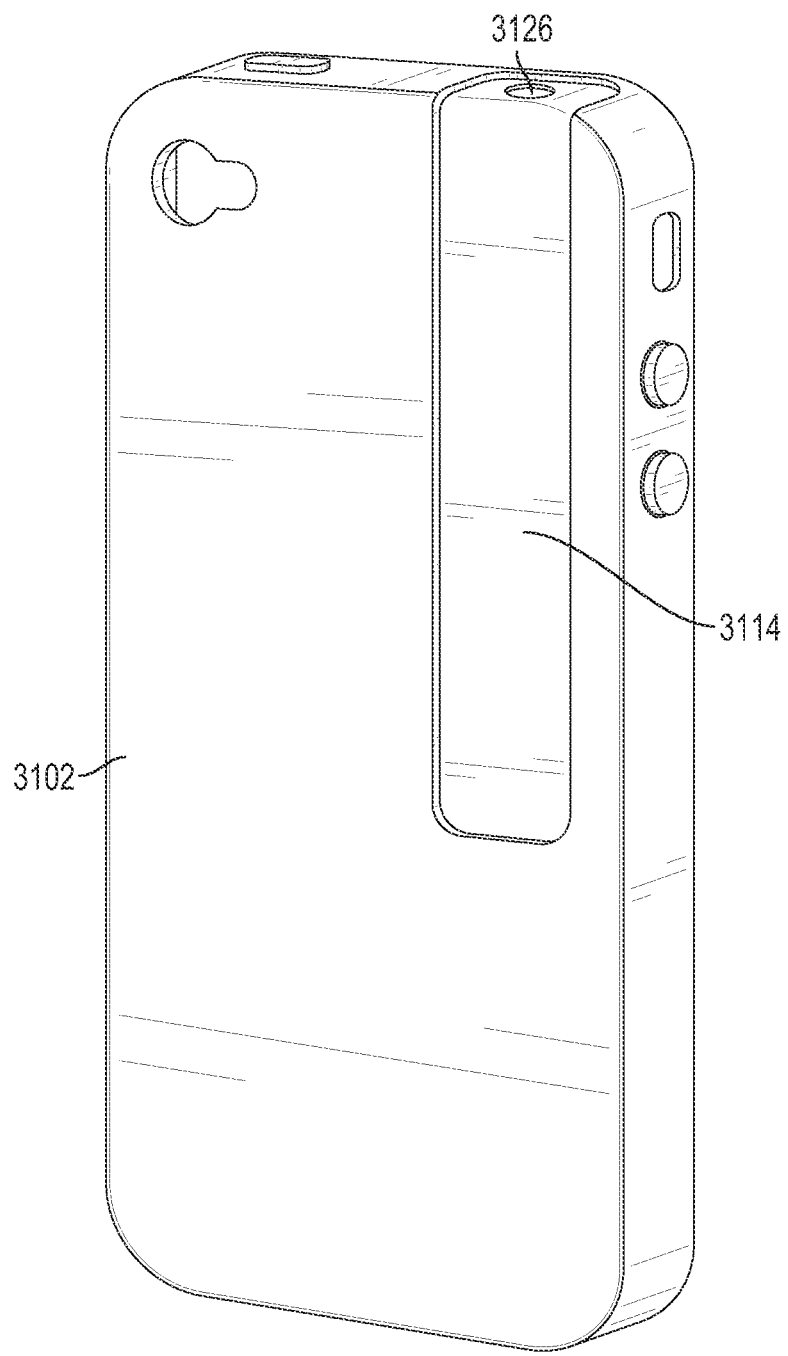

FIG. 31H illustrates a case with a cavity, according to some embodiments.

Figure 31I:
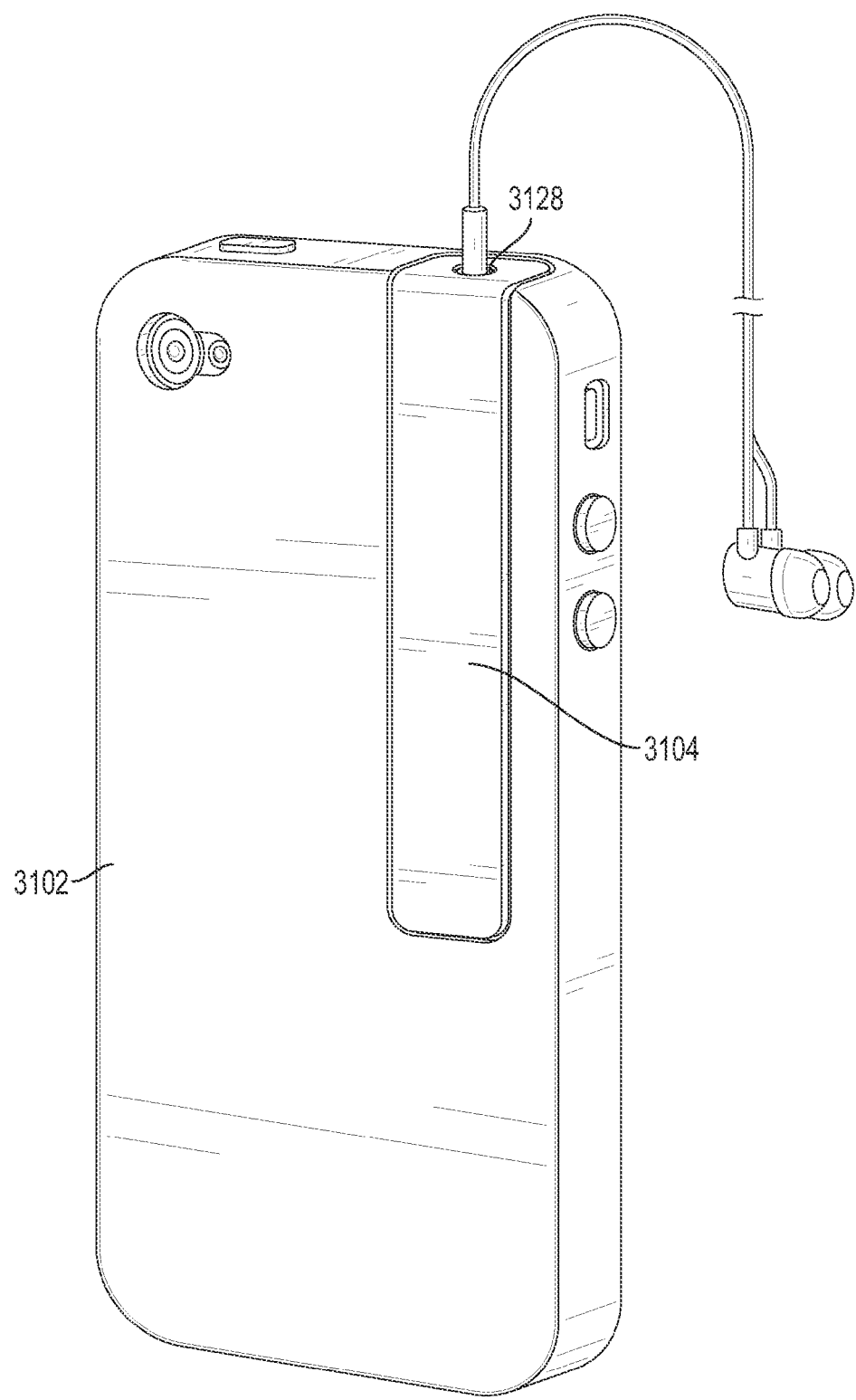

FIG. 31I illustrates a case with a cavity and a semi-permanently attached strap, according to some embodiments.

Figure 31J:
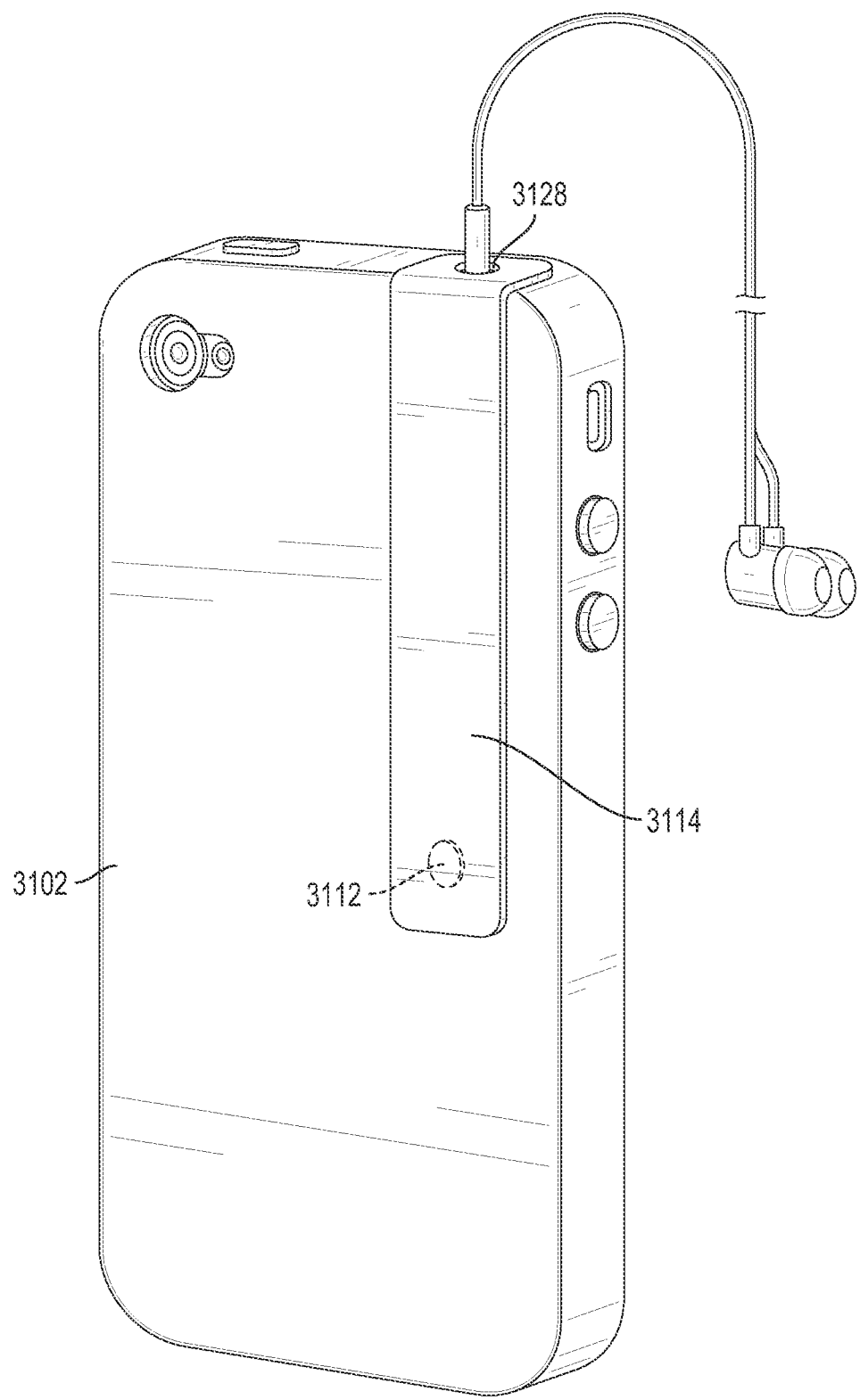
Figure 32A:
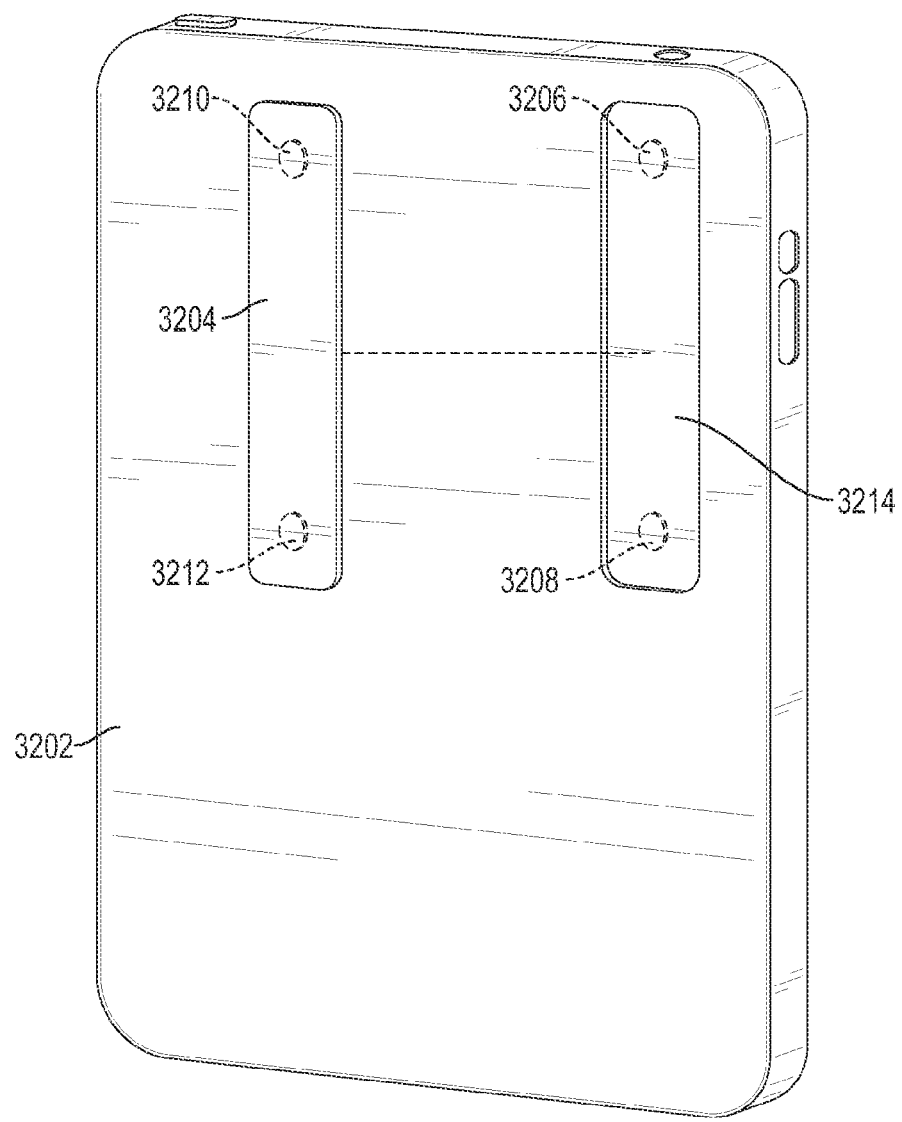
Figure 32B:
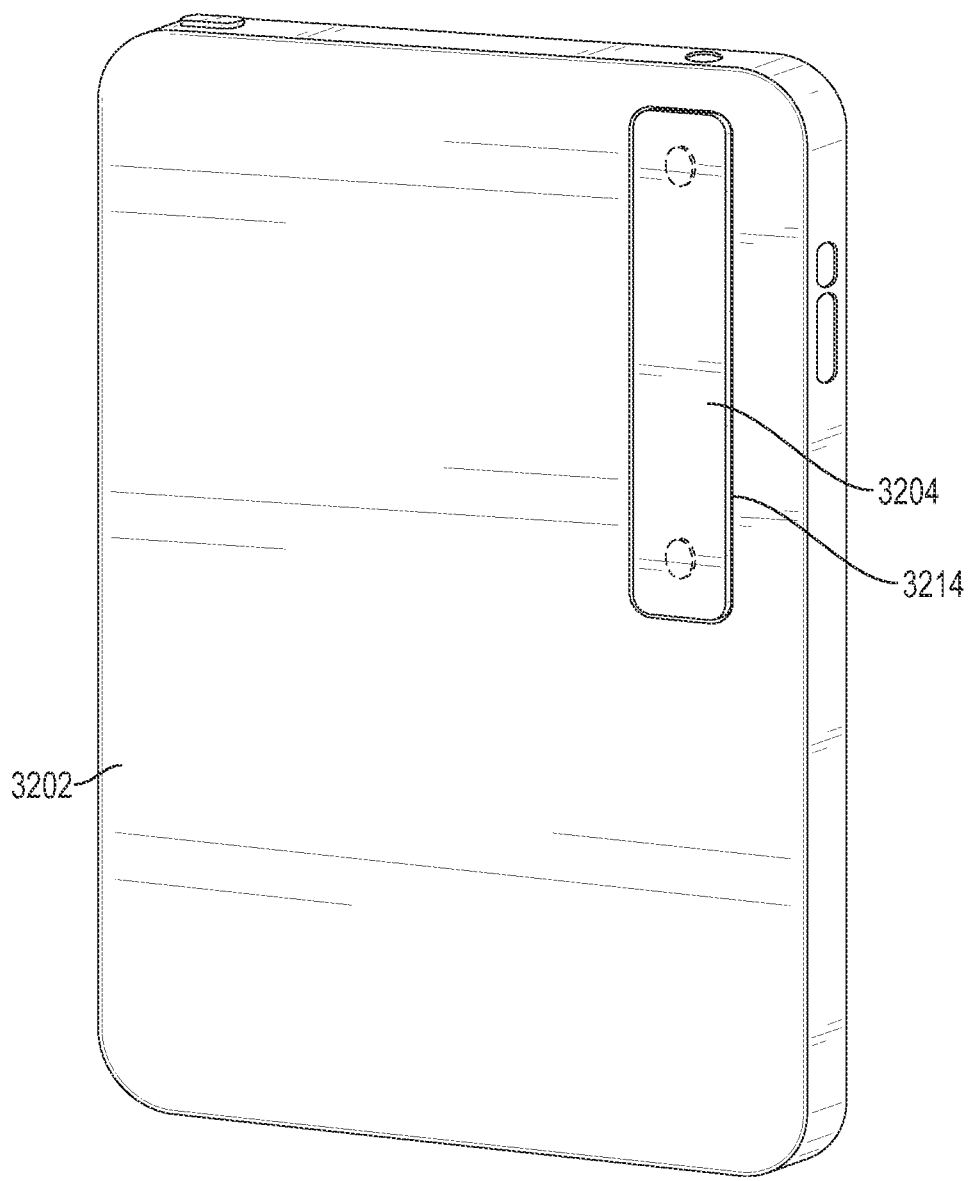
Figure 32C:
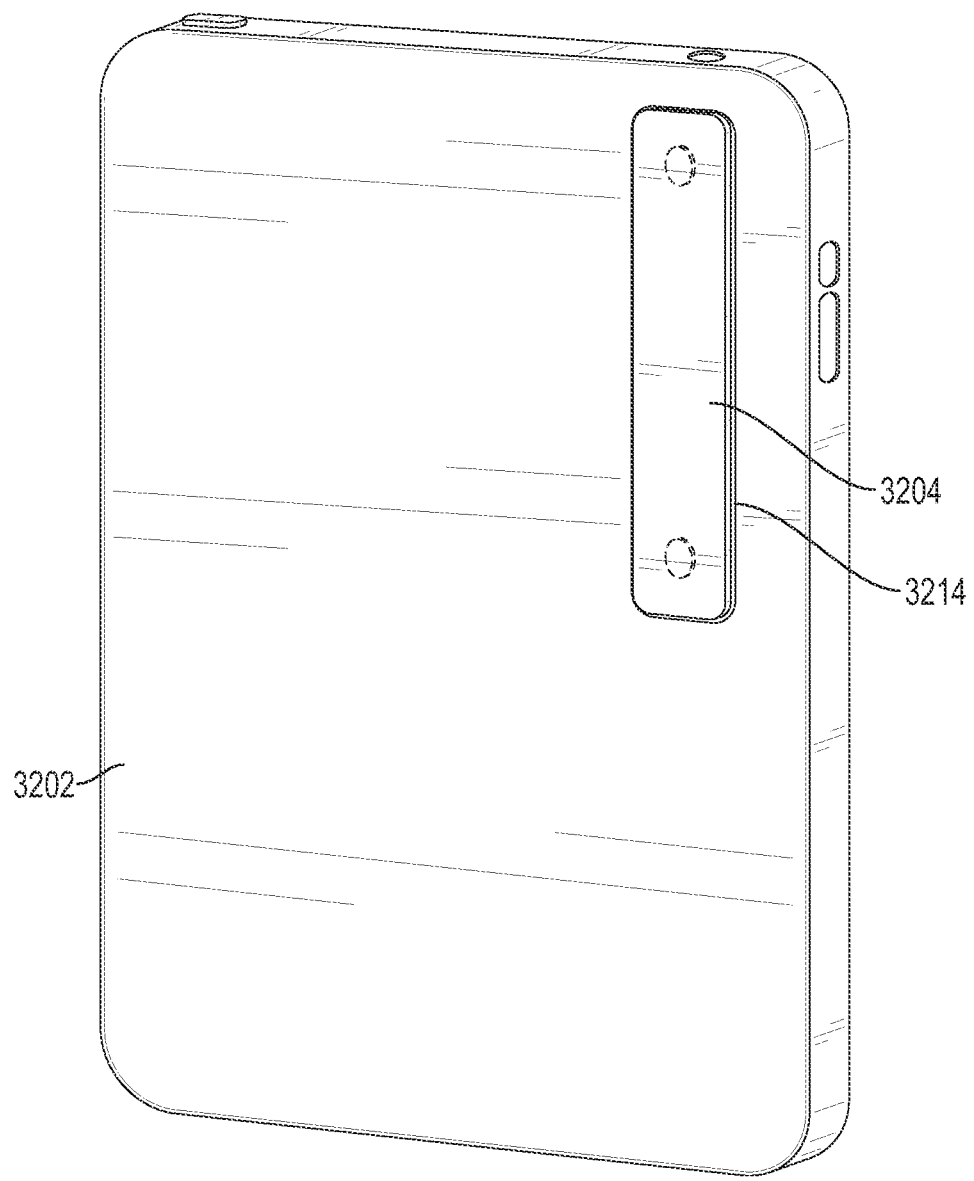
Figure 32D:
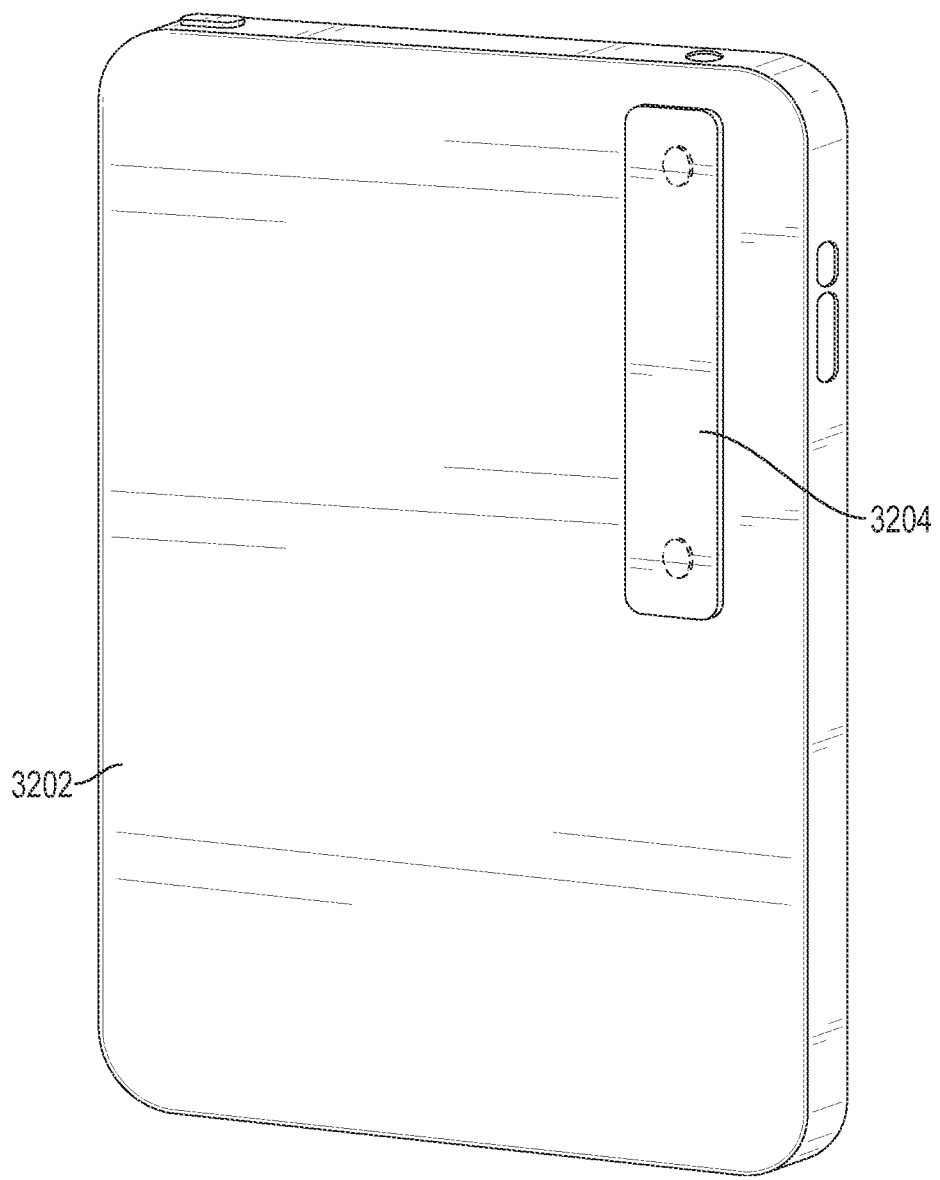
Figure 32E:
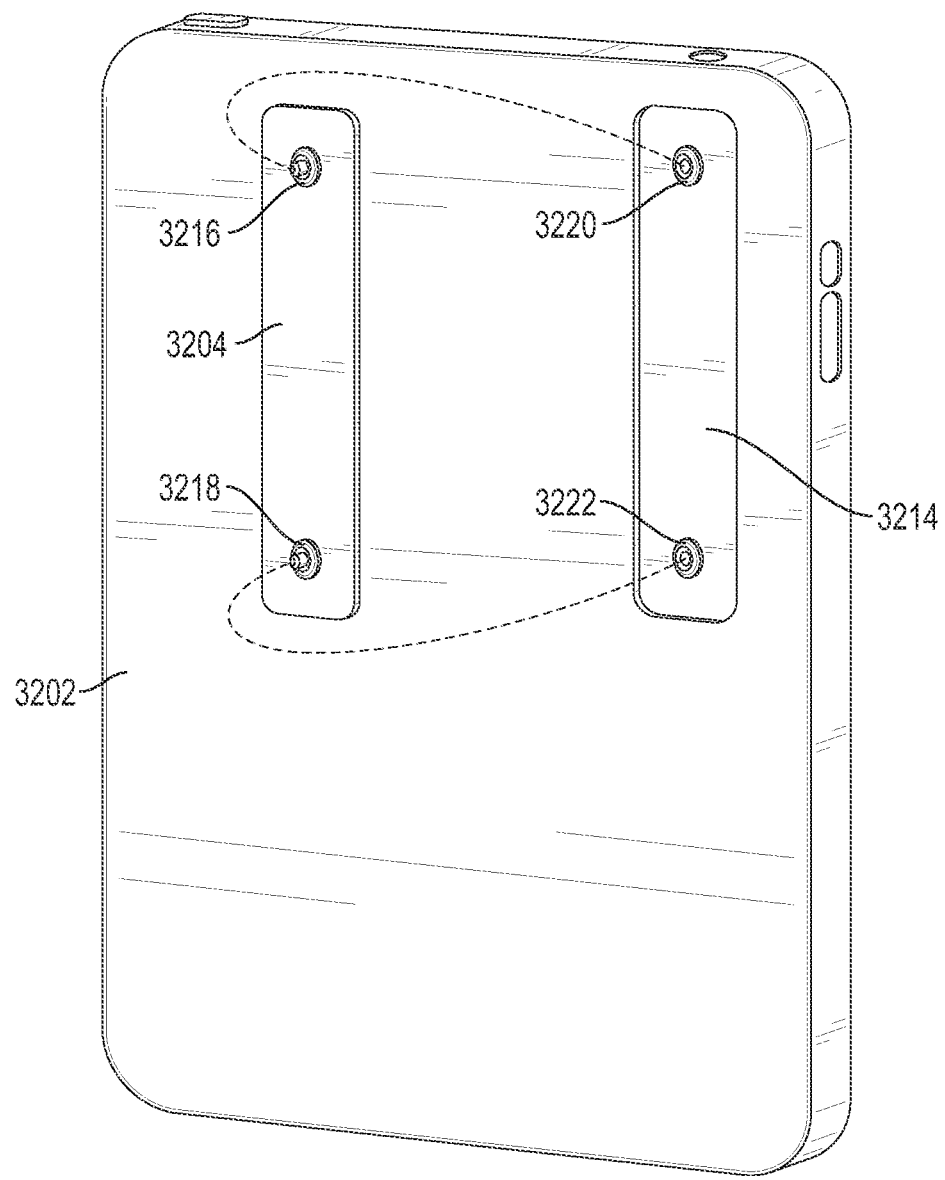
Figure 32F:
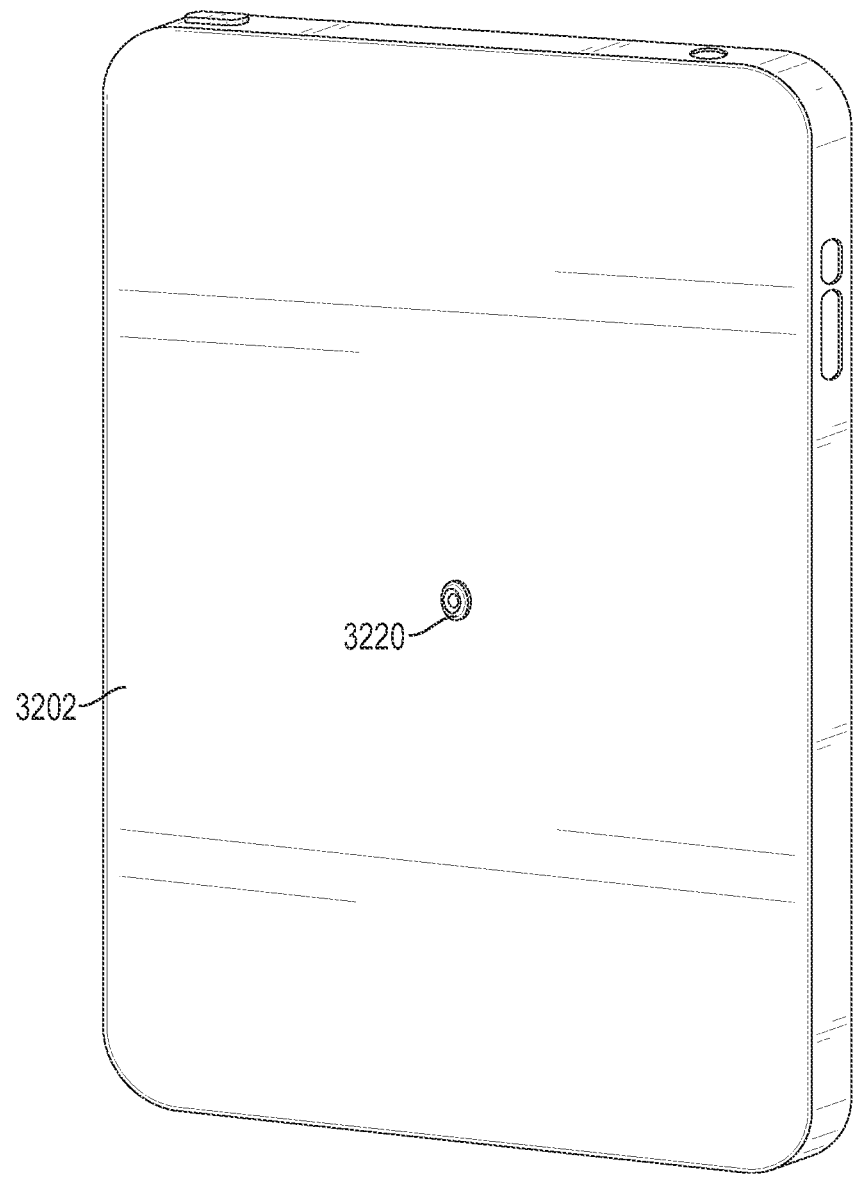
Figure 32G:
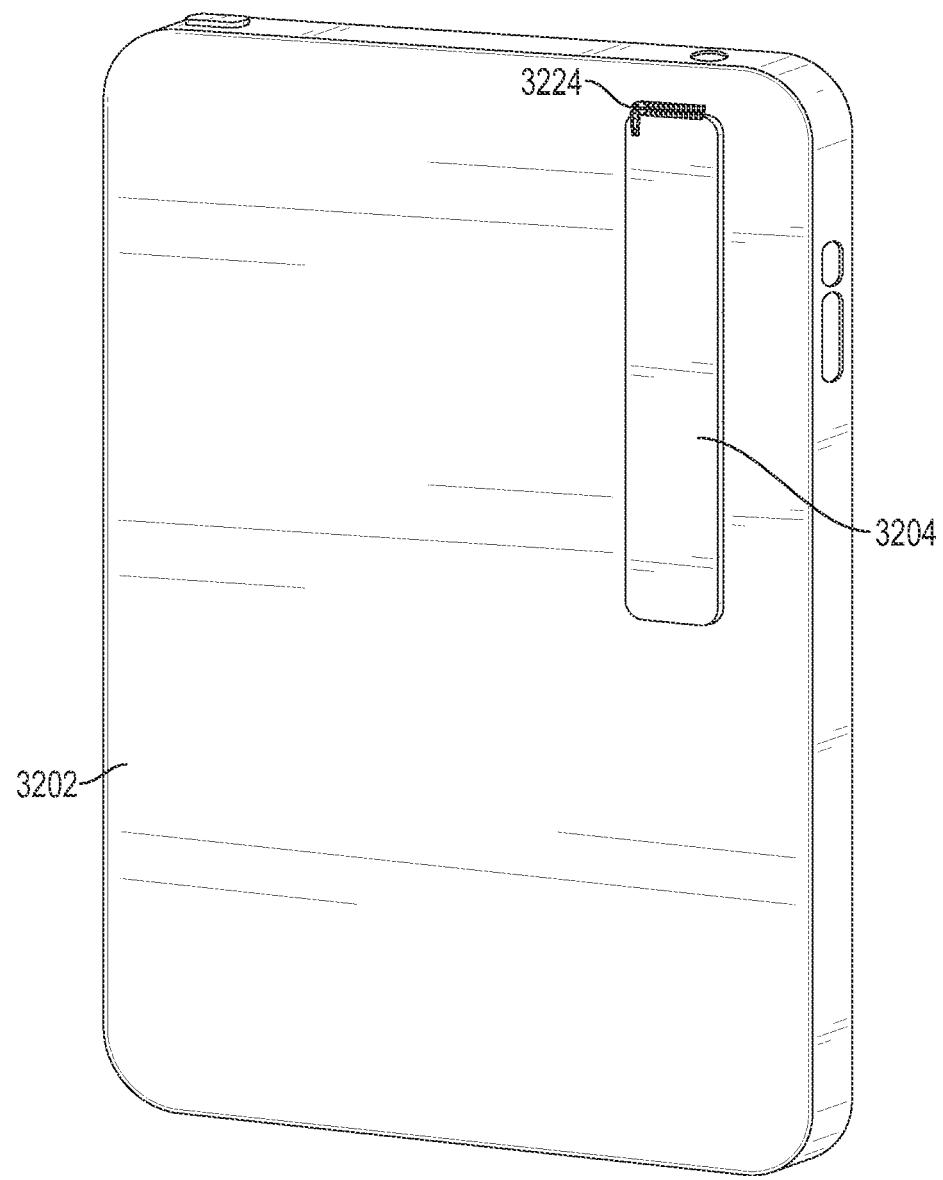
Figure 32H:
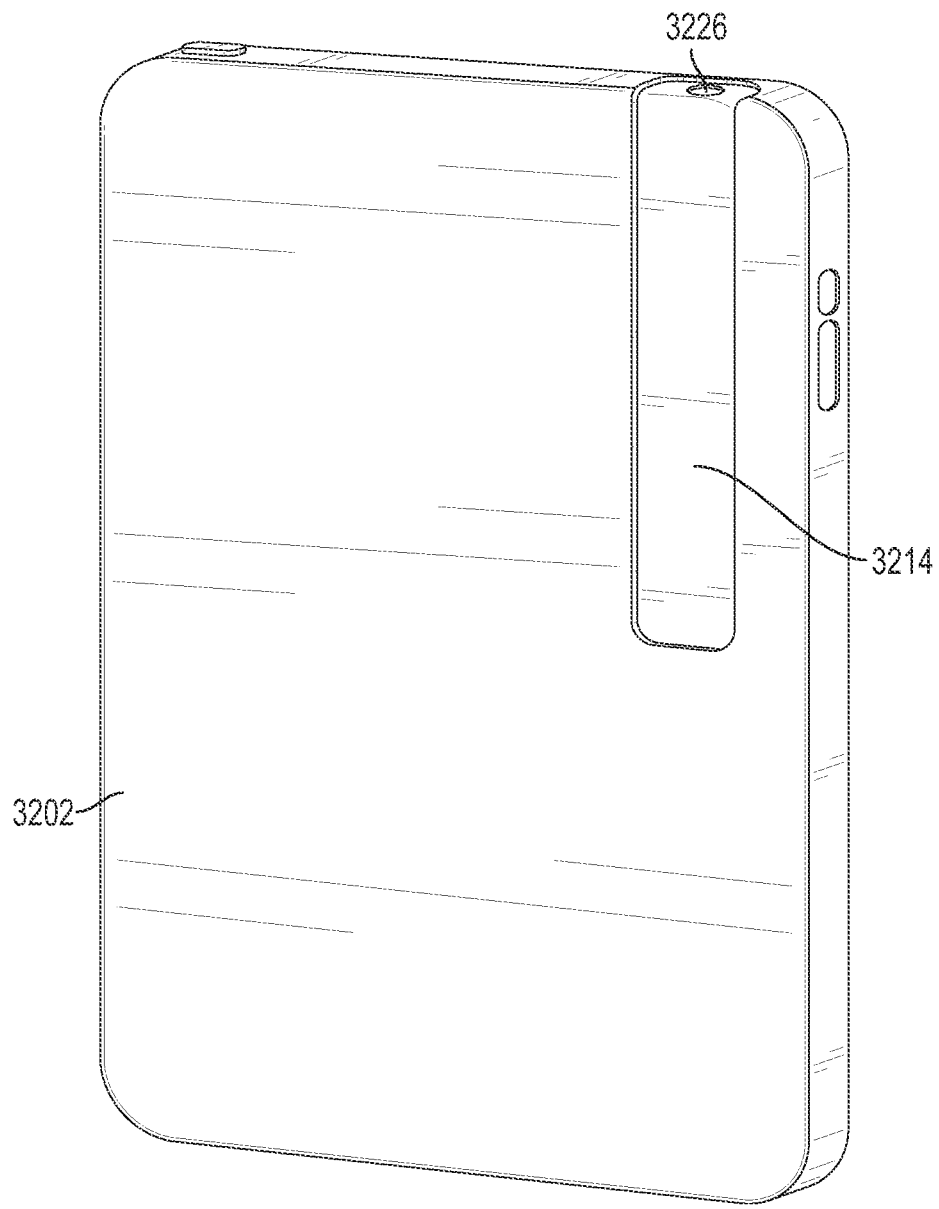
Figure 32I:
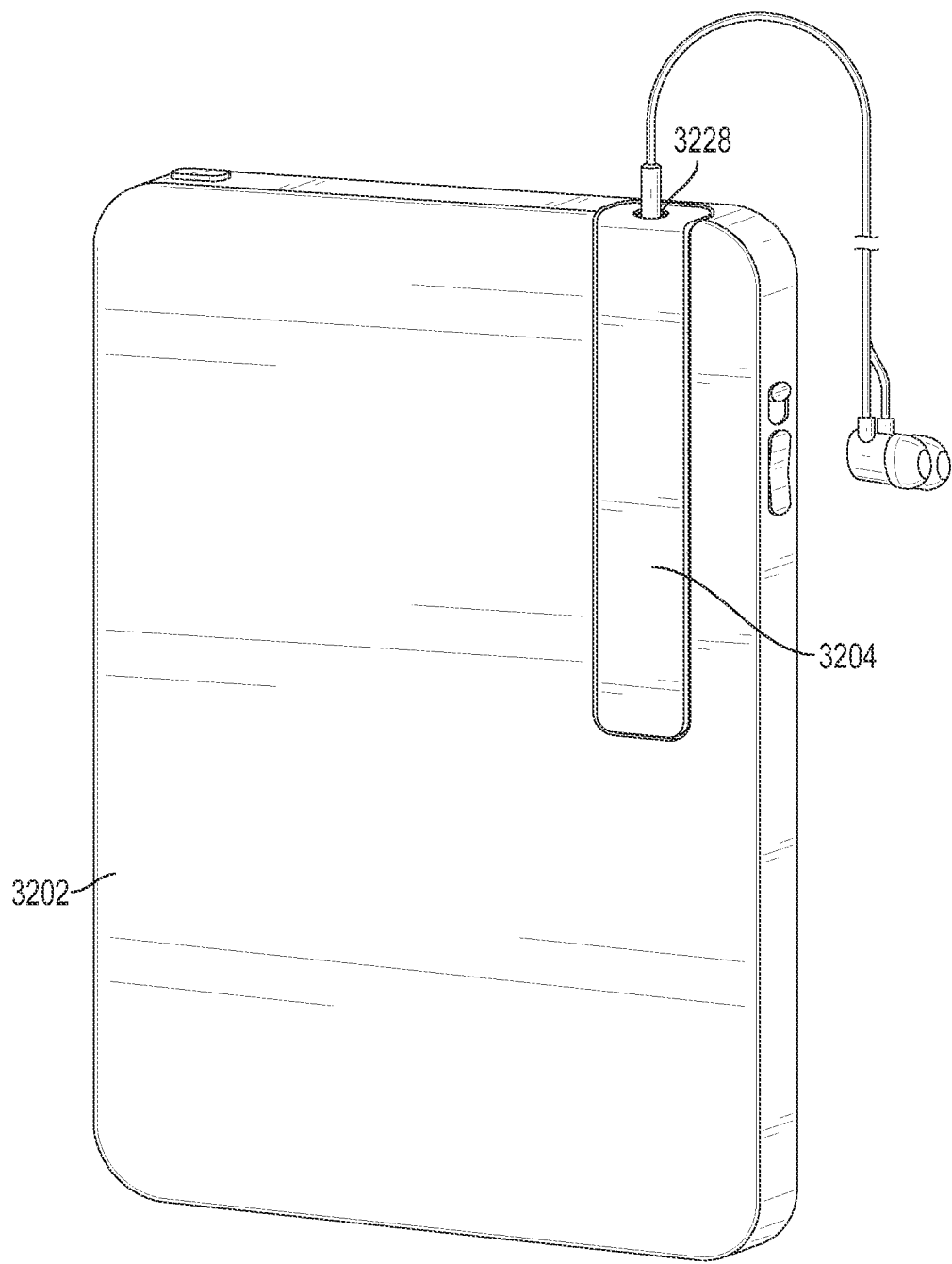
Figure 32J:
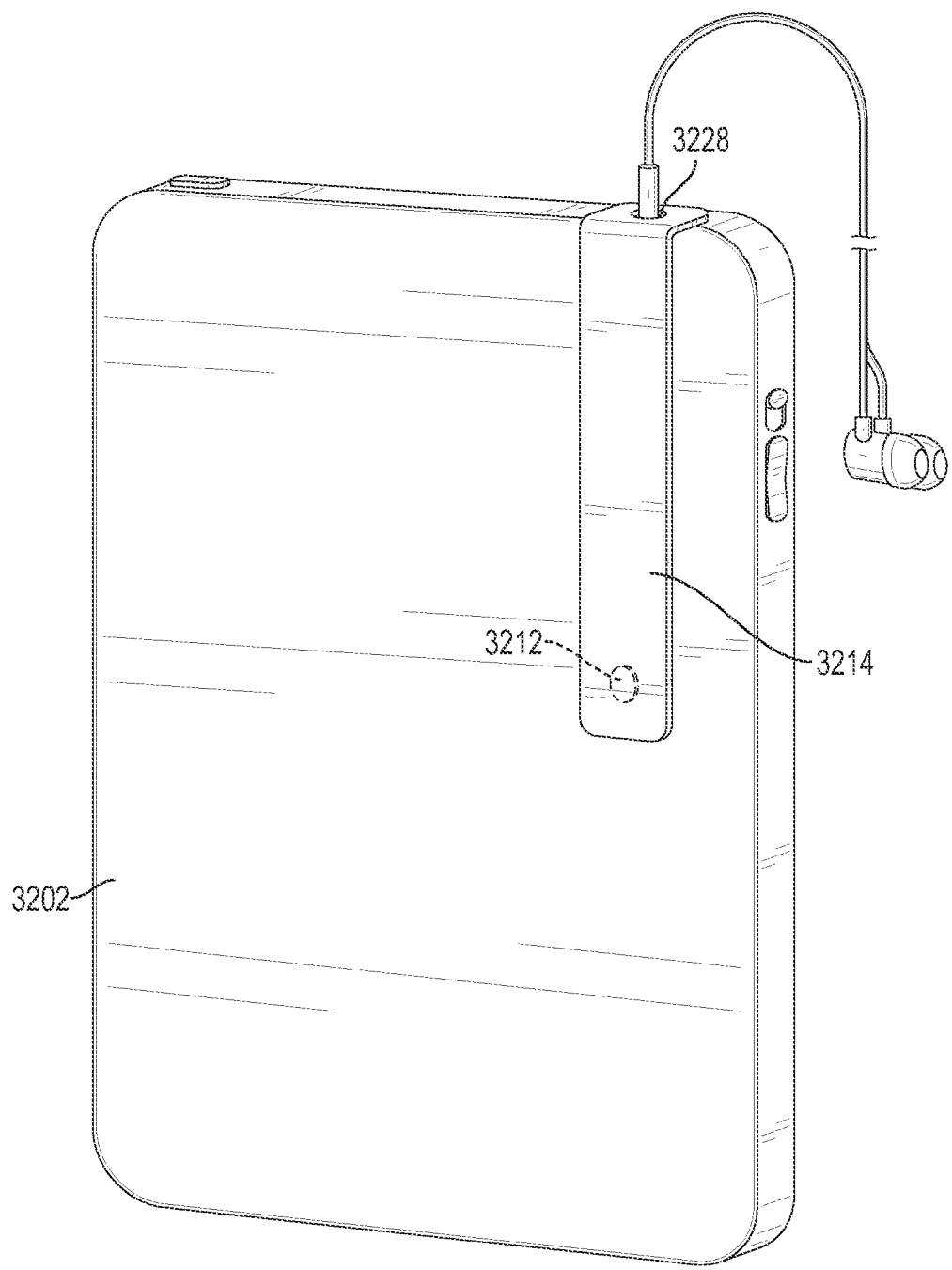

FIG. 31J illustrates a case without a cavity, with a semi-permanently attached strap, according to some embodiments.

FIGS. 32A-32J illustrate embodiments of cases similar to those in FIGS. 31A-31J.

Figure 33A:
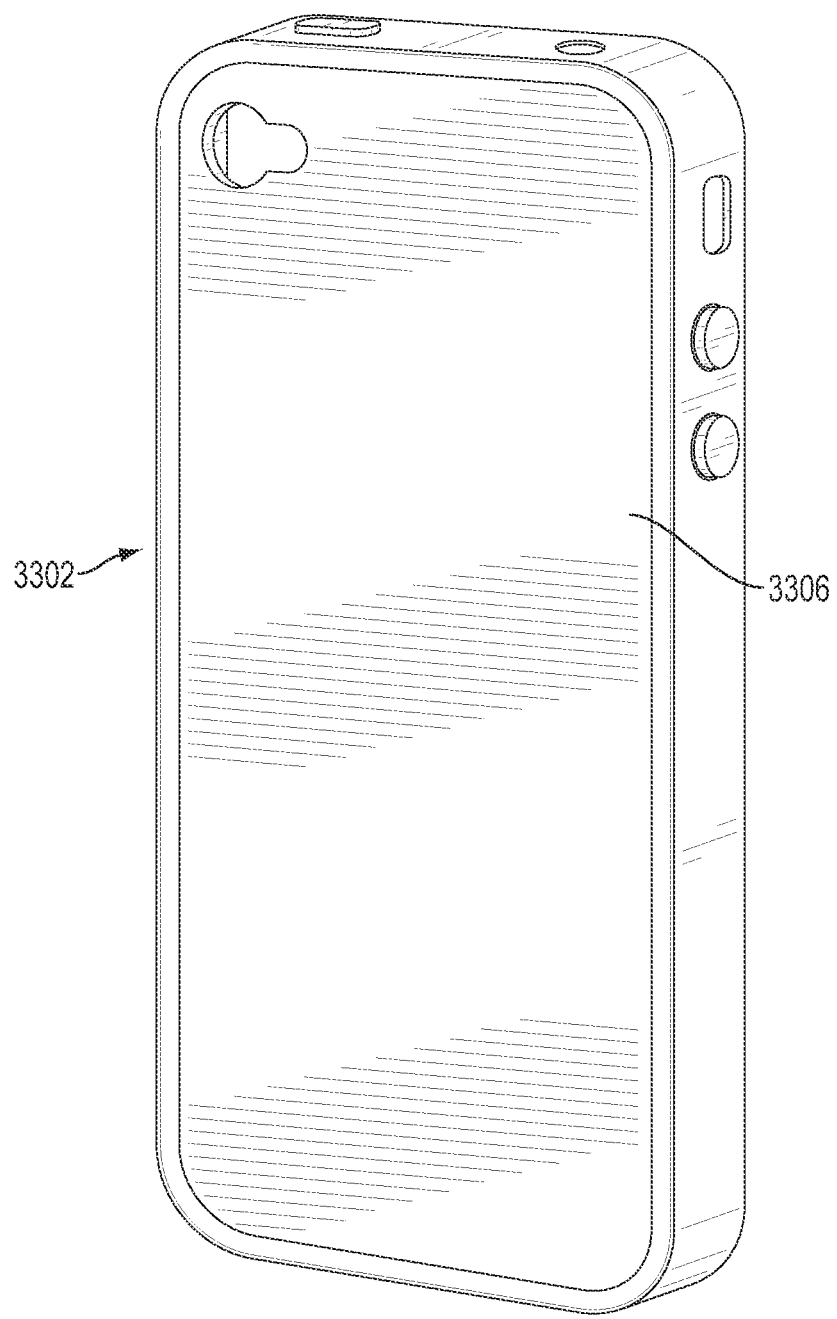

FIG. 33A illustrates a case with a magnetic material back, according to some embodiments.

Figure 33B:
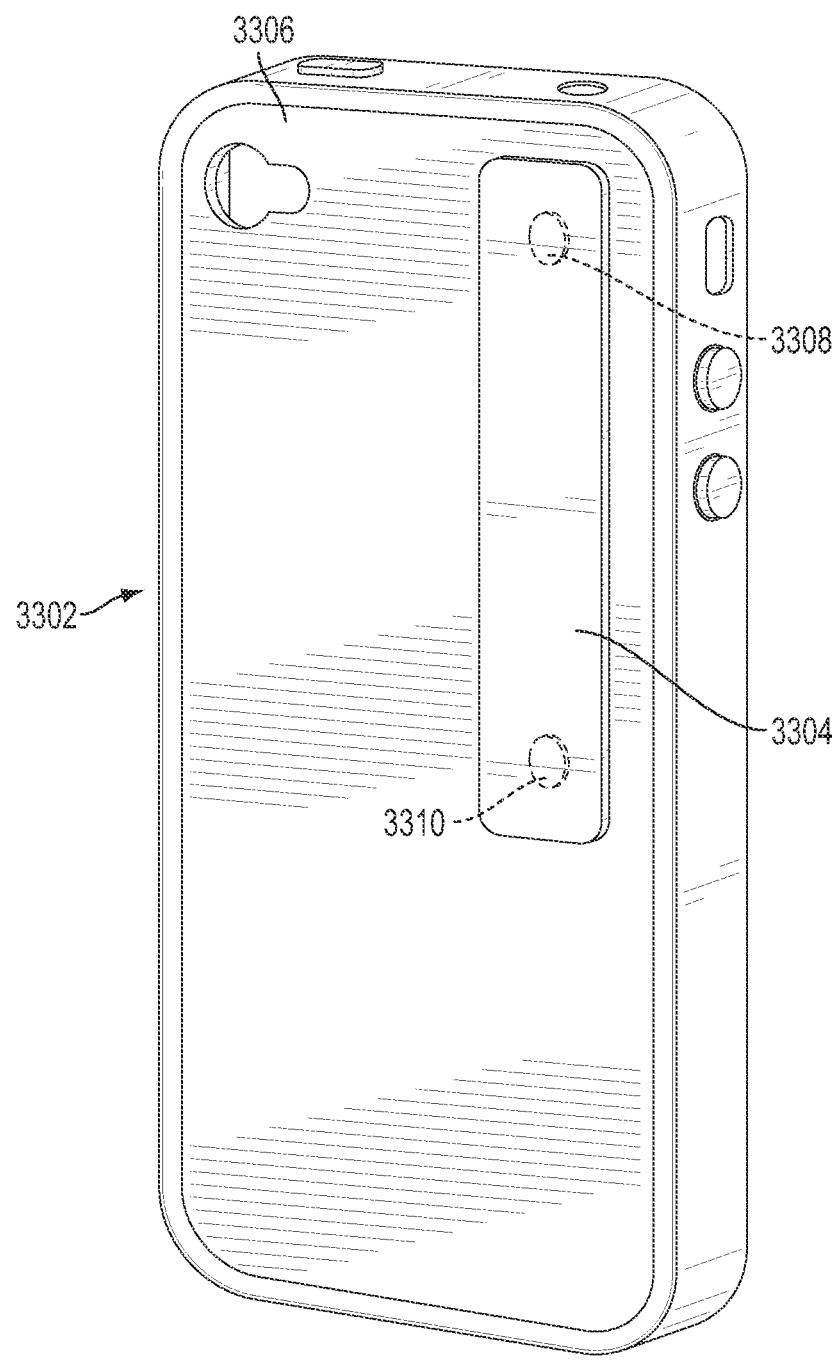

FIG. 33B illustrates a case with a magnetic material back and a strap attached to a location on the case, according to some embodiments.

Figure 33C:
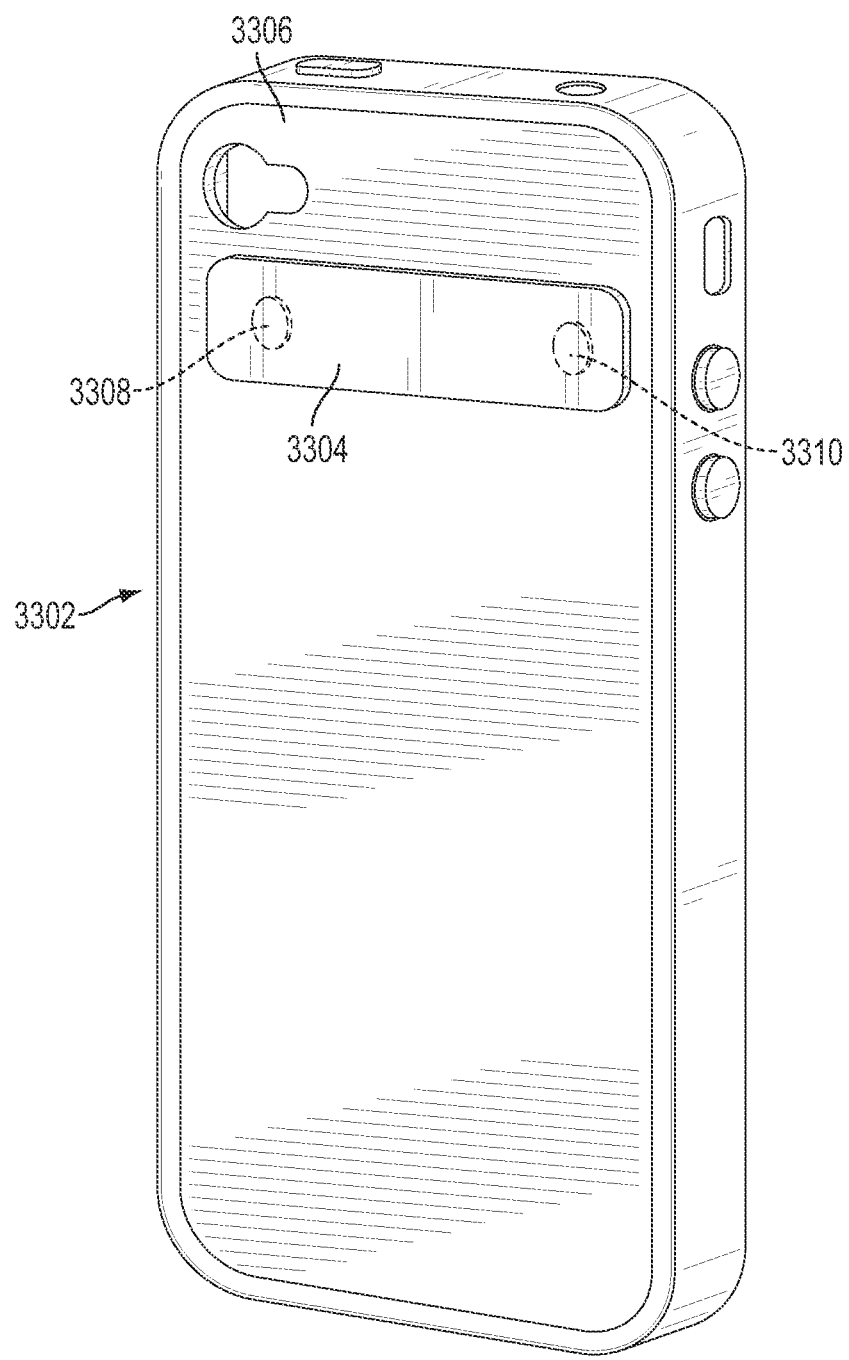

FIG. 33C illustrates a case with a magnetic material back and a strap attached to another location on the case, according to some embodiments.

Figure 33D:
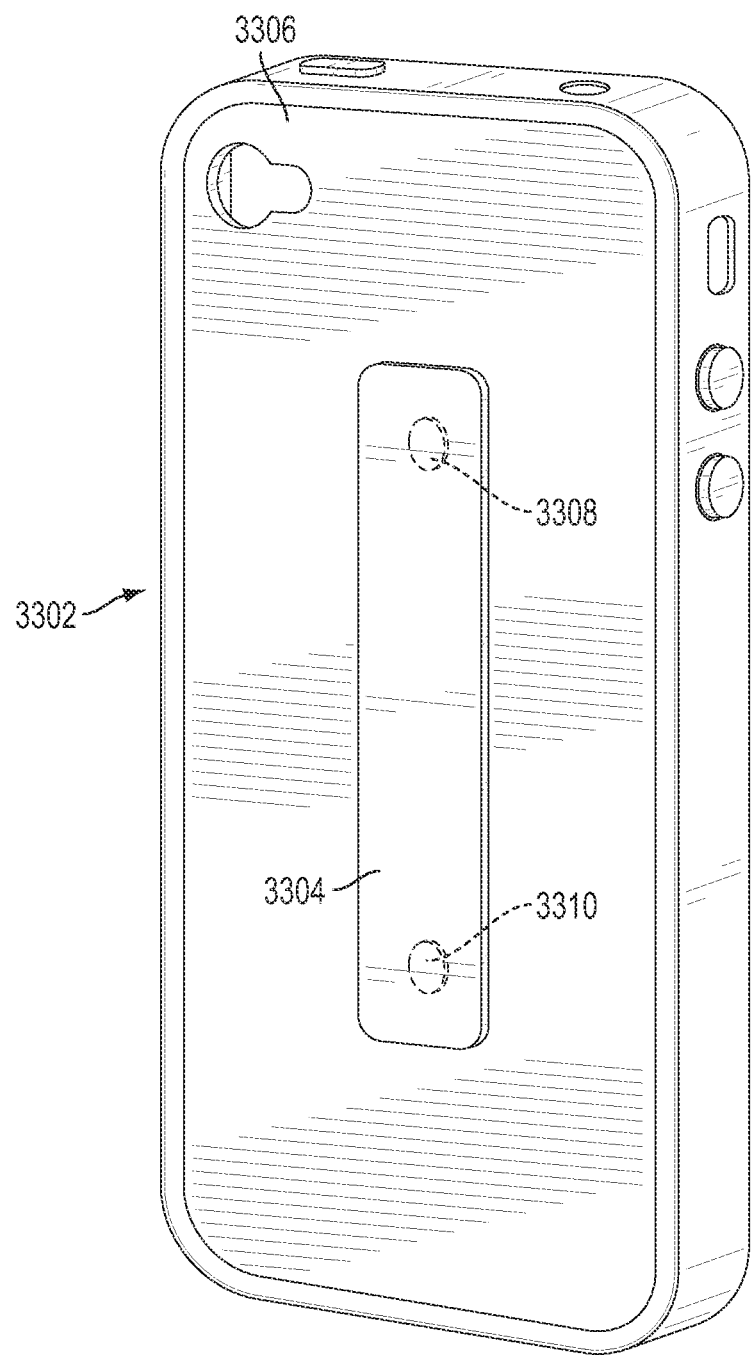

FIG. 33D illustrates a case with a magnetic material back and a strap attached to another location on the case, according to some embodiments.

Figure 33E:
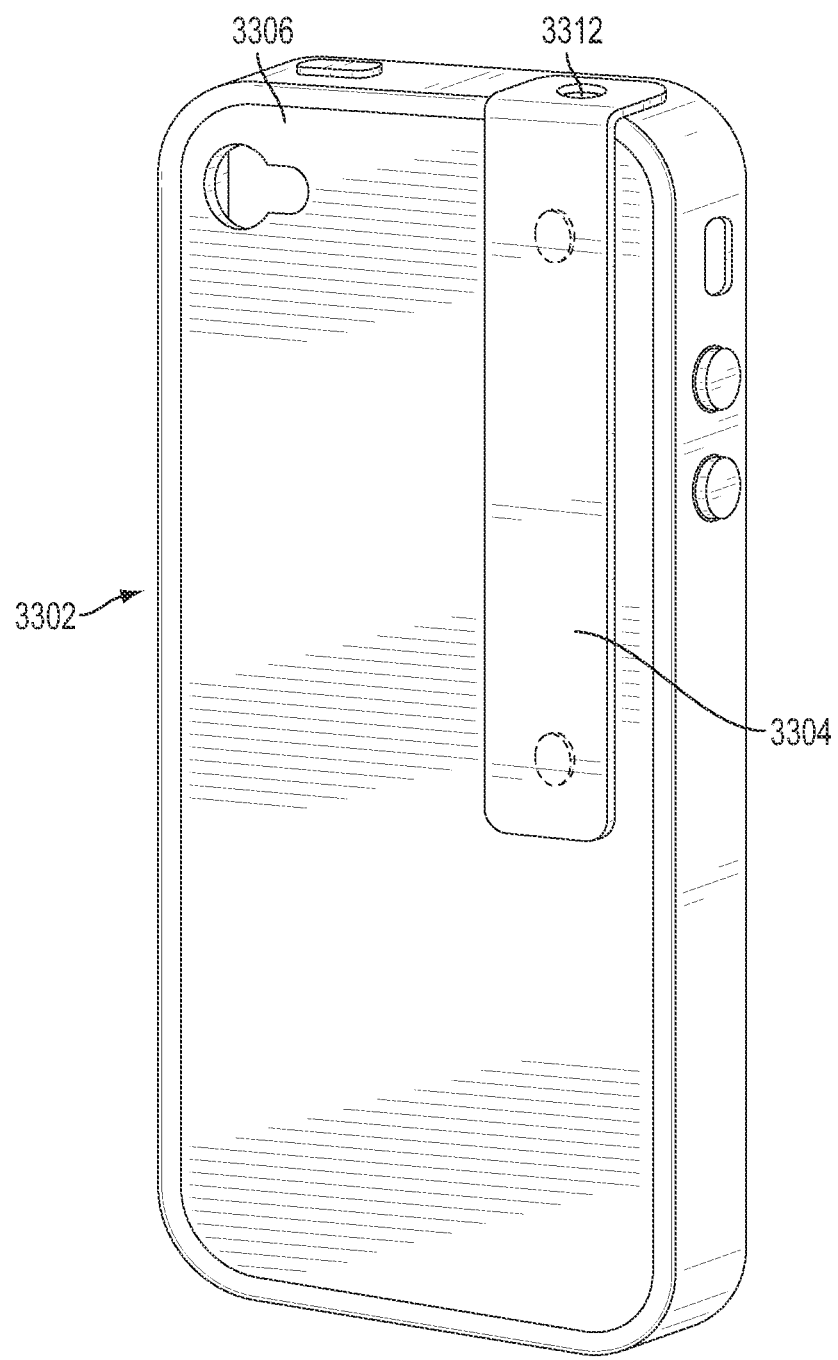

FIG. 33E illustrates a case with a magnetic material back and another strap, according to some embodiments.

Figure 33F:
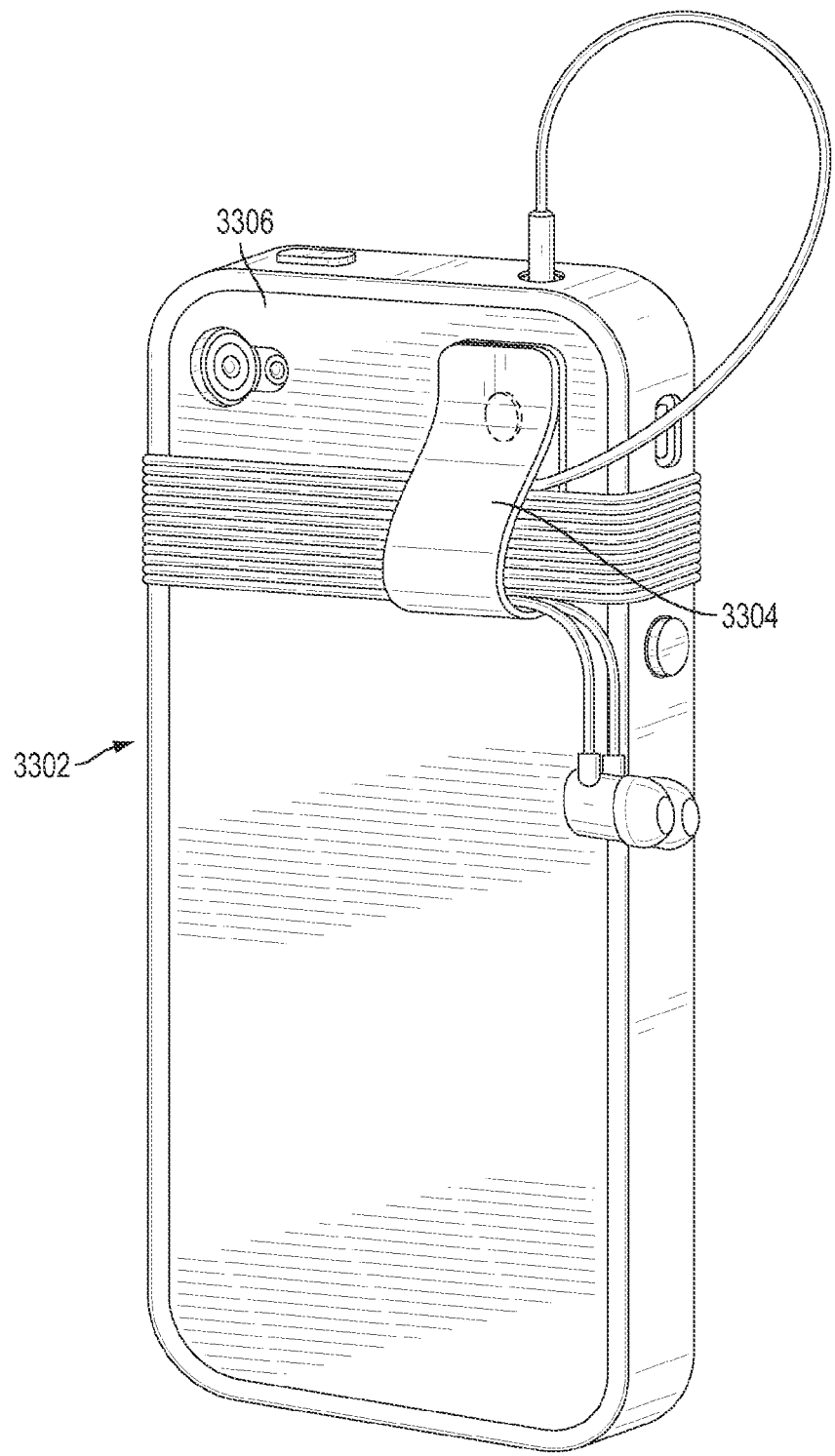

FIG. 33F illustrates a case with a magnetic material back and a strap folded into a loop and securing a cord wrapped around a case, according to some embodiments.

Figure 33G:
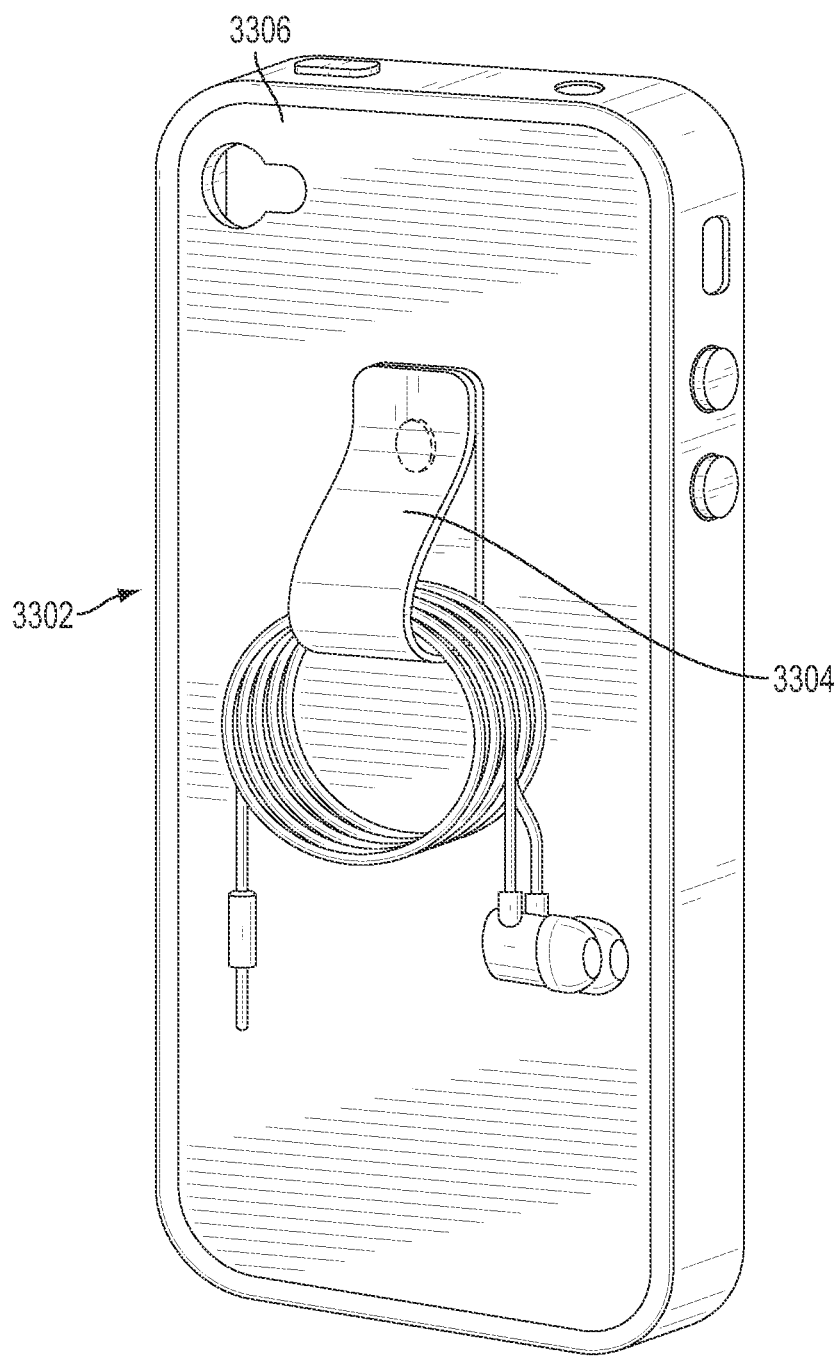

FIG. 33G illustrates a case with a magnetic material back and a strap folded into a loop and securing a cord wrapped in a loop, according to some embodiments.

Figure 33H:
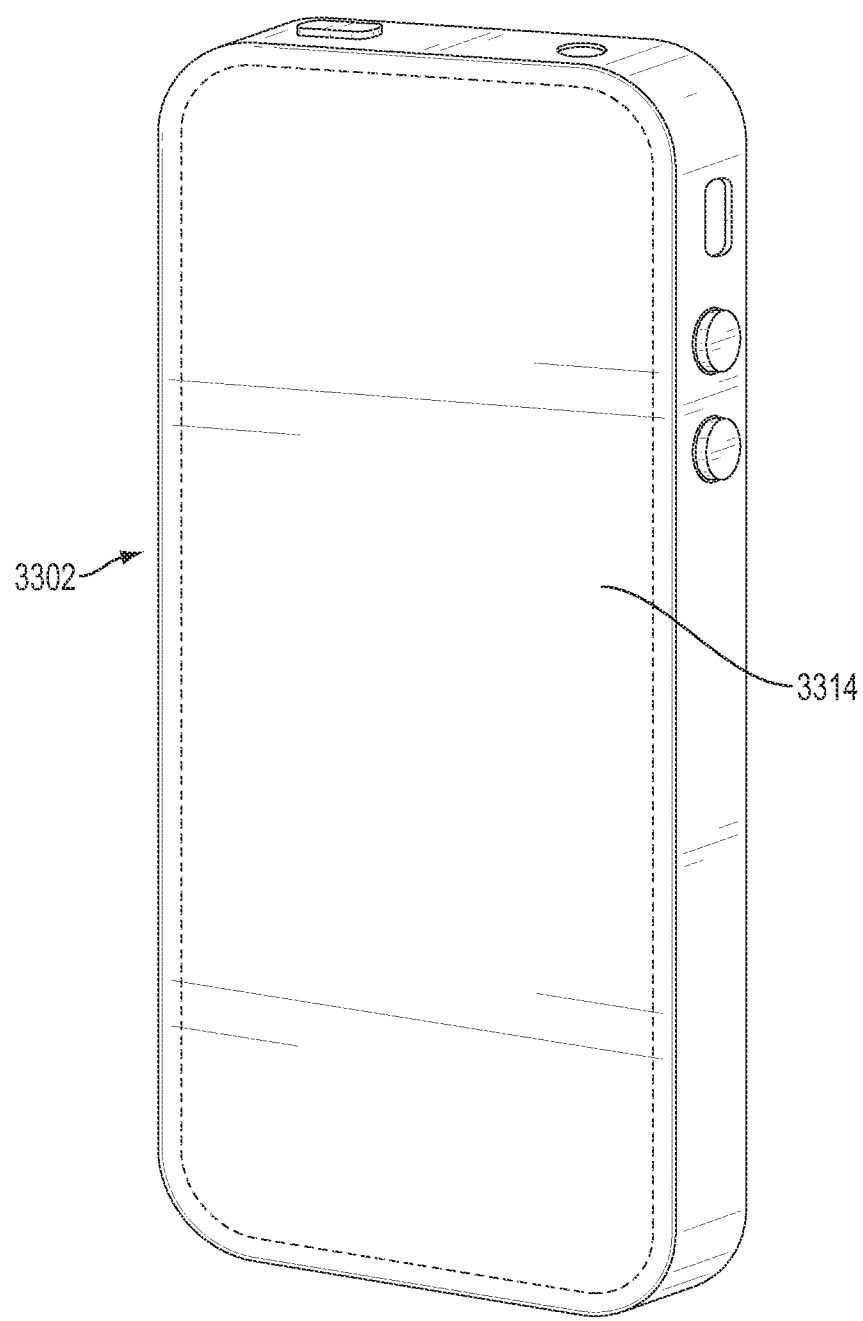

FIG. 33H illustrates a case with an encapsulated magnetic material back, according to some embodiments.

Figure 33I:
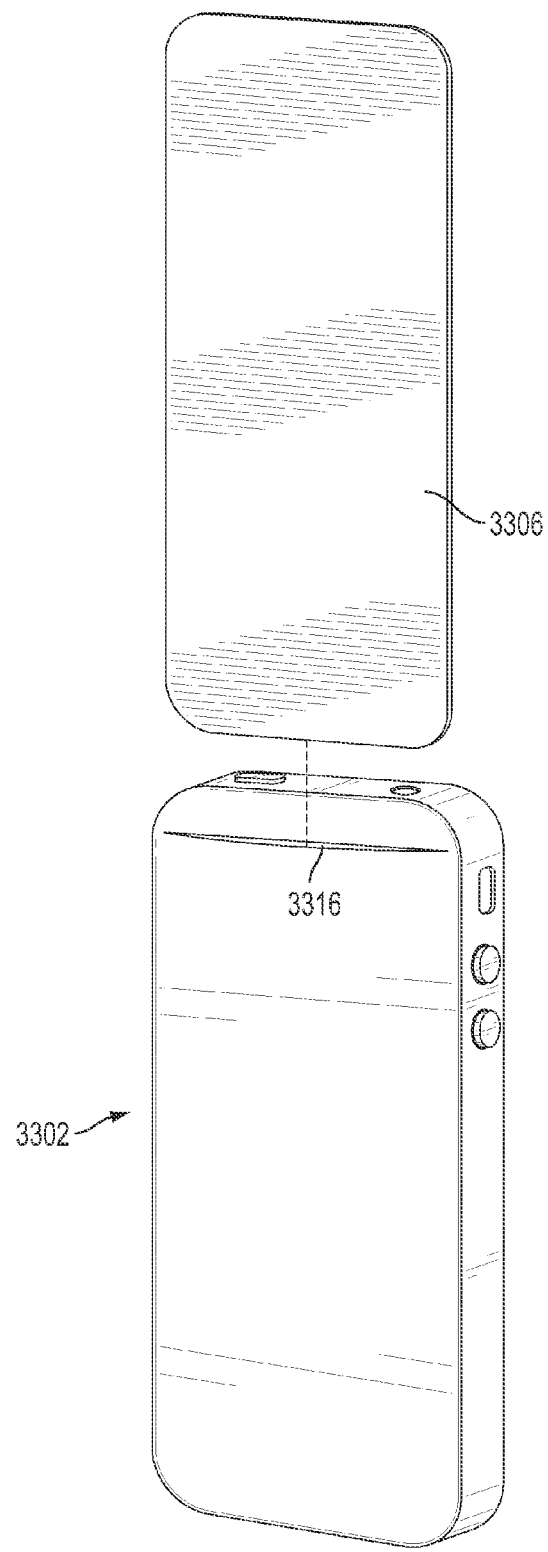

FIG. 33I illustrates a case with a magnetic material back to be inserted into a pocket in the case, according to some embodiments.

Figure 33J:
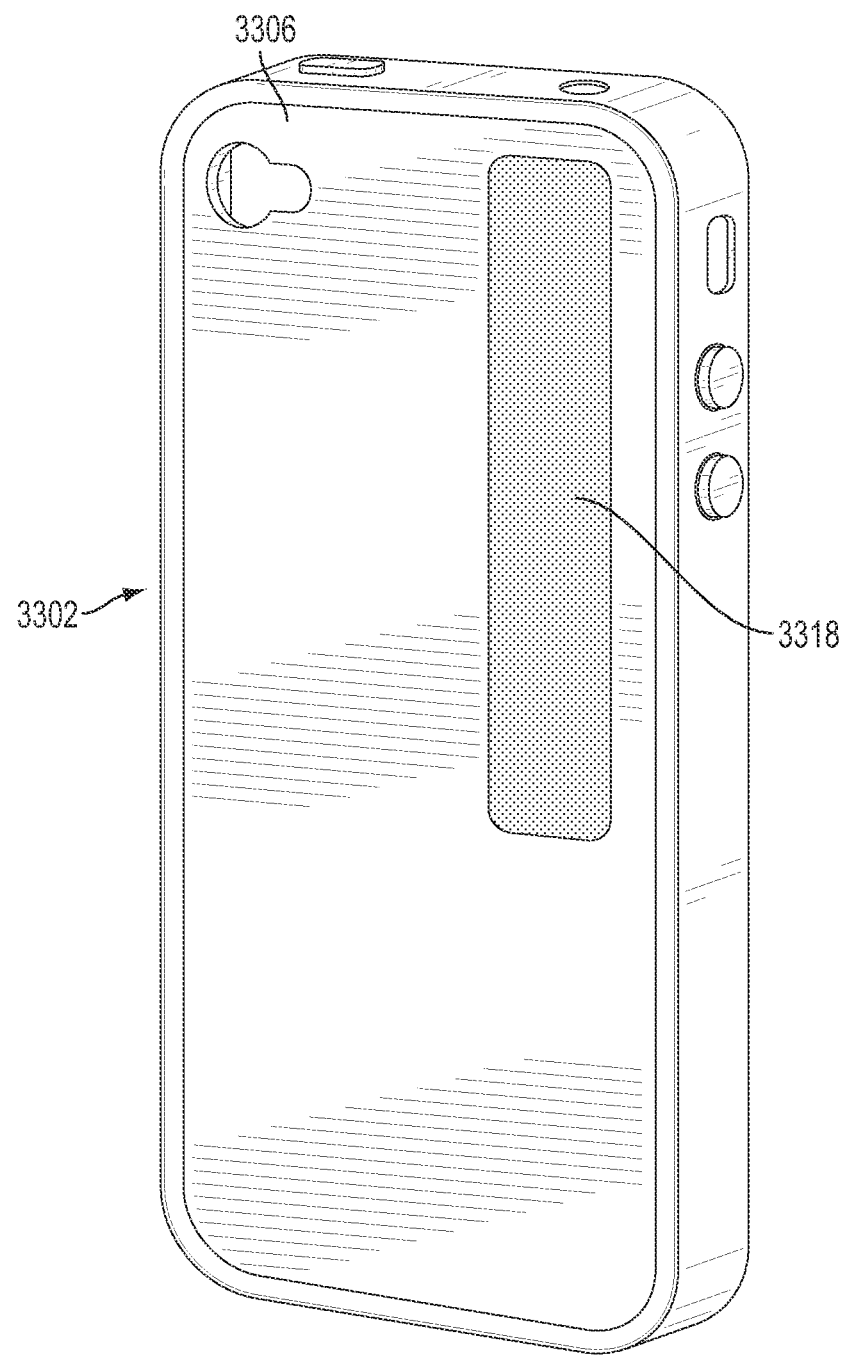

FIG. 33J illustrates a case with a magnetic material back having distinct portions, according to some embodiments.

Figure 33K:
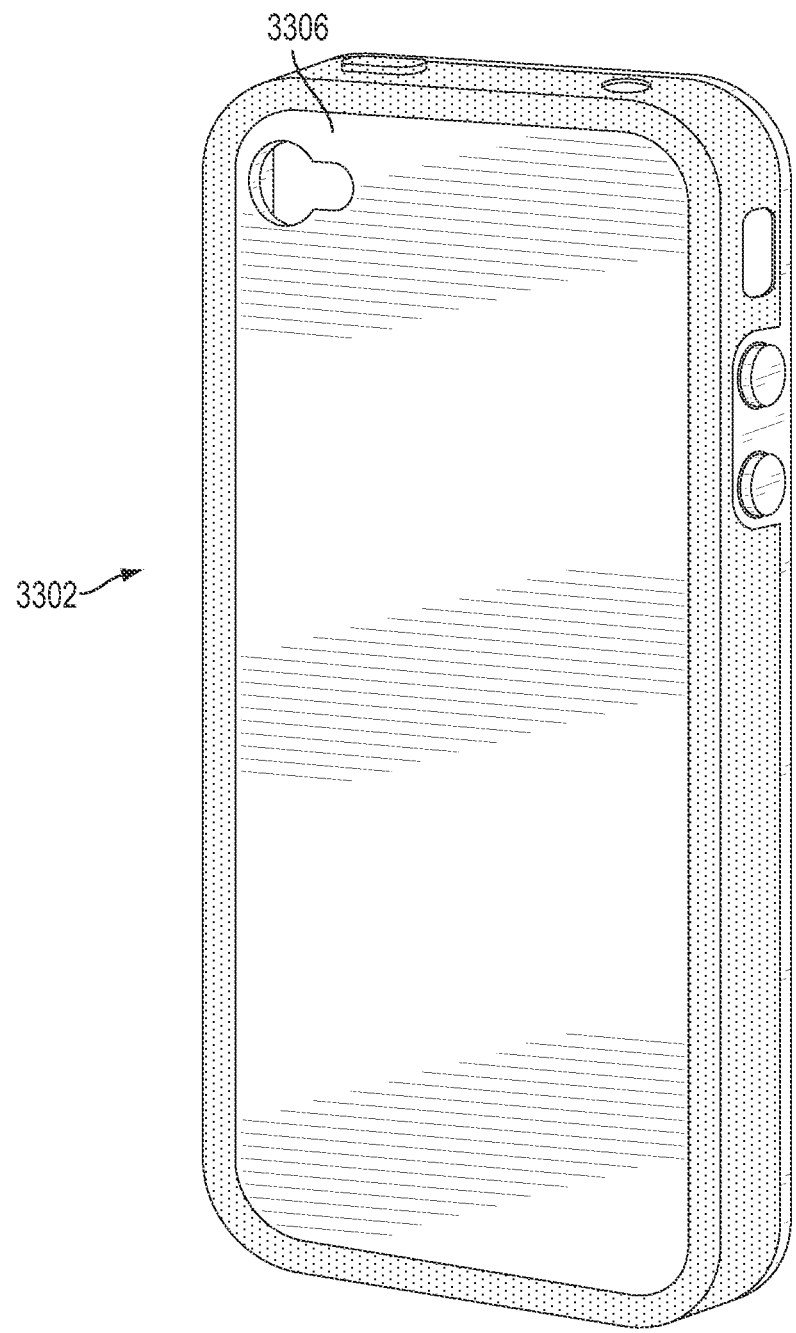

FIG. 33K illustrates a case with a magnetic material back, according to some embodiments.

Figure 33L:
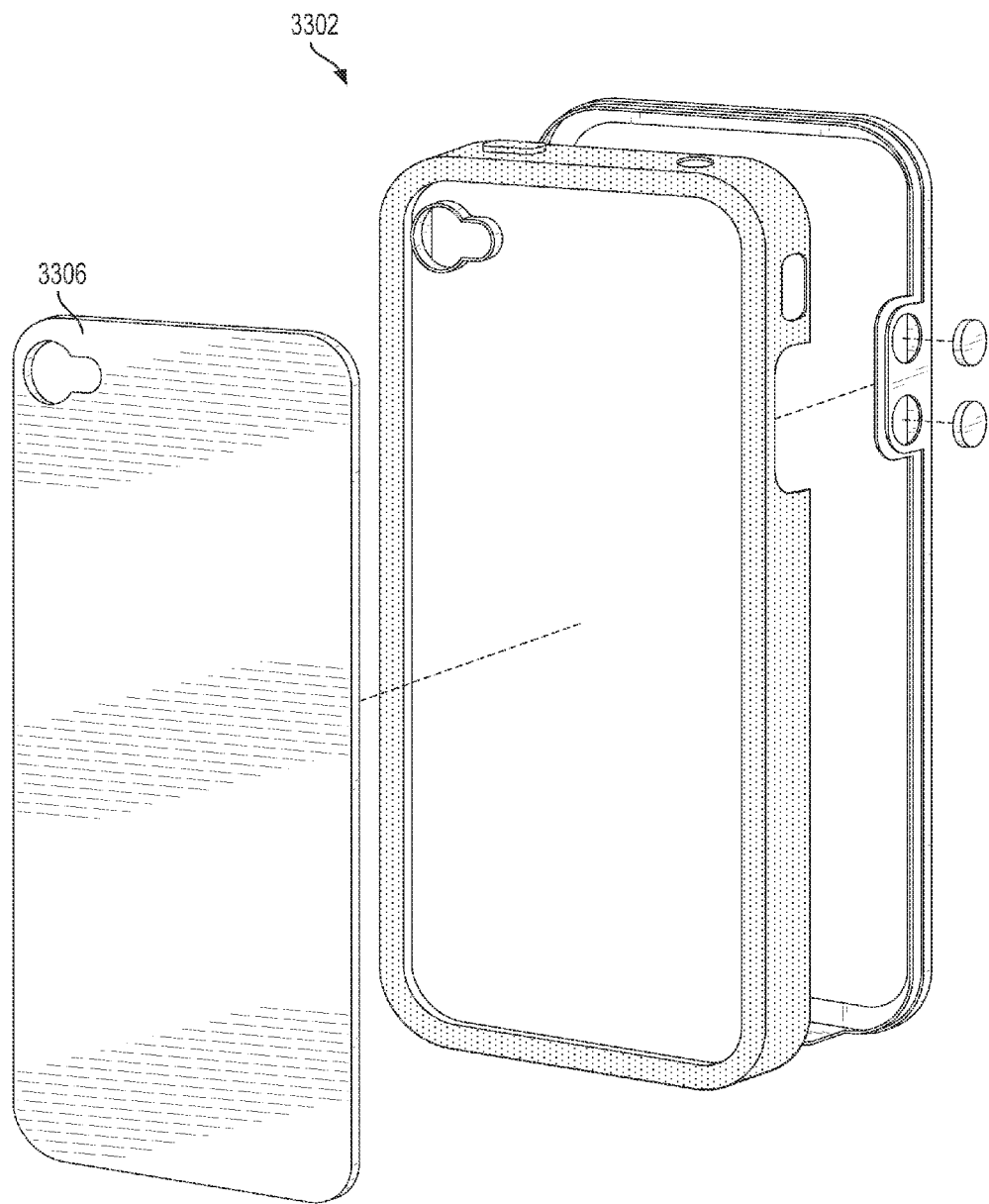
Figure 34A:
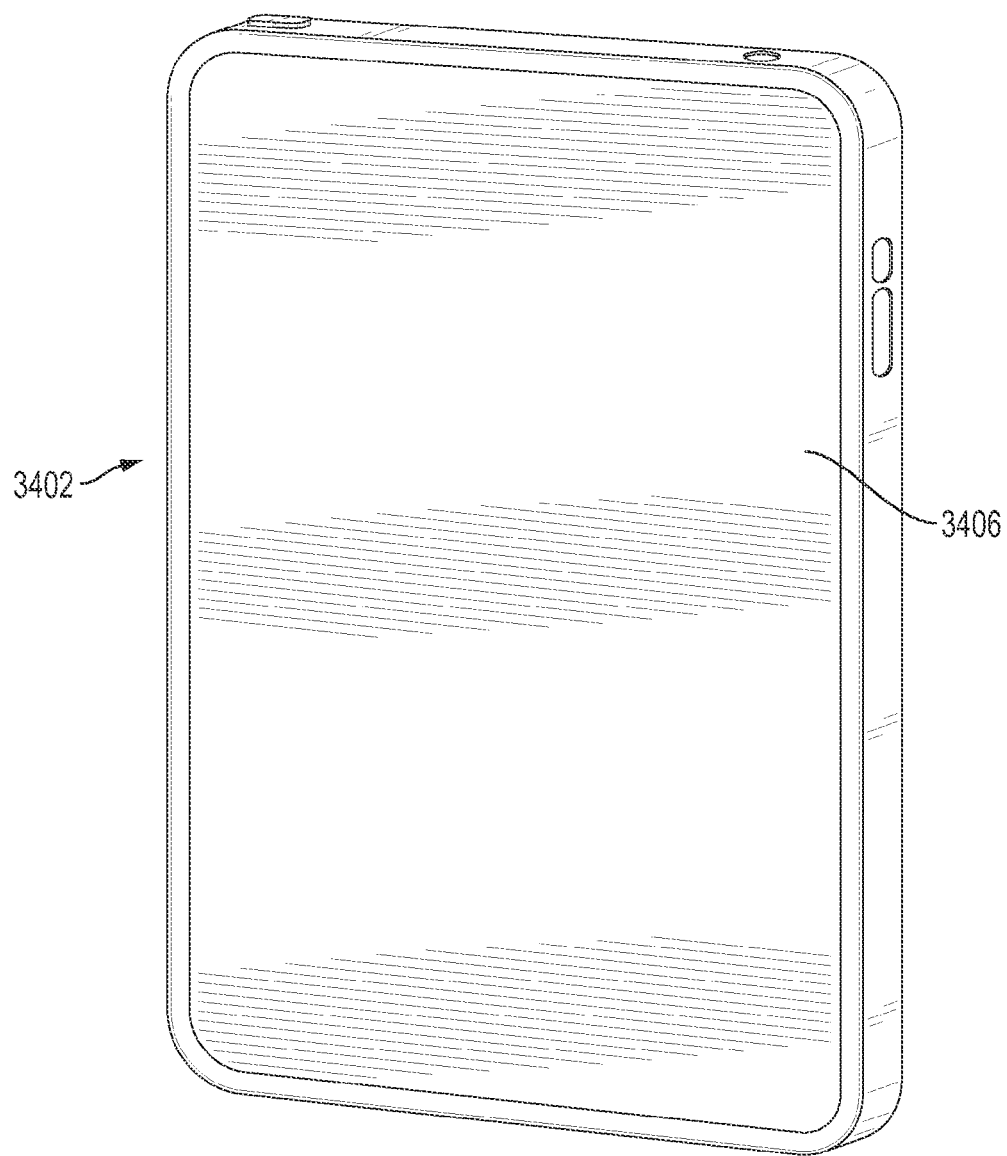
Figure 34B:
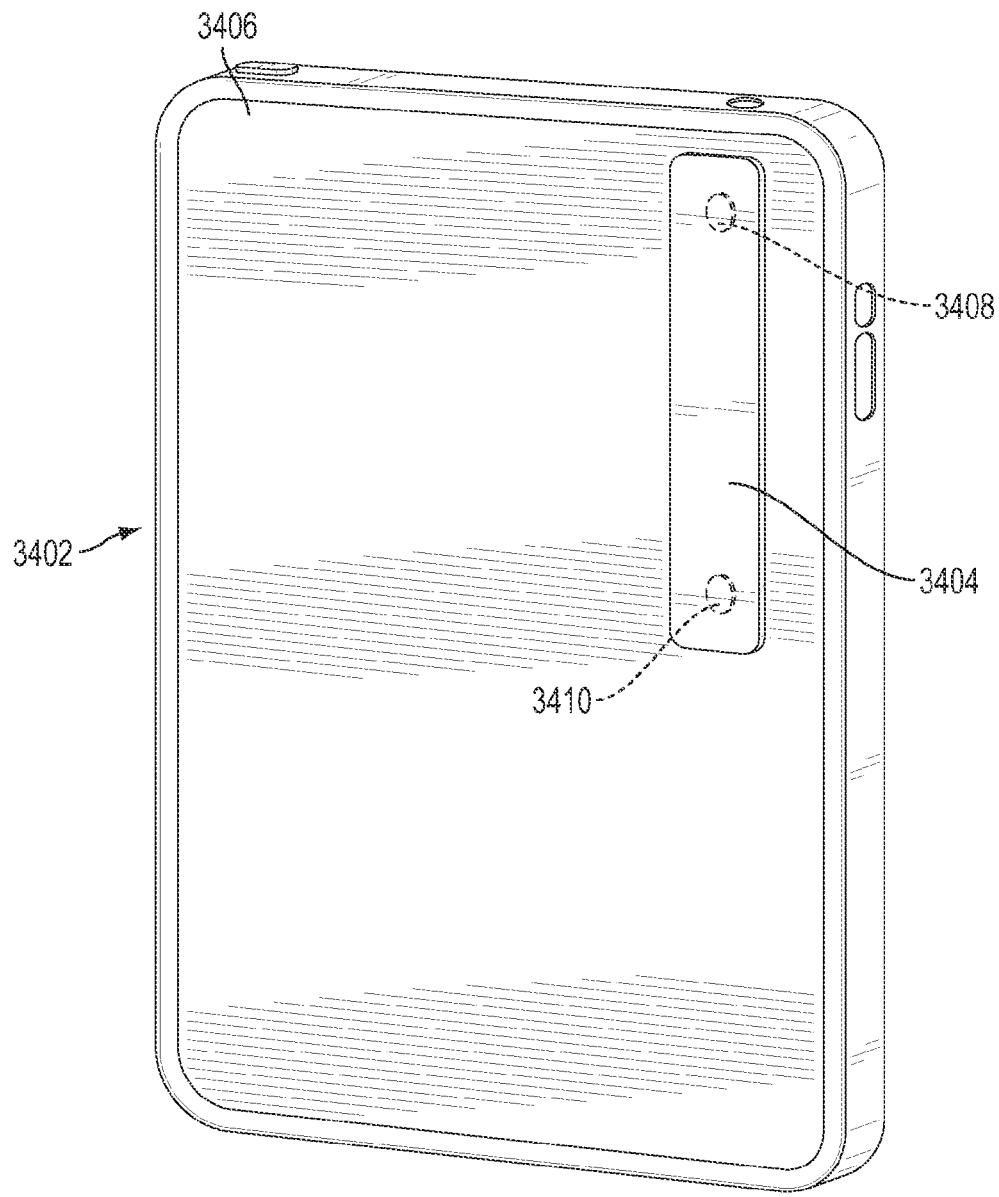
Figure 34C:
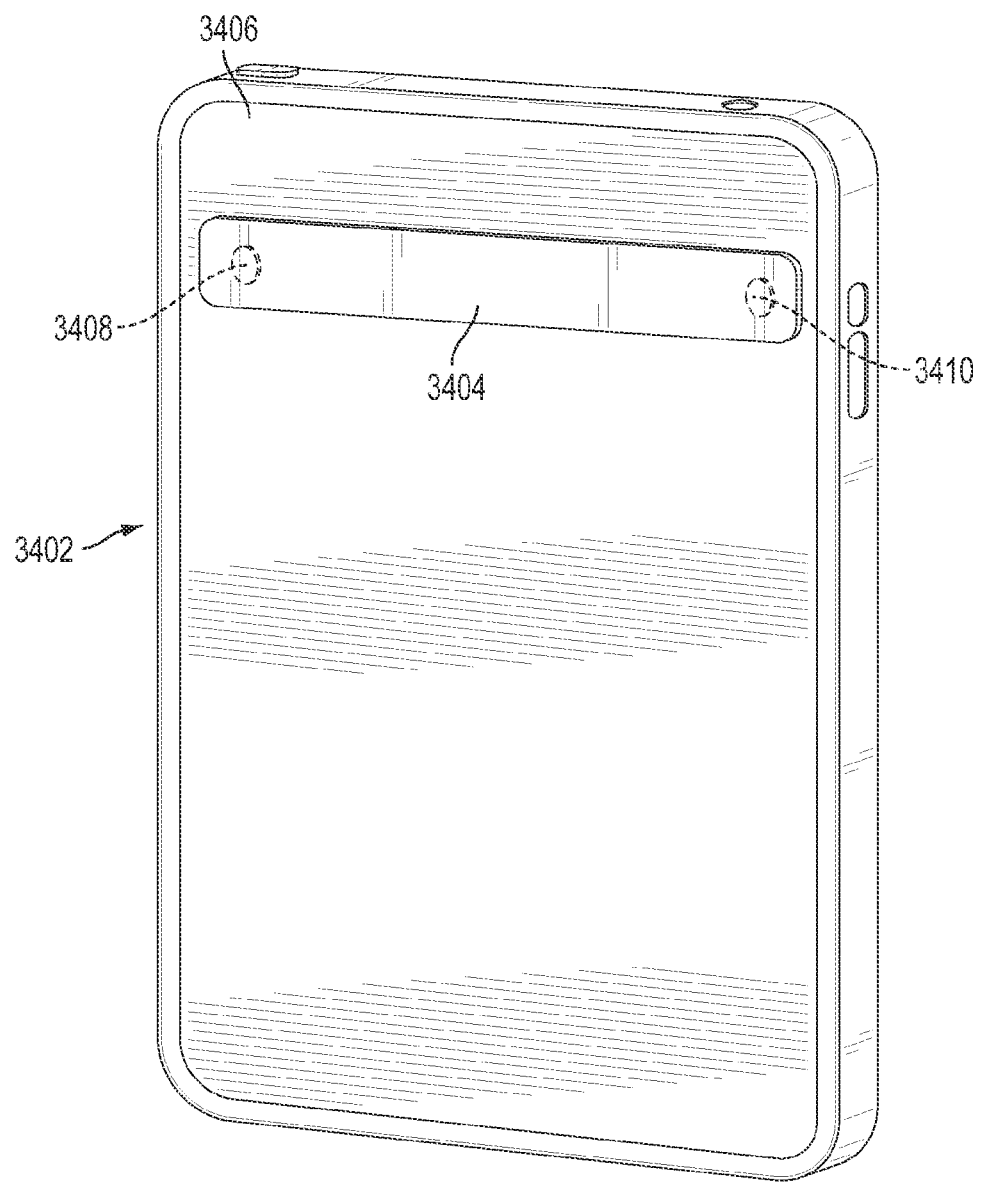
Figure 34D:
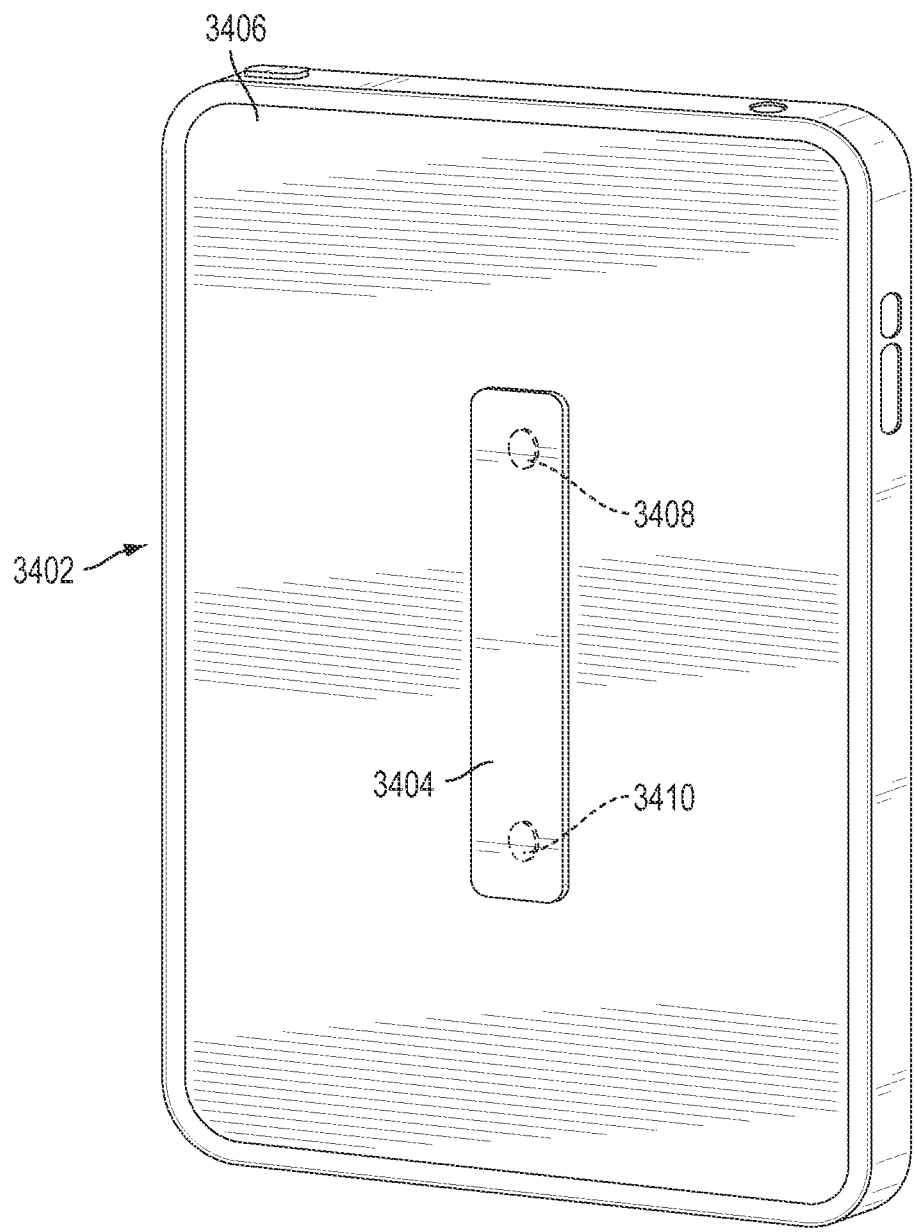
Figure 34E:
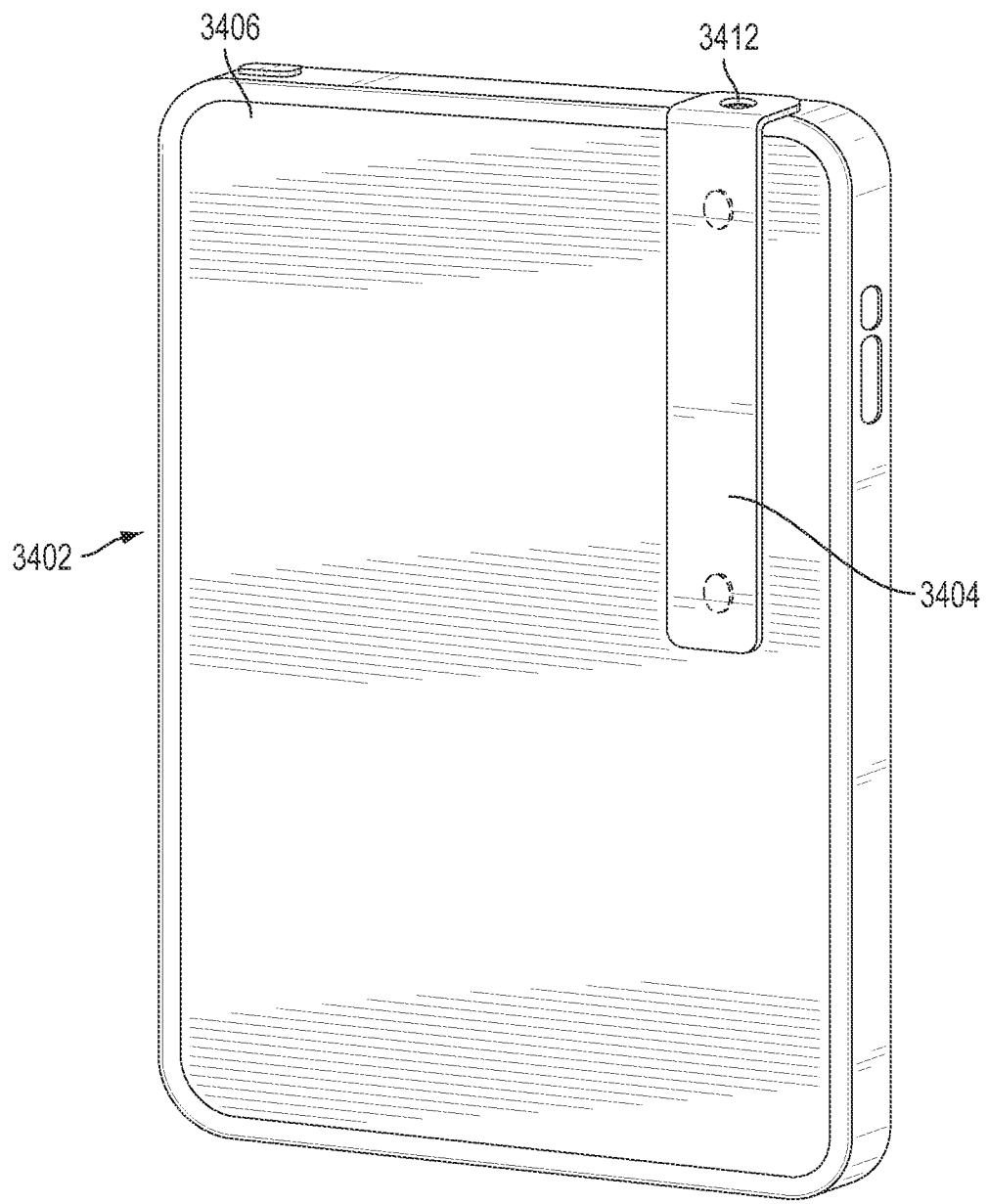
Figure 34F:
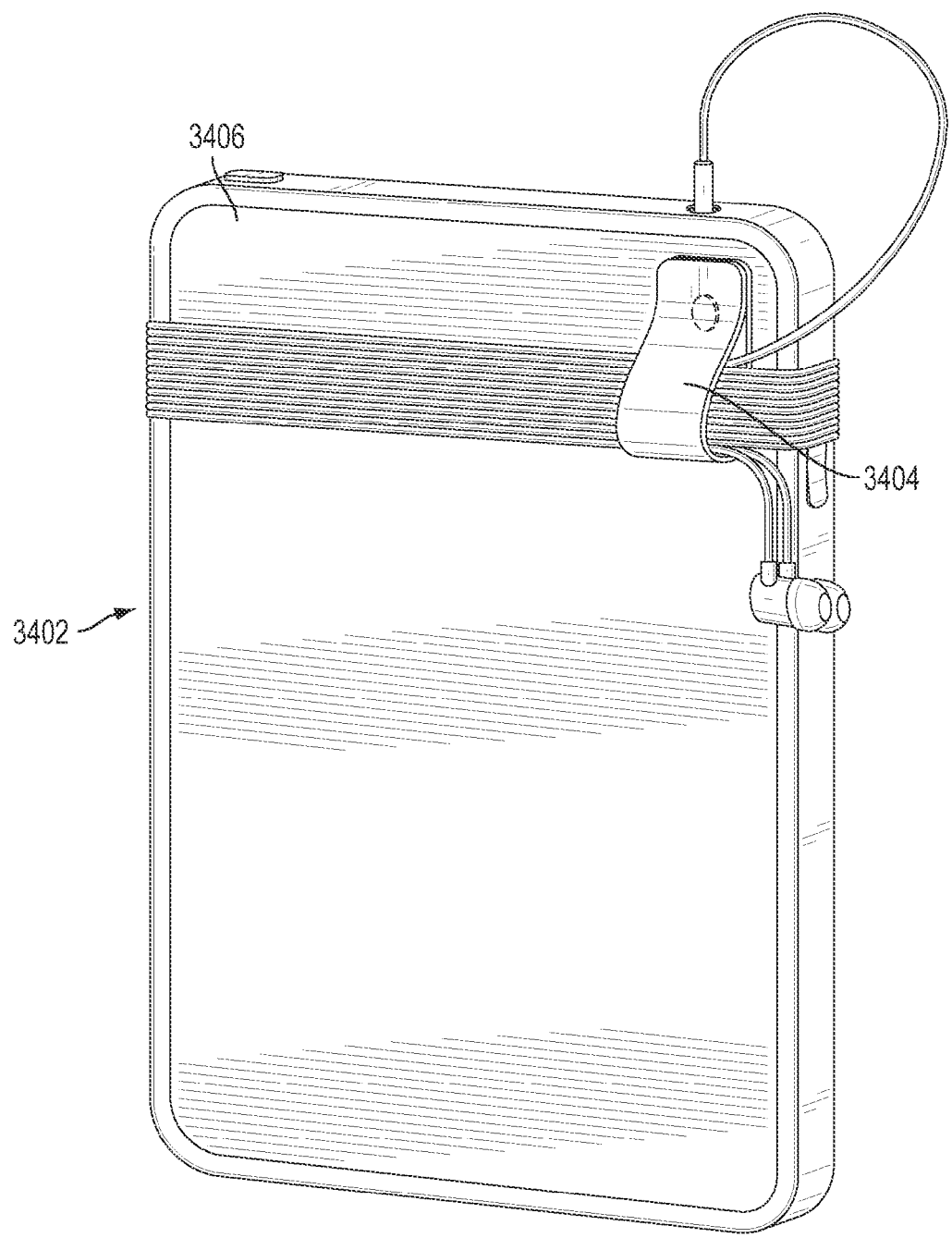
Figure 34G:
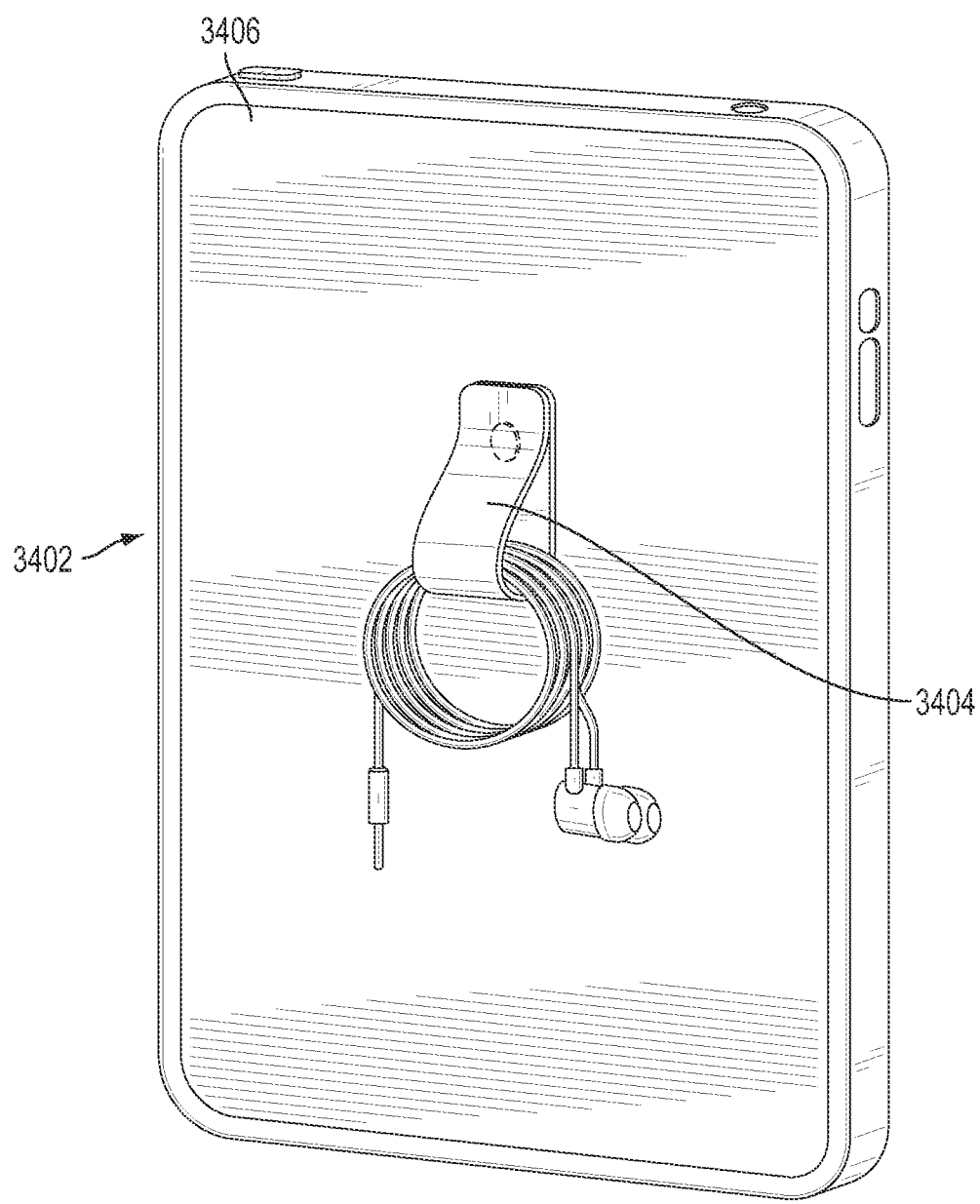
Figure 34H:
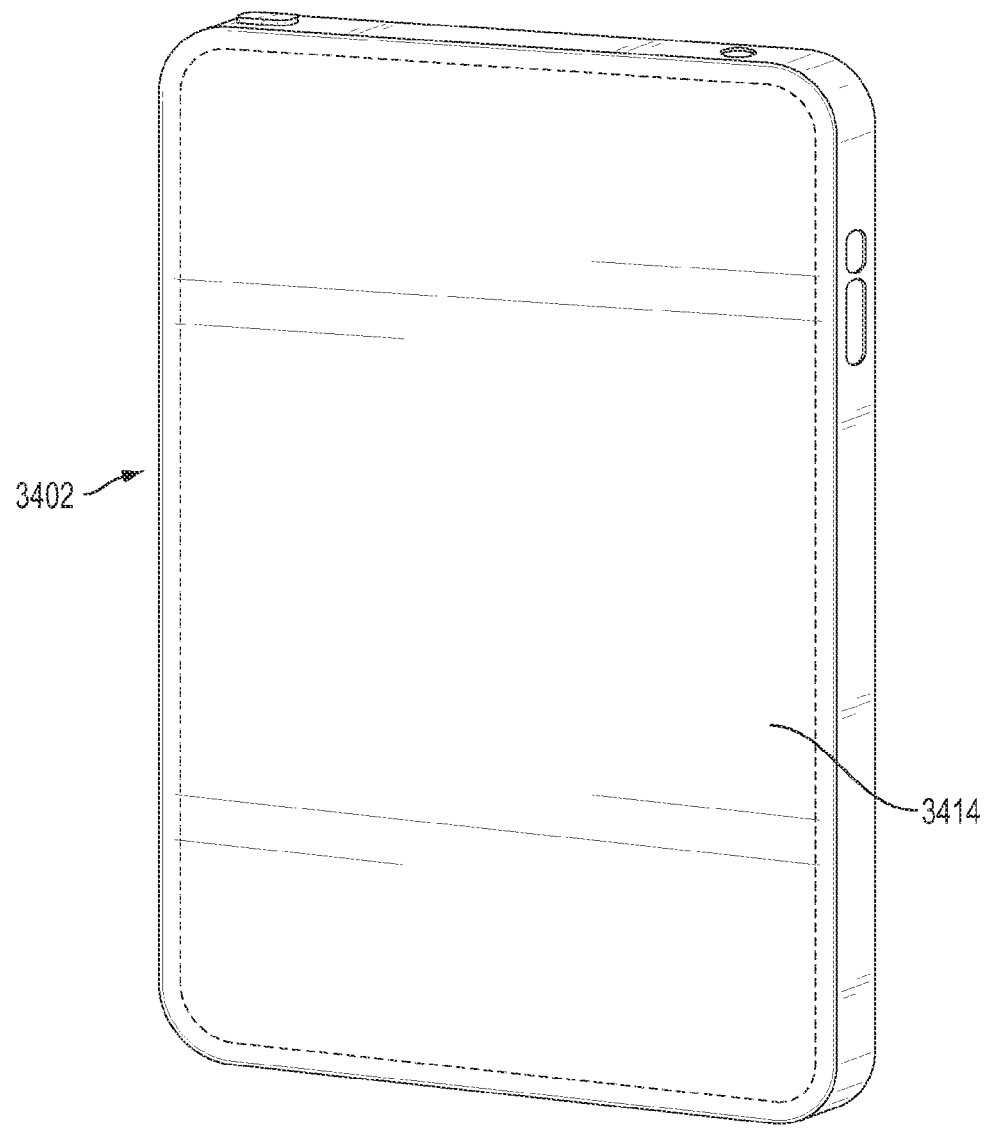
Figure 34I:
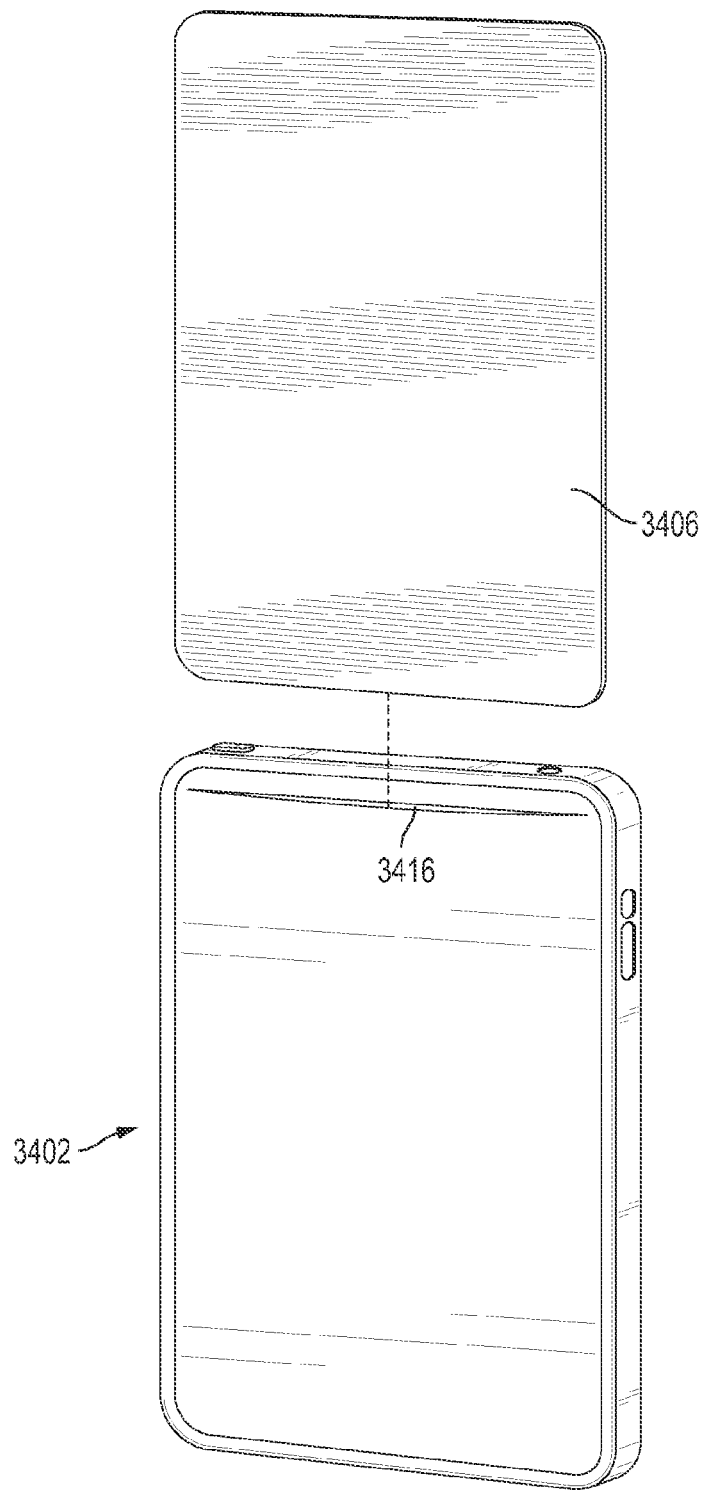
Figure 34J:
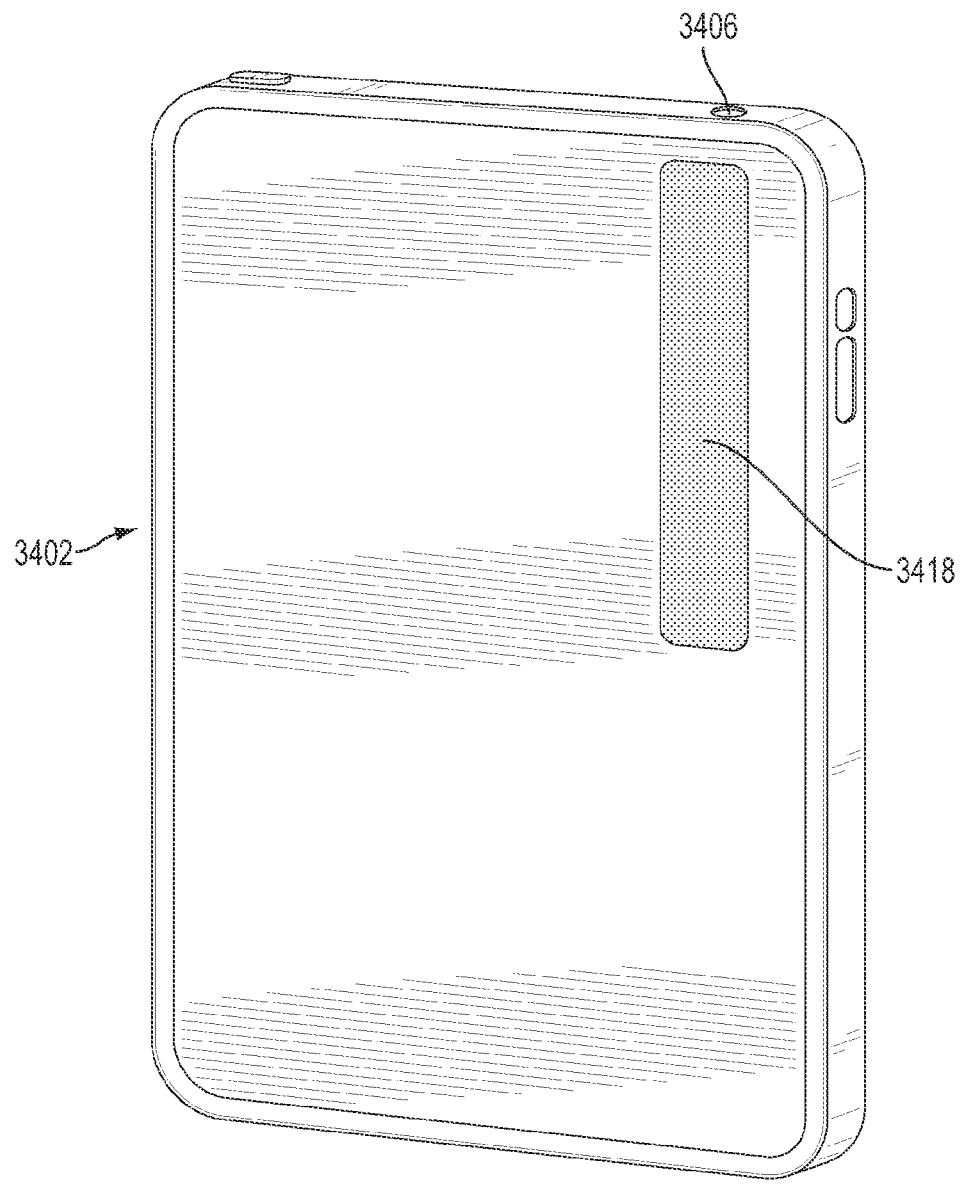
Figure 34K:
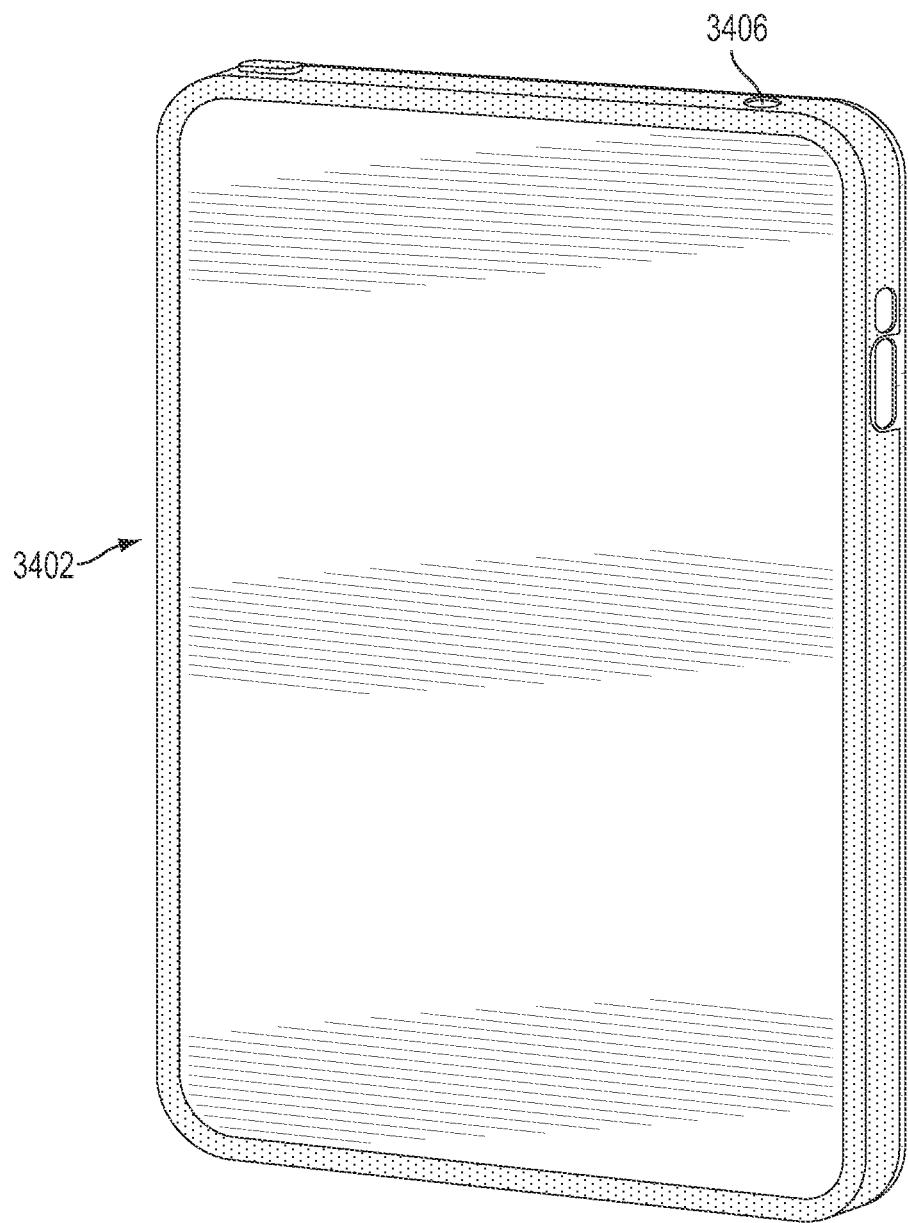
Figure 34L:
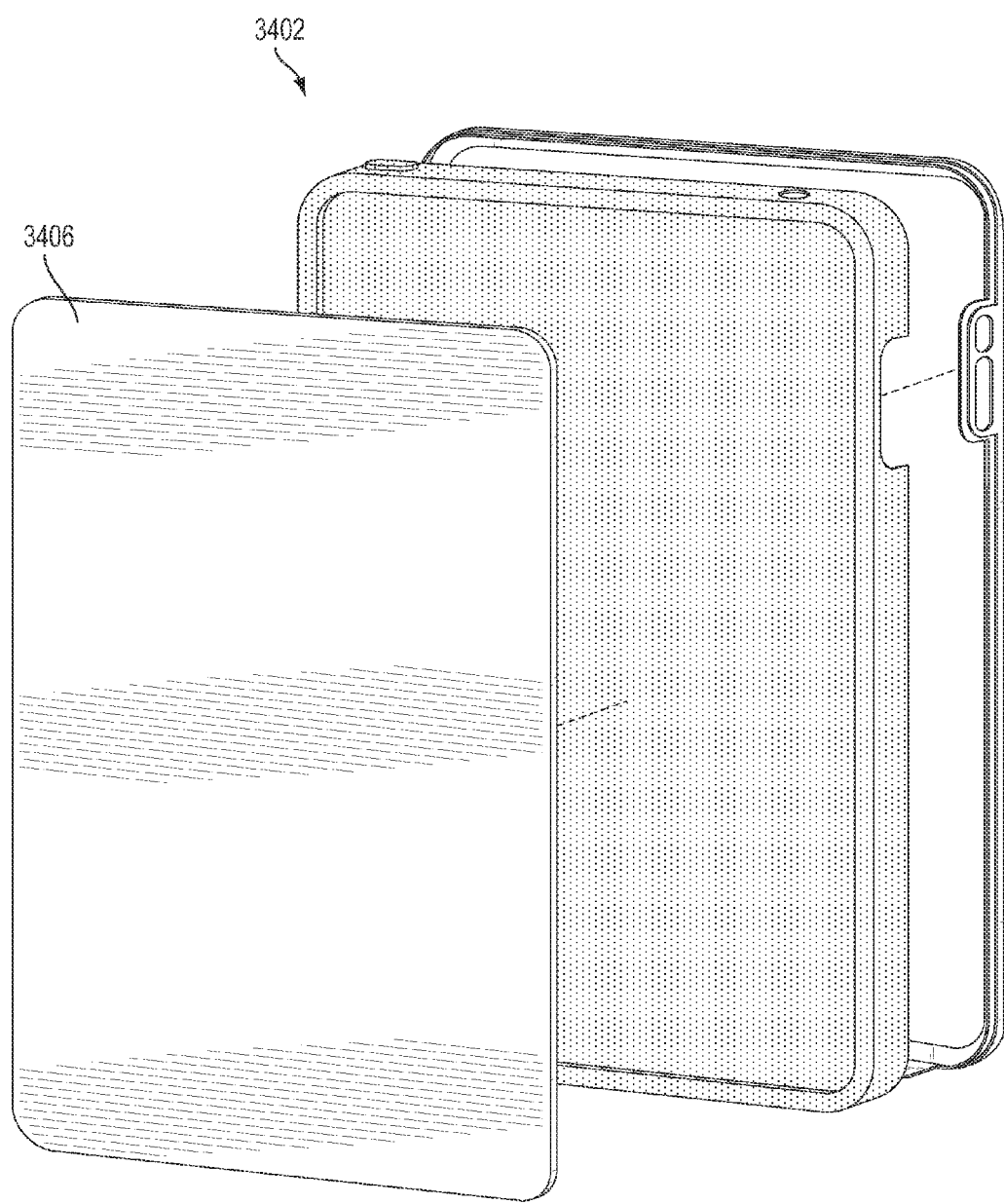

FIG. 33L illustrates an exploded perspective view of a case with a magnetic material back, according to some embodiments.

FIGS. 34A-34L illustrate embodiments of cases similar to those in FIGS. 3A-33L.

Figure 35:
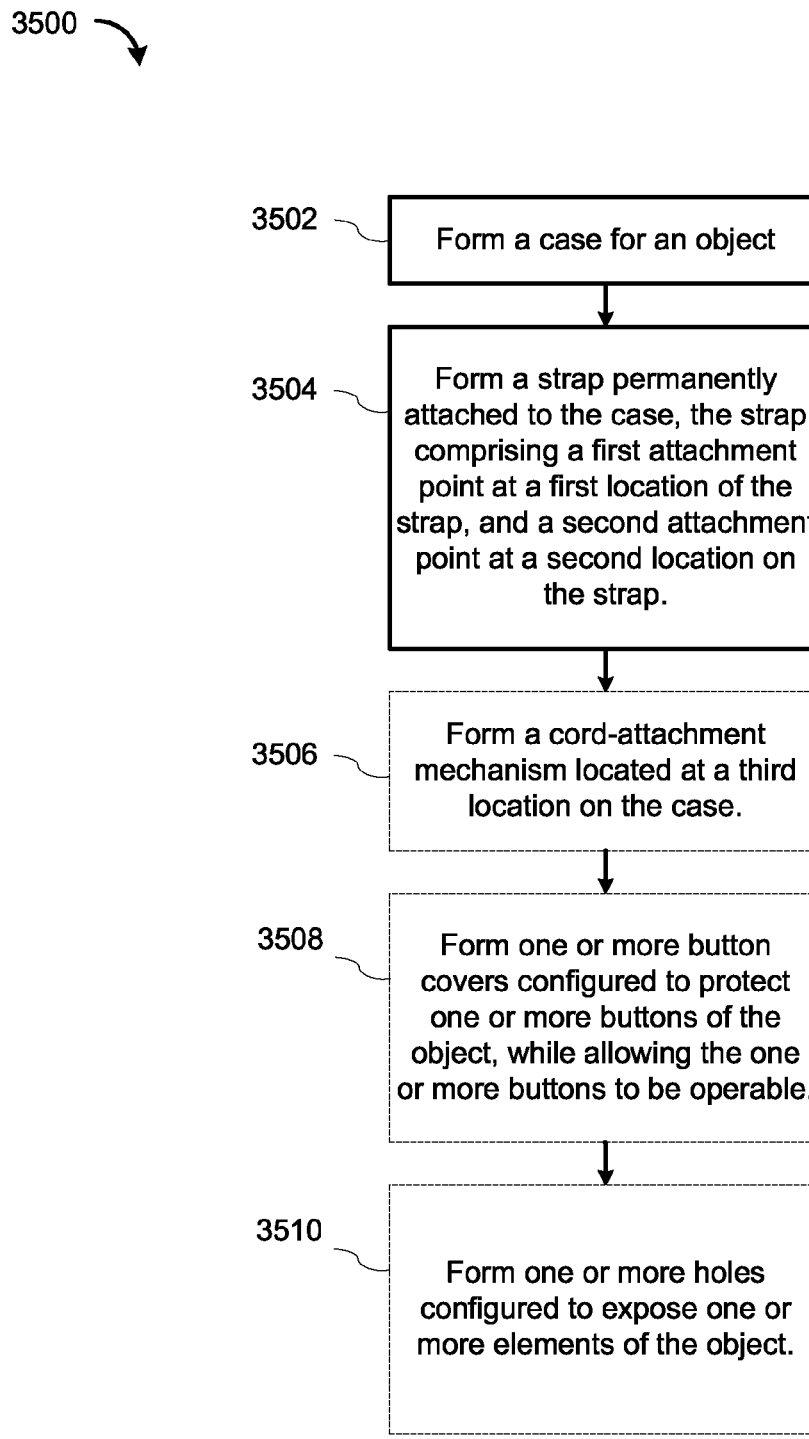

FIG. 35 is a flowchart of a method for manufacturing a cord management system, according to some embodiments.

Figure 36:
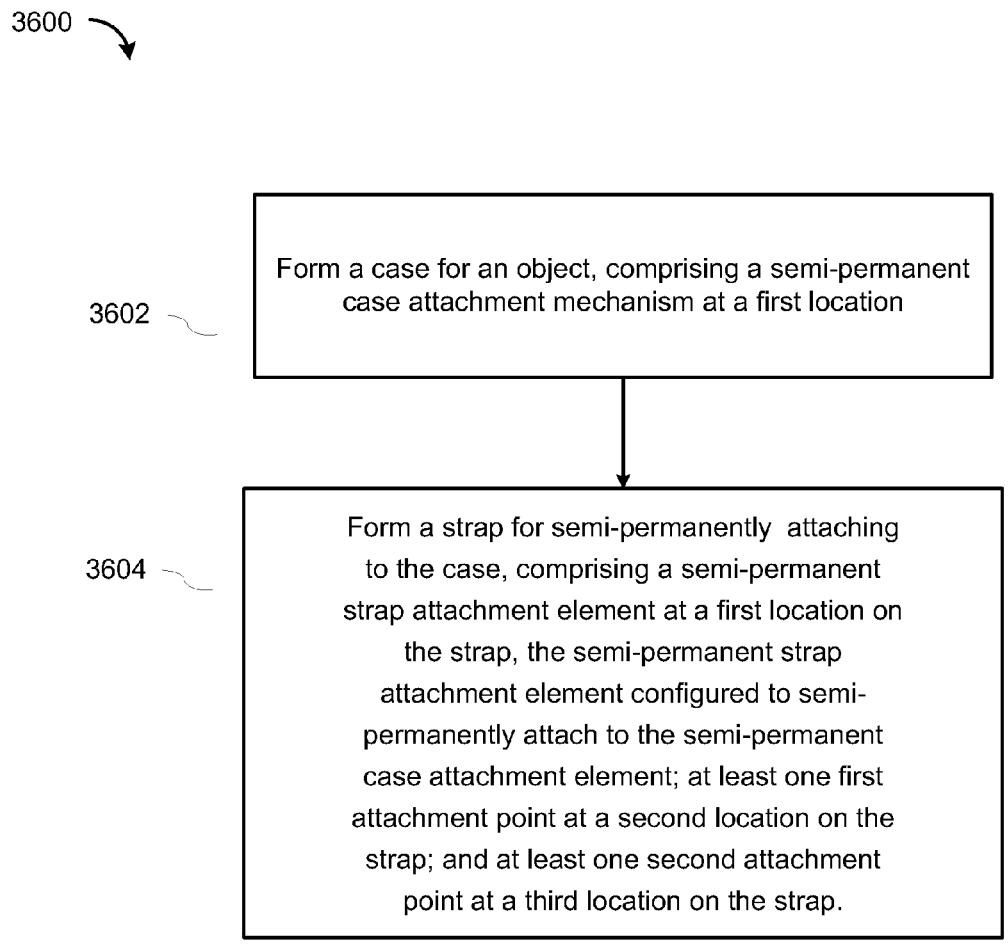

FIG. 36 is a flowchart of method for manufacturing another cord management system, according to some embodiments.

FIG. 37 is a flowchart of a method for manufacturing another cord management system, according to some embodiments.

Like reference numerals refer to corresponding parts throughout the drawings.

DESCRIPTION OF EMBODIMENTS

Cord Management System

Figure 1:
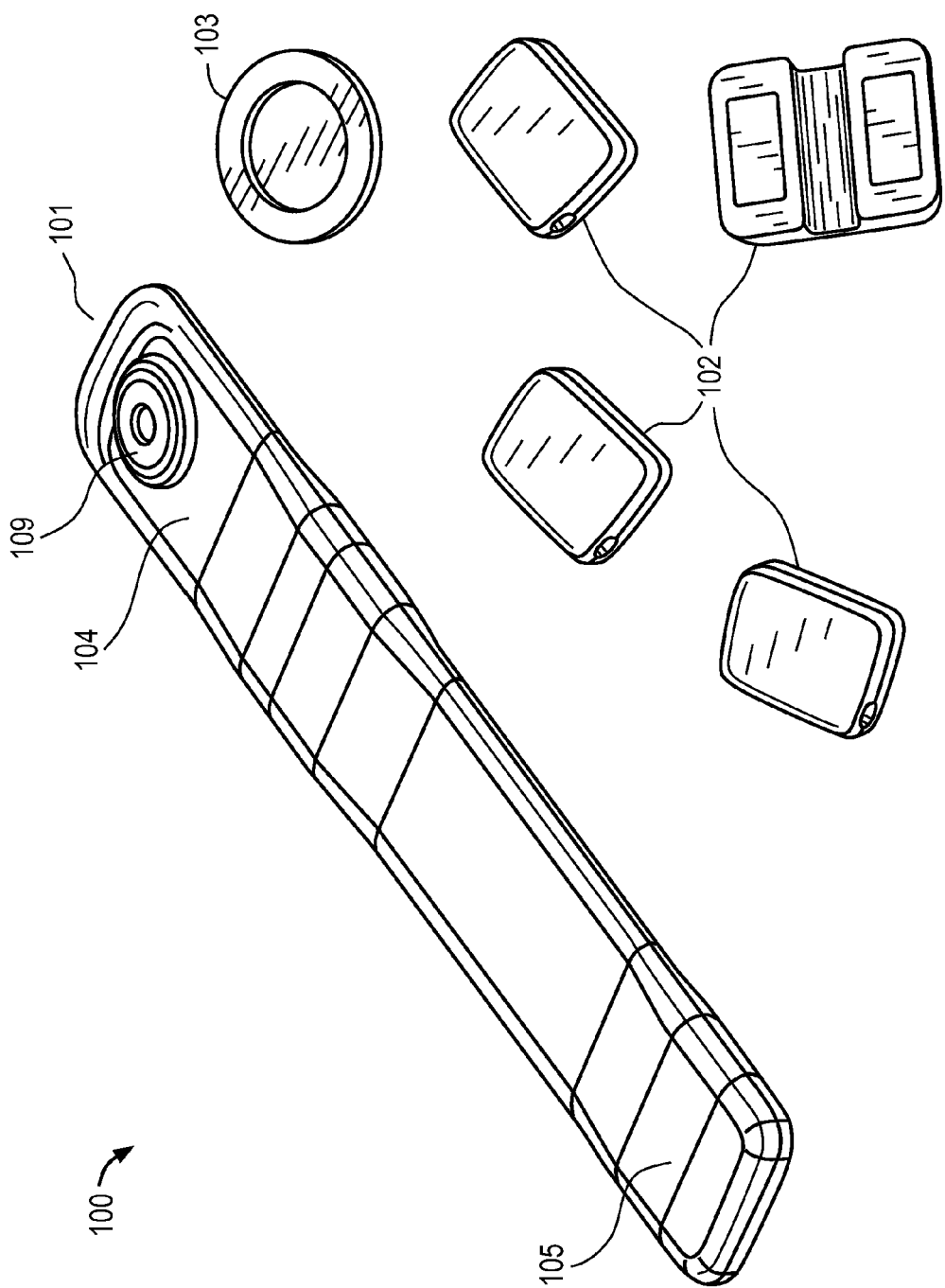
FIG. 1 illustrates components of a cord management system, according to some embodiments.

To address the aforementioned problems, some embodiments provide a cord management system that secures the cord and prevents the cord from becoming tangled. FIG. 1 illustrates components of an exemplary cord management system 100. The components of the cord management system 100 may include a magnetic strap 101, one or more magnetic beads 102, and a magnetic material 103. The magnetic strap 101 is described in more detail with respect to FIG. 6-12 below, the magnetic beads 102 are described in more detail with respect to FIG. 13-14 below. The magnetic material 103 is described in more detail with respect to FIG. 15G below.

In some embodiments, the cord management system 100 is provided to an end user as a kit that includes components that the end user assembles to form the cord management system. The process of assembling the cord management system 100 is described in more detail with respect to FIG. 15 below. In some embodiments, the kit includes a subset of the components illustrated in FIG. 1. For example, the cord management system 100 may include: (1) the magnetic strap 101, (2) the magnetic strap 101 and the magnetic beads 102, (3) the magnetic strap 101 and the magnetic material 103, (4) the magnetic strap 101, the magnetic beads 102, and the magnetic material 103, or (5) the magnetic beads 102.

In some embodiments, only a subset of the cord management system 100 is used to secure a cord and prevent the cord from becoming tangled. For example, the end user may choose one of several options to secure the cord using: (1) the magnetic strap 101, (2) the magnetic strap 101 and the magnetic beads 102, (3) the magnetic strap 101 and the magnetic material 103, (4) the magnetic strap 101, the magnetic beads 102, and the magnetic material 103, or (5) the magnetic beads 102. These options are described below.

Note that although a magnet may be considered a magnetic material, a magnetic material is not necessarily a magnet. Specifically, a magnetic material is a material or composition that produces a magnetic field in response to an applied magnetic field (e.g., a magnetic field produced by a magnet). The magnetic material may include one or more of a ferromagnetic material and a paramagnetic material.

Option 1: Magnetic Strap

Figure 2A:
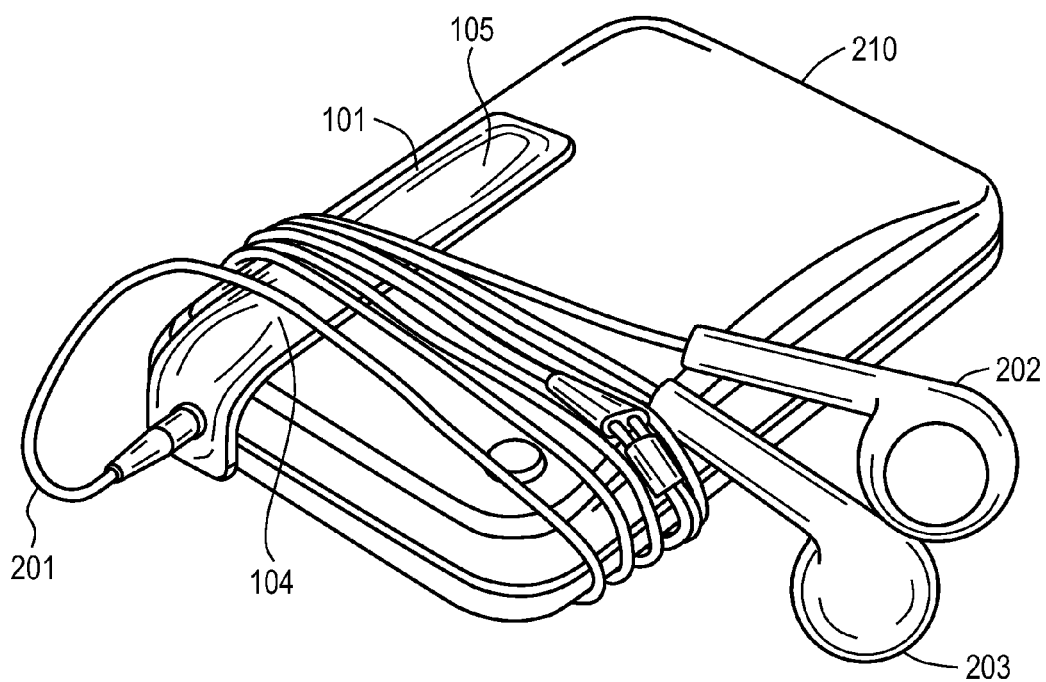
FIG. 2A illustrates a cord wrapped around a magnetic strap and an electronic device, according to some embodiments.
Figure 2B:
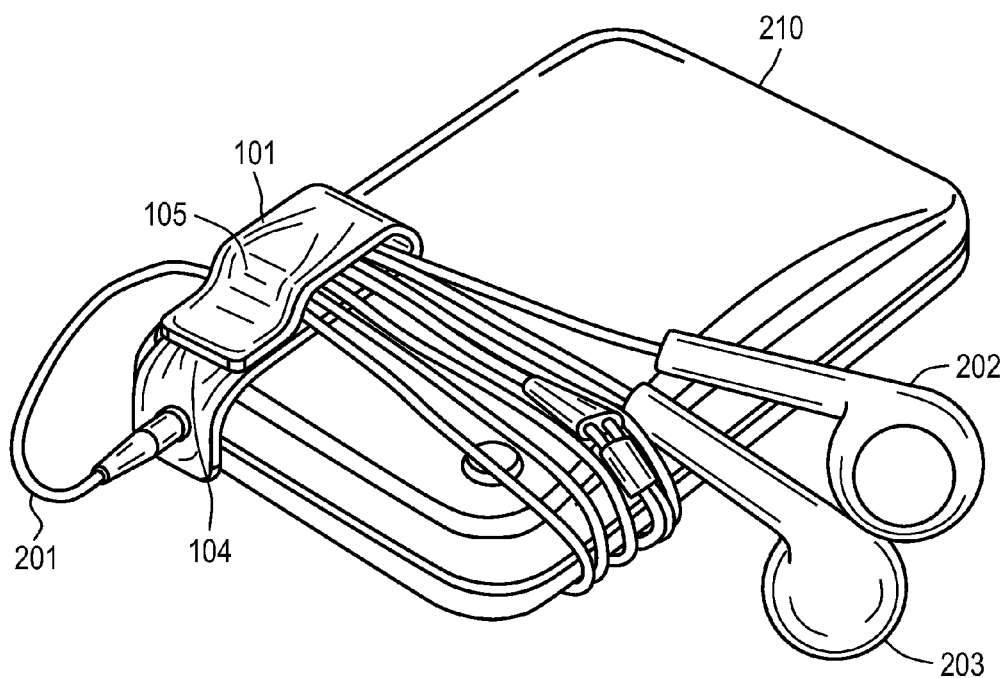
FIG. 2B illustrates a cord wrapped around a magnetic strap and the electronic device, wherein the magnetic strap is folded over the cord, according to some embodiments.
Figure 2C:
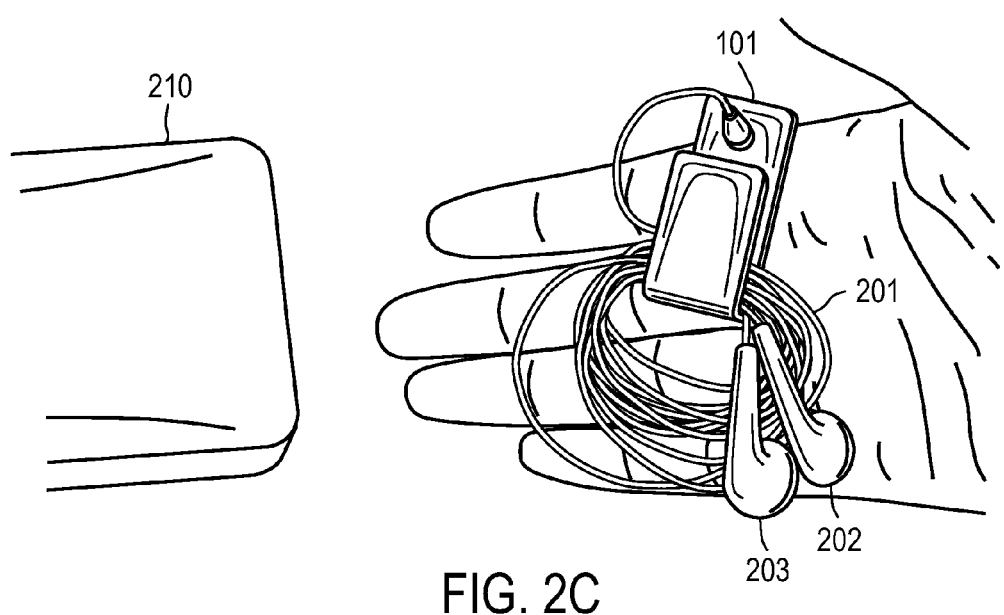
FIG. 2C illustrates a cord removed from the electronic device, according to some embodiments.
Figure 2D:
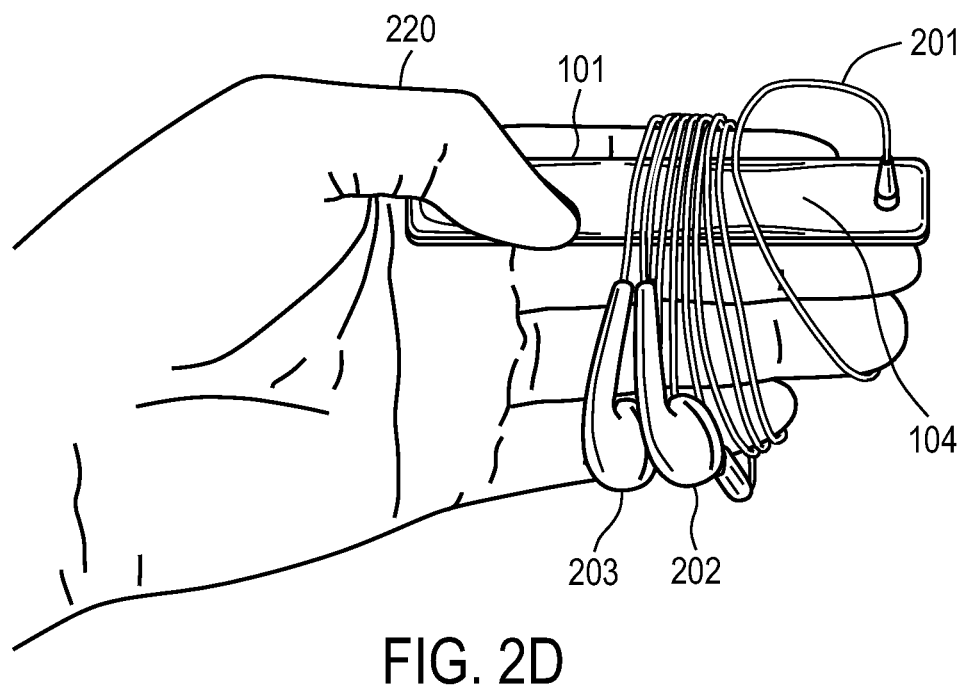
FIG. 2D illustrates a cord wrapped around a magnetic strap and a hand of an end user, according to some embodiments.
Figure 2E:
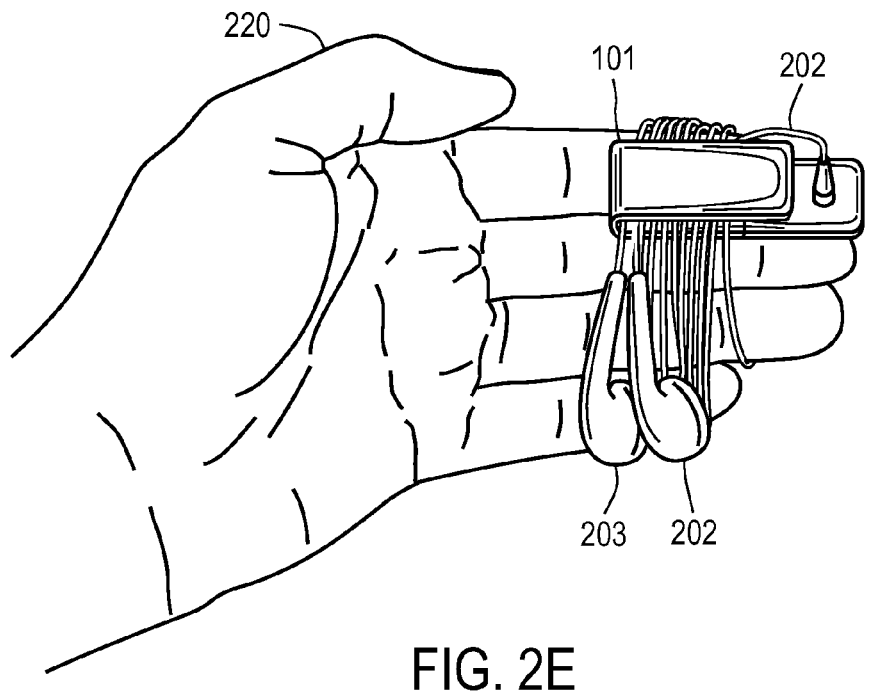
FIG. 2E illustrates a cord wrapped around a magnetic strap and the hand of the end user, wherein the magnetic strap is folded over the cord, according to some embodiments.

In some embodiments, the end user uses the magnetic strap 101 to secure a cord. As illustrated in FIGS. 2A-2E, a cord 201 is wrapped around the magnetic strap 101 substantially perpendicular to and/or otherwise across the magnetic strap 101 at any angle. In some embodiments, the cord 201 is a cord for earphones. Note that the term "earphones" is used in this specification to refer to any device (e.g., headphones, ear buds, etc.) that an end user places on or in the ears to produce sounds. For example, the cord 201 may include speakers (e.g., ear buds) 202 and 203, as illustrated in FIGS. 2A-2E. In some embodiments, the magnetic strap 101 is placed on an object and the cord 201 is wrapped around both the object and the magnetic strap 101 in a direction substantially perpendicular to and/or across the length of the magnetic strap 101. For example, the object may be an electronic device 210, as illustrated in FIGS. 2A-2C. Similarly, the object may be a hand as illustrated in FIG. 2D-2E.

In some embodiments, after a desired length of the cord 201 is wrapped around the magnetic strap 101, the magnetic strap 101 is folded over to form a loop around the cord 201 to secure the cord 201 to the magnetic strap 101. These embodiments are illustrated in FIG. 2B (e.g., an electronic device) and FIG. 2D (e.g., a hand). Once the magnetic strap 101 is secured around the cord 201, the object can be stored in a pocket, a bag, or a purse without the cord 201 becoming tangled or without the cord 201 becoming unwound from the object. In addition, once the magnetic strap 101 is secured around the cord 201, the magnetic strap 101 can be removed from the object and stored in a pocket, a bag, or a purse without the cord 201 becoming tangled or without the cord 201 becoming unwound from the magnetic strap 101.

Figure 2F:
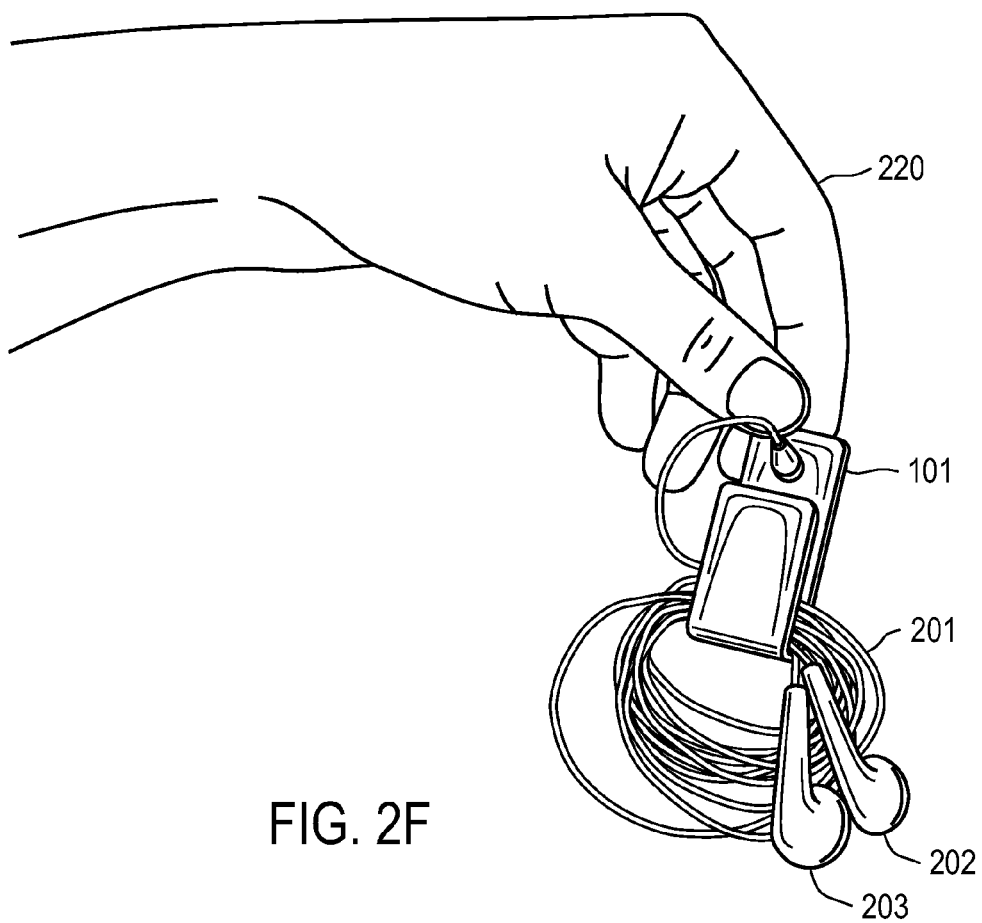
FIG. 2F illustrates a cord removed from the hand of the end user, according to some embodiments.
Figure 2G:
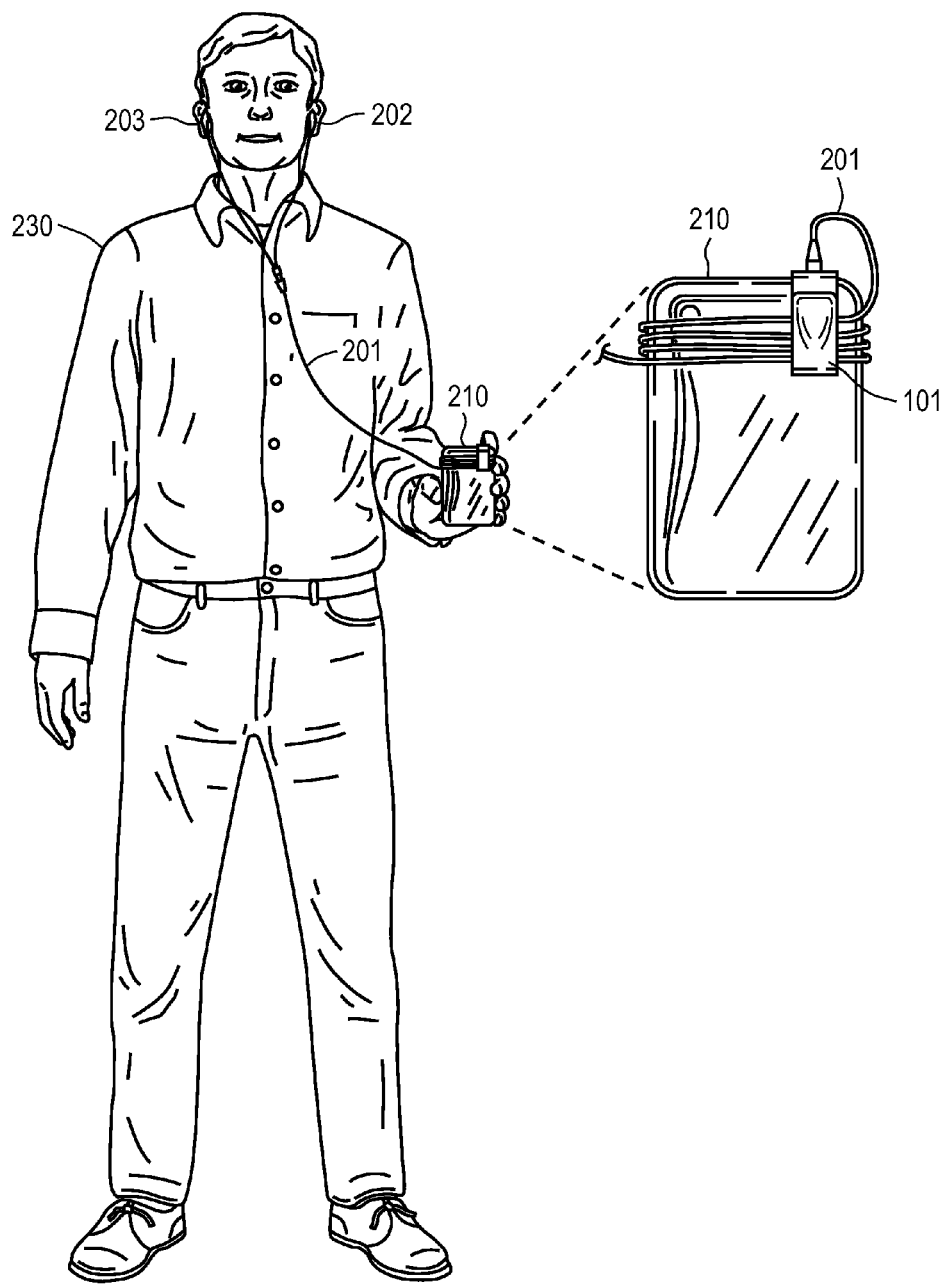
FIG. 2G illustrates a cord that is partially wrapped around a magnetic strap and the electronic device, according to some embodiments.

Although FIGS. 2B and 2D illustrate a cord that is completely secured by the magnetic strap 101, the end user may choose to wrap only a portion of the cord 201 in the magnetic strap 101. For example, FIG. 2G illustrates an end user 230 that is holding the electric device 210 with the speakers 202 and 203 inserted in his ears. As illustrated in FIG. 2G, the cord 201 is wound around the electronic device 210 and the magnetic strap 101 several times and is secured with the magnetic strap 101. In this way, the end user 230 has reduced the length of the cord 201 that is free and dangling. In other words, the length of the cord 201 is such that the end user 230 can perform desired functions and move the electronic device 210 without dislodging the speakers 202 and 203 and without having too much slack on the cord 201.

In some embodiments, magnets located at magnetic attachment points 104 and 105 on the magnetic strap 101 keep the magnetic strap 101 in the loop configuration when the magnetic strap 101 is folded over to form the loop. Note that the magnetic attachment points 104 and 105 may be replaced with other types of attachment mechanisms. For example, the attachment mechanism may include Velcro, adhesives, suction devices (e.g., suction cups), van der Waals force attachment mechanisms (e.g., "Gecko" tape), snaps, buttons, friction mechanisms, buckles, springs, bistable springs (e.g., a slap bracelet), a sleeve that inserts into a slot, a peg that is inserted into a hole, and hinges.

In some cases, the end user may desire to remove the cord 201 from an electronic device onto which the cord 201 is attached and store the cord 201 separately from the electronic device. In these cases, it is highly desirable to prevent the separated cord 201 from becoming tangled. Thus, in some embodiments, after the cord 201 is secured to the magnetic strap 101, the magnetic strap 101 is removed from the object. These embodiments are illustrated in FIGS. 2C and 2F. Since the cord 201 is secured to the magnetic strap 101, removing the magnetic strap 101 from the object removes the cord 201 from the object. When the magnetic strap 101 is removed from the object, the cord 201 remains looped around the magnetic strap 101. Thus, the cord 201 that is wrapped around the magnetic strap 101 does not become tangled when placed in a pocket, a bag, or a purse.

Figure 2H:
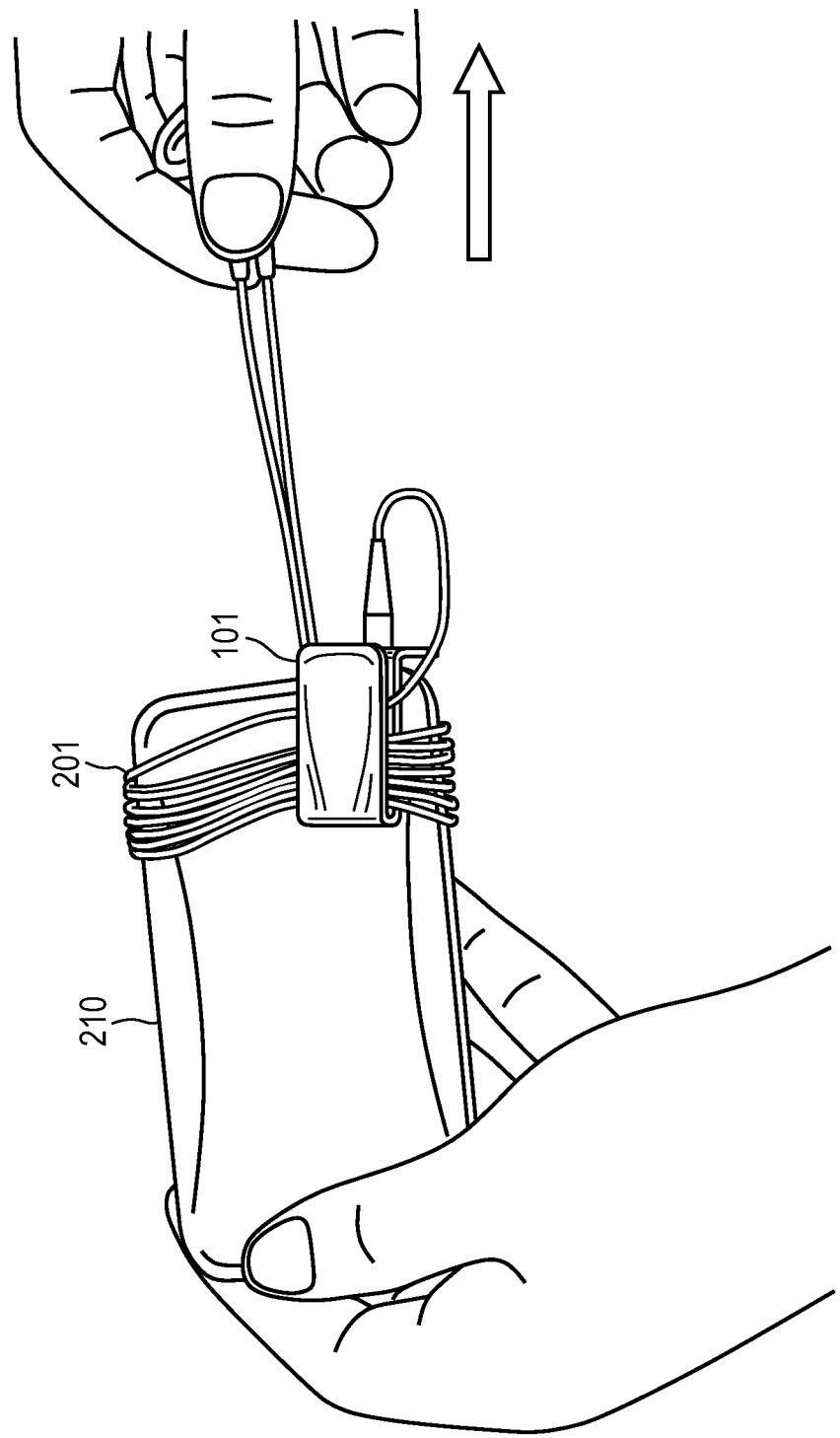
FIG. 2H illustrates a process for deploying a cord wrapped around the electronic device, according to some embodiments.
Figure 2J:
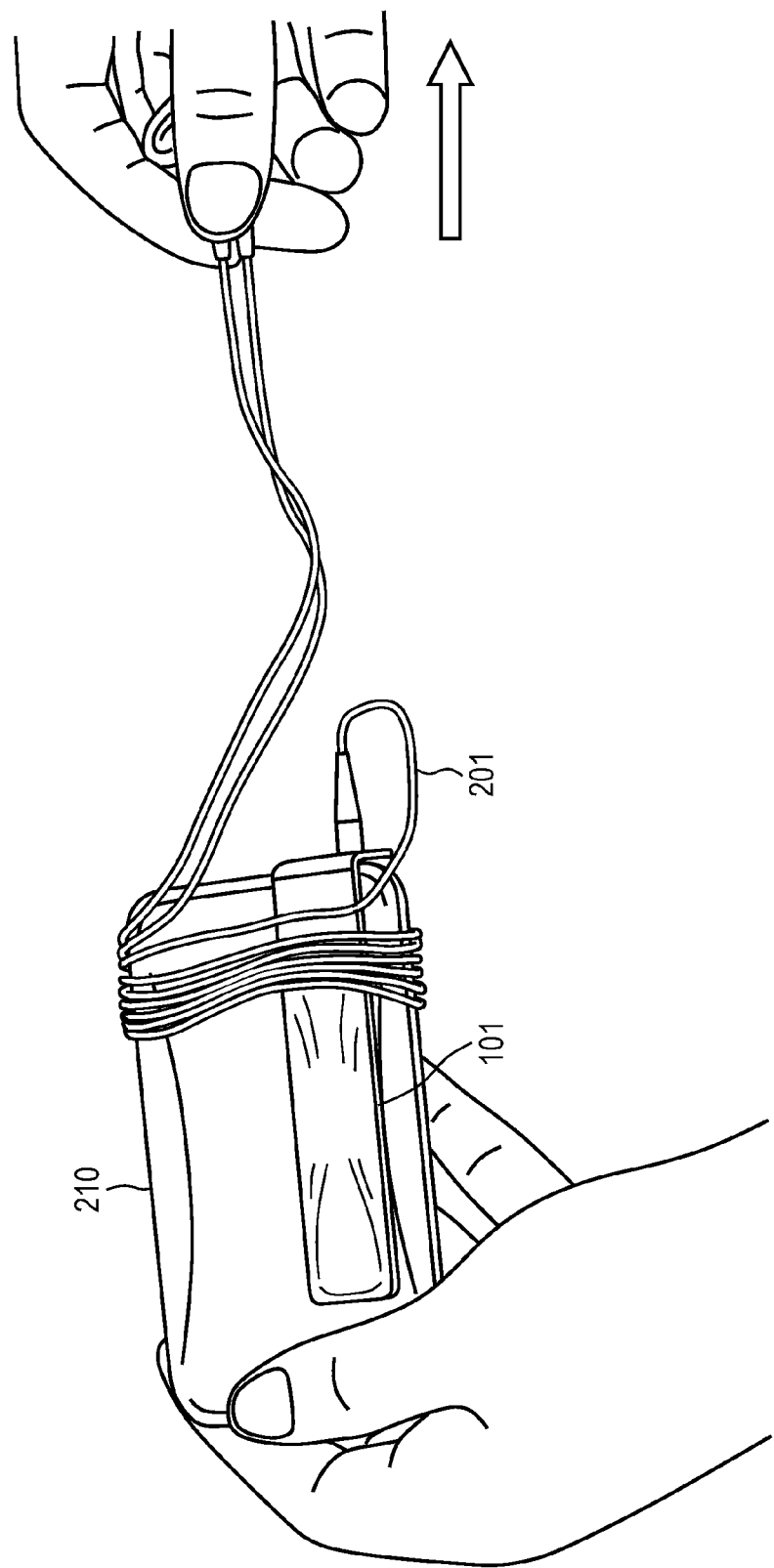
FIG. 2J continues the process of deploying the cord illustrated in FIG. 2H, according to some embodiments.
Figure 2K:
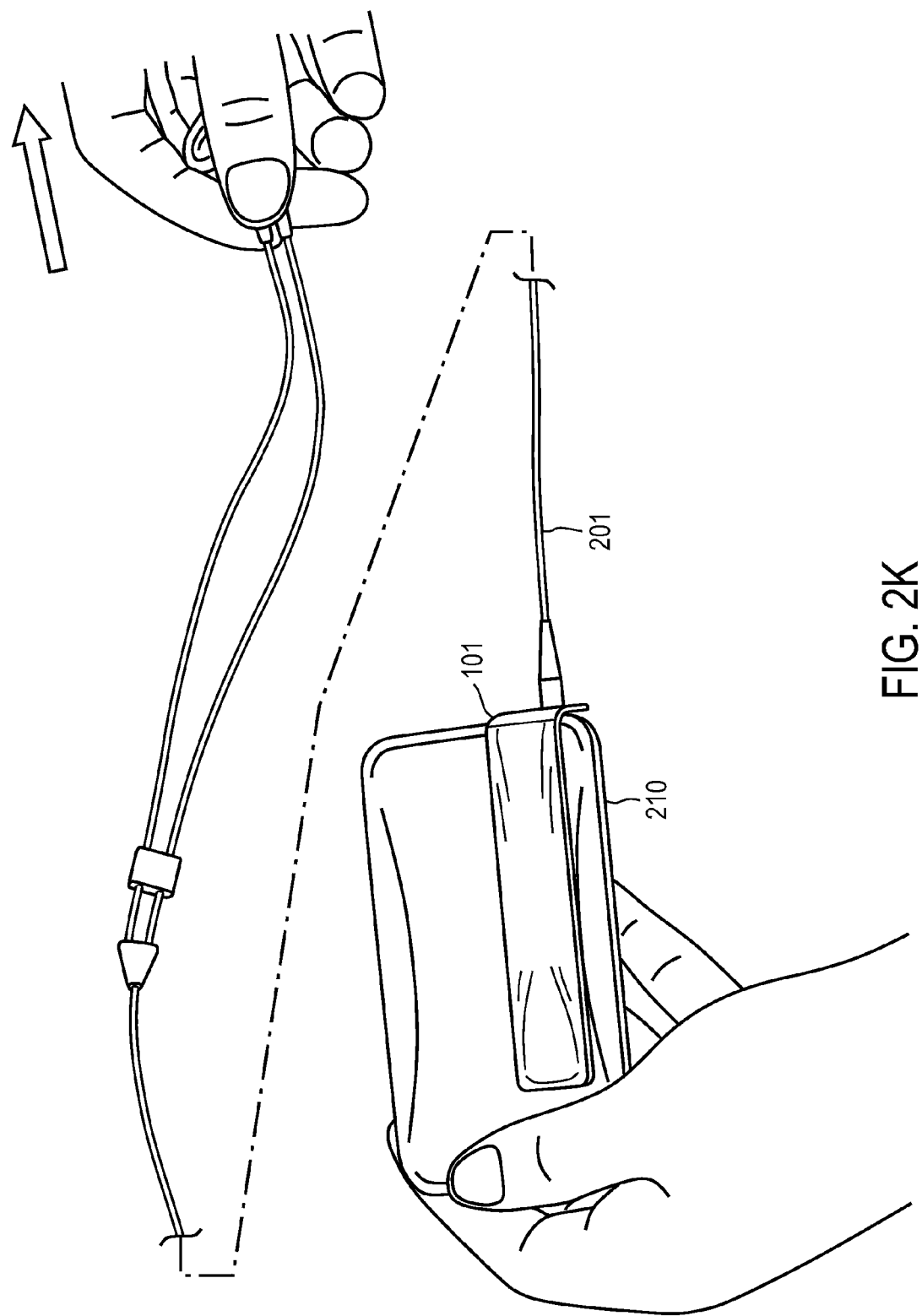
FIG. 2K continues the process of deploying the cord illustrated in FIG. 2J, according to some embodiments.
Figure 5A:
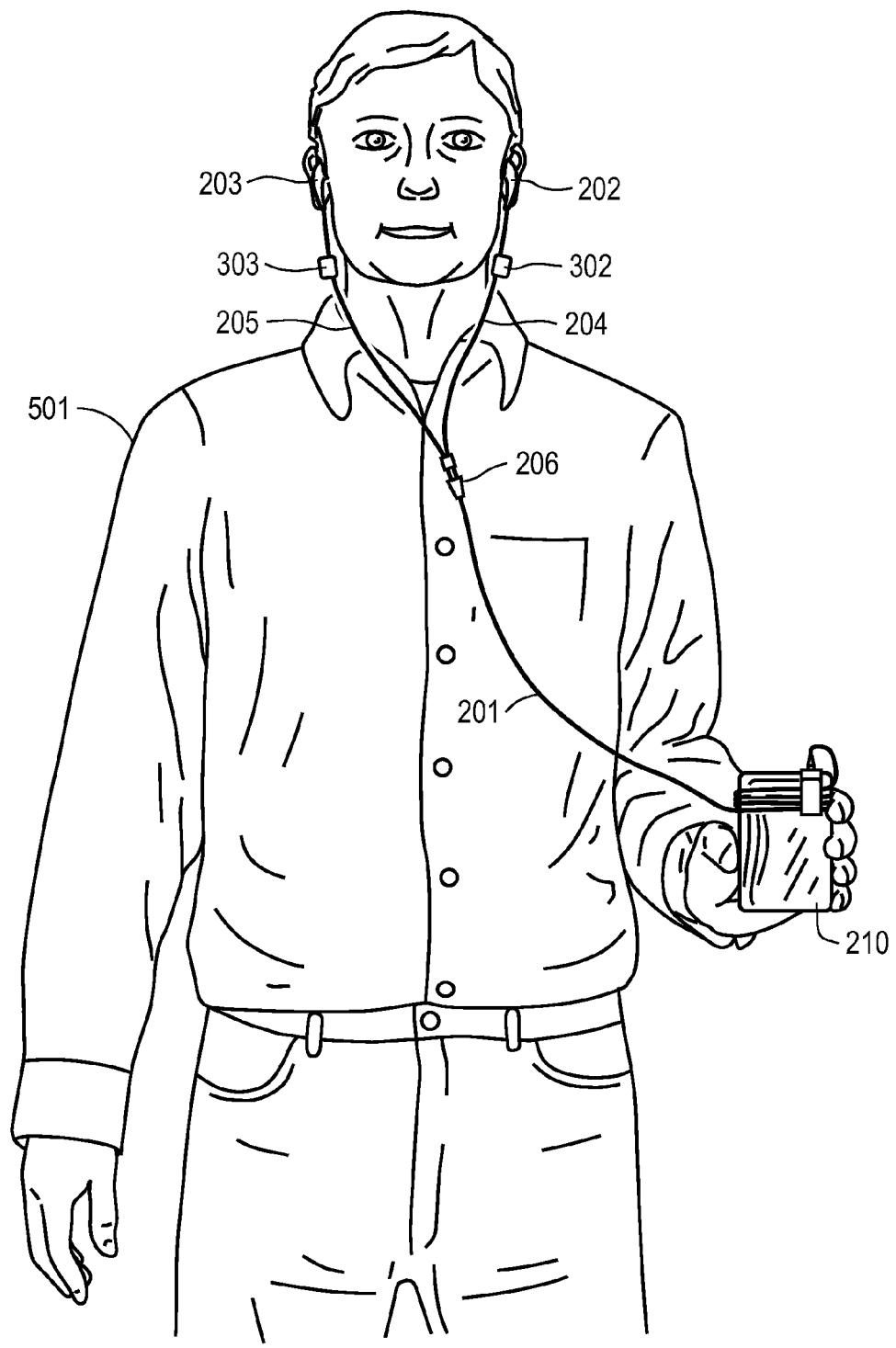
FIG. 5A illustrates an end user using an electronic device and a cord with magnetic beads, according to some embodiments.

In some cases, after wrapping the cord 201 around the electronic device so that the electronic device may be stored without the cord 201 becoming tangled, the end user may wish to use the electronic device again. Thus, in some embodiments, after the cord 201 is secured by the magnetic strap 101, the cord 201 is deployed from the magnetic strap 101. In some embodiments, the cord 201 is deployed from the magnetic strap 101 by pulling the end of the cord 201 in a direction substantially parallel to the length of the magnetic strap. For example, FIGS. 2H, 2J, and 2K illustrate the deployment of the cord 201 when the cord 201 is wrapped around the electronic device 210. As illustrated in FIG. 2H, the end user pulls on the speakers 202 and 203 in a direction substantially parallel to the length of the magnetic strap 101. As illustrated in FIG. 2J, the force that the end user exerts on the cord 201 causes the magnetic strap 101 to detach from the loop and become open. As the end user continues pulling on the cord 201, the cord 201 unwinds from the electronic device 210, as illustrated in FIG. 2K. Note that the user may stop unwinding the cord 201 from the electronic device at any time. For example, user may partially deploy the cord 201 and secure the cord 201 using the magnetic strap 101 as illustrated in FIG. 5A.

In some embodiments, the magnetic strap 101 is used to secure one or more of: drapery, drapery cords, power cords, extension cords, hoses, ropes, kite strings, fishing lines, and the like.

Option 2: Magnetic Strap and Beads

Although the magnetic strap 101 may be used by itself as a cord management system, other components may be added to the cord management system to provide a different user experience. In some embodiments, the cord management system includes the magnetic strap 101 and one or more of the magnetic beads 102. The magnetic beads 102 may be used for several purposes. In some embodiments, the magnetic beads 102 are used to assist in the wrapping of the cord 201 around the electronic device 210 and the magnetic strap 101. In some embodiments, the magnetic beads 102 are used to keep the speakers 202 and 203 coupled to each other when the cord 201 is wrapped around the electronic device 210. In some embodiments, the magnetic beads 102 are used to secure the speakers 202 and 203 to a predetermined point on the cord 201. In some embodiments, the magnetic beads 102 are used to secure excess cord after the cord 201 is wrapped around the electronic device 210. In some embodiments, the magnetic beads 102 are used to secure the cord under the chin of an end user. These embodiments are described below.

FIGS. 3A to 3E illustrates a process for managing a cord using the magnetic strap 101 and the magnetic beads 102, according to some embodiments. Note that the magnetic beads 102 may include one or more of magnetic beads 301, 302, 303, and 304, each having an embedded magnet, as described below. Also note that at least a subset of the magnetic beads 301, 302, 303, and 304 may be substituted for a magnetic material that is embedded in the magnetic beads 301, 302, 303, and 304. Furthermore, additional magnetic beads, above and beyond the magnetic beads 301, 302, 303, and 304, may be included in the cord management system 100. Among other things, these additional magnetic beads may be used as replacements for lost magnetic beads.

Figure 3A:
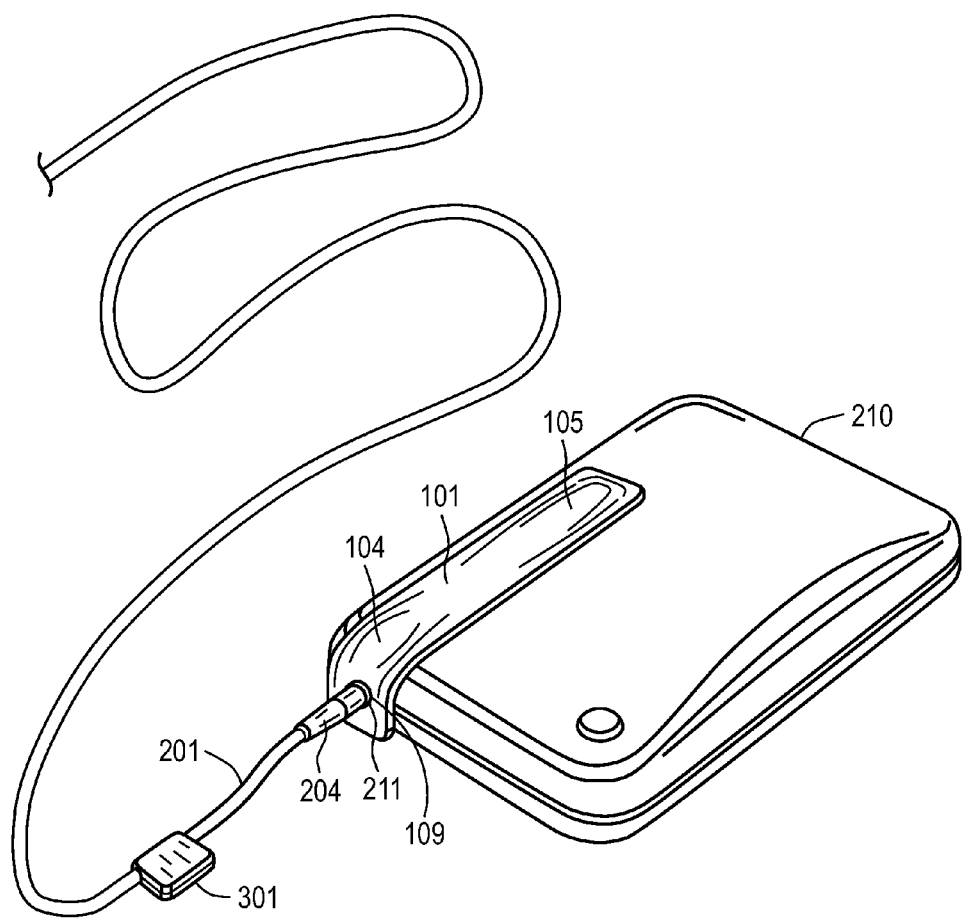
FIG. 3A illustrates a process for managing a cord using a magnetic strap and magnetic beads, according to some embodiments.

As illustrated in FIG. 3A, a connector 204 of the cord 201 (and/or the cord 201) is inserted into a cord-attachment mechanism 109 of the magnetic strap 101. Note that the term "connector" is used in this specification to refer to any type of connector or plug. For example, the connector 204 may be an electrical connector (e.g., an audio connector, a video connector, a power connector, a computer connector, etc.) or non-electrical connector. The connector 204 of the cord 201 is then attached to a corresponding connector 211 on the electronic device 210. The magnetic strap 101 is then placed on the electronic device 210 so that the length of the magnetic strap 101 is collinear with the direction in which the connector 204 of the cord was inserted into the corresponding connector 211 on the electronic device 210. As illustrated in FIG. 3A, the corresponding connector 211 on the electronic device 210 is located at a top edge of the electronic device 210. Thus, in this case, the length of the magnetic strap 101 is parallel to the length of the electronic device 210. If, however, the corresponding connector 211 of the electronic device 210 were located at a side edge of the electronic device 210, the length of the magnetic strap 101 may run in a direction perpendicular to the direction illustrated in FIG. 3A or at another angle other than the angle illustrated in FIG. 3A.

Figure 3B:
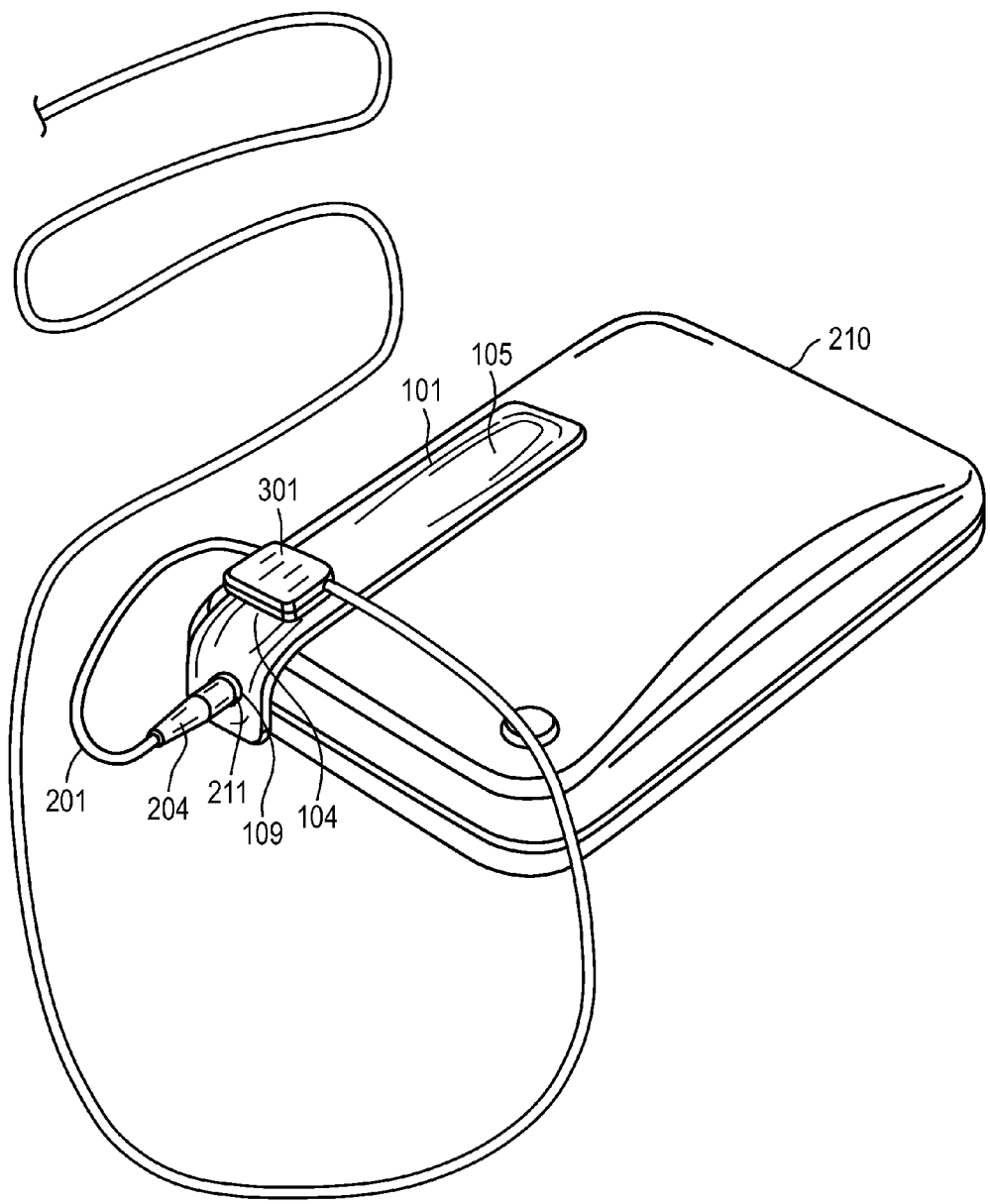
FIG. 3B continues the process illustrated in FIG. 3A, according to some embodiments.

In some embodiments, a magnetic bead 301 is attached to the cord 201 at a predetermined location on the cord 201. In some embodiments, the predetermined location is selected so that when the cord 201 is bent towards the magnetic attachment point 104, the magnetic bead 301 becomes magnetically attached to the magnetic strap 101 at the magnetic attachment point 104. Note that the term "magnetically attached" is defined below. The magnetic bead 301 allows the end user to start wrapping the cord 201 around the electronic device and the magnetic strap 101 without needing to hold the cord 201 onto the magnetic strap 101 or the electronic device 210, as illustrated in FIG. 3B. Note that these embodiments are optional. Although FIGS. 3B-3E illustrate the magnetic bead 301 attached to the cord 201, the magnetic bead 301 may be omitted. For example, an experienced end user may be able to start wrapping the cord 201 around the magnetic strap 101 and the electronic device 210 without the aid of the magnetic bead 301 and without needing to hold the cord 201 onto the magnetic strap 101 or the electronic device 210.

Figure 3C:
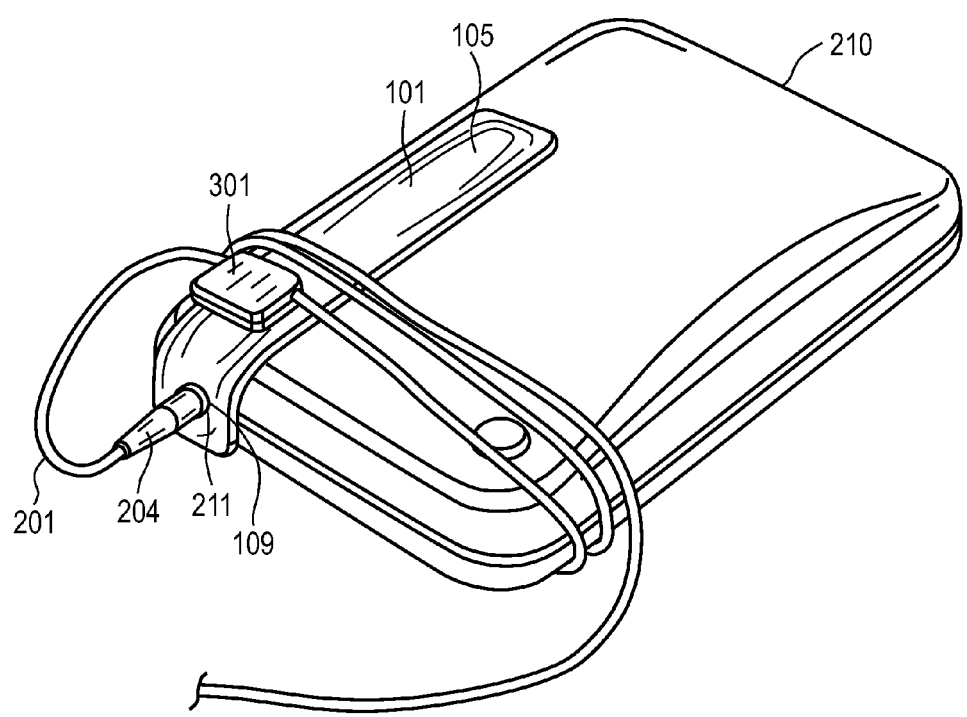
FIG. 3C continues the process illustrated in FIG. 3B, according to some embodiments.
Figure 3D:
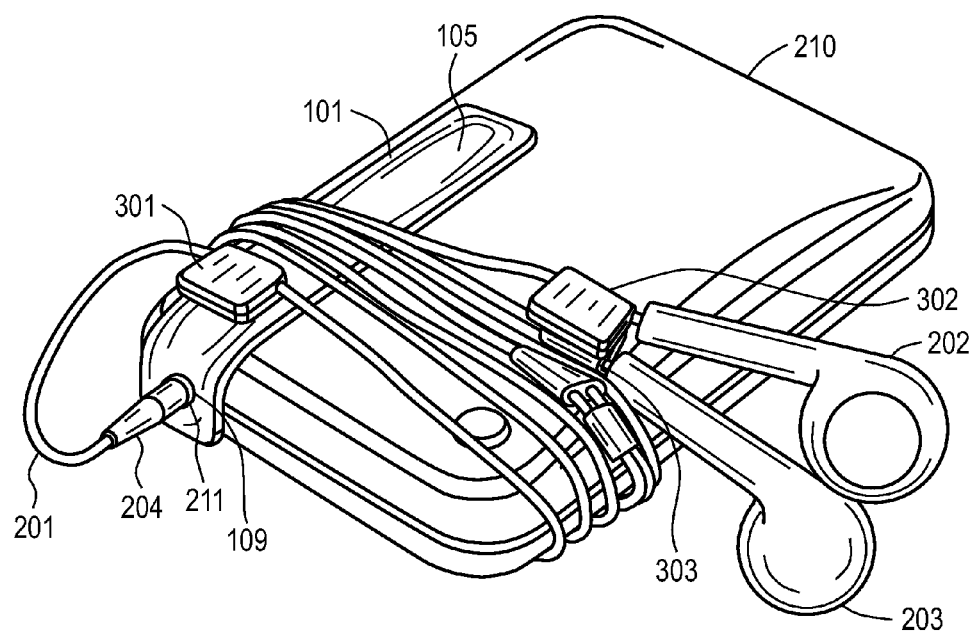
FIG. 3D continues the process illustrated in FIG. 3C, according to some embodiments.
Figure 3E:
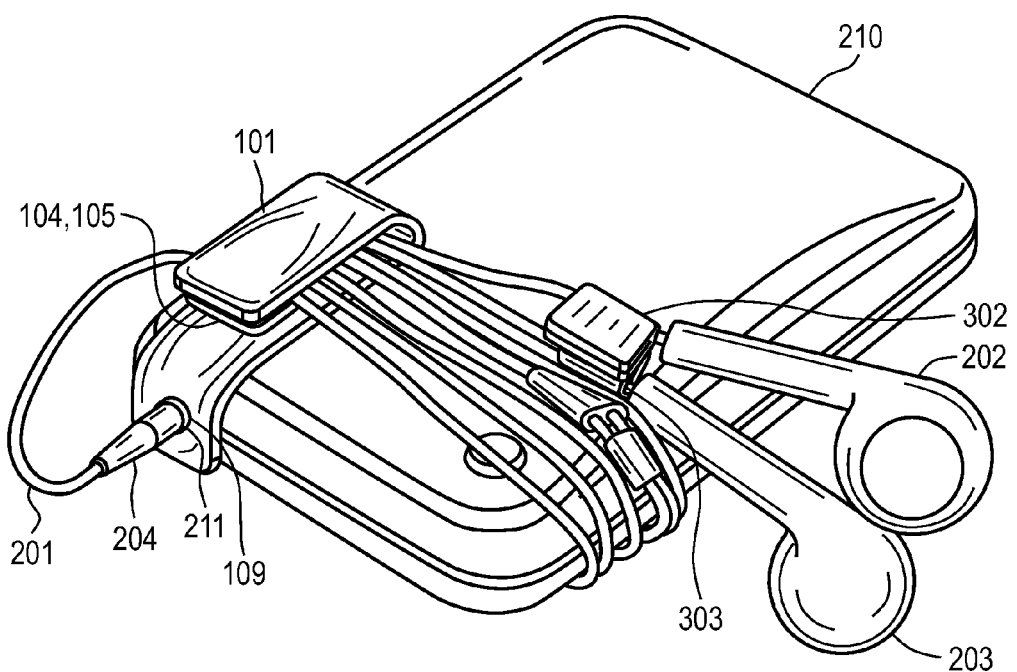
FIG. 3E continues the process illustrated in FIG. 3D, according to some embodiments.

The cord 201 is then wrapped around the magnetic strap 101 and the electronic device 210, as illustrated in FIGS. 3C-3E. In some embodiments, the cord 201 is wrapped around the magnetic strap 101 substantially perpendicular to a length of the magnetic strap 101. Note that if the length of the magnetic strap 101 runs in a direction perpendicular to the direction or at an angle other than the angle illustrated in FIGS. 3A-3E, the cord 201 is wrapped around the length of the electronic device 210 so that the cord 201 is substantially perpendicular to the magnetic strap 101.

Figure 3F:
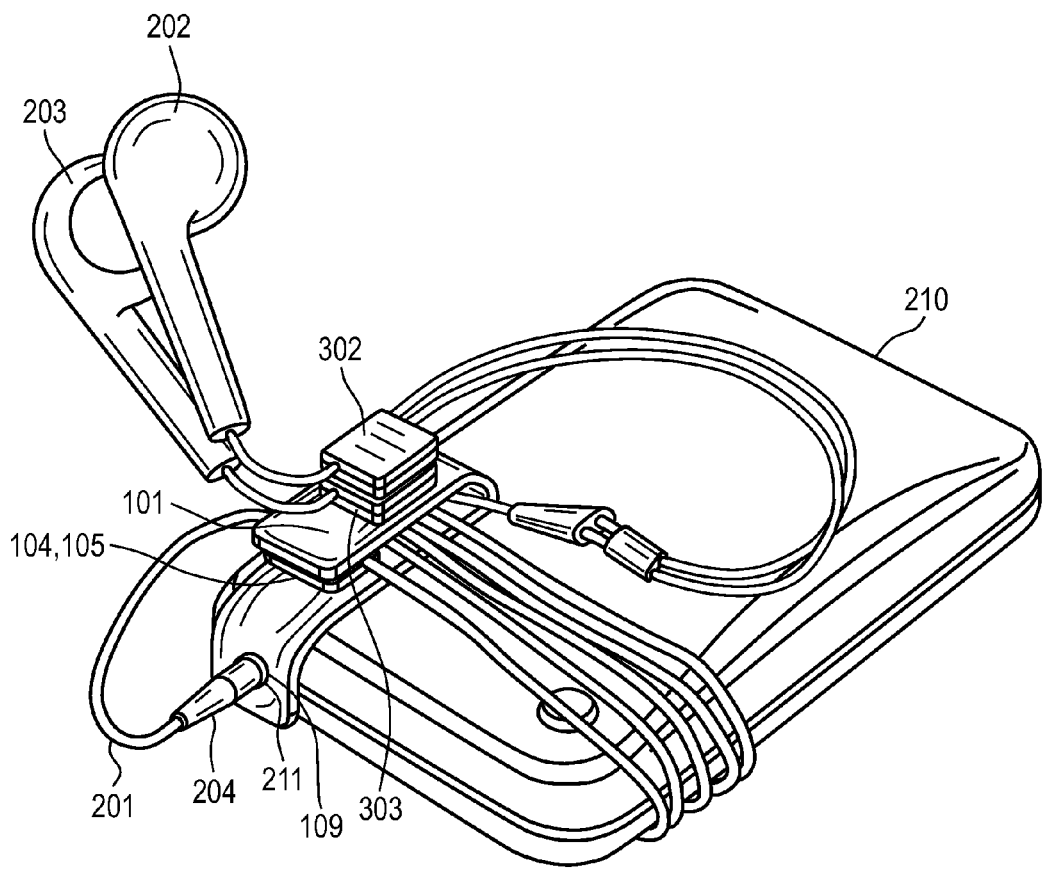
FIG. 3F illustrates a configuration to secure the free end of the cord, according to some embodiments.

FIG. 3D illustrates the cord 201 after it has been wrapped around the electronic device 210. In some embodiments, magnetic beads 302 and 303 are attached on the cords for the speakers 202 and 203 at a predetermined distance from the speakers 202 and 203. In some embodiments, one of the magnets 302 and 303 is substituted for magnetic material. In some embodiments, the magnets of the speakers 202 and 203 are used in lieu of the magnets 302 and 303. In some embodiments, the magnetic beads 302 and 303 are magnetically attached to each other so that the speakers 202 and 203 are coupled to each other. By magnetically attaching the magnetic beads 302 and 303 to each other, the cord for each of the speakers 202 and 203 has a reduced likelihood of becoming tangled with each other or with other parts of the cord 201. The predetermined distance may be selected so that the magnetic beads 302 and 303 are located on the cords just below the speakers 202 and 203, as illustrated in FIG. 3D. As illustrated in FIG. 3E, after the magnetic strap 101 is folded over to form the loop, the free end of the cord 201 (i.e., the end attached to the speakers 202 and 203) may be allowed to dangle freely. As illustrated in FIG. 3F, after the magnetic strap 101 is folded over to form the loop, the free end of the cord 201 may be folded over so that the magnetic beads 302 and 303 are magnetically attached to the magnetic attachment point 105. As illustrated in FIG. 3F, the speakers 202 and 203 no longer dangle.

Figure 3G:
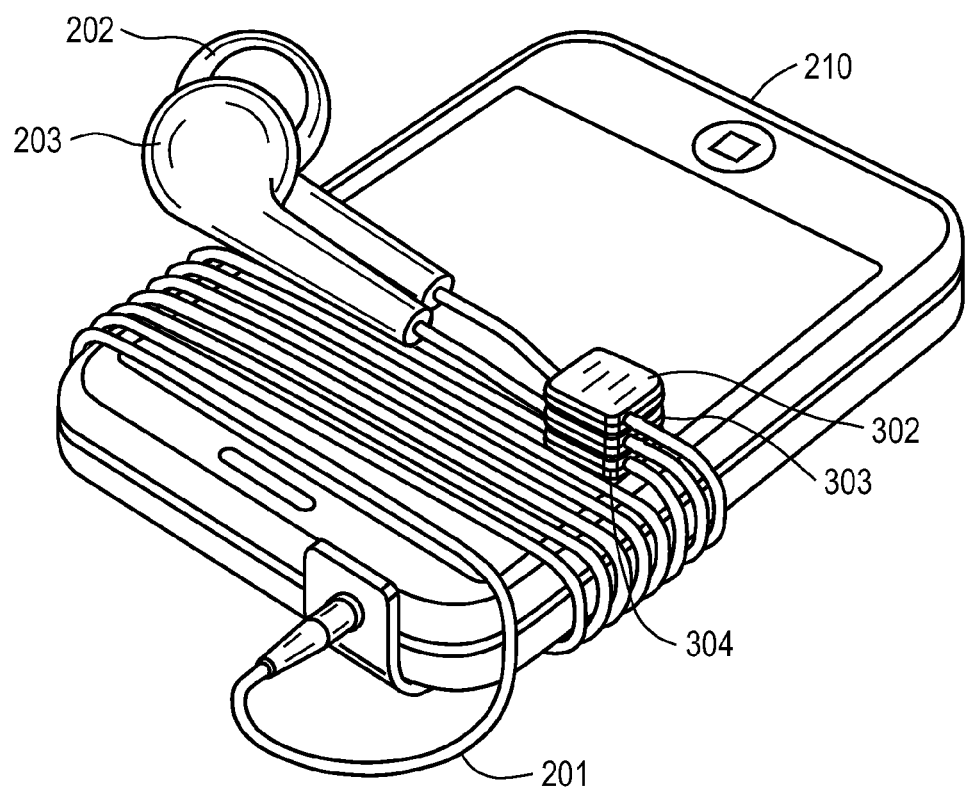
FIG. 3G illustrates an alternative configuration to secure the free end of the cord, according to some embodiments.

In some instances, after the magnetic strap 101 is folded over into the loop configuration, there may be a portion of the cord 201 that is not secured by the magnetic strap 101 (i.e., a portion of the cord from the magnetic strap 101 to the speakers 202 and 203). If the portion of the cord 201 that is not secured by the magnetic strap 101 is long, the cord 201 may become caught on other objects (such as when placed in a pocket, a bag, or a purse). For example, the final wrap of the cord 201 may place the speakers 202 and 203 on front side of the electronic device 210 (i.e., the opposite side of the electronic device 210 illustrated in FIG. 3E). To address these cases, in some embodiments, a magnetic bead 304 is attached on the cord 201 so that when the cord 201 is wrapped around the electronic device 210, the magnetic bead 304 is located on the front side of the electronic device 210. These embodiments are illustrated in FIG. 3G. The magnetic beads 302 and 303 are then magnetically attached to the magnetic bead 304. Note that the end user may slide and/or otherwise readjust the magnetic beads 302 and 303 up and down the cord 201 so that the magnetic beads 302, 303, and 304 can be magnetically attached to each other. Although the speakers 202 and 203 may still dangle, the amount of the cord 201 that is dangling can be reduced.

Figure 3H:
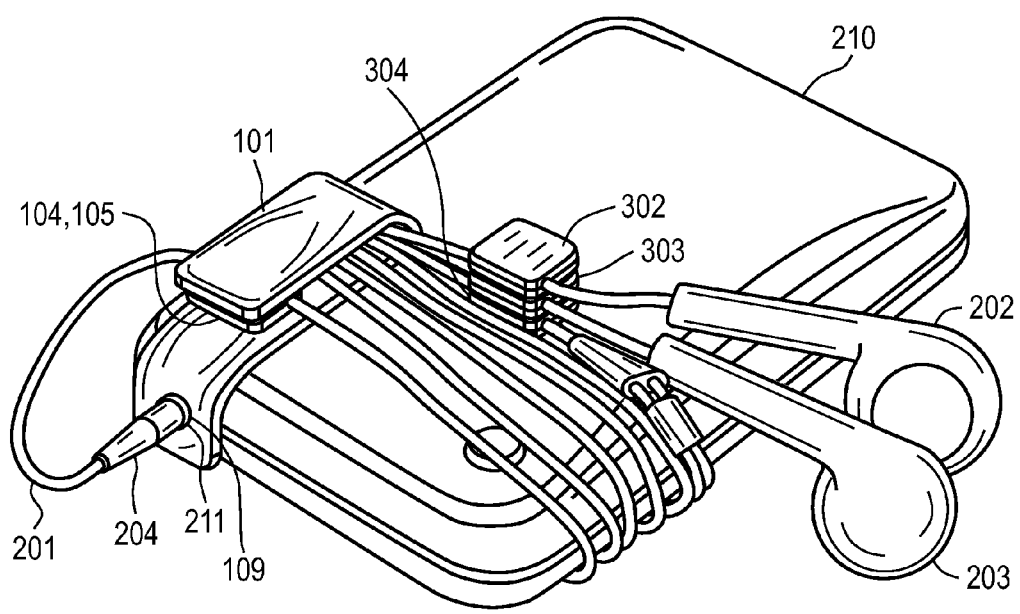
FIG. 3H illustrates an alternative configuration to secure the free end of the cord, according to some embodiments.

In some cases, the end user may not wish to fold over the cord 201 to secure the free end of the cord 201 (e.g., as illustrated in FIG. 3F). In these cases, the magnetic bead 304 may be attached on the cord 201 so that when the cord 201 is wrapped around the electronic device 210, the magnetic bead 304 is located on the back side of the electronic device 210, as illustrated in FIG. 3H. The magnetic beads 302 and 303 are then magnetically attached to the magnetic bead 304. Note that the end user may slide the magnetic beads 302 and 303 up and down the cord 201 so that the magnetic beads 302, 303, and 304 can be magnetically attached to each other. Although the speakers 202 and 203 may still dangle, the amount of the cord 201 that is dangling can be reduced.

In some cases, the end user may not wish to use the magnetic strap 101 to secure the cord. In these cases, the end user may magnetically attach the magnetic beads 302 and 303 to magnetic material that is attached to the electronic device 210. The use of magnetic material in conjunction with the electronic device 210 is described in more detail below.

Figure 3J:
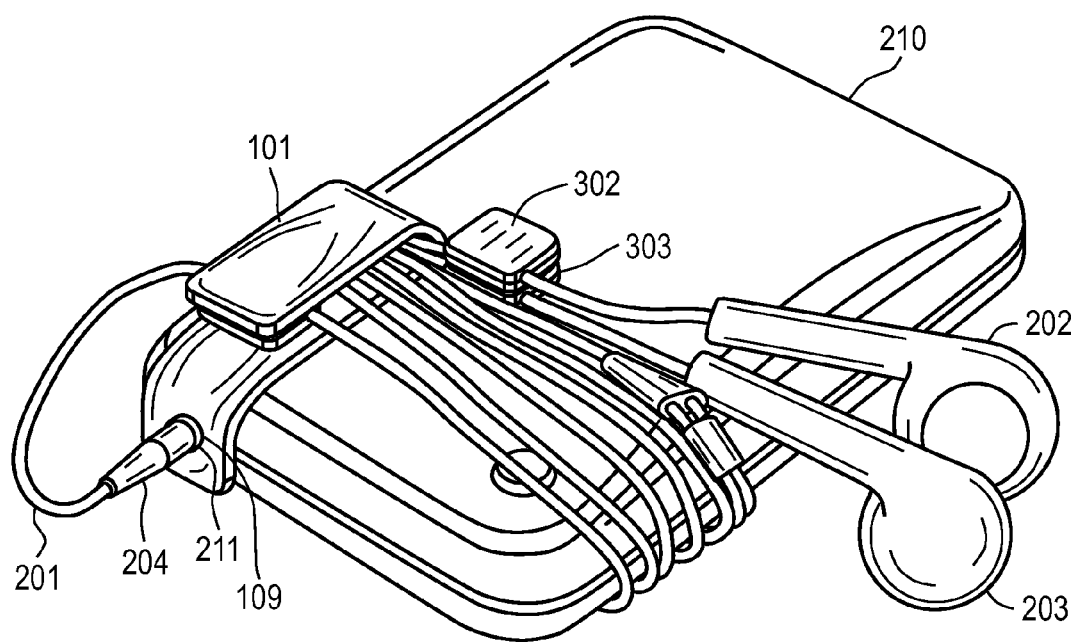
FIG. 3J illustrates an alternative configuration to secure the free end of the cord, according to some embodiments.
Figure 3K:
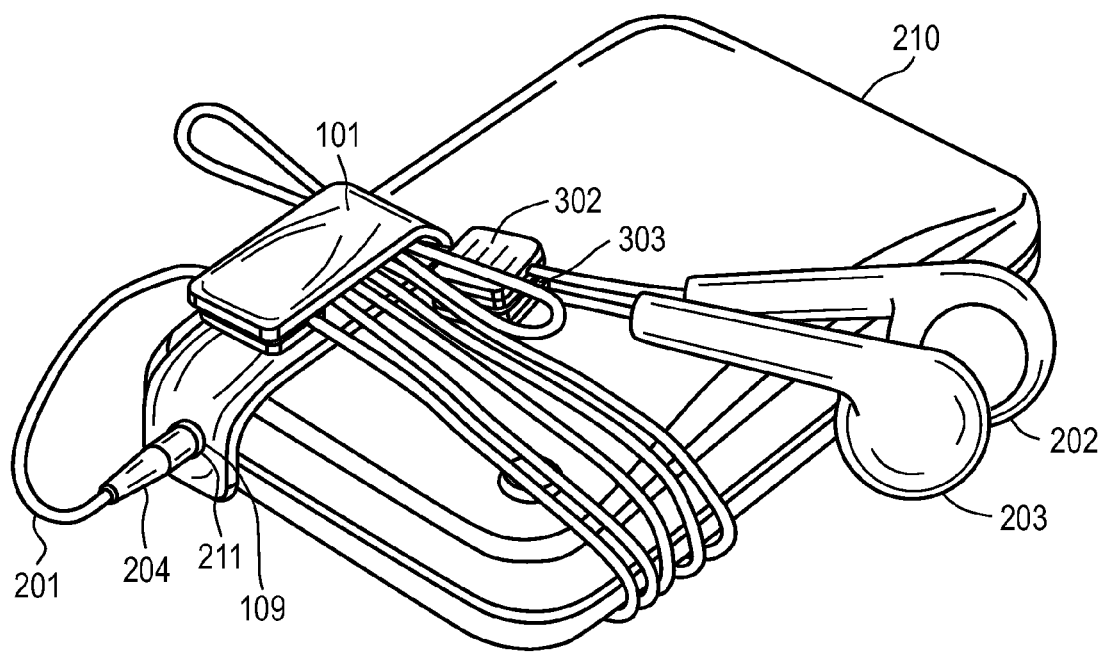
FIG. 3K illustrates an alternative configuration to secure the free end of the cord, according to some embodiments.

In some embodiments, the end user slides the magnetic beads 302 and 304 so that free end of the cord 201 does not slide back through the loop (e.g., as illustrated in FIG. 3J). In some embodiments, the end user wraps a portion of the free end of the cord 201 over itself (e.g., in a shape of a bow tie, as illustrated in FIG. 3K) so that the amount of the cord 201 that is left dangling is reduced. The end user then secures the wrapped portion of the free end of the cord 201 using the magnetic strap 101 as illustrated in FIG. 3K.

When deploying the cord 201, the magnetic strap 101 flips back to the open position (i.e., the magnetic strap 101 lays substantially flat on the electronic device 210), as illustrated in FIGS. 2J and 2K.

Note that the dimensions of the magnetic strap 101 may be selected to accommodate cords of varying lengths and thicknesses. The dimensions of the magnetic strap 101 are also selected to accommodate objects (e.g., portable electronic devices, etc.) of varying sizes. FIGS. 20A to 20E illustrate a process for managing a cord, according to some embodiments. The process illustrated in FIGS. 20A to 20E is similar to the process illustrated in FIGS. 3A to 3E, except that the magnetic strap 101 is attached to an electronic device 2001 having a different shape and size as compared to the electronic device 210.

Figure 20A:
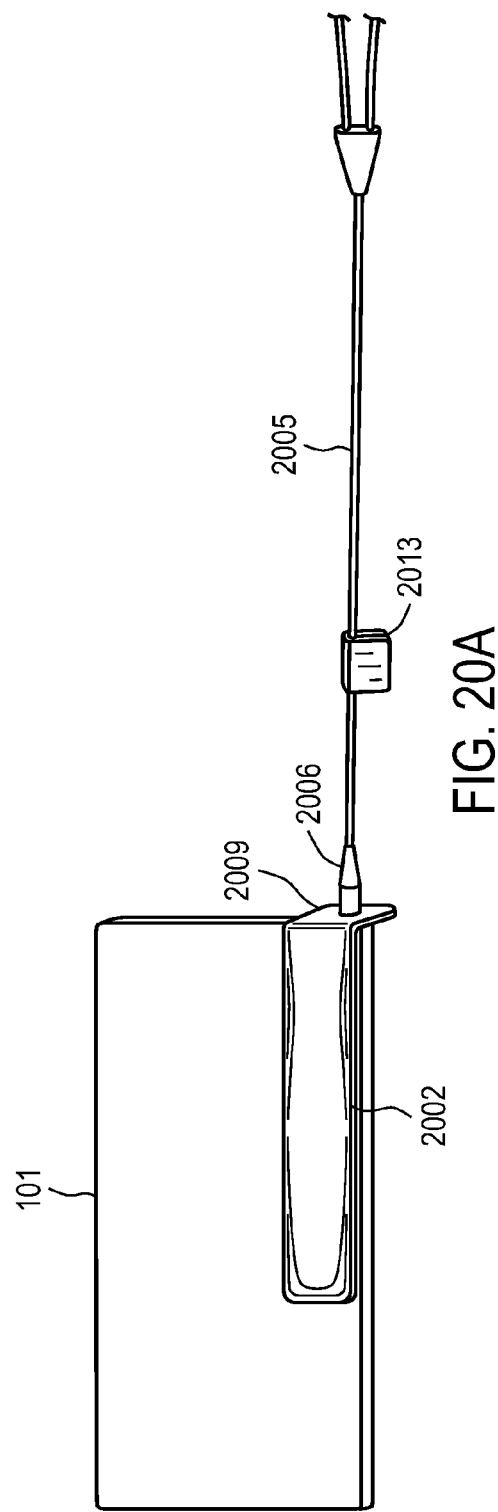
FIG. 20A illustrates a process for managing a cord, according to some embodiments.
Figure 20B:
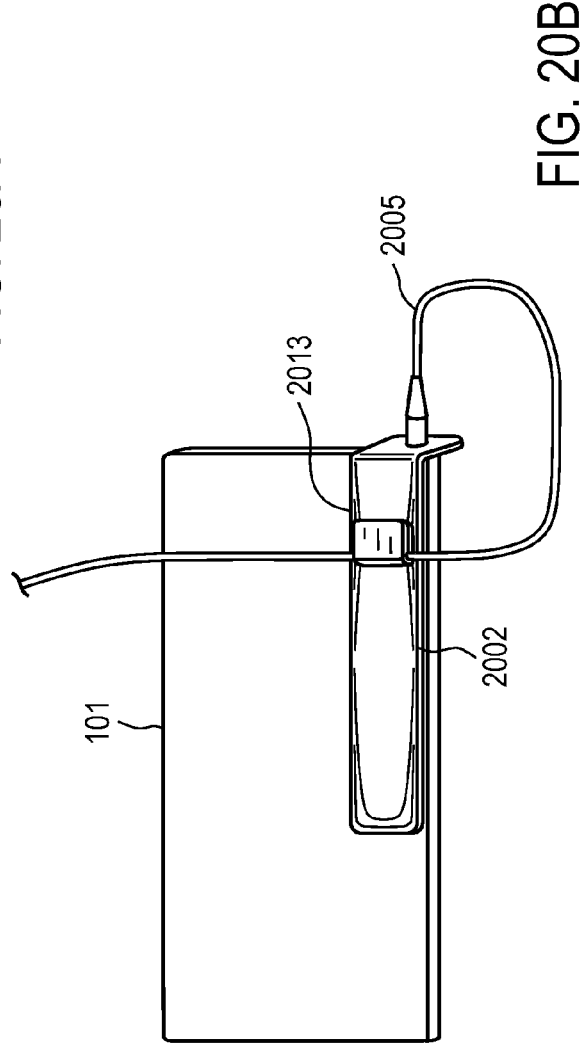
FIG. 20B continues the process illustrated in FIG. 20A, according to some embodiments.
Figure 20C:
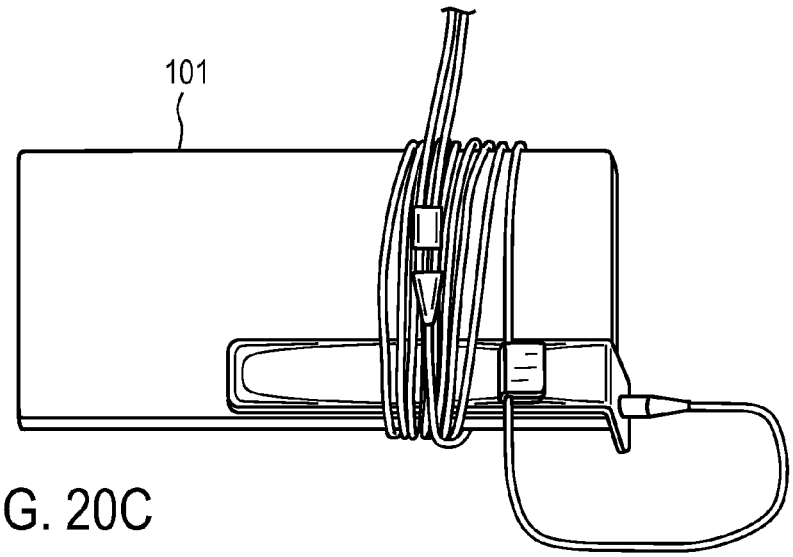
FIG. 20C continues the process illustrated in FIG. 20B, according to some embodiments.
Figure 20D:
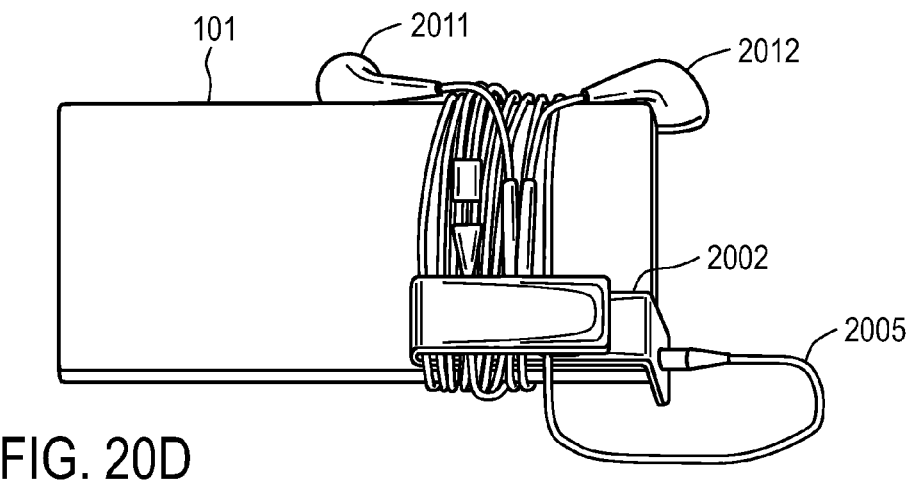
FIG. 20D continues the process illustrated in FIG. 20C, according to some embodiments.

As illustrated in FIG. 20A, the connector 2006 is attached to the electronic device 2001. The cord 2005 (e.g., the cord 201) is then wrapped around the magnetic strap 101 and the electronic device 2001, as illustrated in FIGS. 20B-20D. In some embodiments, the cord 2005 is wrapped around the magnetic strap 101 substantially perpendicular to and/or otherwise across the magnetic strap 101 at any angle.

In some embodiments, the magnetic bead 2013 (e.g., the magnetic bead 301) is first magnetically attached to the magnet of the magnetic strap 101 before the cord 2005 is wrapped around the magnetic strap 101 and the electronic device 2001. These embodiments are illustrated in FIG. 20B. By magnetically coupling the magnetic bead 2013 to the magnetic strap 101, a user does not need to hold the cord 2005 to the electronic device 2001 or to the magnetic strap 101 while wrapping the cord 2005 around the electronic device 2001.

Figure 20E:
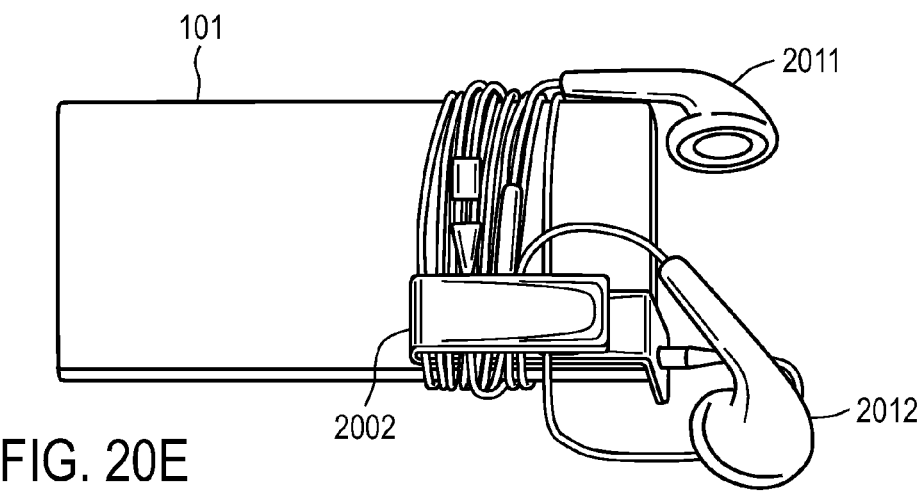
FIG. 20E continues the process illustrated in FIG. 20D, according to some embodiments.

FIG. 20D illustrates the cord 2005 after it has been wrapped around the electronic device 2001. Note that in FIG. 20D, the cords for the speakers 2011 and 2012 do not include magnetic beads. Therefore, the speakers 2011 and 2012 are not coupled to each other and hang freely, as illustrated in FIGS. 20D and 20E.

Figure 21A:
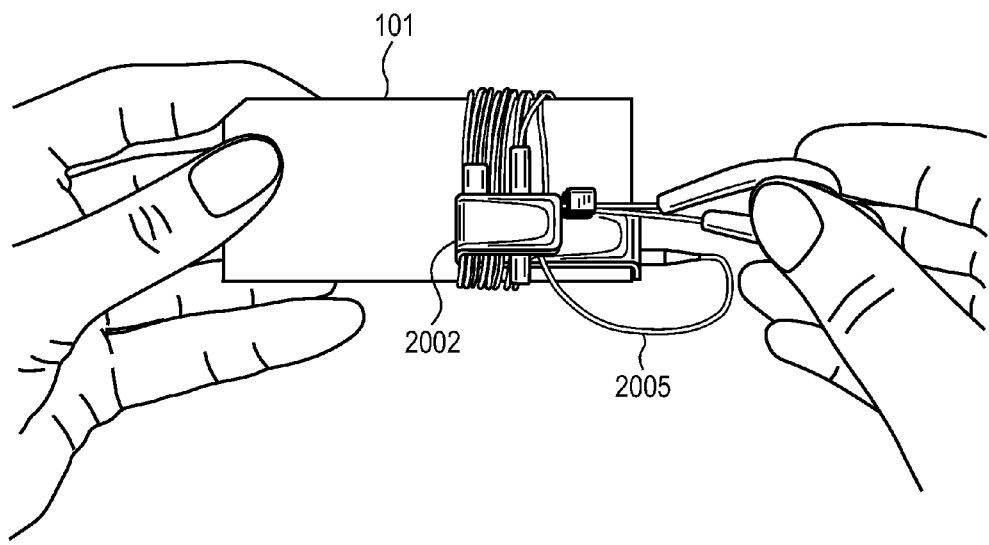
FIG. 21A illustrates a process for deploying a cord wrapped around a device, according to some embodiments.

In some embodiments, after the cord 2005 has been wrapped around the electronic device 2001, the magnetic strap 101 is formed into a loop (i.e., the first mode of operation). These embodiments are illustrated in FIGS. 20D, 20E, and 21A.

Figure 21B:
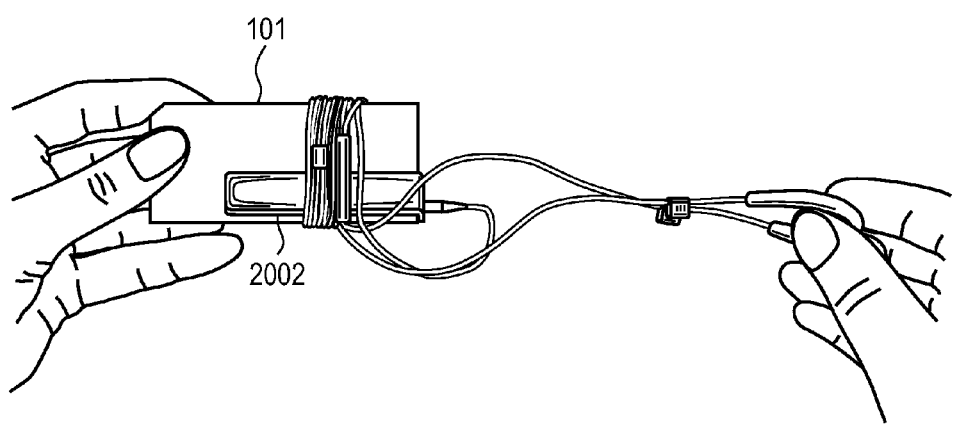
FIG. 21B continues the process illustrated in FIG. 21A, according to some embodiments.
Figure 21C:
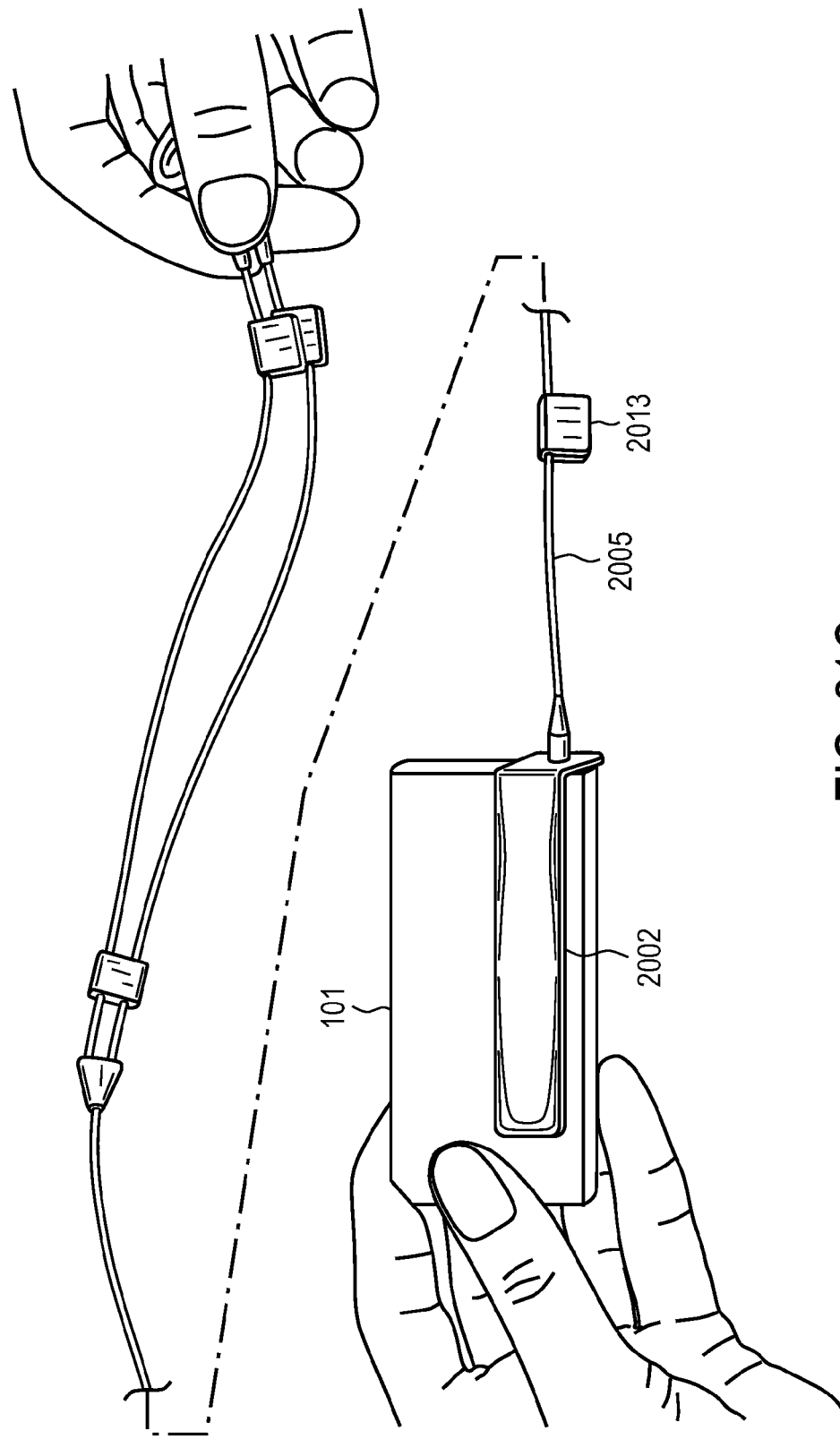
FIG. 21C continues the process illustrated in FIG. 21B, according to some embodiments.

When deploying the cord 2005, the magnetic strap 101 flips back to the open position (i.e., the magnetic strap 101 lays substantially flat on the electronic device 210. This process for deploying the cord 2005 from the electronic device 2001 is illustrated in FIGS. 21A-21C, according to some embodiments. In FIG. 21A, a user grabs the speakers (or the cord 2005 near the speakers) and pulls the cord 2005 in a direction substantially parallel to the length of the magnetic strap 101. The force that the cord 2005 exerts against the magnets at the magnetic attachment points 104 and 105 causes the magnets to be detached from each other, as illustrated in FIG. 21B. In FIG. 21C, the cord 2005 is fully deployed from the magnetic strap 101.

Although the discussion above describes deploying a wrapped cord from the magnetic strap 101 by pulling on the cord in a direction substantially parallel to the length of the magnetic strap 101, in some embodiments, a wrapped cord is deployed from the magnetic strap 101 by pulling on the cord in a direction not parallel to the length of the magnetic strap 101. For example, if the magnetic strap 101 is detached from the electronic devices 210 and 2001, a user may deploy a wrapped cord by pulling in a direction perpendicular to the length of the magnetic strap. Alternatively, the user may also pull the magnetic attachment points 104 and 105 away from each other by pulling on the strap directly.

Figure 5B:
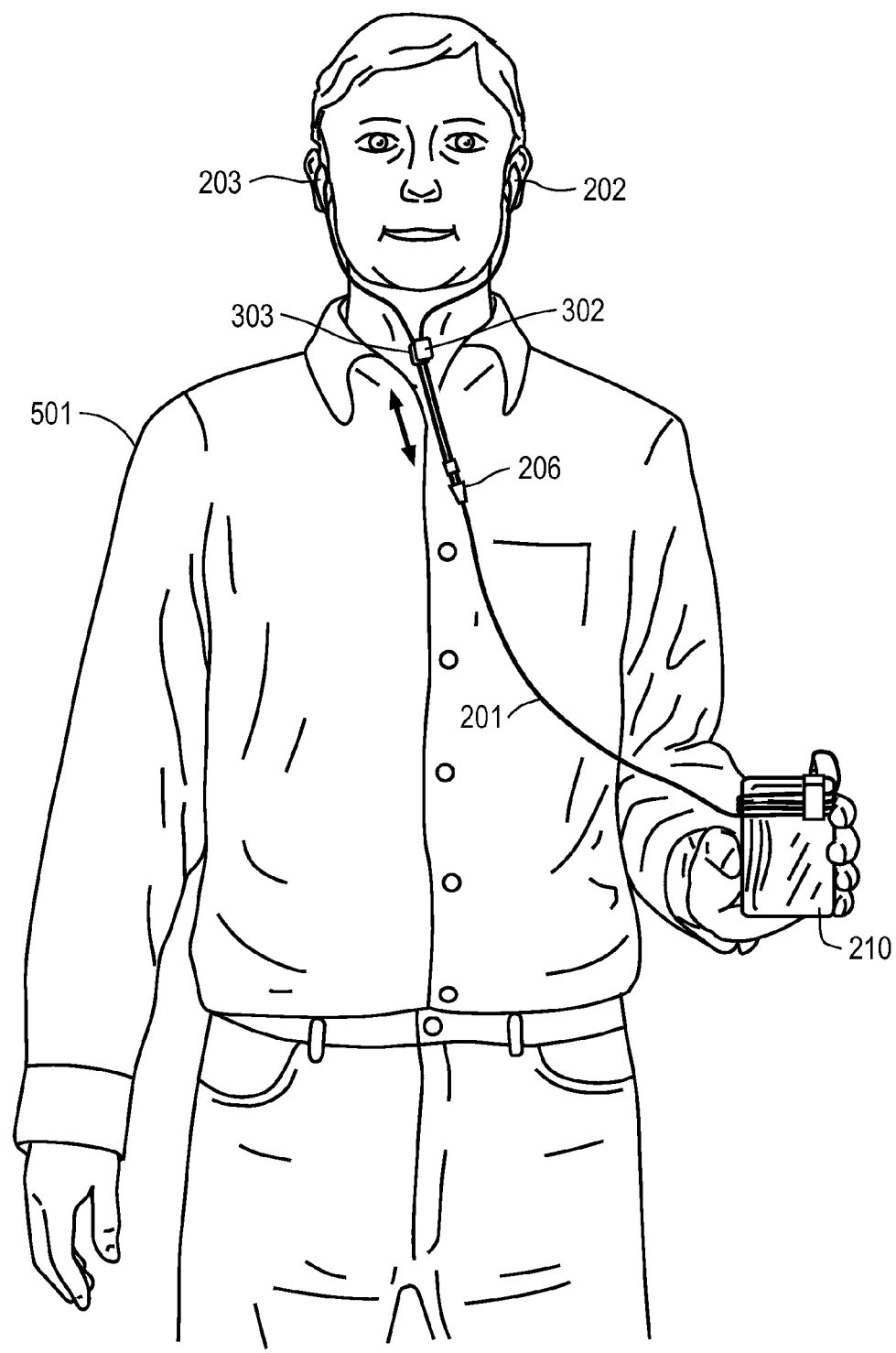
FIG. 5B illustrates using the magnetic beads to secure speaker cords of the cord of FIG. 5A, according to some embodiments.

In some embodiments, the magnetic beads 302 and 303 are used to secure the cord 201 when the cord 201 is deployed. For example, FIG. 5A illustrates an end user 501 using the cord 201 with the electronic device 210, according to some embodiments. As illustrated in FIG. 5A, the cord 201 includes a cord segment 204 coupled to the speaker 202 and a cord segment 205 coupled to the speaker 203. Note that cord segments 204 and 205 may also be referred to as speaker cords. The cord segments 204 and 205 are coupled to the cord 201 at point 206. When the speakers 202 and 203 are inserted into the ears of the end user 501, the cord segments 204 and 205 may dangle loosely. If the end user is moving around (e.g., running, walking, etc.), the cord segments 204 and 205 may swing around and get caught in clothing and/or become dislodged from the ears of end user 501. To prevent the cord segments 204 and 205 from dangling, the magnetic beads 302 and 303 are moved to a position below the chin of the end user 501 and are magnetically coupled to each other, as illustrated in FIG. 5B. In the configuration illustrated in FIG. 5B, the end user 501 may slide the magnetic beads 302 and 303 up and down the cord segments 204 and 205 to adjust the amount of the cord segments 204 and 205 that are unsecured.

Figure 5C:
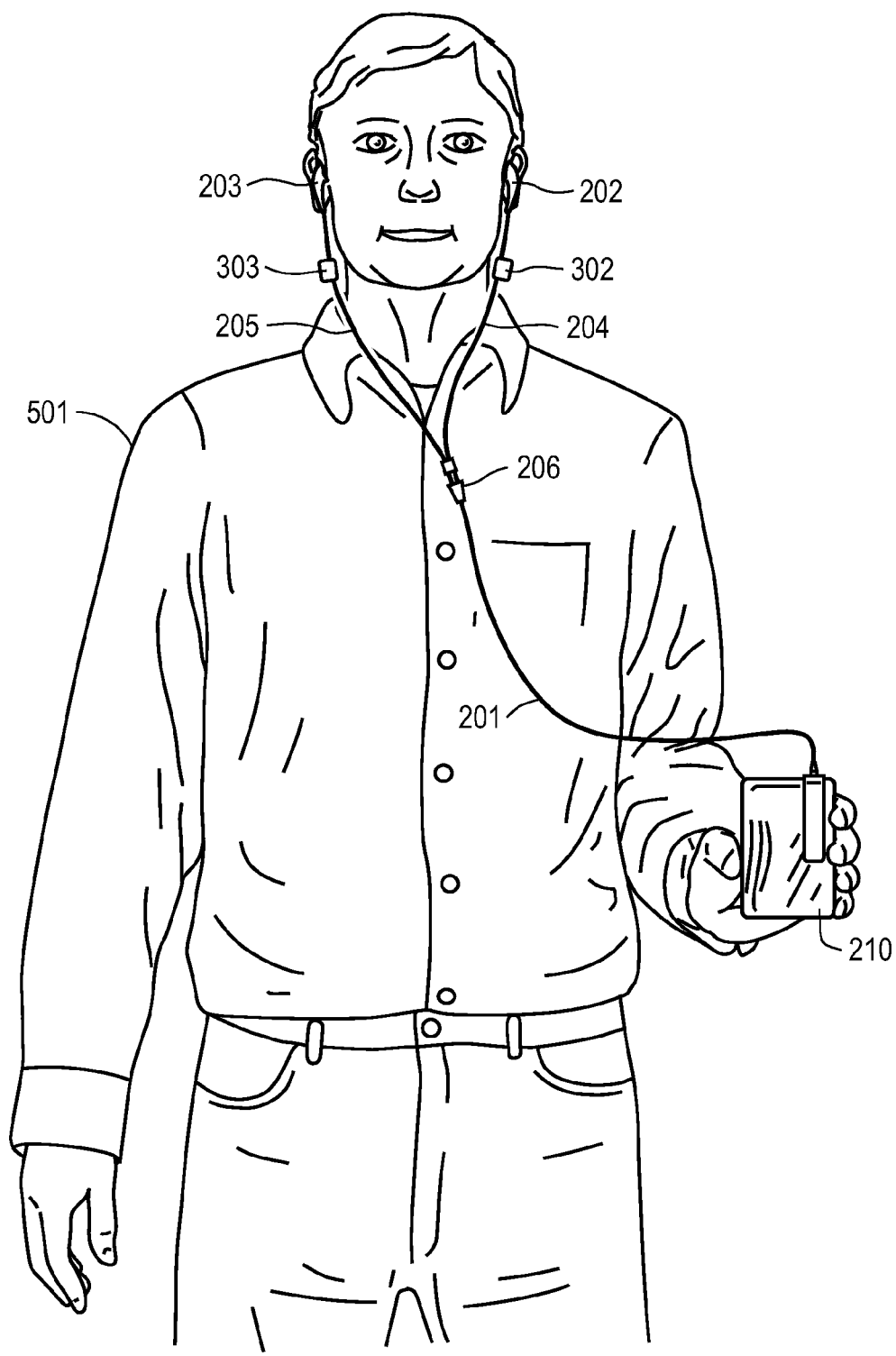
FIG. 5C illustrates the end user using the electronic device and the cord with magnetic beads when the cord is fully-deployed, according to some embodiments.
Figure 5D:
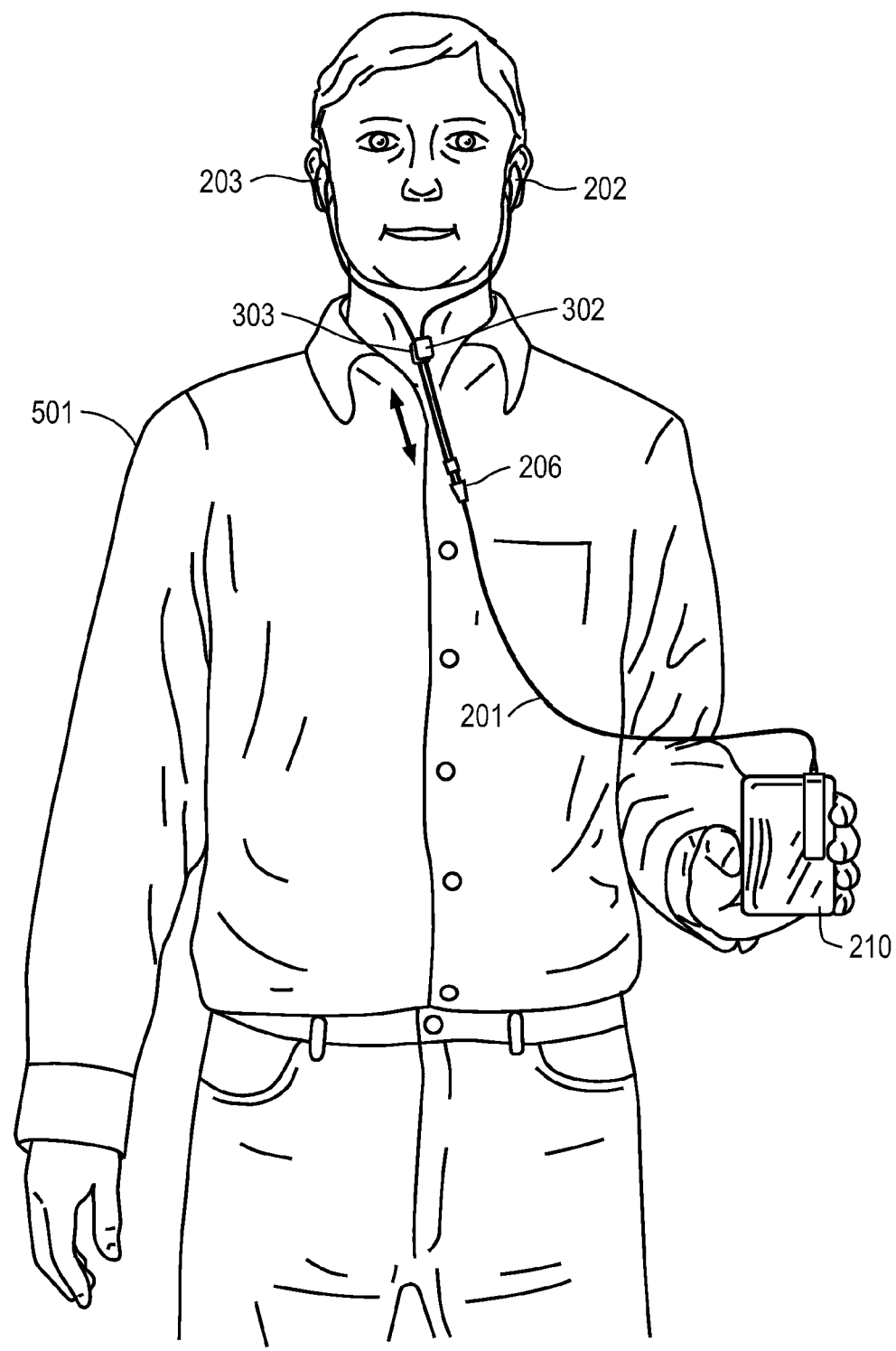
FIG. 5D illustrates using the magnetic beads to secure speaker cords of the cord of FIG. 5C, according to some embodiments.

Although FIGS. 5A and 5B illustrate a partially-deployed cord 201, the cord 201 may also be fully-deployed. The fully-deployed cord is illustrated in FIGS. 5C and 5D, which are analogous to FIGS. 5A and 5B, respectively.

In some embodiments, at least one of the magnetic beads 301, 302, 303, and 304 include a clip that allows the magnetic bead to be clipped onto an object. For example, the object may be clothing (e.g., a shirt, a pants pocket, etc.) or a purse strap.

Option 3: Magnetic Strap and Magnetic Material

Figure 4A:
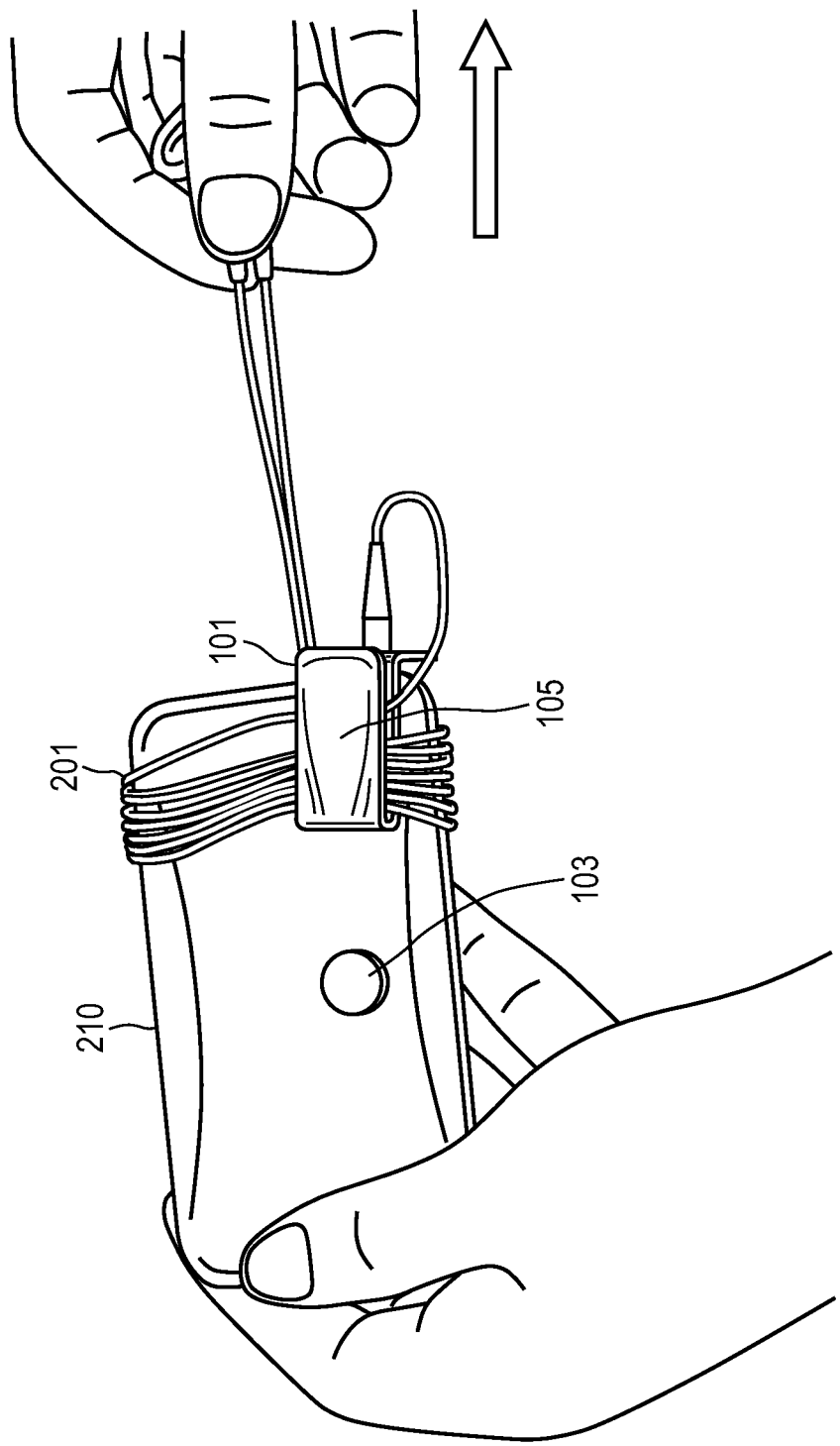
FIG. 4A illustrates a process for deploying a cord wrapped around the electronic device with the assistance of a magnetic material located on the electronic device, according to some embodiments.
Figure 4B:
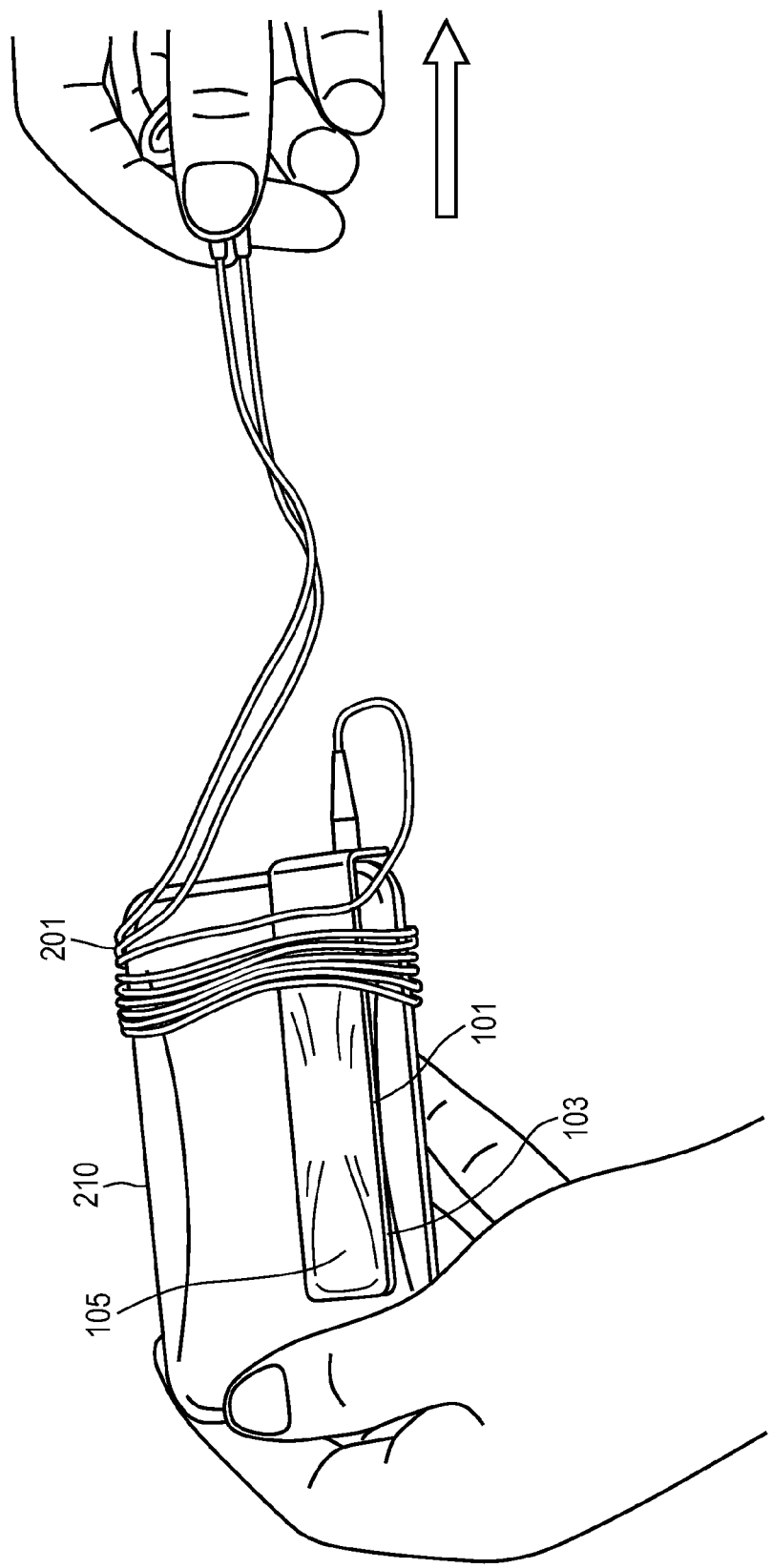
FIG. 4B continues the process of deploying the cord illustrated in FIG. 4A, according to some embodiments.
Figure 4C:
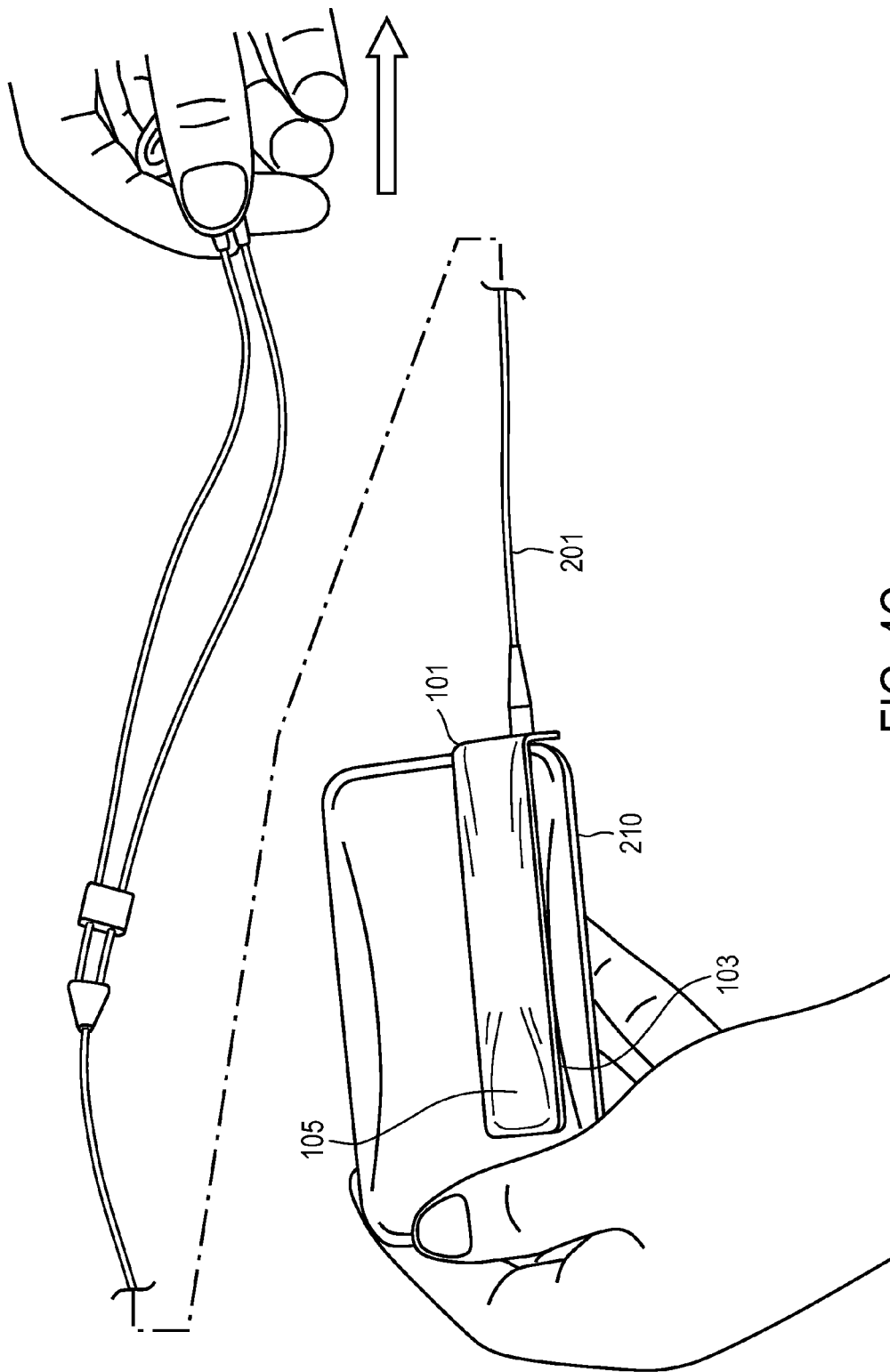
FIG. 4C continues the process of deploying the cord illustrated in FIG. 4B, according to some embodiments.
Figure 4D:
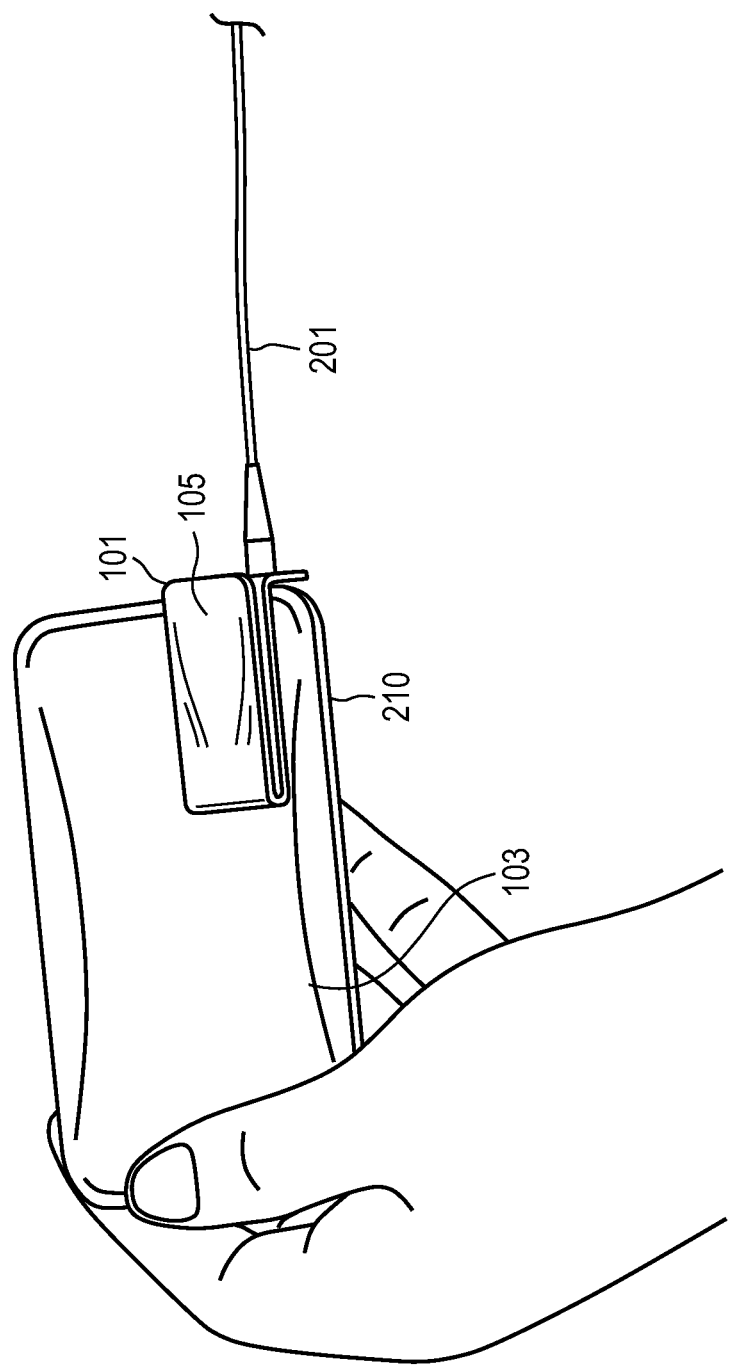
FIG. 4D illustrates the strap of FIG. 4C folded over into the loop configuration, according to some embodiments.

In some embodiments, to assist in the deployment of the cord 201, the magnetic material 103 is attached to the back of the electronic device 210 so that when the magnetic strap 101 is in the open position, the magnetic attachment point 105 of the magnetic strap 101 is magnetically attached to the magnetic material 103. These embodiments are illustrated in FIGS. 4A, 4B, and 4C. In FIG. 4A, an end user grabs the speakers and pulls the cord 201 in a direction substantially parallel to the length of the magnetic strap 101. The force that the cord 201 exerts against the magnets at the magnetic attachment points 104 and 105 causes the magnets to be detached from each other so that the magnetic strap 101 no longer forms the loop, as illustrated in FIG. 4B. The force that the cord 201 exerts against the magnets causes the magnetic strap 101 to return to its natural configuration (e.g., the flat configuration). The magnetic strap 101 is also magnetically attracted to the magnetic material 103, thereby assisting in the deployment of the magnetic strap 101. In other words, the magnetic force between the magnetic attachment point 105 of the magnetic strap 101 and the magnetic material 103 pulls the magnetic attachment point 105 towards the magnetic material 103. The magnetic material 103 also holds the magnetic strap 101 to the electronic device 210 so that the strap does not move while in the open position. In FIG. 4C, the cord 201 is fully deployed from the magnetic strap 101. After the cord 201 is fully deployed, the end user may fold the strap over, as illustrated in FIG. 4D.

In some embodiments, the magnetic material 103 is attached to the electronic device 210 so that when the magnetic strap 101 is in the open position, the magnetic attachment point 104 of the magnetic strap 101 is magnetically attached to the magnetic material 103. These embodiments are used to attach the magnetic strap 101 to the electronic device 210 when the magnetic strap 101 is folded into the loop configuration.

Note that the magnetic material may be attached to the electronic device 210 using adhesives, suction devices (e.g., suction cups), Velcro, van der Waals force attachment mechanisms (e.g., "Gecko" tape), snaps, buttons, and the like. Also note that the magnetic material may be molded into the electronic device 210, a back panel of the electronic device 210, and/or a case for the electronic device 210. Furthermore, that the magnetic material may be substituted for an adhesive applied to either or both of the electronic device 210 and/or the magnetic strap 101, suction devices (e.g., suction cups) attached to either or both of the electronic device 210 and/or the magnetic strap 101, Velcro attached to both the electronic device 210 and the magnetic strap 101, van der Waals force attachment mechanisms (e.g., "Gecko" tape) attached to either or both of the electronic device 210 and/or the magnetic strap 101, snaps attached to either or both of the electronic device 210 and/or the magnetic strap 101, buttons attached to either or both of the electronic device 210 and/or the magnetic strap 101, and hinges attached to either or both of the electronic device 210 and/or the magnetic strap 101.

Option 4: Magnetic Strap, Magnetic Beads, and Magnetic Material

In some embodiments, the cord management system 100 includes the magnetic strap 101, the magnetic beads 102, and the magnetic material 103. The various embodiments described above may be used in combination to secure the cord 201.

The design and the composition of magnetic strap 101, the magnetic beads 102, and the magnetic material 103 are described in more detail below.

Option 5: Magnetic Beads

In some embodiments, the cord management system 100 includes the magnetic beads 102. In these embodiments, the magnetic beads are attached to the cord 201 at locations so that when the cord 201 is wrapped around an object (e.g., the electronic device 210), two or more magnetic beads at different locations on the cord 201 are magnetically attached to each other so that the cord 201 cannot become unwrapped from the object. For example, FIG. 3G illustrates magnetic beads 302, 303, and 304 (all of which are located at different locations on the cord 201) are magnetically attached to each other.

Magnetic Straps

FIGS. 6A, 6B, and 6C illustrate top, perspective and side views, respectively, of a magnetic strap 601, according to some embodiments. Note that the magnetic strap 601 is one particular embodiment of the magnetic strap 101 described above. In some embodiments, the magnetic strap 601 includes a magnet 602 at a location 604 on the magnetic strap 601 and a magnet 603 at a location 605 on the magnetic strap 601. The magnets 602 and 603 may include any element or composition that is capable of producing a magnetic field. For example, the magnets 602 and 603 may include one or more of magnetic metallic elements (e.g., iron, cobalt, nickel, etc.), composite magnets (e.g., ceramic or ferrite magnets, alnico magnets, ticonal magnets, injection molded magnets, flexible magnets), rare earth magnets (e.g., samarium-cobalt magnets, neodymium-iron-boron magnets, etc.), electromagnets, sets of any of these magnets, or any material or composition that produces a magnetic field. In some embodiments, the magnets 602 and 603 are Neodymium magnets. In some embodiments, the Neodymium magnets are a grade N42.

In some embodiments, the magnetic strap 601 includes only one magnet and a magnetic material. For example, the magnetic strap 601 may include the magnet 602 at the location 604 and a magnetic material at the location 605. Alternatively, the magnetic strap 601 may include a magnetic material at the location 604 and the magnet 603 at the location 605. Note that a magnetic material is a material or composition that produces a magnetic field in response to an applied magnetic field. The magnetic material may include one or more of a ferromagnetic material and a paramagnetic material. In some embodiments, the magnetic material is low-carbon steel. Also note that this specification refers to the magnets 602 and 603 as "magnets" even though one of the magnets 602 and 603 may be a magnetic material. Furthermore, any combination of magnets and magnetic material that allows for the magnetic attachments described herein to function may be used.

In some embodiments, the magnets 602 and 603 are solid magnets. In some embodiments, the magnets 602 and 603 are selected from the group consisting of donut (ring) magnets, horseshoe-shaped (U-shaped) magnets, cylindrical magnets, disc-shaped magnets, rectangular magnets, and the like. In some embodiments, the magnets 602 and 603 are sets of magnets. The selection of the size and shape of the magnets 602 and 603 may depend on factors including, but not limited to, a desired magnetic strength, a desired form factor, a desired aesthetic, and the manufacturing process used to produce the magnetic strap 601.

In some embodiments, the magnets 602 and 603 are embedded in the magnetic strap 601. In these embodiments, the magnets 602 and 603 are either enclosed or partially enclosed by the material that forms the magnetic strap 601. As illustrated in FIG. 6C, the material that forms the magnetic strap 601 forms a gradual contour around the magnets 602 and 603. The contour formed by the material of the magnetic strap 601 around the magnets 602 and 603 may conform to the shape of the magnetic strap 601. For example, as illustrated in FIGS. 6A-6C, the material enclosing the magnets 602 and 603 forms a rectangular region. This rectangular region serves at least two purposes: to hold the magnets 602 and 603 in place and to provide a flat surface onto which the magnets 602 and 603 can be magnetically attached to each other. Note that the flat surface allows the magnets 602 and 603 to be magnetically attached to each other better than a surface that is not flat (e.g., a crowned surface).

In some embodiments, the magnets 602 and 603 are configured so that opposite magnetic poles of each magnet are perpendicular to the top (or bottom) surface of the magnetic strap 601. For example, the north pole of the magnet 602 is configured to be perpendicular to a first surface of the magnetic strap 601 whereas the south pole of the magnet 603 is configured to be perpendicular to the first surface of the magnetic strap 601. In other embodiments, and as noted above, only one of the magnets 602 and 603 is a magnet and the other magnet is a magnetic material. Again, any combination of magnets and magnetic material that allows for the magnetic attachments described herein to function may be used.

In some embodiments, the magnetic strap 601 includes a segment 606 that is located between the magnets 602 and 603. In some embodiments, the segment 606 also includes the portion of the magnetic strap 601 that includes the magnets 602 and 603. In some embodiments, the segment 606 is composed of a material that is substantially memoryless. In some embodiments, the memoryless material is an elastic polymer. A material that is memoryless is a material that does not exhibit elastic hysteresis, which causes a material to behave differently when a loading force that was exerted on the material is removed. In the case of a material that does not have elastic hysteresis, the application of a loading force and a subsequent removal of the loading force does not cause the material to "remember" that the material was previously loaded. Thus, the material returns to its original shape and/or configuration when the loading force is removed. In some embodiments, the segment 606 is composed of a memoryless material that causes the magnetic strap 601 to return to a substantially flat configuration when unloaded (or when the loading force is less than a restoring force of the memoryless material). These embodiments are illustrated in FIGS. 6A-6C. Note that when an external force is applied to the memoryless material, the memoryless material generates a restoring force that opposes the external force. In other words, the restoring force tries to keep the memoryless material in its natural configuration (e.g., a flat configuration). For example, consider the application of an external force to the segment 606 that causes the segment 606 to form a loop. When the external force is removed, the segment 606 returns to its natural configuration (e.g., as illustrated in FIGS. 6A-6C). In some embodiments, the restoring force is a function of the displacement (e.g., stretching, bending, etc.) of the memoryless material. In these embodiments, the external force required to change the configuration of the memoryless material varies as a function of the displacement.

In some embodiments, the segment 606 is composed of a polymer. In some embodiments, the polymer is selected from the group consisting of silicone and an elastomer (e.g., thermoplastic elastomer). In some embodiments, the polymer is resistant to dust. These polymers may be used in manufacturing processes such as injection molding, casting, compression molding, and die cutting. The type of manufacturing process selected may depend on factors such as a desired manufacturing volume, manufacturing time, and manufacturing costs. Additionally, the type of manufacturing process selected may depend on a desired aesthetic design of the magnetic strap 601. For example, if the aesthetic design of the magnetic strap 601 requires that the magnets 602-603 are to be encapsulated in the material of the magnetic strap 601, an injection molding process may be used. In some embodiments, a two-shot injection molding process is used to manufacture the magnetic strap 601.

In some embodiments, the segment 606 is composed of a fabric. For example, the fabric may be a Neoprene fabric, leather, silk, cotton, denim, foil, Mylar, and the like.

In some embodiments, the magnetic strap 601 includes a segment 607. In some embodiments, the segment 607 includes the portion of the magnetic strap 601 that includes the magnet 603. In some embodiments, the segment 607 is composed of an elastic material. The elastic polymer may be any of the polymers discussed above with respect to the segment 606. In some embodiments, the segment 607 is composed of a fabric (e.g. Neoprene).

In some embodiments, the segment 607 includes a handle 610. In some embodiments, the handle 610 is formed from the same material as the segment 607. The handle 610 is a raised portion or high friction of material of the magnetic strap 601 that allows a user to grab onto the end of the magnetic strap 601 while attaching the magnetic strap 601 to a cord (or connector) using the cord-attachment mechanism 609. Without the handle 610, the fingers of the end user may slip off of the magnetic strap 601 while attaching the magnetic strap 601 to a cord (and/or a connector of the cord) using the cord-attachment mechanism 609. A high friction surface for the handle 610 may be created In some embodiments, the magnetic strap 601 includes a segment 608. In some embodiments, the segment 608 includes the portion of the magnetic strap 601 that includes the magnet 602. In some embodiments, the segment 608 is composed of an elastic material. In some embodiments, the elastic material is an elastic polymer. The elastic polymer may be any of the polymers discussed above with respect to the segment 606. In some embodiments, the segment 608 is composed of a fabric (e.g., Neoprene).

In some embodiments, the segments 606, 607, and 608 are composed of the same polymer. In some embodiments, the segments 606, 607, and 608 are composed of different, but compatible, polymers. In some embodiments, the segment 608 is composed of a fabric.

In some embodiments, the segment 607 includes a cord-attachment mechanism 609 that is used to attach the magnetic strap 601 to a cord (and/or a connector of the cord). The cord-attachment mechanism is described in more detail below with respect to FIGS. 10 and 11.

In some embodiments, the magnetic strap 601 operates in at least two modes of operation, as described above. In a first mode of operation, the magnets 602 and 603 are magnetically attached to each other so that the segment 606 of the magnetic strap 601 located between the magnets 602 and 603 forms a loop configured to secure a cord that is wrapped around the magnetic strap 601 (e.g., see FIG. 2B). In the first mode of operation, the attractive magnetic force between the magnets 602 and 603 is greater than any restoring force exerted by the material of the magnetic strap 601 that causes the magnetic strap 601 to return to its natural configuration (e.g., flat configuration). Thus, the segment 606 remains in a loop until an external force is applied to the segment 606 that causes the magnets 602 and 603 to be magnetically detached and/or otherwise separated from each other. In a second mode of operation, the magnets 602 and 603 are magnetically detached and/or otherwise separated from each other (e.g., the magnets 602 and 603 are no longer attached to each other). For example, in the second mode of operation, the magnetic strap 601 may be substantially flat (e.g., see FIGS. 6A, 6B, and 6C).

Note that the term "magnetically attached," when applied to two magnets, refers to two magnets being attached to each other by an attractive magnetic force between the two magnets. In contrast, the term "magnetically detached," when applied to two magnets, refers to two magnets that are no longer attached to each other. Although the two magnets may no longer be magnetically attached to each other, the two magnets may still be "magnetically coupled" to each other. In other words, each magnet may feel a magnetic force generated by the magnetic field of the other magnet. This magnetic force is a function of the distance between the two magnets. Thus, in some embodiments, the strength of the magnets 602 and 603 are selected so that the magnetic force between the magnets 602 and 603 is greater than any restoring force exerted by the material of the magnetic strap only when the magnets 602 and 603 are a predefined distance from each other. When the magnets 602 and 603 are at a distance greater than the predefined distance from each other, the magnetic force between the magnets 602 and 603 is less than the restoring force exerted by the material. Thus, the magnetic strap 601 returns to its natural configuration (e.g., the flat configuration illustrated in FIGS. 6A-6C). When the magnets 602 and 603 are at a distance less than or equal to the predefined distance from each other, the magnetic force between the magnets 602 and 603 exceeds the restoring force exerted by the material. Thus, the magnets 602 and 603 are drawn to each other and become magnetically attached to each other.

Also note that this specification refers to two magnets (or magnets and magnetic materials) being "magnetically attached" to each other even if the magnets are separated by intermediary materials. For example, even though the material of the magnetic strap 601 (e.g., an elastic polymer) may enclose the magnets 602 and 603, the magnets 602 and 603 are magnetically attached to each other when the surface(s) of material enclosing the magnets 602 and 603 touch each other.

In some embodiments, the second mode of operation is used when deploying (e.g., unwrapping) a cord that is wrapped around the magnetic strap 601. These embodiments are discussed above with respect to FIGS. 2H-2K.

In some embodiments, the second mode of operation is used when wrapping a cord around the magnetic strap 601. In some embodiments, the cord is wrapped substantially perpendicular to and/or otherwise across the magnetic strap 601 at any angle (e.g., see FIGS. 2A-2B).

In some embodiments, the second mode of operation is used when a user uses the cord. For example, if the cord is a cord for headphones and the magnetic strap 601 is attached to a music player, the user may use the deployed cord to listen to music.

In some embodiments, the length of the segment 607 and the location of the cord-attachment mechanism 609 within the segment 607 are selected so that when the magnetic strap 601 is placed on an object, the segment 606 lies flat on a surface of the object (e.g., a portable electronic device) (e.g., see FIG. 2A).

In some embodiments, the length of the magnetic strap 601 is selected based on one or more of: a range of lengths of cords that are to be secured using the magnetic strap 601, a range of thicknesses of cords that are to be secured using the magnetic strap 601, a number of times the cord will wrap around the magnetic strap 601, dimensions of objects on which the magnetic strap 601 is to be placed, the location of the magnets 602 and/or 603, whether a case is used, and a number of times the cord will wrap around the magnetic strap 601 and an object (and a case for the object). In some embodiments, the minimum length of the magnetic strap 601 is 1.5 inches. In some embodiments, the length of the magnetic strap 601 is between 1.5 inches and 3.19 inches. In some embodiments, the length of the magnetic strap 601 is 3.02 inches.

Note that the width of the magnetic strap 601 is typically bounded by the minimum manufacturable width of the material used in the magnetic strap 601. However, the actual width used for the magnetic strap 601 is typically selected to be at least the size (e.g., the diameter) of the magnets 602 and 603 in embodiments in which the magnets are embedded in the magnetic strap 601. In embodiments in which the magnets 602 and 603 are attached to the magnetic strap 601 by other means, the magnetic strap 601 may be narrower than the magnets 602 and 603. The width of the magnetic strap 601 also affects the resistance of the magnetic strap 601 to twisting (or torsional) forces about a longitudinal axis (i.e., the length) of the magnetic strap 601. For example, if the magnetic strap 601 is wider, the magnetic strap 601 has less tendency to twist (e.g., when deploying a cord). In some embodiments, the width of the magnetic strap 601 is between 0.25 inches and 0.52 inches. In some embodiments, the width of the magnetic strap 601 is 0.51 inches. In some embodiments, the width of the magnetic strap 601 is at least 0.25 inches.

The thickness of the magnetic strap 601 is typically bounded by the minimum manufacturable thickness of the material used in the magnetic strap 601. The thickness of the magnetic strap 601 also affects the resistance of the magnetic strap 601 to twisting (or torsional) forces about a longitudinal axis (i.e., the length) of the magnetic strap 601. For example, if the magnetic strap 601 is wider, the magnetic strap 601 has less tendency to twist (e.g., when deploying a cord). In some embodiments, the thickness of the magnetic strap 601 is between 0.01 inches and 0.19 inches. In some embodiments, the minimum thickness of the magnetic strap 601 is 0.01 inches. In some embodiments, the thickness of the magnetic strap 601 in the center of the segment 606 is 0.06 inches. In some embodiments, the thickness of the magnetic strap 601 enclosing the magnets 602 and 603 is 0.11 inches.

In some embodiments, the strength of the magnets 602 and 603 are selected to provide a predefined attractive magnetic force between the magnets 602 and 603 when the magnet 602 is magnetically attached to the magnet 603. When the magnet 602 is magnetically attached to the magnet 603 and a decoupling force (e.g., an external force) that is less than the predefined threshold is exerted against the predefined attractive magnetic force between the magnets 602 and 603, the magnets remains magnetically attached to each other. When the magnet 602 is magnetically attached to the magnet 603 and a decoupling force that is greater than or equal to the predefined threshold is exerted against the predefined attractive magnetic force between the magnets, the magnets are magnetically detached from each other.

The predefined threshold is a function of several factors. These factors include the strengths, size, number, shape, and surface area of the magnets 602 and 603, the material of the magnetic strap 601, and the type of decoupling force exerted against the magnets 602 and 603. The strengths of the magnets 602 and 603 determine the strength of the attractive magnetic force between the magnets 602 and 603. As described above, the strength of the attractive magnetic force between the magnets 602 and 603 is a function of the distance between the magnets 602 and 603. Thus, the closer the magnets 602 and 603 are to each other, the stronger the attractive magnetic force. The material of the magnetic strap 601, the material of the cord wrapped within the magnetic strap 601, the length of the cord, the diameter of the cord, and the number of loops of the cord that are wrapped within the magnetic strap 601, and the thickness of the magnetic strap 601 determine the magnitude of the restoring force. As described above, the magnitude of the restoring force may be a function of the displacement of the material. For example, the restoring force may be greater when the material of the magnetic strap is folded over so that the magnets 602 and 603 are magnetically attached to each other than if the material were only bent slightly. The type of decoupling force exerted against the magnets 602 and 603 may include an impulse force (or a force applied during a short but finite time interval) and a continuous force that is either constant or variable.

For a decoupling force that is continuously exerted against the attractive magnetic force between the magnets 602 and 603, the decoupling force required to detach the magnets 602 and 603 so that they do not become magnetically attached again is a function of the distance between the magnets 602 and 603 and of the restoring force of the material of the magnetic strap 601. As the distance between the magnets 602 and 603 increases, the attractive magnetic force decreases and the decoupling force required is decreased. When a predetermined distance between the magnets 602 and 603 is reached, the restoring force of the material of the magnetic strap 601 exceeds the attractive magnetic force. At this point, the magnets 602 and 603, while still magnetically coupled to each other, cannot pull the magnets 602 and 603 back together. Accordingly, the decoupling force is no longer necessary because the restoring force of the material of the magnetic strap 601 causes the magnetic strap 601 to return to its natural configuration. An example of a decoupling force that is continuously exerted is a force that is generated by a hand that is pulling the magnets 602 and 603 apart from each other.

For a decoupling force that is an impulse (or that is applied during a short but finite time interval) exerted against the attractive magnetic force between the magnets 602 and 603, the decoupling force required to detach the magnets 602 and 603 so that they do not become magnetically attached again must impart at least enough momentum to the magnets 602 and/or 603 such that distance between the magnets 602 and 603 reaches the predetermined distance at which the restoring force of the material of the magnetic strap 601 exceeds the attractive magnetic force. For example, consider a decoupling force that is an impulse that does not impart enough momentum to the magnets 602 and/or 603 such that the distance between the magnets 602 and 603 reaches the predetermined distance. After the decoupling force is applied and the magnets 602 and 603 are detached from each other, the attractive magnetic force between the magnets 602 and 603 act against the imparted momentum and slows the parting magnets 602 and 603 until the momentum of the magnets 602 and/or 603 reaches zero. Since the magnets 602 and 603 have not reached the predetermined distance by the time the momentum of the magnets 602 and/or 603 reaches zero, the attractive magnetic force pulls the magnets 602 and 603 back toward each other so that they become magnetically attached again. An example of a decoupling force that is an impulse is a force generated when a wrapped cord is pulled away from the magnetic strap 601 (e.g., see FIGS. 2H-2K).

In some embodiments, each of the magnets 602 and 603 are Neodymium donut-shaped magnets having a grade of N42, an outer diameter of 0.375 inches, an inner diameter of 0.125 inches, and a thickness of 0.0625 inches. In some embodiments, the thickness of the magnets 602 and 603 is between 0.0625 inches and 0.2 inches. In some embodiments, the diameter of the magnets 602 and 603 are between 0.3 inches and 0.375 inches. Note that the combination of the grade (i.e., the composition of materials, wherein a higher number for the grade indicates a higher magnetic strength per unit volume), the diameters, the shape, and the thickness of a magnet determines the magnetic strength of the magnet. The magnetic strength of a larger magnet (e.g., larger surface area, diameter, and/or thickness) having a lower grade (e.g., lower "N" number) may have greater magnetic strength than a smaller magnet with a higher grade.

For example, Neodymium magnets have the following grades, ordered from lowest to highest strength, N28, N30, N33, N35, N38, N40, N42, N45, N48, N50, and N52. A large N28 magnet may be stronger than a small N52 magnet. Also note that the effective magnetic strength of the magnets may be affected by the properties of the material of the magnetic strap 601. For example, if the magnets 602 and 603 are encapsulated in a thicker material, the effective magnetic strength of the magnets 602 and 603 is reduced. Similarly, if the magnets 602 and 603 are encapsulated in a material that suppresses or otherwise impedes a portion of the magnetic fields from the magnets 602 and 603, the effective magnetic strength of the magnets 602 and 603 is reduced. Furthermore, note that the selection of the magnetic strength of the magnets 602 and 603 also depends on the elasticity of the material used for the magnetic strap 601. For example, when a less elastic material (i.e., a more rigid material) is used in the magnetic strap 601, the restoring force of the elastic material is greater (i.e., the material is more rigid and resists changes to its natural configuration) and stronger magnets are required to hold the magnets 602 and 603 together.

In some embodiments, each of the magnets 602 and 603 are Neodymium step-shaped (e.g., step-layered) magnets.

In some embodiments, the location and the distance of the magnets 602 and 603 on the magnetic strap 601 is determined based at least in part on the length of the strap, the type of objects onto which the magnetic strap is to be used, the elasticity of the material of the magnetic strap 601, and a length of a cord. In some embodiments, the minimum distance between the magnets 602 and 603 on the magnetic strap 601 is 0.5 inches. In some embodiments, the distance between the magnets 602 and 603 is between 0.5 inches to 2.1 inches. In some embodiments, the distance between the magnets 602 and 603 is 1.38 inches.

In some embodiments, the durometer (i.e., the hardness, also referred to as the "Shore durometer") of the material of the magnetic strap 601 is at least 10. In some embodiments, the durometer of the material of the magnetic strap 601 in the segments 607 and 608 is 40 and the durometer of the material of the magnetic strap 601 in the segment 606 is 60. In some embodiments, the durometer of the material of the magnetic strap 601 in the segments 607 and 608 is 20 and the durometer of the material of the magnetic strap 601 in the segment 606 is 60. In some embodiments, the durometer of the material of the magnetic strap 601 in the segments 607 and 608 is 20 and the durometer of the material of the magnetic strap 601 in the segment 606 is 40.

Thus, the selection of material for the magnetic strap 601 (e.g., the segments 606-608) and the selection of the strengths, size, number, the distance between the magnets 602 and 603, shape, and surface area of the magnets 602 and 603 depends on the aforementioned factors. Furthermore, the selection of the materials for the magnetic strap 601 and the strengths of the magnets 602 and 603 are based on factors including the ease of deployment of the cord (e.g., the amount of force required to free the cord from the magnetic strap 601, etc.) and the prevention of the accidental deployment of the cord (e.g., from jostling in a bag or a purse, a pocket, etc.).

In some embodiments, the location 605 is selected so that when a connector for a cord is inserted into the cord-attachment mechanism 609 and the connector is inserted into an electronic device, the magnetic strap 601 lies substantially flat on the electronic device.

Note that although the discussion of the magnetic strap 601 refers to the magnet 602 and the magnet 603, each of the magnets 602 and 603 may include a set of magnets. Also note that, one of the magnets 602 and 603 may be replaced with a magnetic material, as described above. In some embodiments, the magnet 602 and the magnet 603 are replaced with an attachment mechanism selected from the group consisting of Velcro, adhesives, suction cups, and a van der Waals force attachment mechanism.

FIGS. 7A, 7B, and 7C illustrate top, perspective, and side views, respectively, of a magnetic strap 701, according to some embodiments. The magnetic strap 701 is similar to the magnetic strap 601, so only the differences are discussed. The magnetic strap 701 includes a magnet 702 at a location 704 on the magnetic strap 701 and a magnet 703 at a location 705 on the magnetic strap 701. The magnetic strap 701 also includes a cord-attachment mechanism 709.

In some embodiments, the magnets 702 and 703 are embedded in the magnetic strap 701. In these embodiments, the magnets 702 and 703 are either enclosed or partially enclosed by the material that forms the magnetic strap 701. As illustrated in FIG. 7C, the material that forms the magnetic strap 701 forms a gradual contour around the magnets 702 and 703. The contour formed by the material of the magnetic strap 701 around the magnets 702 and 703 may conform to the shape of the magnetic strap 701. For example, as illustrated in FIGS. 7A-7C, the material enclosing the magnets 702 and 703 forms a gradual contour from the center of the magnets 702 and 703 to the center of the segment 706. Thus, in contrast to the flat surface above the magnets 602 and 603 illustrated in FIGS. 6A-6C, a crown is formed at the center of the magnets 702 and 703. Although the crown may be more aesthetically appealing, the crown reduces the surface area on which the magnets 702 and 703 can be magnetically attached to each other such that magnets of greater magnetic strength may be required.

In some embodiments, the magnetic strap 701 includes a segment 706 that is located between the magnets 702 and 703. In some embodiments, the segment 706 also includes the portion of the magnetic strap 701 that includes the magnets 702 and 703. In some embodiments, the segment 706 is composed of a material that is substantially memoryless, as discussed above with respect to the segment 606 in FIGS. 6A-6C.

In some embodiments, the magnetic strap 701 includes a segment 707. In some embodiments, the segment 707 includes the portion of the magnetic strap 701 that includes the magnet 703. In some embodiments, the segment 707 is composed of an elastic material, as discussed above with respect to the segment 607 in FIGS. 6A-6C. In some embodiments, the segment 707 is composed of an elastic polymer.

In some embodiments, the magnetic strap 701 includes a segment 708. In some embodiments, the segment 708 includes the portion of the magnetic strap 701 that includes the magnet 702. In some embodiments, the segment 708 is composed of an elastic material, as discussed above with respect to the segment 608 in FIGS. 6A-6C. In some embodiments, the segment 708 is composed of an elastic polymer.

In some embodiments, the segment 707 includes a cord-attachment mechanism that is used to attach the magnetic strap 701 to a cord (and/or a connector for the cord), as described above with respect to the cord-attachment mechanism 609 in FIGS. 6A-6C.

FIGS. 8A, 8B, and 8C illustrate top, perspective, and side views, respectively, of a magnetic strap 801, according to some embodiments. The magnetic strap 801 is similar to the magnetic strap 601, so only the differences are discussed.

The magnetic strap 801 includes magnets 802 and 804 at a location 806 on the magnetic strap 801 and magnets 803 and 805 at a location 807 on the magnetic strap 801. In some embodiments, the magnets 802-805 are attached to the surface of the magnetic strap 801. In some embodiments, the material of the magnetic strap 801 covers all but one surface of the magnets 802-805 (e.g., see FIGS. 8D and 8E). In some embodiments, the material of the magnetic strap 801 covers all of the surfaces of the magnets 802-805. Note that although the discussion of the magnetic strap 801 refers to the magnets 802, 803, 804, and 805, each of the magnets 802, 803, 804, and 805 may include a set of magnets.

In some embodiments, the magnets 802, 803, 804, and 805 are configured so that for a given surface of the magnetic strap 801, opposite magnetic poles of each magnet on the surface of the magnetic strap 801 are perpendicular to the surface of the magnetic strap 601. For example, the north pole of the magnet 802 is configured to be perpendicular to a top surface of the magnetic strap 801, whereas the south pole of the magnet 803 is configured to be perpendicular to the top surface of the magnetic strap 801. Similarly, the south pole of the magnet 804 is configured to be perpendicular to the bottom surface of the magnetic strap 801, whereas the north pole of the magnet 805 is configured to be perpendicular to the bottom surface of the magnetic strap 801. Note that the directions of the poles of the magnets may be reversed.

In some embodiments, the magnets 802 and 804 are a single magnet and the magnets 803 and 805 are a single magnet.

In some embodiments, the magnetic strap 801 includes a segment 808 that is located between the magnets 802 and 804 and the magnets 803 and 805. In some embodiments, the segment 808 also includes the portion of the magnetic strap 801 that includes the magnets 802-805. In some embodiments, the segment 808 is composed of a material that is substantially memoryless, as discussed above with respect to the segment 606 in FIGS. 6A-6C.

In some embodiments, the magnetic strap 801 includes a segment 809. In some embodiments, the segment 809 includes the portion of the magnetic strap 801 that includes the magnets 803 and 805. In some embodiments, the segment 809 is composed of an elastic material, as discussed above with respect to the segment 607 in FIGS. 6A-6C. In some embodiments, the segment 809 is composed of an elastic polymer.

In some embodiments, the magnetic strap 801 includes a segment 811. In some embodiments, the segment 811 includes the portion of the magnetic strap 801 that includes the magnets 802 and 804. In some embodiments, the segment 811 is composed of an elastic material, as discussed above with respect to the segment 608 in FIGS. 6A-6C. In some embodiments, the segment 811 is composed of an elastic polymer.

Figure 8D:
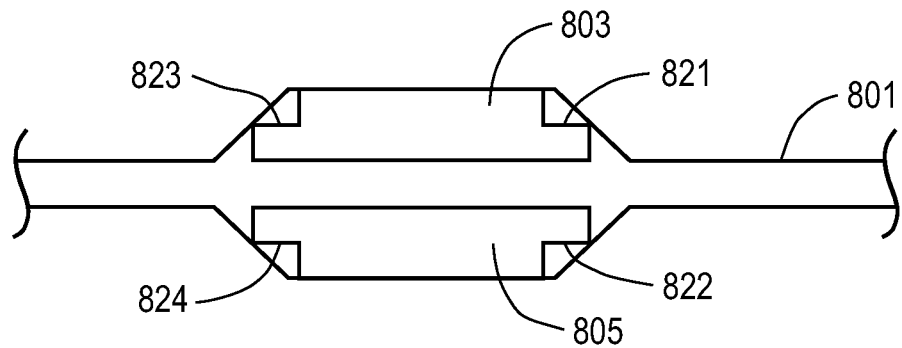
FIG. 8D illustrates a shape of the magnets of the magnetic strap illustrated in FIG. 8A, according to some embodiments.

In some embodiments, the cross section of the magnets 802, 803, 804, and 805 are step-shaped (i.e., step-layered). These embodiments are illustrated in FIG. 8D. In these embodiments, the base of the magnet has protrusions (e.g., protrusions 821, 822, 823, 824) that form a step. The protrusions of the magnets 802, 803, 804, and 805 may be inserted into corresponding holes (or pockets) in the material so that the magnets 802, 803, 804, and 805 are secured to the magnetic strap 801. Note that as discussed above, the material of the magnetic strap 801 may cover all but one surface of the magnets 802-805. Alternatively, the material of the magnetic strap 801 may cover all of the surfaces of the magnets 802-805.

Figure 8E:
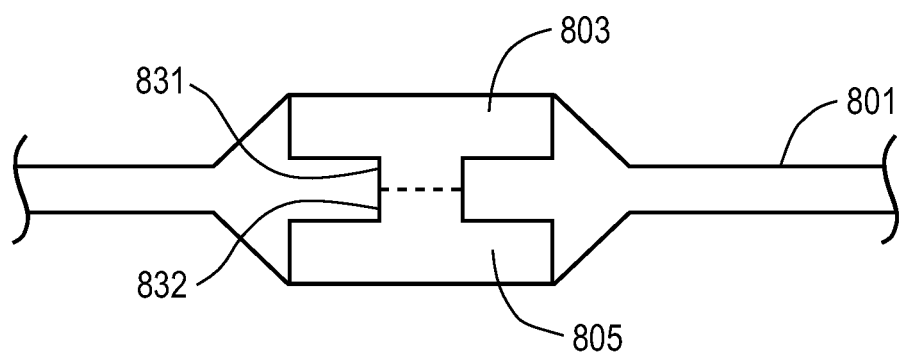
FIG. 8E illustrates another shape of the magnets of the magnetic strap illustrated in FIG. 8A, according to some embodiments.

In some embodiments, the magnets 802 and 804, and 803 and 805, respectively, include posts that are configured to be inserted into each other through the magnetic strap 801. These embodiments are illustrated in FIG. 8E. In these embodiments, the magnetic strap 801 has a hole at the locations 806 and 807 into which the posts of the magnets 802 and 804, and 803 and 805 (e.g., post 831 for the magnet 803 and post 832 for the magnet 805) for respectively, are inserted. The posts of the magnets 802 and 804, and 803 and 805, respectively, may be configured to be locked to each other after being attached to the magnetic strap 801.

In some embodiments, the segment 809 includes a cord-attachment mechanism that is used to attach the magnetic strap 801 to a cord (and/or a connector for the cord), as described above with respect to FIGS. 6A-6C.

FIGS. 9A, 9B, and 9C illustrate top, perspective, and side views of a magnetic strap 901, according to some embodiments. The magnetic strap 901 is similar to the magnetic strap 601, so only the differences are discussed. The magnetic strap 901 includes a magnet 902 at a location 904 on the magnetic strap 901 and a magnet 903 at a location 905 on the magnetic strap 901. In some embodiments, the magnets 902 and 903 are either embedded or partially embedded in the magnetic strap 901. In these embodiments, the material of the magnetic strap 901 that encloses the magnets 902 and 903 conforms (i.e., fitted) to the shape of the magnets 902 and 903. Note that although the discussion of the magnetic strap 901 refers to the magnets 902 and 903, each of the magnets 902 and 903 may include a set of magnets.

In some embodiments, the magnets 902 and 903 are configured so that opposite magnetic poles of each magnet are perpendicular to the top (or bottom) surface of the magnetic strap 901. For example, the north pole of the magnet 902 is configured to be perpendicular to a first surface of the magnetic strap 901 whereas the south pole of the magnet 903 is configured to be perpendicular to the first surface of the magnetic strap 901.

In some embodiments, the magnetic strap 901 includes a segment 906 that is located between the magnet 902 and the magnet 903. In some embodiments, the segment 906 also includes the portion of the magnetic strap 901 that includes the magnets 902 and 903. In some embodiments, the segment 906 is composed of a material that is substantially memoryless, as discussed above with respect to segment 606 in FIGS. 6A-6C.

In some embodiments, the magnetic strap 901 includes a segment 907. In some embodiments, the segment 907 includes the portion of the magnetic strap 901 that includes the magnet 903. In some embodiments, the segment 907 is composed of an elastic material, as discussed above with respect to the segment 607 in FIGS. 6A-6C. In some embodiments, the segment 907 is composed of an elastic polymer.

In some embodiments, the magnetic strap 901 includes a segment 908. In some embodiments, the segment 908 includes the portion of the magnetic strap 901 that includes the magnet 902. In some embodiments, the segment 908 is composed of an elastic material, as discussed above with respect to the segment 608 in FIGS. 6A-6C. In some embodiments, the segment 908 is composed of an elastic polymer.

In some embodiments, the segment 907 includes a cord-attachment mechanism that is used to attach the magnetic strap 901 to a cord (and/or a connector for the cord), as described above with respect to the cord-attachment mechanism 609 in FIGS. 6A-6C.

As discussed above, the magnetic straps 601, 701, 801, and 901 use magnets and/or a combination of magnets and magnetic material to form a loop that is configured to secure a cord. However, other attachment mechanisms may be used to form the loop. In some embodiments, the attachment mechanism is selected from the group consisting of adhesive, Velcro, snaps, buttons, buckles, beads, and van der Waals force attachment mechanisms, suction devices (e.g., suction cups), springs, bistable springs (e.g., a slap bracelet), sleeves that insert into slots, pegs that are inserted into holes, and hinges.

FIGS. 12A-12F illustrate magnetic straps 1201-1206, respectively, which are alternative designs of the magnetic strap 601 (701, 801, or 901), according to some embodiments. The magnetic straps 1201-1206 illustrated in these figures differ only in the shapes of the ends of the straps. These alternative designs may also be applied to the magnetic straps 601, 701, 801, and 901 illustrated in FIGS. 6-9, respectively.

In some embodiments, the thickness of the material of the magnetic strap 601 (701, 801, or 901) from the edge magnets gradually decreases to the thickness of the magnetic strap 601 at the center of the sections 606, 706, 808, or 906. In some embodiments, the thickness of the material of the magnetic strap 601 from the edge magnets gradually decreases to the thickness of the magnetic strap 601 a predetermined location in the sections 606, 706, 808, or 906. In these embodiments, the thickness of the magnetic strap 601 from the predetermined location in the sections 606, 706, 808, or 906 to the center of the sections 606, 706, 808, or 906 is constant. By adjusting the predetermined location, the flexibility of the magnetic strap 601 may be increased or decreased. For example, if the predetermined location is closer to the magnets, the magnetic strap 601 is more flexible because the magnetic strap 601 is thinner in the sections 606, 706, 808, or 906. However, if the predetermined location is at the center of the sections 606, 706, 808, or 906, the magnetic strap 601 is less flexible because the magnetic strap 601 is thicker in the sections 606, 706, 808, or 906.

In some embodiments, the material enclosing the magnets of the magnetic strap 601 (801, or 901) forms a substantially flat surface over the top and the bottom of the magnets. In these embodiments, the substantially flat surface increases the surface area on which the magnets can be magnetically coupled to each other, and in turn, increases the magnetic coupling force between the magnets as compared to a crowned surface (e.g., as illustrated in FIG. 7C).

Note that although the embodiments described herein encapsulate the magnets in the material of the magnetic strap 601 (701, 801, or 901), the magnets may also be attached (e.g., using an adhesive, bolts, rivets, or other attachment mechanisms) onto one or more faces of the magnetic strap 601 (e.g., the "top" side or the "bottom" side of the magnetic strap 601).

In some embodiments, the magnetic straps 601, 701, 801, and 901 are symmetrical. In these embodiments, the magnetic straps 601, 701, 801, and 901 may be folded over on either surface to form the loop. In some embodiments, the magnetic straps 601, 701, 801, and 901 are asymmetrical. In these embodiments, the magnetic straps 601, 701, 801, and 901 may only be folded on one of the surfaces to form the loop. In some embodiments, one surface of the magnetic straps 601, 701, 801, and 901 have a high-friction coating to help hold the wrapped cord in the strap and one surface of the magnetic straps 601, 701, 801, and 901 have a low-friction coating to ease removal of the strap from an object.

Note that any combination of the features of the magnetic straps described above with respect to FIGS. 6-9 may be used in a particular implementation of a magnetic strap.

Cord-Attachment Mechanism

As described above, the cord-attachment mechanisms 609, 709, 810, and 909 allow the magnetic straps 601, 701, 801, and 901, respectively, to be attached to a cord (and/or a connector for the cord). Although the following discussion of cord-attachment mechanisms refers to the cord-attachment mechanism 609, the embodiments described below may be applied to the cord-attachment mechanisms 709, 810, and 909. FIGS. 10 and 11 illustrate exemplary embodiments of the cord-attachment mechanism 609.

Figure 10B:
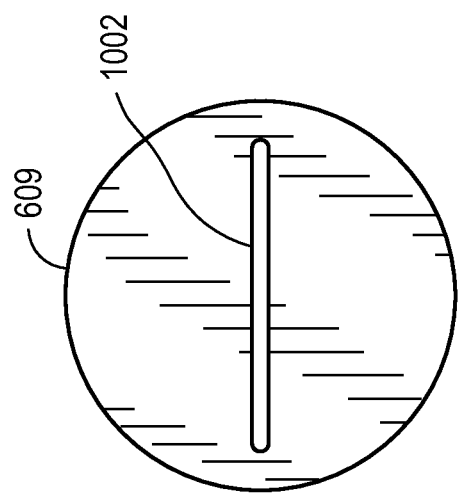
FIG. 10B illustrates another cord-attachment mechanism, according to some embodiments.
Figure 10A:
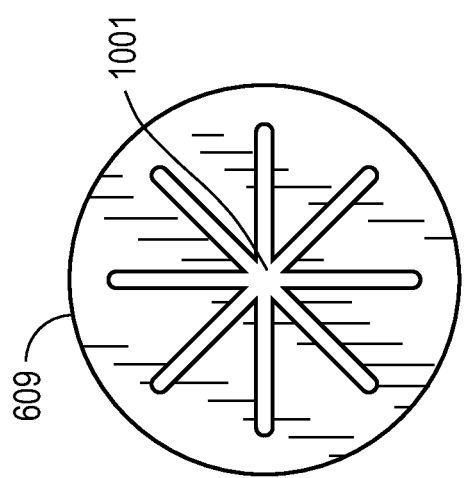
FIG. 10A illustrates a cord-attachment mechanism, according to some embodiments.

FIG. 10A illustrates the cord-attachment mechanism 609 as having a plurality of slits 1001, according to some embodiments. FIG. 10B illustrates the cord-attachment mechanism 609 as having a single slit 1002, according to some embodiments. FIG. 10C illustrates the cord-attachment mechanism 609 as having two slits 1003 configured as an "X" or a "+," according to some embodiments. Note that the angle between the two slits 1003 may be arbitrarily set. FIG. 10E illustrates the cord-attachment mechanism 609 as having slits 1005 in the shape of a star, according to some embodiments. The dimensions of the slits 1001, 1002, 1003, and 1005 are selected so that when a cord is inserted into the slits 1001, 1002, 1003, and 1005, the material around the respective slits applies a pressure against the cord and hold the cord to the magnetic strap 601. Furthermore, the dimensions of the slits 1001, 1002, 1003, and 1005 are selected so that the cord-attachment mechanism 609 can attach to cords (or connectors of cords) of varying sizes. After the magnetic strap 601 has been attached to the cord (or a connector of the cord), a predetermined elastic force exerted by the hole against the cord secures the magnetic strap 601 to the cord (or the connector of the cord).

Figure 10D:
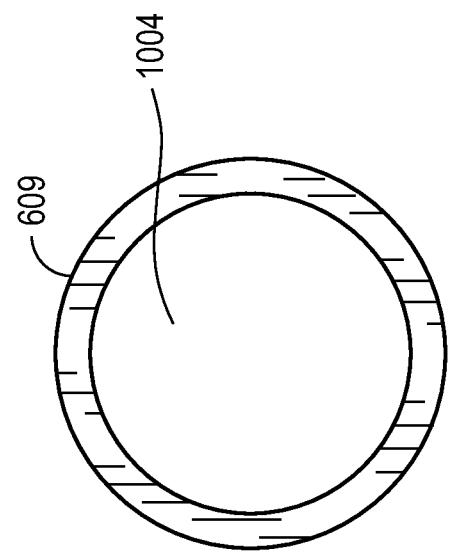
FIG. 10D illustrates another cord-attachment mechanism, according to some embodiments.
Figure 10C:
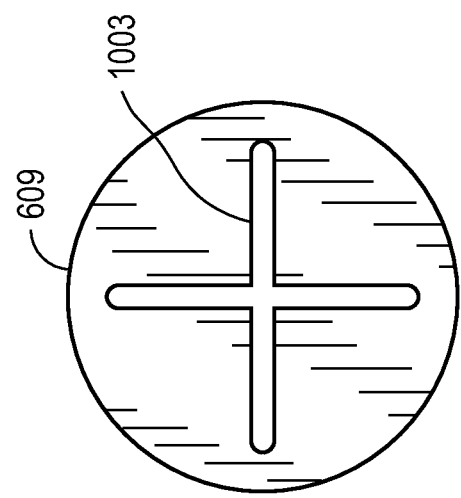
FIG. 10C illustrates another cord-attachment mechanism, according to some embodiments.
Figure 10E:
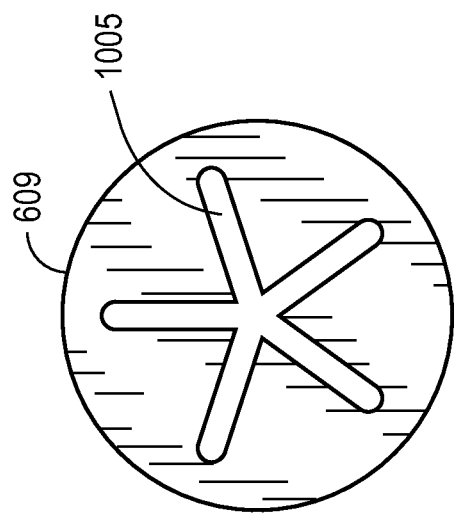
FIG. 10E illustrates another cord-attachment mechanism, according to some embodiments.

FIG. 10D illustrates the cord-attachment mechanism 609 as a hole 1004 (e.g., a circular hole) in the segment 607, according to some embodiments. In these embodiments, a cord (or a connector of the cord) may be inserted into the hole. For embodiments in which the segment 607 is elastic, the hole expands as the cord (or the connector for the cord) is inserted into the hole. In some embodiments, the cord-attachment mechanism 609 is formed from an elastic polymer (e.g., by injecting an elastic polymer into a mold for the magnetic strap 601 or by cutting material from the segment 607, etc.). For example, the elastic polymer may be the elastic polymers described above with respect to the segment 607. In some embodiments, the cord-attachment mechanism 609 is composed of the same polymer as the segments 606, 607, and 608. In some embodiments, the cord-attachment mechanism is composed of different, but compatible, polymers. Note that the diameter of the hole 1004 may be determined based on factors including the range of diameters for cords and/or connectors for the cords to be used with the magnetic strap 601.

Figure 11A:
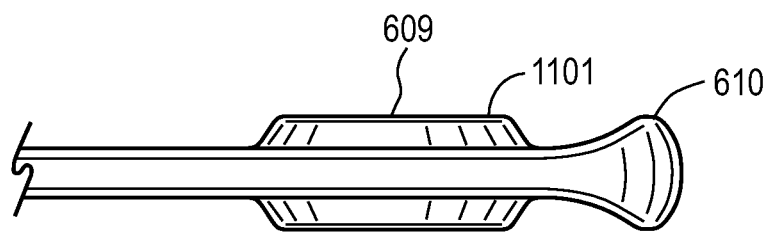
FIG. 11A illustrates a side view of a grommet for a cord-attachment mechanism, according to some embodiments.
Figure 11B:
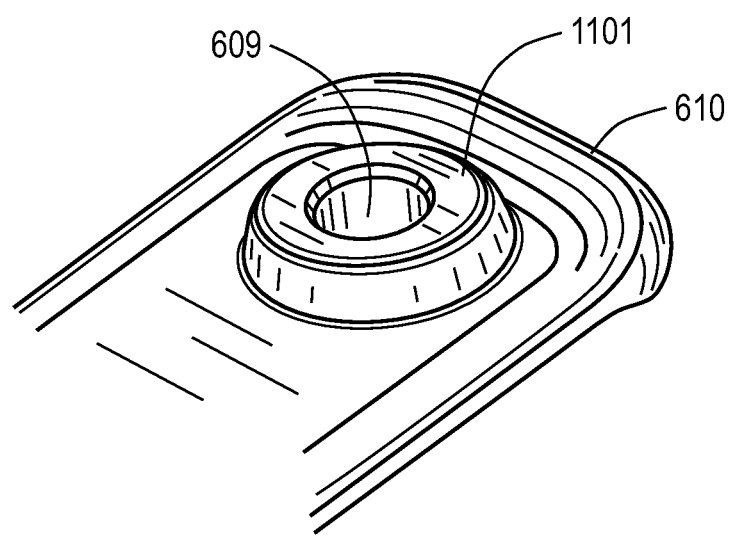
FIG. 11B illustrates a perspective view of a grommet for a cord-attachment mechanism, according to some embodiments.

FIGS. 11A and 11B illustrate a side view and a perspective view, respectively, of a grommet 1101 for the cord-attachment mechanism 609, according to some embodiments. The grommet 1101 increases the surface area in contact with a cord (or a connector for the cord) to reduce the tendency of the cord-attachment mechanism 609 to move up and/or down a cord (or a connector for the cord) and to prevent the material in section 607 from forming a cone shape when installing and/or using the magnetic strap 601. In some embodiments, the grommet has a height of 0.158 inches. In some embodiments, the grommet has a diameter of 0.1 inches.

Figure 11C:
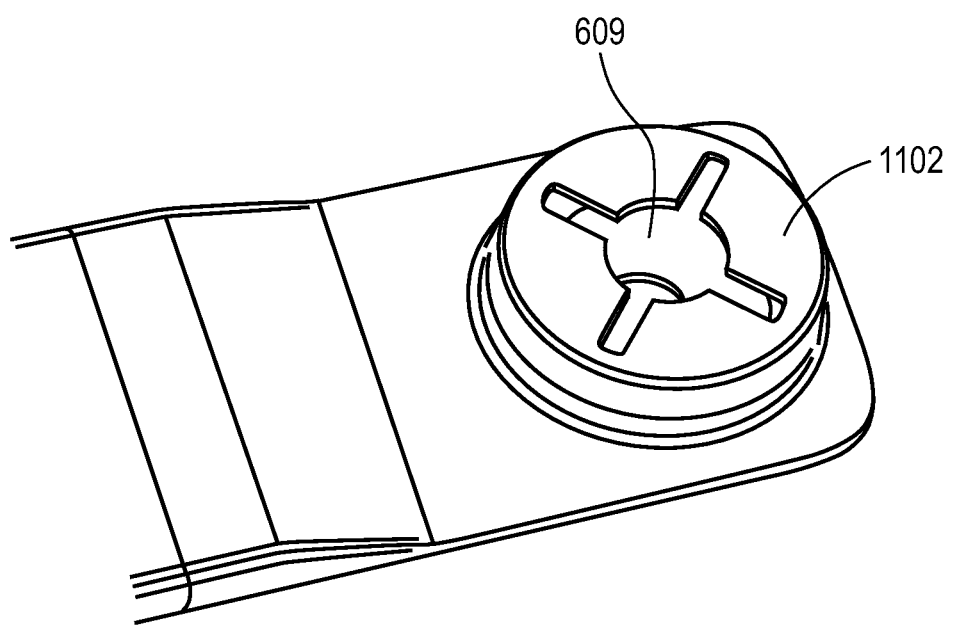
FIG. 11C illustrates another grommet for a cord-attachment mechanism, according to some embodiments.
Figure 12C:
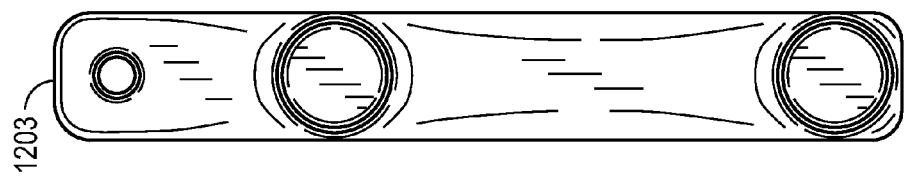
FIG. 12C illustrates another magnetic strap, according to some embodiments.
Figure 12B:
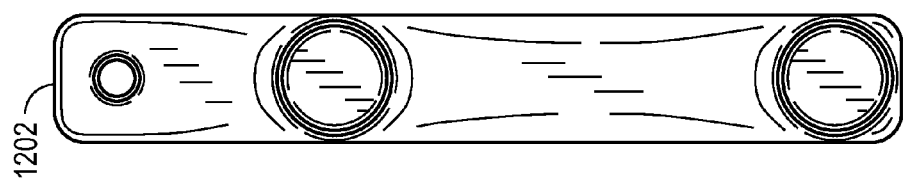
FIG. 12B illustrates another magnetic strap, according to some embodiments.
Figure 12A:
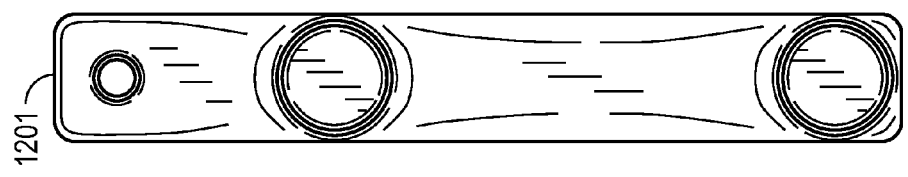
FIG. 12A illustrates a magnetic strap, according to some embodiments.
Figure 12F:
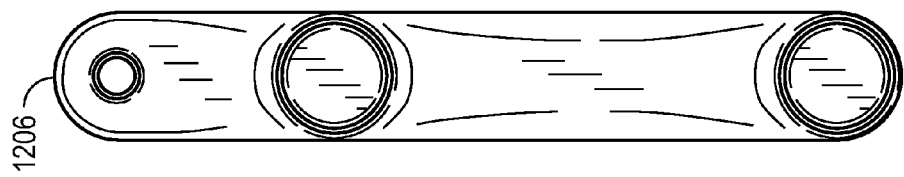
FIG. 12F illustrates another magnetic strap, according to some embodiments.
Figure 12E:
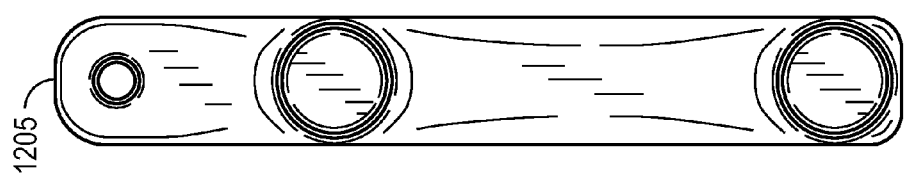
FIG. 12E illustrates another magnetic strap, according to some embodiments.
Figure 12D:
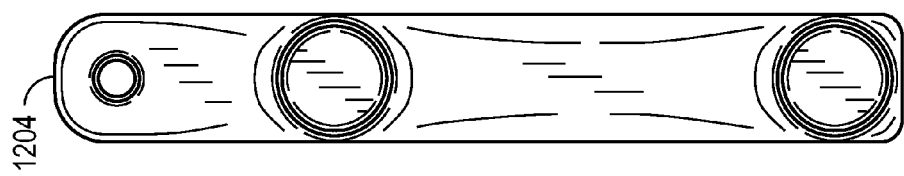
FIG. 12D illustrates another magnetic strap, according to some embodiments.

FIG. 11C illustrates another grommet 1102 for the cord-attachment mechanism 609, according to some embodiments. The grommet 1102 includes a centrally-located hole and slits coming out of the hole. The slits allow the grommet 1102 to expand to fit larger diameter cords (or connectors).

Note that other cord-attachment mechanisms may be used instead of the hole. For example, Velcro, adhesives, magnetic beads, suction devices, van der Waals force attachment mechanisms, buttons, buckles, springs, bistable springs (e.g., a slap bracelet), sleeves that insert into slots, pegs that are inserted into holes, hinges a molded strap with snaps may be used.

Magnetic Beads

FIGS. 13A and 13B illustrate top and side views, respectively, of a magnetic bead 1301, according to some embodiments. The magnetic bead 1301 includes a leg 1302 and a leg 1303 that are pivotally coupled to each other at one end of each respective leg. Each of the legs 1302 and 1303 also includes a free end. As illustrated in FIGS. 13A and 13B, the leg 1302 and the leg 1303 are formed from a single piece of material (e.g., a flexible material that allows the legs 1302 and 1303 to bend toward each other). However, the legs 1302 and 1303 may be pivotally coupled to each other using other mechanisms. For example, a hinge may be used to couple the leg 1302 to the leg 1303. The magnetic bead 1301 also includes a magnet 1304 attached to the free end of the leg 1302 and a magnet 1305 attached to the free end of the leg 1303. Note that a magnetic material may be substituted for one of the magnets 1304 and 1305. In some embodiments, the magnets 1304 and 1305 are embedded into the free ends of the legs 1302 and 1303, respectively. In some embodiments, the free ends of the legs 1302 and 1303 cover all of the surfaces of the magnets 1304 and 1305. In some embodiments, the free ends of the legs 1302 and 1303 cover all but one surface of the magnets 1304 and 1305, respectively, as illustrated in FIGS. 13A and 13B. In some embodiments, the magnets are selected form the group consisting of magnetic metallic elements, composite magnets, ceramic or ferrite magnets, alnico magnets, ticonal magnets, injection molded magnets, flexible magnets, rare earth magnets, and electromagnets. In some embodiments, the magnets are Neodymium magnets. In some embodiments, each magnet is a Neodymium having a grade of N42 a length of 0.27 inches, a width of 0.125 inches, and a thickness of 0.47 inches. Note that the grade and the dimensions of the Neodymium magnet depend on the size of the free ends of the legs 1302 and 1303 magnetic beads. For example, a lower grade Neodymium magnet having larger dimensions may be used for a clip that has larger legs.

In some embodiments, the magnetic bead 1301 includes two configurations. In a first configuration, the magnetic bead 1301 is open so that the free ends of the legs 1302 and 1303 are not touching each other. In a second configuration, the magnetic bead 1301 is closed so that the free ends of the legs 1302 and 1303 are touching each other. When the magnetic bead 1301 is closed, the magnets 1304 and 1305 are magnetically attached to each other and hold the magnetic bead 1301 in the closed configuration. To change the magnetic bead 1301 from the open configuration to the closed configuration, the free ends of the legs 1302 and 1303 are bent towards each other. To return the magnetic bead 1301 to the open configuration a force greater than the attractive magnetic force must be applied to magnetically detach the free ends of the legs 1302 and 1303. The free ends of the legs 1302 and 1303 must also be moved to a position so that the magnetic force between the magnets 1304 and 1305 does not pull the free ends of the legs 1302 and 1303 together again.

In some embodiments, the free ends of the legs 1302 and 1303 each have at least one substantially flat surface. In these embodiments, when free ends of the legs 1302 and 1303 are bent toward each other so that they touch, the substantially flat surfaces of the legs 1302 and 1303 are flush (i.e., there are no gaps) with each other (e.g., see FIGS. 14A to 14K).

In some embodiments, the magnetic bead 1301 includes a cavity 1306. When attaching the magnetic bead 1301 to a cord, the cord is inserted into the cavity 1306 and the magnetic bead 1301 is closed. Once closed, the magnetic bead 1301 holds the cord until the magnetic bead 1301 is opened. The cavity 1306 allows the magnetic bead 1301 to attach to the cord so that the surfaces of the free ends of the legs 1302 and 1303 are flush with each other (e.g., see FIGS. 6A to 6J). In some embodiments, the cavity 1306 is lined with a high-friction material to make the cavity 1306 more difficult to adjust when the magnetic bead 1301 is attached to a cord. In some embodiments, the cavity 1306 is lined with a low-friction material to make the cavity 1306 easier to adjust when the magnetic bead 1301 is attached to a cord.

In some embodiments, the cavity 1306 is formed of an elastic material that stretches to accommodate cords of varying sizes. The elastic material of the cavity 1306 allows the magnetic bead 1301 to attach to cords of varying sizes so that faces of the free ends of the legs 1302 and 1303 are flush with each other (e.g., see FIGS. 6A to 6J). The elastic material also provides a force against the cord so that the magnetic bead 1301 does not slip along the cord. In some embodiments, the cavity 1306 is ribbed.

Instead of using the magnets 1304 and 1305 to attach the magnetic bead 1301 to the cord, other attachment mechanisms may be used. In some embodiments, the attachment mechanism are selected form the group consisting of a snap closure, Velcro, an adhesive, a mechanical bead (e.g., a groove in the side the magnetic bead 1301 that snaps onto the cord), a latch, metal that bends and holds its shape, and the like.

FIGS. 13C and 13D illustrate cross-section views of the magnetic bead 1301, according to some embodiments. As illustrated in FIG. 13D, the magnet 1305 is shaped like a step. Specifically, the magnet 1305 includes protrusions 1310 and 1311 that are configured to hold the magnet 1305 in the material of the magnetic bead 1301. In some embodiments, the protrusions 1310 and 1311 are located on two opposing sides of the magnet 1305. The protrusions 1310 and 1311 may run the full length or a portion of the length of the side of the magnet 1305. In some embodiments, two or more protrusions may be used. For example, the magnet 1305 may include protrusions on all of the sides of the magnet 1305. Note that the magnet 1304 may also have the protrusions 1310 and 1311.

FIGS. 14A to 14k illustrate varying dimensions for magnetic beads, according to some embodiments. Each of the magnetic beads is attached to a cord for earbuds 601. Each of the magnetic beads 602, 604, 606, 608, 610, 612, 614, 616, 618, and 620 includes a cavity 603, 605, 607, 609, 611, 613, 615, 617, 619, 621, respectively. Table 1 presents exemplary dimensions for each of the magnetic beads illustrated in FIGS. 14A to 14K. In Table 1, "length" refers to the dimension of the magnetic bead (or magnet) along the cord, "width" refers to the dimension of the magnetic bead (or magnet) that is perpendicular to the cord, and "thickness" refers to the thickness of the magnetic bead (or magnet). All dimensions are listed in inches.

TABLE 1

Exemplary dimensions for magnetic beads illustrated in FIGS. 14A-14K.

| | Figure | 14A | 14B | 14C | 14D | 14E | 14F | 14G | 14H | 14J | 14K |
|---|---|---|---|---|---|---|---|---|---|---|---|
| Folded | Length (along cord) | 0.31 | 0.42 | 0.56 | 0.25 | 0.31 | 0.42 | 0.56 | 0.25 | 0.31 | 0.26 |
| Bead | Width (⊥ to cord) | 0.25 | 0.22 | 0.20 | 0.25 | 0.27 | 0.24 | 0.22 | 0.28 | 0.25 | 0.22 |
| Size | Thickness | 0.14 | 0.14 | 0.14 | 0.18 | 0.14 | 0.14 | 0.14 | 0.18 | 0.19 | 0.25 |
| Magnet | Length (along cord) | 0.213 | 0.36 | 0.13 | 0.19 | 0.213 | 0.36 | 0.13 | 0.19 | 0.213 | 0.197 |
| Size | Width (⊥ to cord) | 0.125 | 0.1 | 0.08 | 0.125 | 0.125 | 0.1 | 0.08 | 0.125 | 0.125 | 0.099 |
| | Thickness | 0.047 | 0.047 | 0.047 | 0.063 | 0.047 | 0.047 | 0.047 | 0.063 | 0.125 | 0.099 |

In some embodiments, when the magnetic beads described herein are attached to a cord, the magnetic beads can rotate about the cord so that the polarities of the magnets in the magnetic beads can be aligned so that two distinct magnetic beads can magnetically attach to each other.

In some embodiments, a magnetic sheath is used in lieu of or in addition to magnetic beads. The magnetic sheath is described in more detail in U.S. patent application Ser. No. 12/338,680, entitled "Magnetic Cord Management System," filed Dec. 18, 2008.

Configuring the Cord Management System

FIGS. 15A to 15H illustrate the process of configuring a cord management system. These figures illustrate a cord 1515, which is an audio cord. Note that cords 1513 and 1514 are segments of the cord 1515 (e.g., see FIG. 15D), and are also audio cords.

Figure 15A:
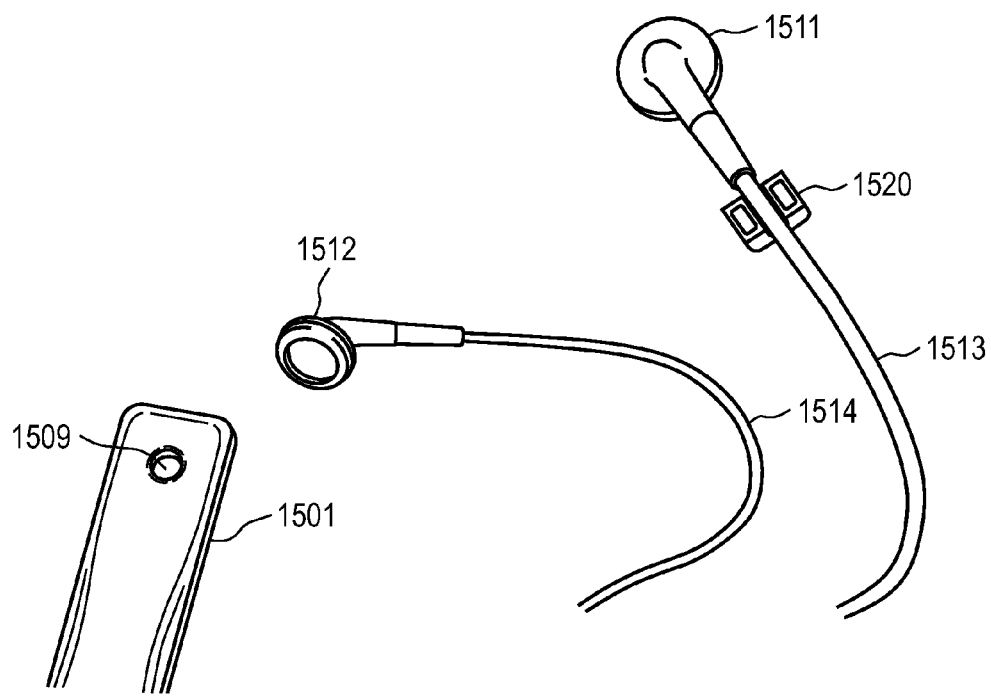
FIG. 15A illustrates a process of attaching a magnetic bead to a cord, according to some embodiments.

FIG. 15A illustrates a process of attaching a magnetic bead 1520 to the cord 1513, according to some embodiments. As illustrated in FIG. 15A, the cord 1513 is inserted into a cavity (e.g., the cavity 1306 in FIG. 13A) of the magnetic bead 1520. In this case, the cord 1513 is connected to a speaker 1511 of the headphone. Similarly, the cord 1514 is connected to a speaker 1512 of the headphone. In some embodiments, the magnetic bead 1520 is attached to the cord 1513 a predetermined distance from the speaker 1511.

Figure 15B:
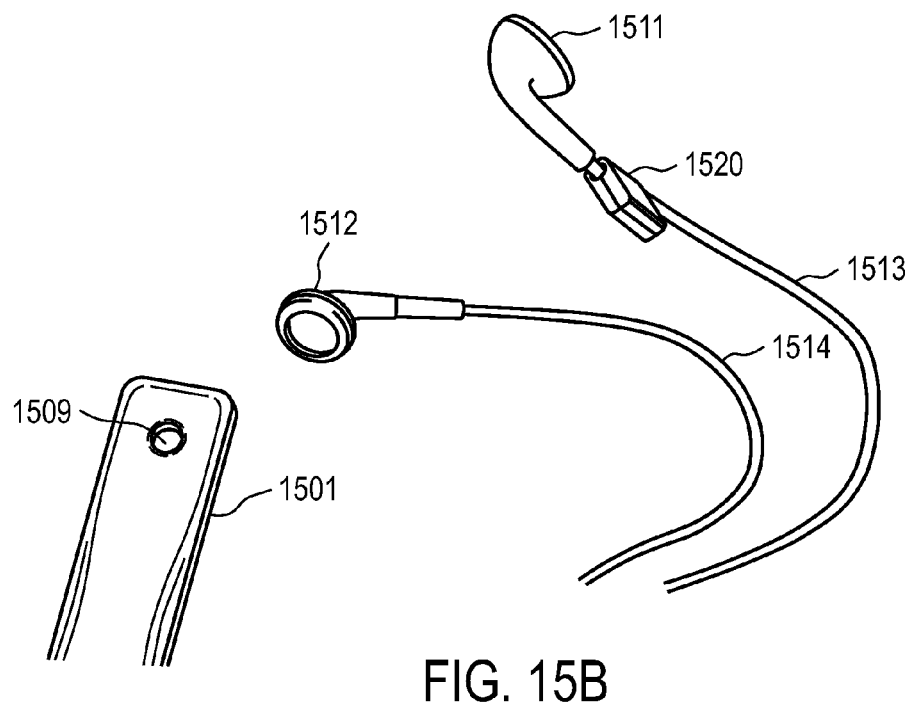
FIG. 15B illustrates the magnetic bead of FIG. 15A attached to the cord, according to some embodiments.
Figure 15C:
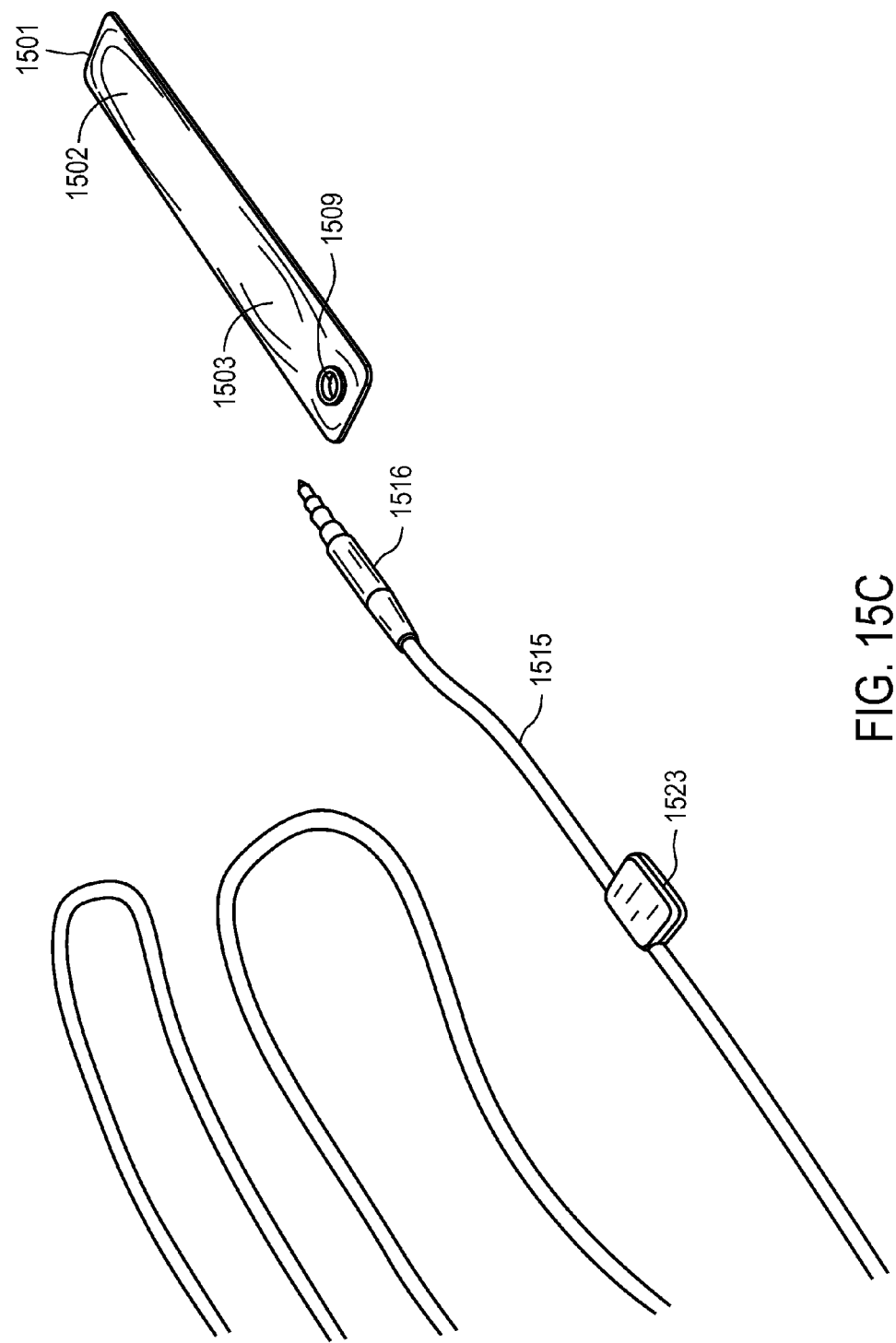
FIG. 15C illustrates another magnetic bead that is attached to the cord, according to some embodiments.
Figure 15D:
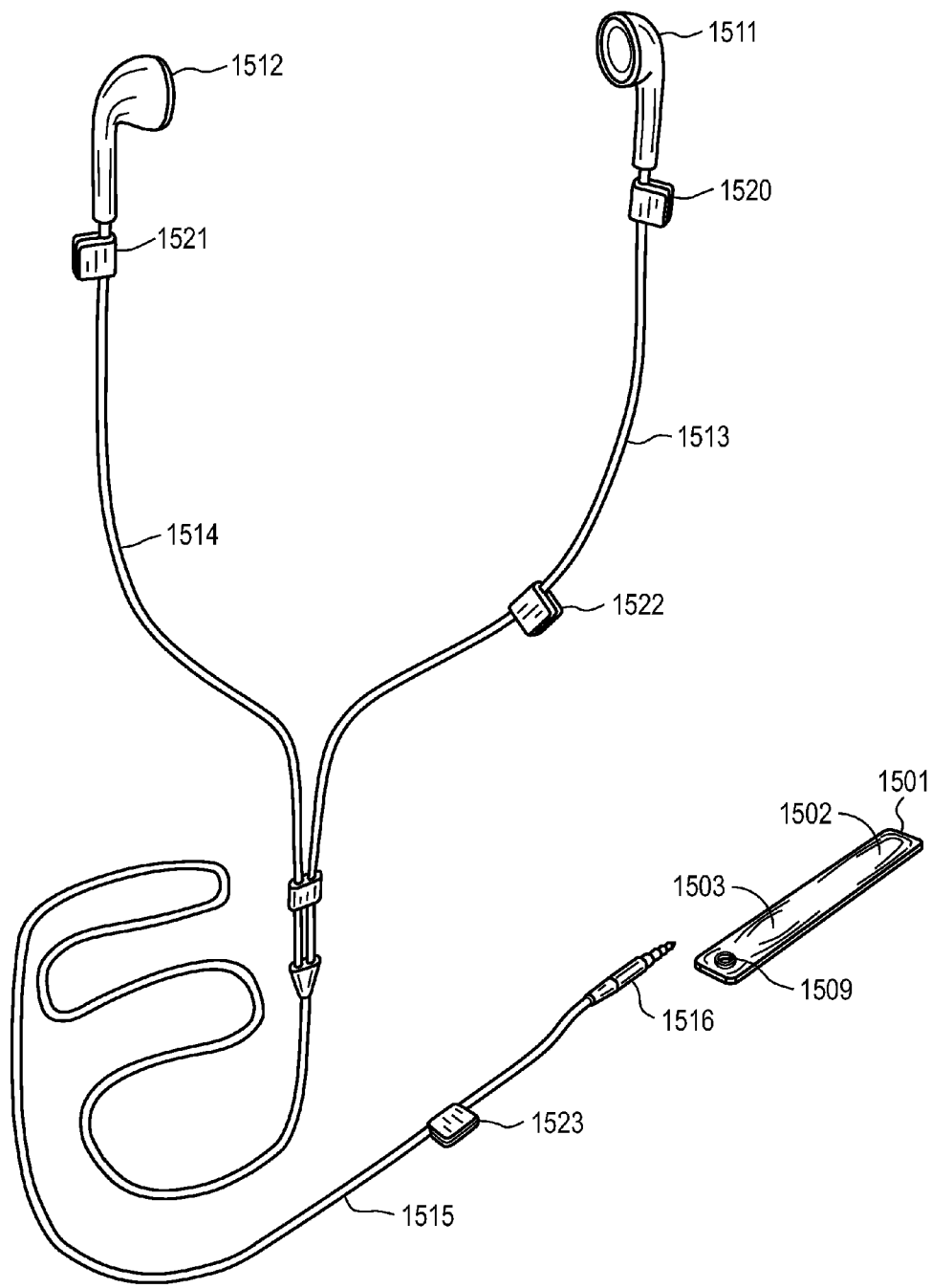
FIG. 15D illustrates several magnetic beads that are attached to the cord, according to some embodiments.

Once the magnetic bead 1520 is closed, the magnetic bead 1520 is attached to the cord 1513 (e.g., see FIG. 15B). In some embodiments, another magnetic bead is attached to the cord 1514 a predetermined distance from the speaker 1512, as illustrated in FIG. 15D. In some embodiments, only one of the two magnetic beads attached to the speakers 1511 and 1512 includes a magnet. In these embodiments, the other magnetic bead includes a magnetic material.

In some embodiments, a magnetic bead is opened by sliding the magnets of the magnetic bead across each other until the magnets of the magnetic bead are magnetically detached from each other. In some embodiments, a magnetic bead is opened by prying the magnets of the magnetic bead away from each other until the magnets of the magnetic bead are magnetically detached from each other.

In some embodiments, a magnetic bead 1513 is attached to the cord 1515 a predetermined distance from a connector 1516 (e.g., an audio connector). These embodiments are illustrated in FIG. 15C. In some embodiments, the predetermined distance is selected so that when the connector 1516 is inserted into the cord-attachment mechanism 1509 of the magnetic strap 1501, the magnetic bead 1523 is configured to be magnetically attached to at least one of the magnets 1502 and 1503 of the magnetic strap 1501 when the cord 1515 is wrapped around the magnetic strap 1501. The magnetic bead 1523 holds the cord 1515 on the magnetic strap 1501 to facilitate winding of the cord around the magnetic strap 1501. Thus, a user does not need to hold the cord 1515 to the magnetic strap 1501 while winding the cord 1515 around the magnetic strap 1501.

In some embodiments, a magnetic bead 1522 is attached to the cord 1513. These embodiments are illustrated in FIG. 15D. In some embodiments, the magnetic bead 1522 is attached to the cord 1513 a specified distance from the speaker 1511. In some embodiments, the specified distance is selected so that the magnetic bead 1522 can be magnetically attached to one of the magnets of the magnetic strap 1501 when the cord 1513 is wrapped around the magnetic strap 1501. In some embodiments, the specified distance is selected so that the magnetic bead 1522 can be magnetically attached to one or more of the magnetic beads 1520 and 1521 when the cord 1513 is wrapped once around an object (e.g., a mobile electronic device). For example, a user may wrap the cord 1513 once around the object and attach the magnetic bead 1522 on the cord 1513 at the location where the magnetic beads 1520 and/or 1521 intersect (or overlap) the cord 1513.

Figure 15E:
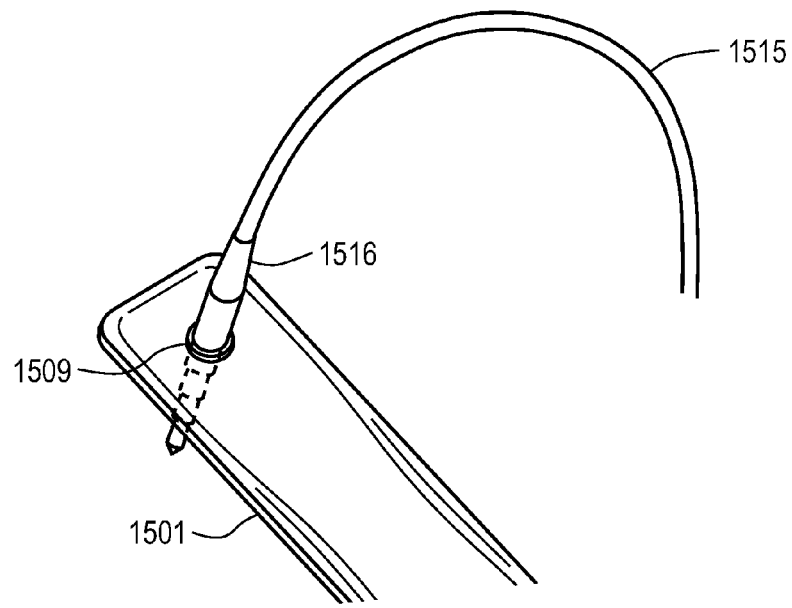
FIG. 15E illustrates a process of attaching a connector for the cord to a magnetic strap, according to some embodiments.
Figure 15F:
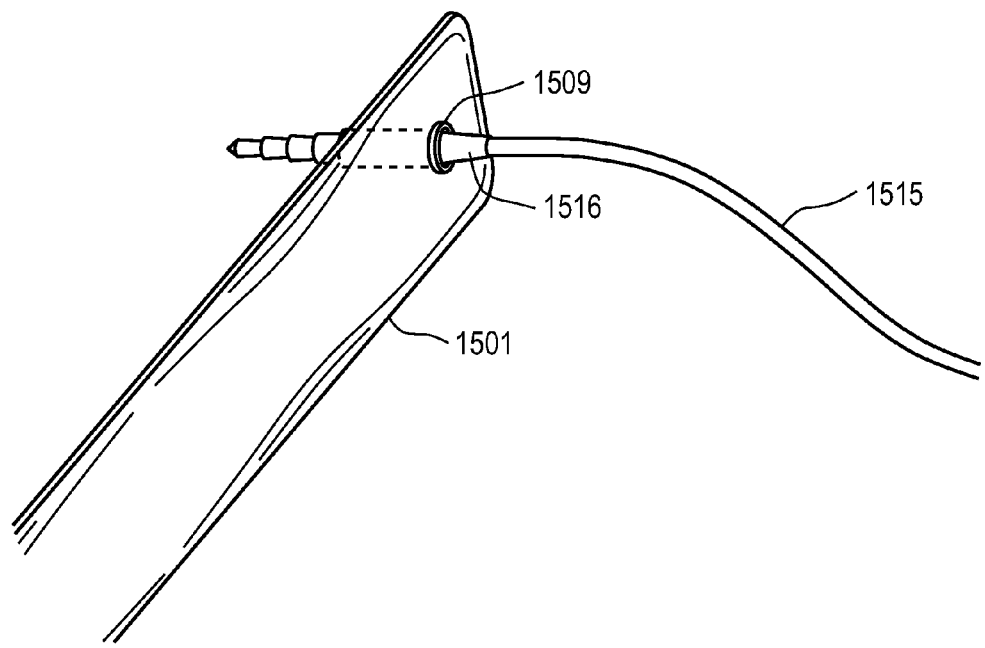
FIG. 15F illustrates the connector of FIG. 15E attached to the cord, according to some embodiments.

In some embodiments, the connector 1516 is inserted into the cord-attachment mechanism 1509 of the magnetic strap 1501. These embodiments are illustrated in FIGS. 15E and 15F. By inserting the connector 1516 into the cord-attachment mechanism 1509, the cord 1515 is secured to the magnetic strap 1501.

Figure 15G:
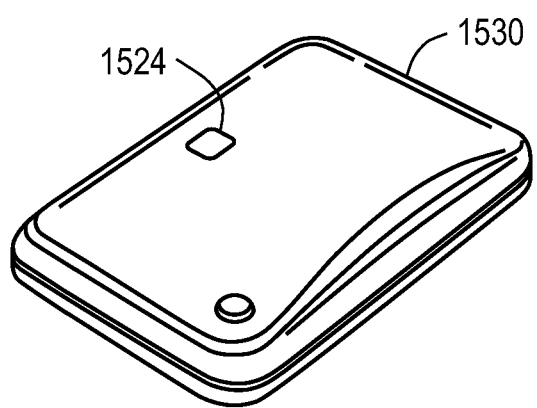
FIG. 15G illustrates a magnetic material attached to an object, according to some embodiments.

In some embodiments, a magnetic material 1524 (e.g., the magnetic material 103) is attached to an object 1530, as illustrated in FIG. 15G. Note that the magnetic material 1524 may be a magnet or magnetic material as discussed above. In these embodiments, the magnetic material 1524 is attached to the object 1530 at a predetermined location. In some embodiments, the predetermined location is selected so that when the magnetic strap 1501 is attached to the object 1530, the magnet 1502 is magnetically attached to the magnetic material 1524. These embodiments assist with the deployment of the magnetic strap 1501 and/or may be used to hold the magnetic strap 1501 to the object 1530 when the magnetic strap 1501 is in its natural configuration (e.g., the flat configuration). Note that these embodiments are also useful for electronic devices that have connectors at the bottom of the device. For these electronic devices, the magnetic strap 1501 is attached so that the cord-attachment mechanism 1509 faces downwards when the electronic device is held in an upright position (e.g., when the user is interacting with the user interface of the electronic device). Thus, when the magnetic strap 1501 is in its natural configuration (e.g., the flat configuration) and the magnetic material 1524 is not used, gravity may pull down the end of the magnetic strap 1501 that includes the magnet 1502. However, when the magnetic strap 1501 is in its natural configuration and the magnet 1502 is magnetically attached to the magnetic material 1524, the end of the magnetic strap 1501 that includes the magnet 1502 will not be pulled down by gravity. In some embodiments, the predetermined location is selected so that when the magnetic strap 1501 is attached to the object 1530, the magnet 1503 is magnetically attached to the magnetic material 1524. These embodiments may be used to hold the magnetic strap 1501 to the object 1530 when the magnetic strap 1501 is folded over into the loop configuration.

In some embodiments, the magnetic material 1524 is selected from the group consisting of a ferromagnetic material and a paramagnetic material. In some embodiments, the magnetic material 1524 is low-carbon steel. In some embodiments, the magnetic material 1524 is Vanadium carbonyl. The magnetic material 1524 may be any shape, including, but not limited to, a disc, a square, a rectangle, a decorative shape, and the like. The size and shape of the magnetic material may be selected based on factors including, but not limited to, an aesthetic design of the object onto which the magnetic material is being attached and a width of the magnetic strap. In some embodiments, the magnetic material is a square having 0.5 inches sides. In some embodiments, the magnetic material is a circle having a radius of 0.5 inches. In some embodiments, the thickness of the magnetic material is 0.006 inches. Note that the magnetic material 1524 is beneficial when using the magnetic strap 1501 with an electronic device that has an audio connector port on the side or the bottom of the electronic device. In these cases, the magnetic material 1524 may be used to hold the magnetic strap 1501 to the object. Specifically, the magnetic material 1524 may be used as a magnetic attachment point for the magnet 1502 so that the magnetic strap 1502 does not dangle on the electronic device. In some embodiments, the magnetic material is galvanized or otherwise coated with a sealant. The sealant may protect against rusting and protects the end users against the sharp edges of the magnetic material.

Figure 15H:
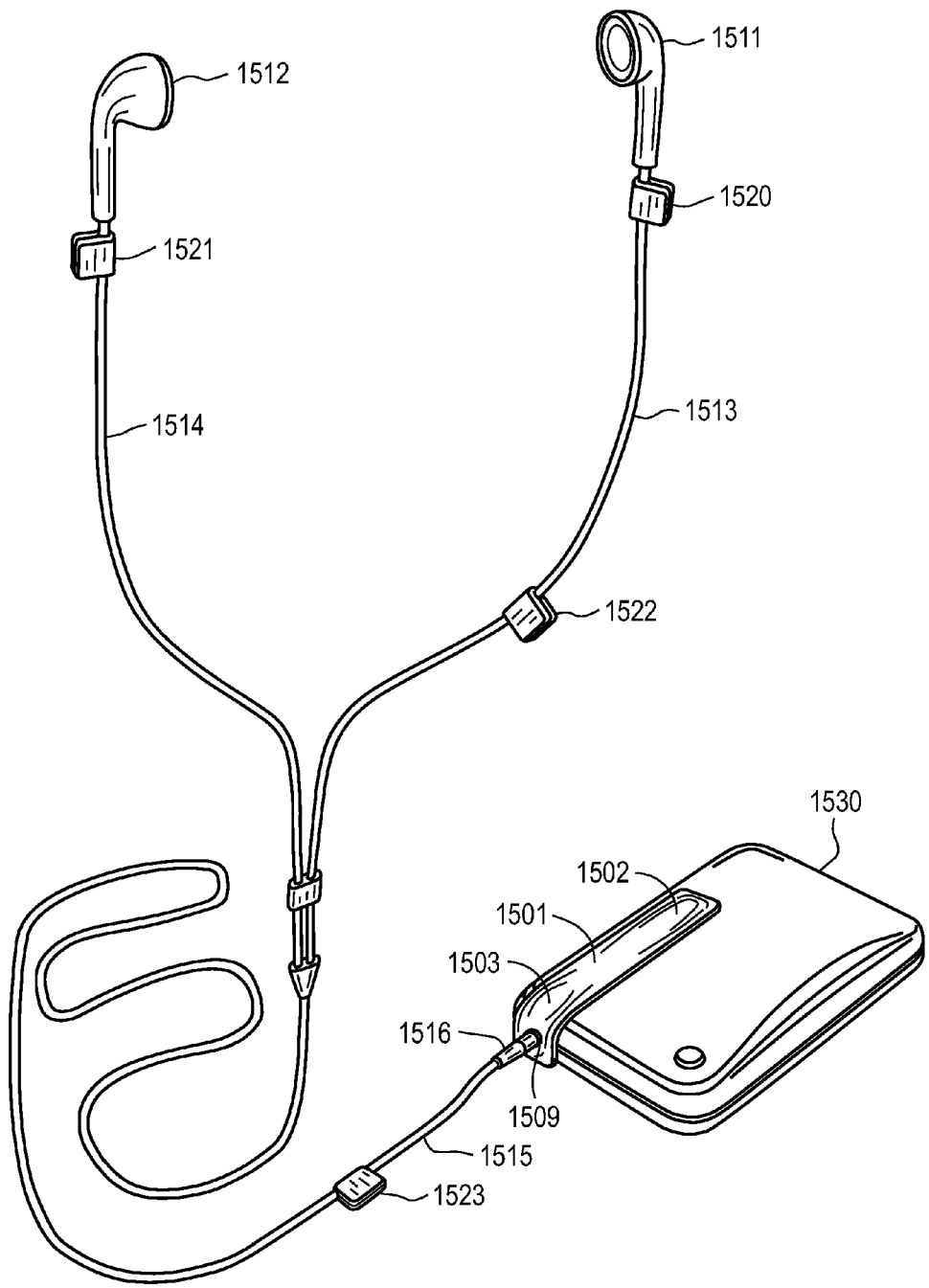
FIG. 15H illustrates an assembled cord managements system, according to some embodiments.
Figure 15J:
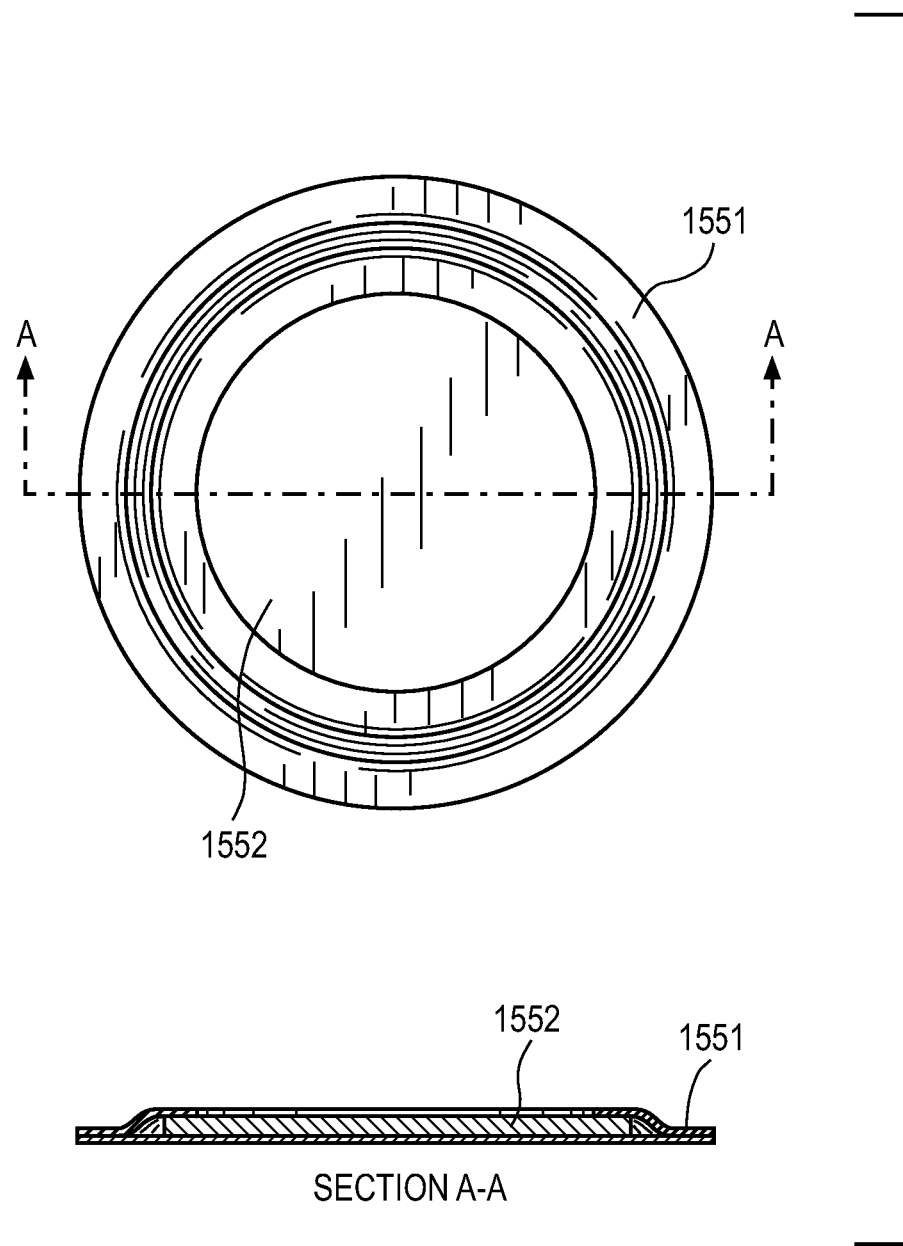
FIG. 15J illustrates views of the magnetic material, according to some embodiments.

FIG. 15J illustrates a top view and a side view of the magnetic material 1524, according to some embodiments. As illustrated, the magnetic material 1524 includes several elements. In some embodiments, the magnetic material 1524 includes a disc-shaped magnetic material 1552 (e.g., composed of the magnetic material as described herein) whose outer edge is at least partially covered and/or surrounded by a ring-shaped elastic material 1551 (e.g., an elastic polymer as described herein). The ring-shaped elastic material 1551 and/or disc-shaped magnetic material 1552 may be coated with an adhesive (or other attachment mechanism) on one surface to allow the magnetic material 1524 to be attached to the object 1530. The ring-shaped elastic material 1551 is configured to conform to the shape of the object when pressed against the object. Alternatively, or additionally, the disc-shaped material 1552 and/or the magnetic material 1524 may be attached to an intermediate material (e.g., using adhesives and the like) that includes adhesives on one or both surfaces so that the intermediate material may be attached to the object 1530 and to the disc-shaped material 1552 and the magnetic material 1524. The intermediate material may be chosen so that when the intermediate material is pressed onto the object, the intermediate material conforms to the shape of the object. For example, the intermediate material may be foam. Note that the shape of the magnetic material 1524 may be any other shape (e.g., a square, a rectangle, etc.). The elastic material that partially covers and/or surrounds the magnetic material may have a corresponding shape or may be any shape. For example, if the magnetic material 1524 has a disc shape, the elastic material may be a disc shape or may be a square shape (or any other shape).

In some embodiments, the magnetic strap 1501 is attached to the object 1530 (e.g., see FIG. 15H). The object 1530 may be a portable electronic device (e.g., a mobile phone, a music player, etc.) or any other object (e.g., a hand). In some embodiments, the magnetic material 1524 is attached to the object 1530 and the magnet 1502 of the magnetic strap 1501 is magnetically attached to the magnetic material 1501 so that the magnetic strap 1501 is attached to the object 1530. In some embodiments, the connector 1516 is connected to a port on the object 1520. In these embodiments, the magnetic strap 1501 lays flat on the surface of the object 1530. Note that the magnetic strap 1501 may also be incorporated into a case or into the object 1530, as described herein.

In some embodiments, the magnetic strap 1501 does not have a predefined "top" side and a predefined "bottom" side. In other words, either face of the magnetic strap 1501 may be used as the top (or "face up") side on the object 1530. In some embodiments, the magnetic strap 1501 has a predefined "top" side and a predefined "bottom" side. In these embodiments, the magnetic strap 101 can only be used with the top side facing away from the object 1530.

Figure 22:
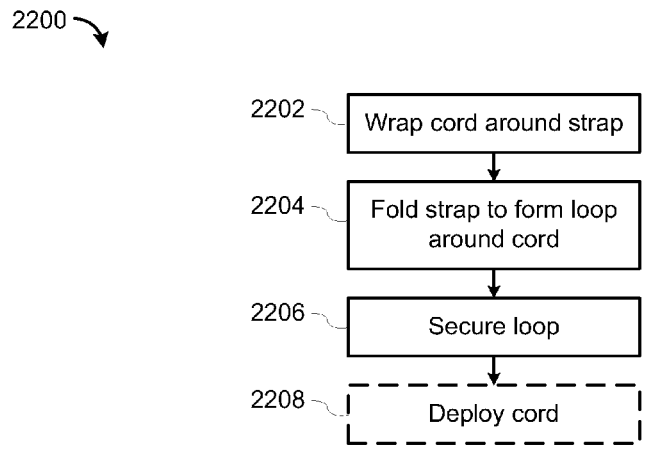
FIG. 22 is a flowchart of a method for using a cord management system, according to some embodiments.

FIG. 22 is a flowchart of a method 2200 for using a cord management system, according to some embodiments. As described above, a strap of the cord management system may be used by itself or may be used in conjunction with magnetic beads and/or a magnetic material attached to the object.

As noted above, the magnetic strap 101 may be used with or without the electronic device 210. In either case, steps 2202-2208 are performed. A cord is wrapped (2202) around the magnetic strap 101 substantially perpendicular to and/or otherwise across the magnetic strap 101 at any angle, wherein the strap includes a first set of magnets attached to a first location on the magnetic strap 101 and a second set of magnets attached to a second location on the magnetic strap 101. The magnetic strap 101 is folded (2204) so that the magnetic strap 101 forms a loop around the cord. The loop is secured (2206) by coupling the first set of magnets and the second set of magnets.

In some embodiments, when the user desires to use the cord, the cord is deployed (2208) from the magnetic strap 101 by pulling the cord away form the strap (e.g., substantially parallel to the length of the strap or in any other direction from the strap). When the cord is pulled away from the magnetic strap 101, the first set of magnets is decoupled from the second set of magnets so that the magnetic strap 101 no longer forms the loop around the cord. In embodiments where the magnetic strap 101 is used by itself to manage the cord, the cord may be deployed from the magnetic strap 101 by pulling the cord away from the magnetic strap 101 in a direction other than substantially parallel to the length of the magnetic strap 101.

Figure 23:
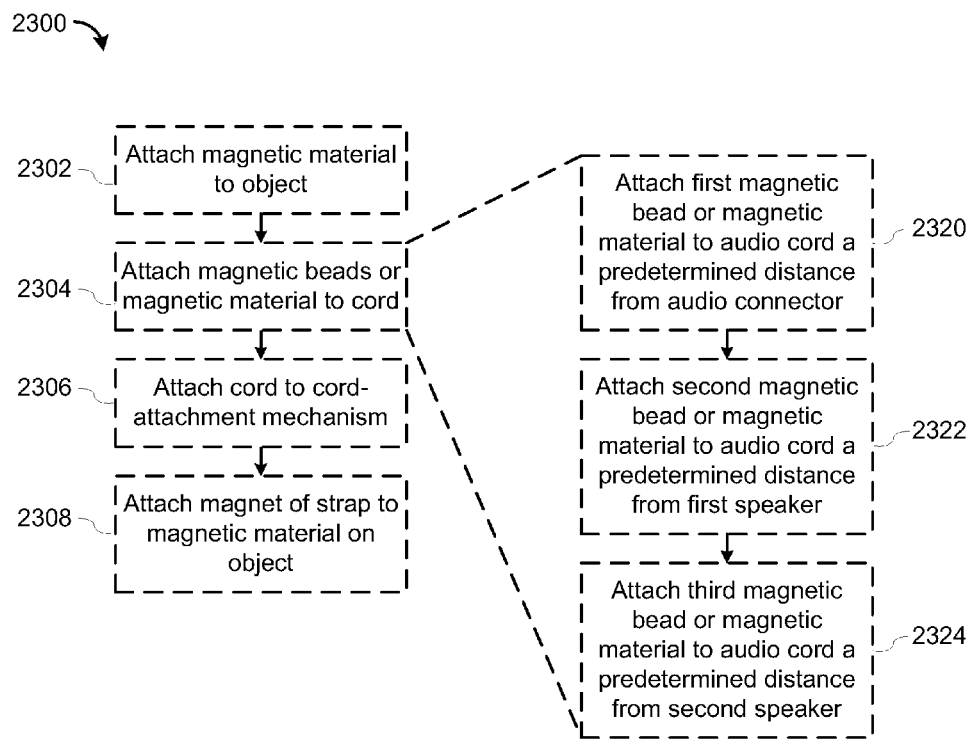
FIG. 23 is a flowchart of a method for configuring a cord management system, according to some embodiments.

FIG. 23 is a flowchart of a method 2300 for configuring a cord management system, according to some embodiments. In some embodiments, at least one magnetic material or magnet is attached (2302) to an object. For example, the magnetic material 103 may be attached to the electronic device 210.

In some embodiments, a plurality of magnetic beads and/or magnetic material is attached (2304) to a cord. In some embodiments, at least one magnetic bead of the plurality of magnetic beads is attached to the cord so that when the cord is wrapped around the strap, the at least one magnetic bead is magnetically attached to one set of magnets and/or magnetic material of the magnetic strap. In some embodiments, the cord is an audio cord of a headphone, which includes an audio connector and one or more speakers connected to the audio connector via the audio cord. In some embodiments, a first magnetic bead of the plurality of magnetic beads is attached (2320) to the audio cord at a predetermined distance from the audio connector of the headphone. In some embodiments, a second magnetic bead of the plurality of magnetic beads is attached (2322) to the audio cord at a predetermined distance from a first speaker in the one or more speakers of the headphone. In some embodiments, a third magnetic bead of the plurality of magnetic beads is attached (2324) to the audio cord at a predetermined distance from a second speaker in the one or more speakers of the headphone.

In some embodiments, the cord (and/or a connector for the cord) is attached (2306) to a cord-attachment mechanism. For example, the connector 204 of the cord 201 may be inserted into the cord-attachment mechanism of the magnetic strap 101.

In some embodiments, a first set of magnets or magnetic material of the magnetic strap 101 is attached (2308) to the magnetic material or the magnet (e.g., the magnetic material 103) attached to the object. As discussed above, instead of using a magnet attached to the object, a material onto which the magnetic strap 101 can attach to the object is used (e.g., an adhesive disc, a suction cup, etc.).

OTHER EMBODIMENTS

FIGS. 16-19 illustrate other embodiments of the cord management system.

Figure 16B:
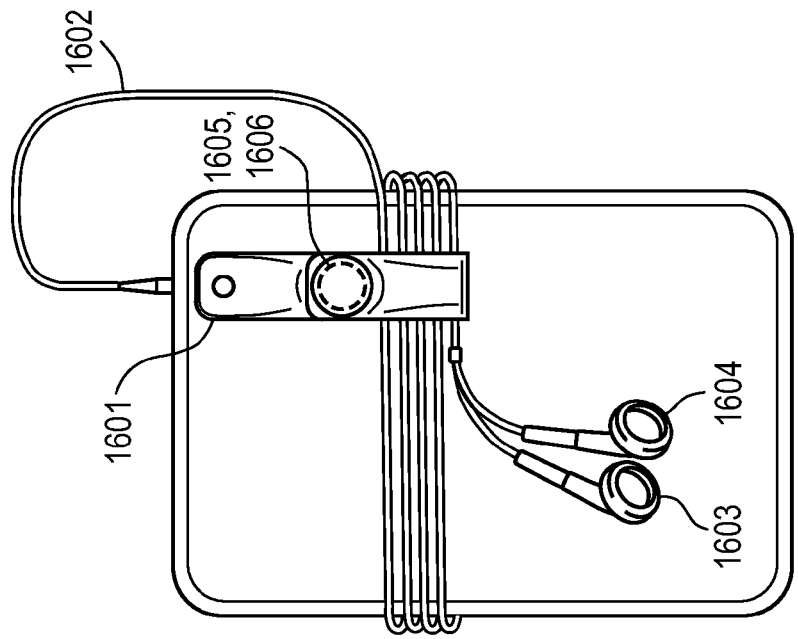
FIG. 16B illustrates the magnetic strap of FIG. 16A folded to form a loop, according to some embodiments.
Figure 16A:
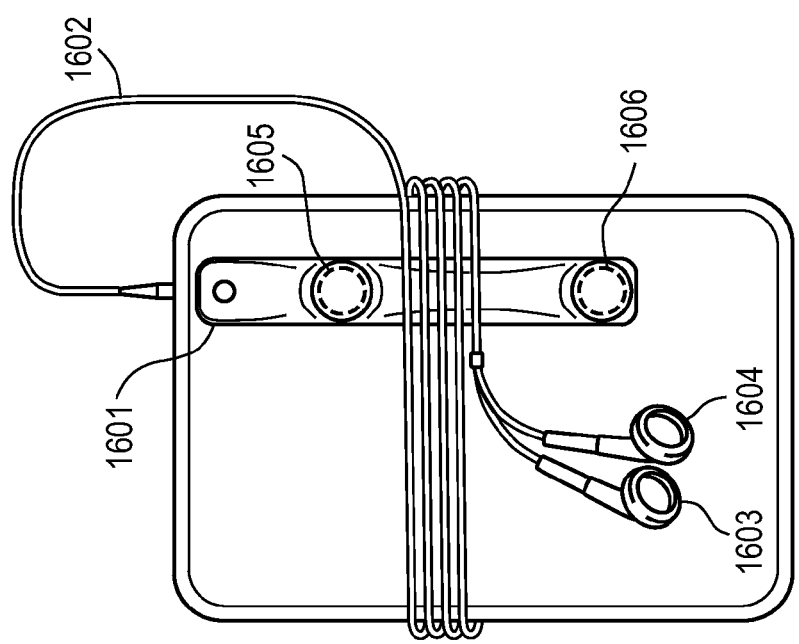
FIG. 16A illustrates a magnetic strap attached to an object, according to some embodiments.

FIG. 16A illustrates a magnetic strap 1601 and a cord 1602, according to some embodiments. The magnetic strap 1601 can be any of the magnetic straps discussed above (e.g., the magnetic straps 101, 601, 701, 801, or 901). As illustrated in FIG. 16A, the magnetic strap 1601 includes magnets 1605 and 1606 and the cord 1602 includes speakers 1603 and 1604. In contrast to the embodiments described above, the cord-attachment mechanism of the magnetic strap 1601 is not used to attach the magnetic strap 1601 to the cord 1602. In order to use the magnetic strap 1601 with the object, the magnetic strap 1601 is attached to the object. In some embodiments, the magnetic strap 1601 is magnetically attached to the object. In these embodiments, magnetic material (e.g., the magnetic material 103) is attached to the object (e.g., using adhesives, suction cups, Velcro, etc., as described above) so that at least one of magnets 1605 and 1606 can be magnetically attached to the magnetic material. When the magnets 1605 and/or 1606 are magnetically attached to the magnetic material, the magnetic strap is coupled to the object. In some embodiments, the magnetic strap 1601 is attached to the object using one selected from the group consisting of adhesives, suction cups, Velcro, and a van der Waals force attachment mechanism.

As described above and as illustrated in FIGS. 16A and 16B, the cord 1602 can be wrapped around the object and the magnetic strap 1601 and secured by folding the magnetic strap 1601 into the loop, as described above.

Figure 26A:
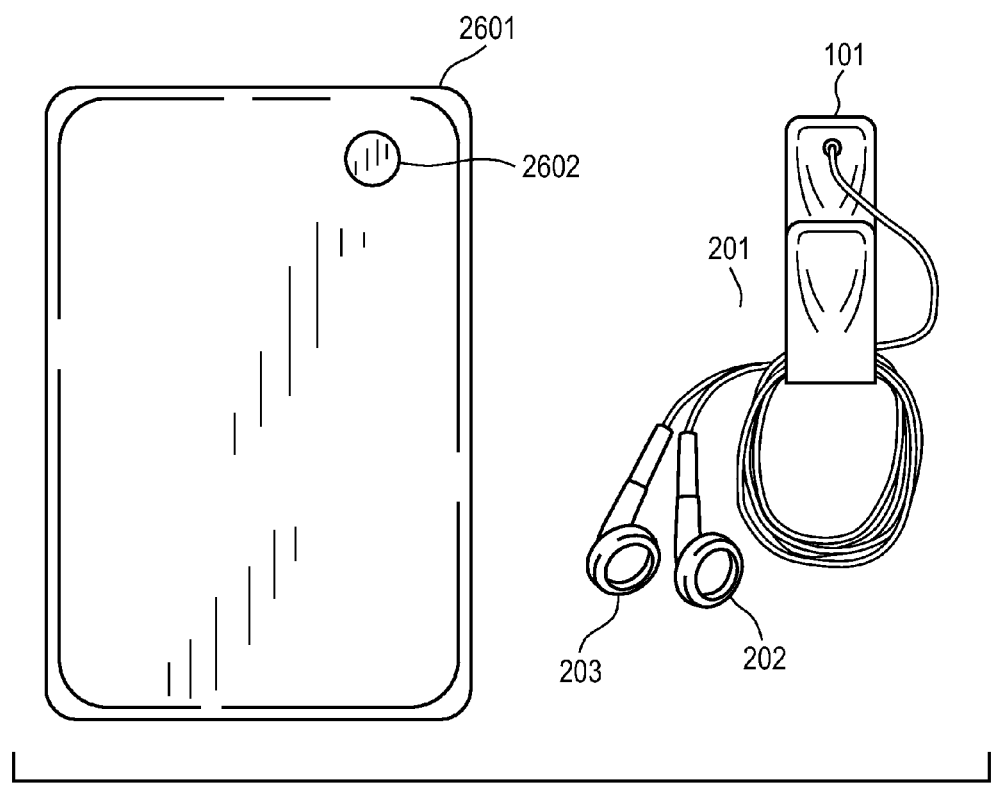
FIG. 26A illustrates an object and a cord secured by a magnetic strap, according to some embodiments.
Figure 26B:
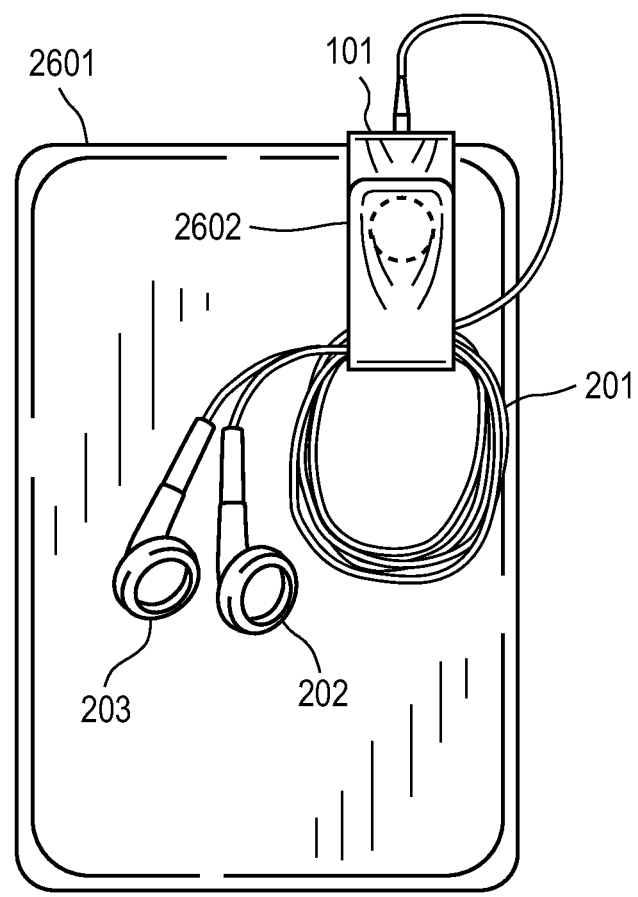
FIG. 26B illustrates the magnetic strap attached to the object, according to some embodiments.
Figure 26C:
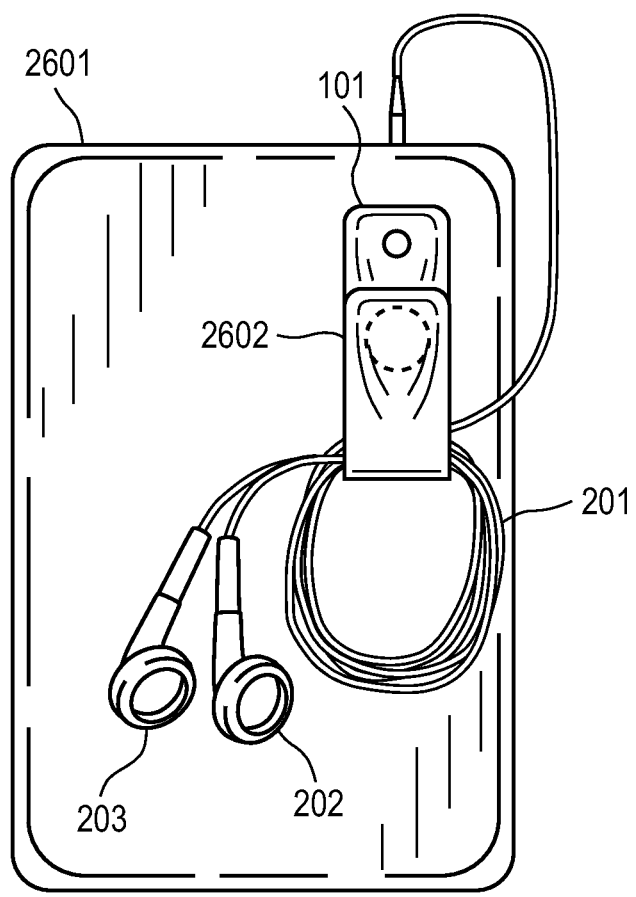
FIG. 26C illustrates the magnetic strap attached to the object, according to some embodiments.

FIG. 26A illustrates an object 2601 and the cord 201 secured by the magnetic strap 101, according to some embodiments. As illustrated in FIG. 26A, the cord 201 and the magnetic strap 101 are detached from the object 2601. A magnetic material 2602 is also attached to the object 2601. As discussed above, the magnetic material 2602 may be located on the object 2601 so that when the magnetic strap 101 is attached to the object 2601, one of the magnets 104 and 105 can be magnetically attached to the magnetic material 2602. In some cases, the end user may reattach the magnetic strap 101 and/or the cord 201 to the object 2601 without deploying the cord 201 from the magnetic strap 101, as illustrated in FIG. 26B. In some cases, a user may have already wrapped the cord 201 in the magnetic strap 101 where the magnetic strap 101 is detached from the object 2601. In these cases, the user may reattach the magnetic strap to the object 2601 to hold the magnetic strap 101 and the cord 201 to the object 2601. FIG. 26C illustrates the magnetic strap 101 attached to the object 2601, according to some embodiments. As illustrated in FIG. 26C, the connector for the cord 201 is not attached to the cord-attachment mechanism of the magnetic strap 101. The magnetic strap 101 may be attached to the surface of the object 2601 using any of the attachment mechanisms discussed herein (e.g., magnets, suction cups, adhesives, etc.). For example, the magnetic material 103 may be attached to the object. The magnets 104 and/or 105 may then be magnetically attached to the magnetic material 103 so that the magnetic strap 101 is attached to the object 2601, as illustrated in FIG. 26C. Note that although the connector for the cord 201 is illustrated as being attached to a corresponding connector of the object 2601, the connector of the cord 201 may also be disconnected from the corresponding connector. In other words, the connector of the cord 201 may dangle freely from the magnetic strap 2602.

Figure 27A:
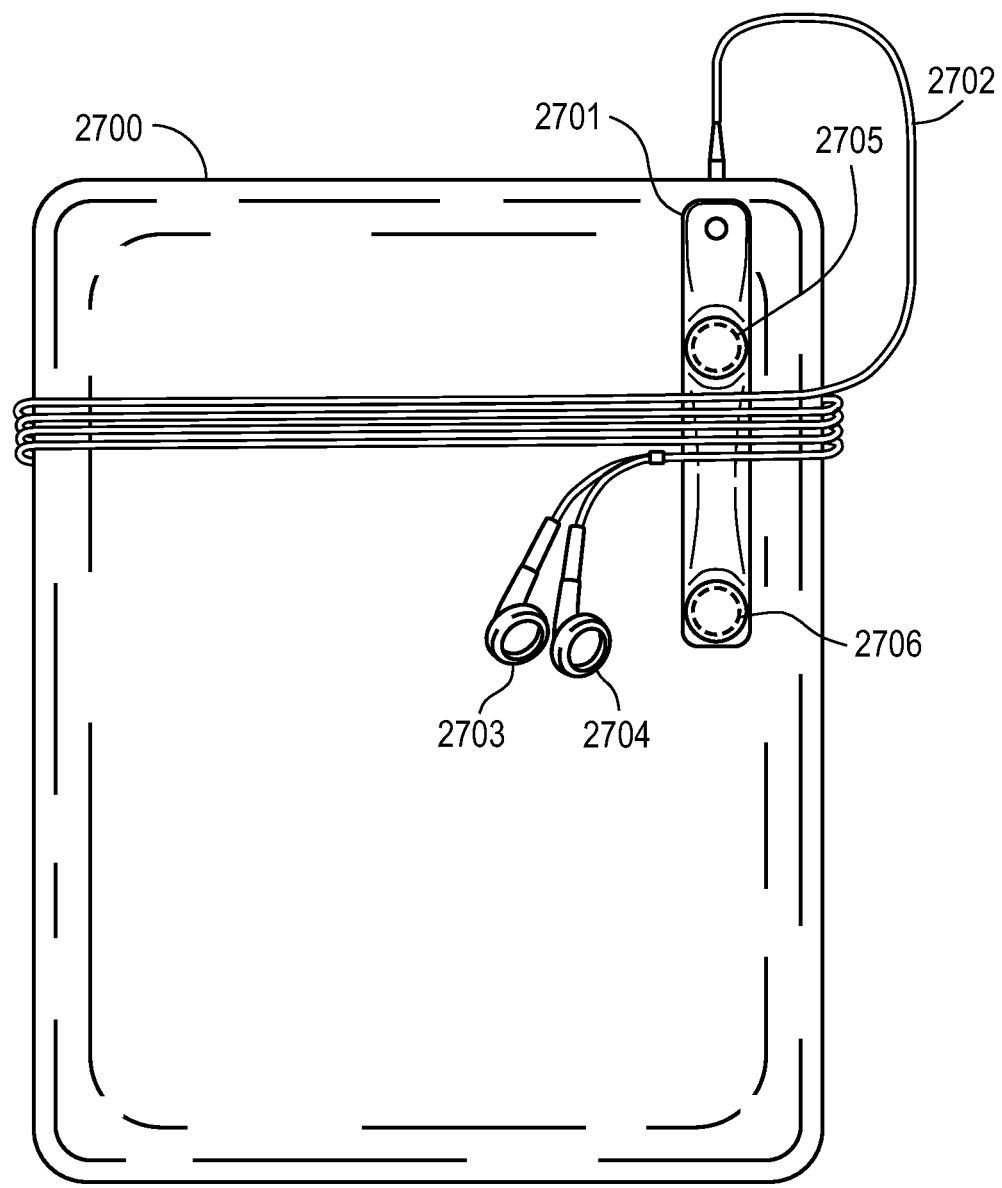
FIG. 27A illustrates a magnetic strap attached to an object, according to some embodiments.

FIG. 27A illustrates a magnetic strap 2701 attached to an object 2700, according to some embodiments. Note that FIG. 27A is similar to FIG. 16A with the exception that the object 2700 has larger dimensions that the illustrated in FIG. 16A. The magnetic strap 2701 can be any of the magnetic straps discussed above (e.g., the magnetic straps 101, 601, 701, 801, or 901). As illustrated in FIG. 27A, the magnetic strap 2701 includes magnets 2705 and 2706 and the cord 2702 includes speakers 2703 and 2704. As with FIG. 16A, the cord-attachment mechanism of the magnetic strap 2701 is not used to attach the magnetic strap 2701 to the cord 2702. In order to use the magnetic strap 2701 with the object, the magnetic strap 2701 is attached to the object. In some embodiments, the magnetic strap 2701 is magnetically attached to the object. In these embodiments, magnetic material (e.g., the magnetic material 103) is attached to the object (e.g., using adhesives, suction cups, Velcro, etc., as described above) so that at least one of magnets 2705 and 2706 can be magnetically attached to the magnetic material. When the magnets 2705 and/or 2706 are magnetically attached to the magnetic material, the magnetic strap is coupled to the object. In some embodiments, the magnetic strap 2701 is attached to the object using one selected from the group consisting of adhesives, suction cups, Velcro, and a van der Waals force attachment mechanism.

As described above and as illustrated in FIGS. 27A and 27B, the cord 2702 can be wrapped around the object 2700 and the magnetic strap 2701 and secured by folding the magnetic strap 2701 into the loop, as described above. Note that since the object 2700 is larger than the object illustrated in FIG. 16A, the number of loops of the cord 2702 around the object 2700 is less than the number of loops of the cord 1602 around the object illustrated in FIG. 16A.

Figure 27B:
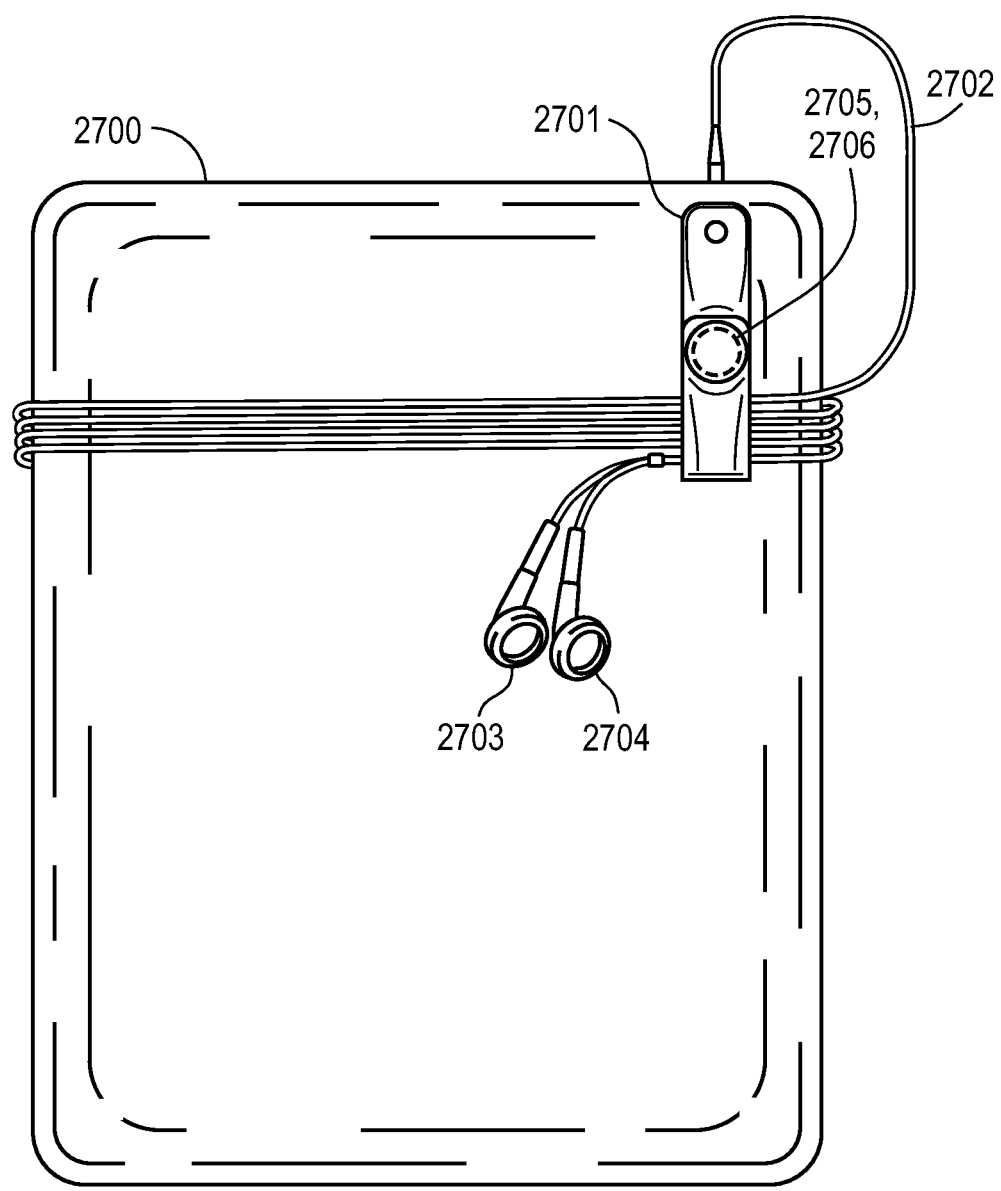
FIG. 27B illustrates the magnetic strap of FIG. 27A folded to form a loop, according to some embodiments.
Figure 27C:
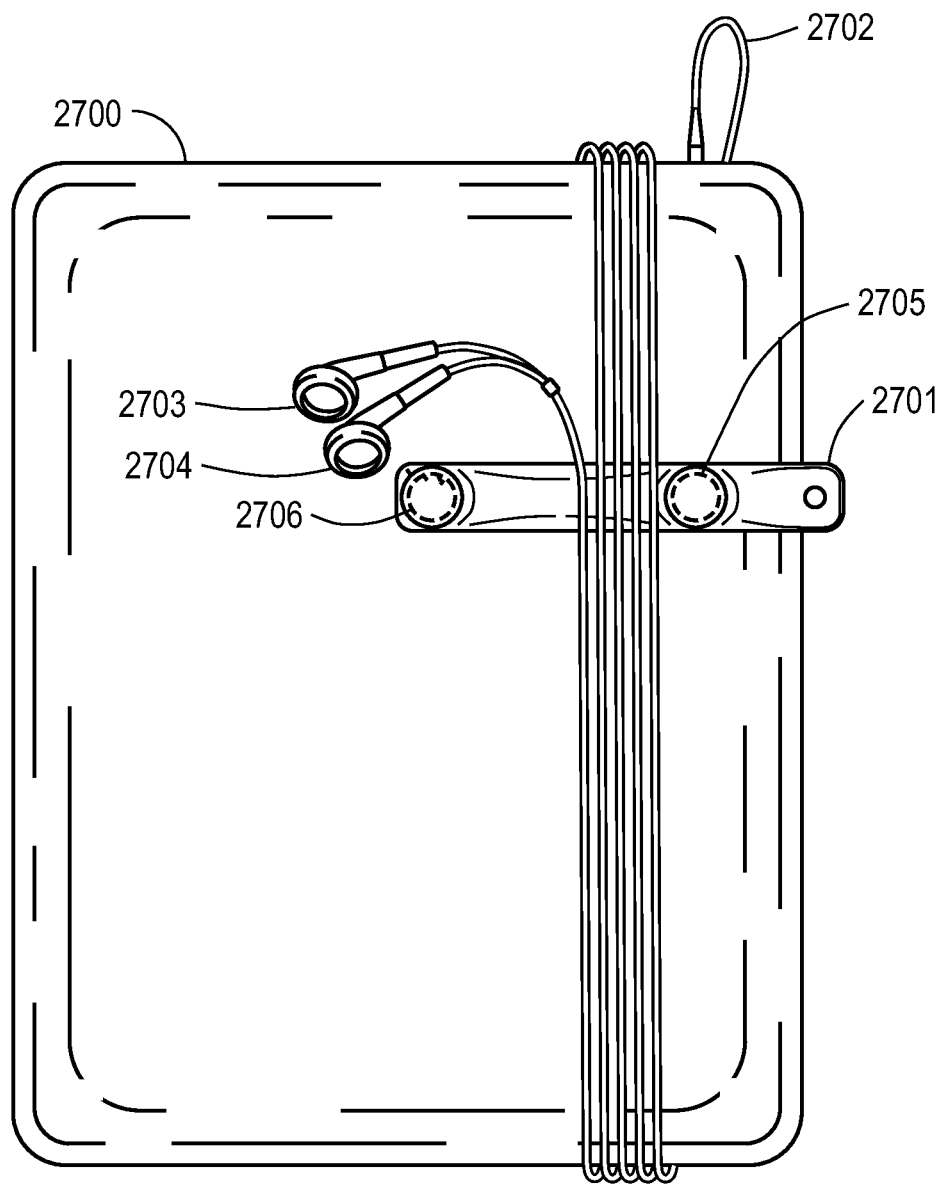
FIG. 27C illustrates the magnetic strap of FIG. 27A rotated 90 degrees, according to some embodiments.
Figure 27D:
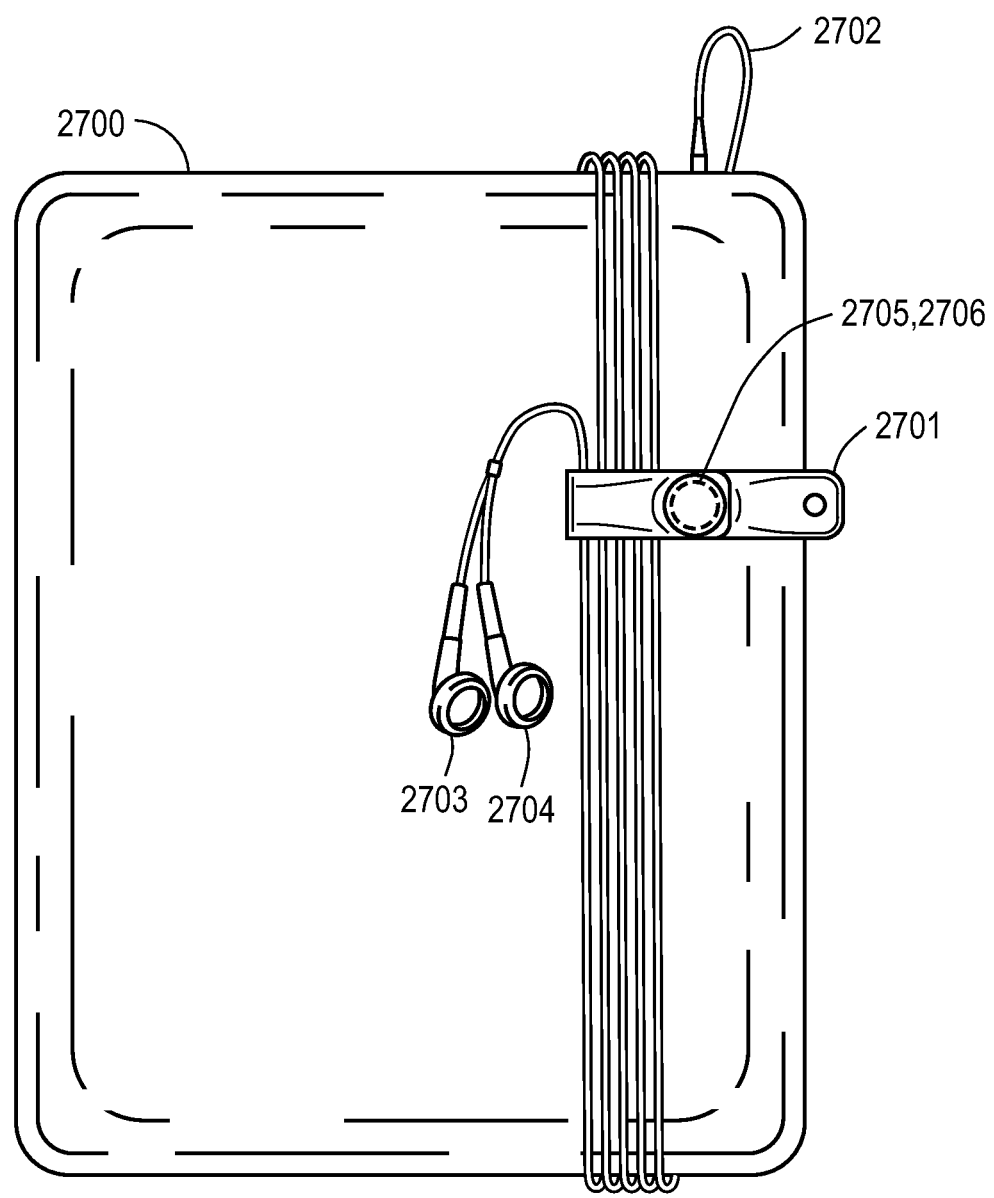
FIG. 27D illustrates the magnetic strap of FIG. 27C folded to form a loop, according to some embodiments.

FIGS. 27C and 27D are analogous to FIGS. 27A and 27B except that the magnetic strap 2701 in FIGS. 27C and 27D is rotated 90 degrees on the object 2700 and the cord 2702 is wrapped vertically around the object 2700.

Figure 27E:
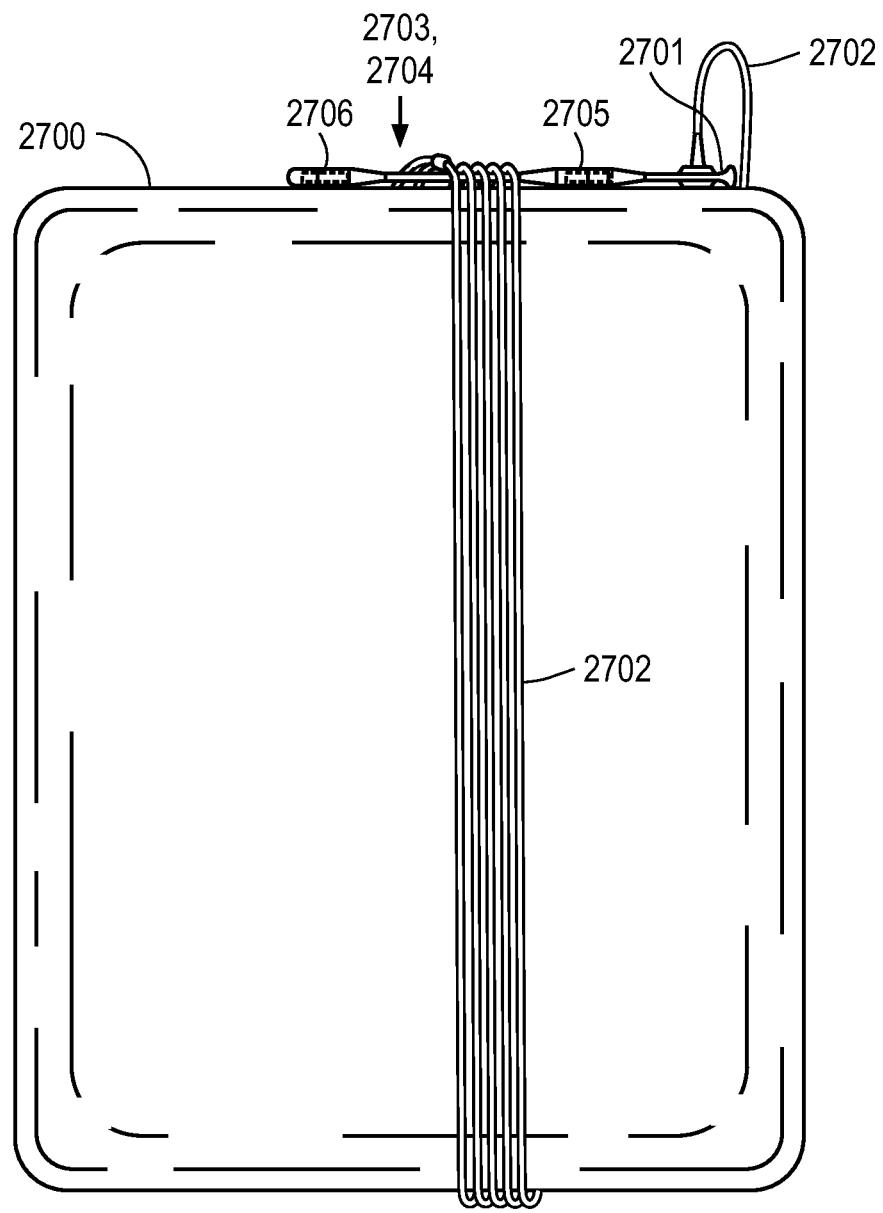
FIG. 27E illustrates the magnetic strap of FIG. 27A attached to a top surface of the object, according to some embodiments.
Figure 27F:
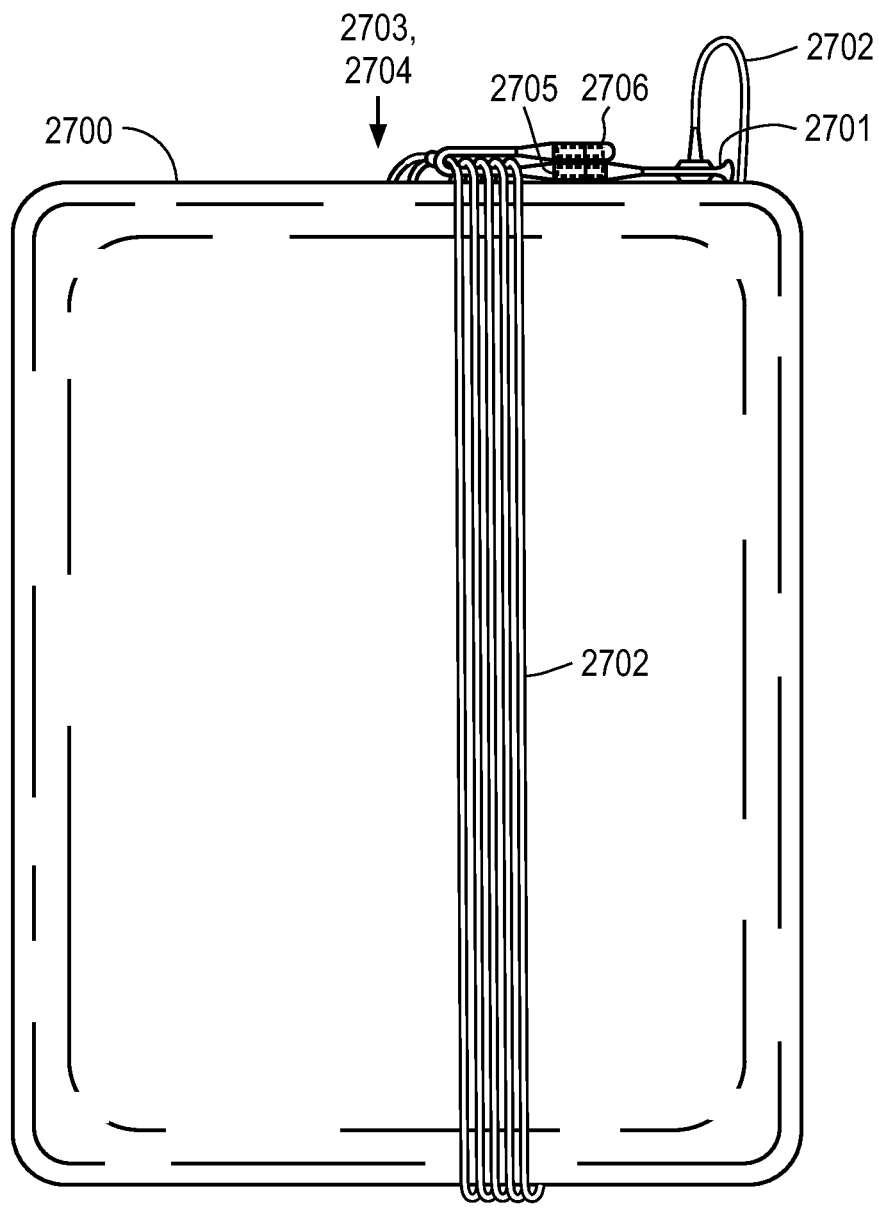
FIG. 27F illustrates the magnetic strap of FIG. 27E folded to form a loop, according to some embodiments.

FIGS. 27E and 27F are analogous to FIGS. 27A and 27B except that the magnetic strap 2701 in FIGS. 27E and 27F is attached to the top surface of the object 2700 and the cord 2702 is wrapped vertically around the object 2700. As illustrated in FIGS. 27E and 27F, the connector for the cord 2702 is attached through the cord-attachment mechanism of the magnetic strap 2701 to the corresponding connector on the object 2700.

Figure 27G:
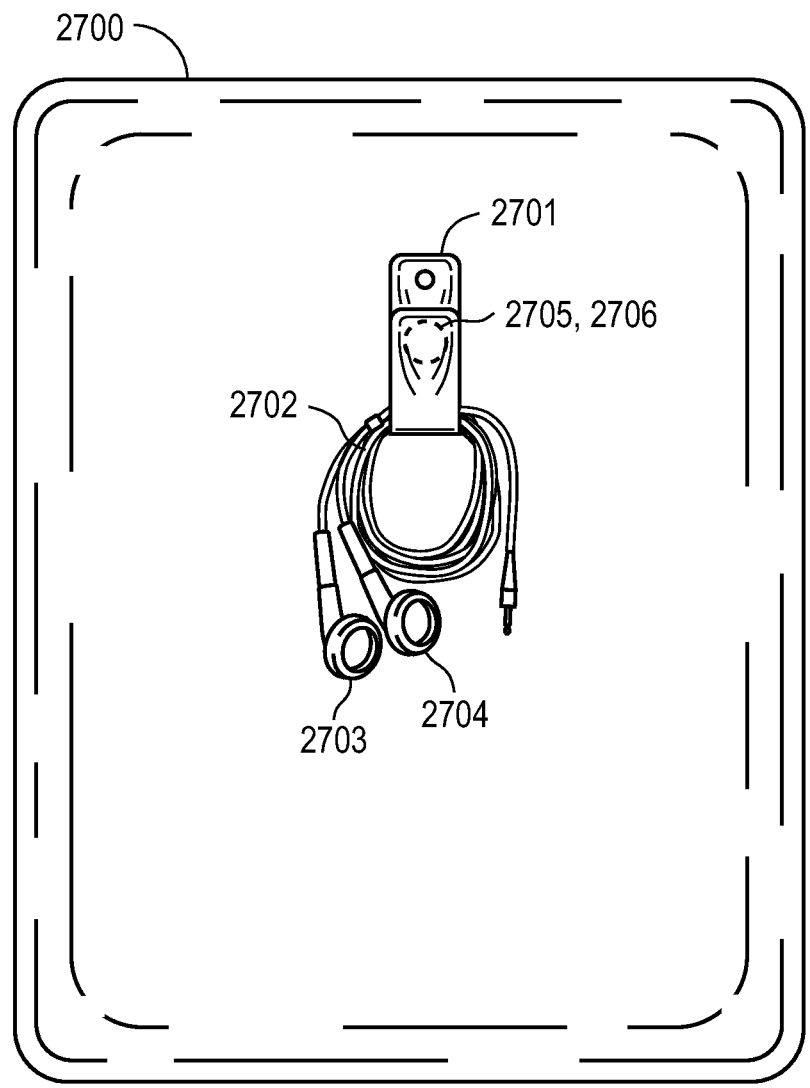
FIG. 27G illustrates the magnetic strap securing a cord and attached to the object, according to some embodiments.

FIG. 27G is analogous to FIG. 26C and illustrates the magnetic strap 2701 securing the cord 2702 and attached to the object 2700, according to some embodiments.

FIG. 17A illustrates a magnetic strap 1701 attached to an object, according to some embodiments. The magnetic strap 1701 can be any of the magnetic straps discussed above (e.g., the magnetic straps 101, 601, 701, 801, or 901). As illustrated in FIG. 17A, the magnetic strap 1701 includes magnets 1705 and 1706 and the cord 1702 includes speakers 1703 and 1704. In contrast to the embodiments described above, the cord-attachment mechanism of the magnetic strap 1701 is not present. In order to use the magnetic strap 1701 with the object, the magnetic strap 1701 is attached to the object. In some embodiments, the magnetic strap 1701 is magnetically attached to the object. In these embodiments, magnetic material (e.g., the magnetic material 103) is attached to the object (e.g., using adhesives, suction cups, Velcro, etc., as described above) so that at least one of magnets 1705 and 1706 can be magnetically attached to the magnetic material. When the magnets 1705 and/or 1706 are magnetically attached to the magnetic material, the magnetic strap is coupled to the object. In some embodiments, the magnetic strap 1701 is attached to the object using one selected from the group consisting of adhesives, suction cups, Velcro, and a van der Waals force attachment mechanism.

In some embodiments, at least one surface of the magnetic strap 1701 is a high-friction surface. In these embodiments, the high-friction surface faces the object and helps keep the magnetic strap 1701 from moving on the object.

As described above and as illustrated in FIGS. 17A and 17B, the cord 1702 can be wrapped around the object and the magnetic strap 1701 and secured by folding the magnetic strap 1701 into the loop, as described above.

Figure 28A:
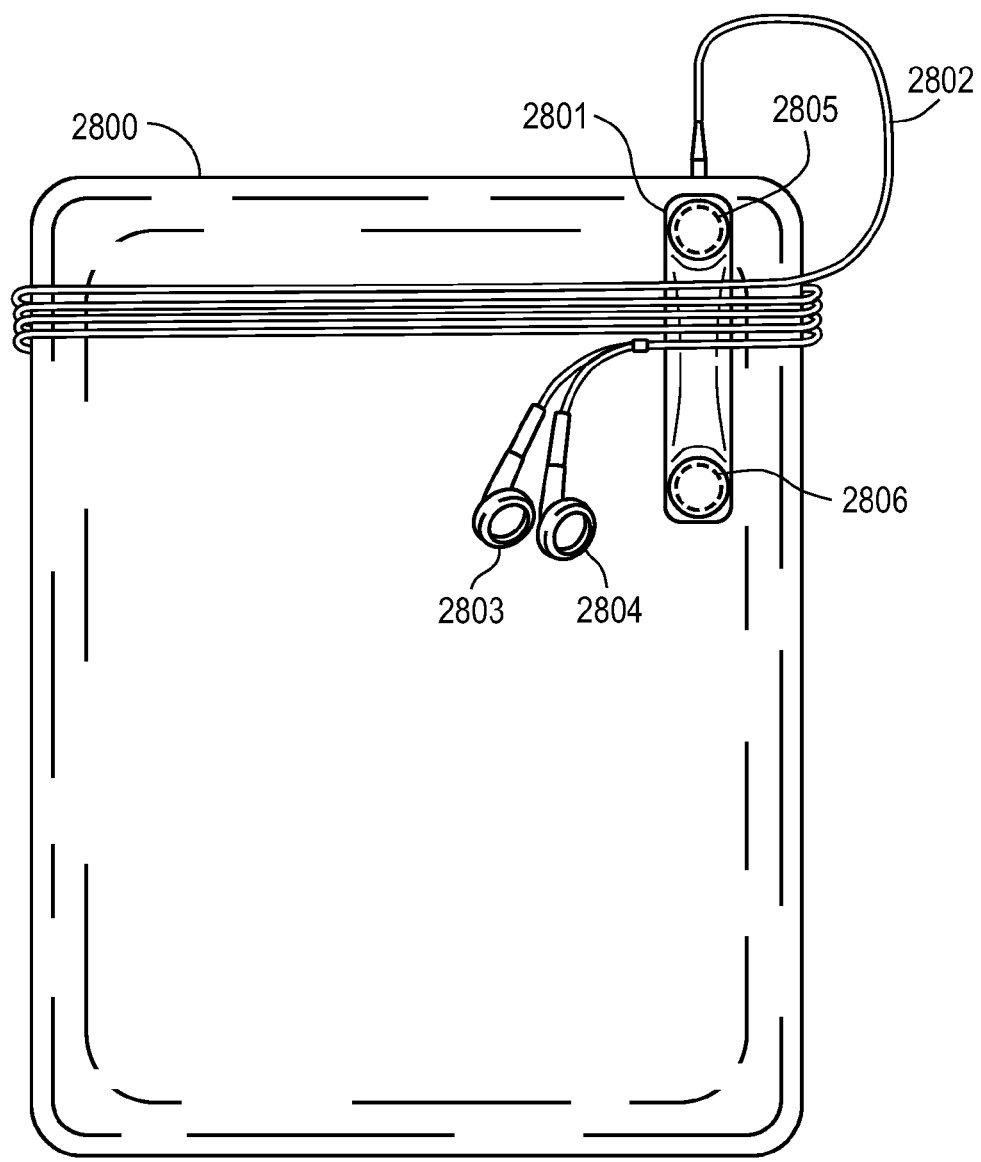
FIG. 28A illustrates a magnetic strap attached to an object, according to some embodiments.

FIG. 28A illustrates a magnetic strap attached to an object, according to some embodiments. Note that FIG. 28A is similar to FIG. 17A with the exception that the object 2800 has larger dimensions that the illustrated in FIG. 17A. The magnetic strap 2801 can be any of the magnetic straps discussed above (e.g., the magnetic straps 101, 601, 701, 801, or 901). As illustrated in FIG. 28A, the magnetic strap 2801 includes magnets 2805 and 2806 and the cord 2802 includes speakers 2803 and 2804. As with FIG. 17A, the cord-attachment mechanism of the magnetic strap 2801 is not present. In order to use the magnetic strap 2801 with the object, the magnetic strap 2801 is attached to the object. In some embodiments, the magnetic strap 2801 is magnetically attached to the object. In these embodiments, magnetic material (e.g., the magnetic material 103) is attached to the object (e.g., using adhesives, suction cups, Velcro, etc., as described above) so that at least one of magnets 2805 and 2806 can be magnetically attached to the magnetic material. When the magnets 2805 and/or 2806 are magnetically attached to the magnetic material, the magnetic strap is coupled to the object. In some embodiments, the magnetic strap 2801 is attached to the object using one selected from the group consisting of adhesives, suction cups, Velcro, and a van der Waals force attachment mechanism.

As described above and as illustrated in FIGS. 28A and 28B, the cord 2802 can be wrapped around the object 2800 and the magnetic strap 2801 and secured by folding the magnetic strap 2801 into the loop, as described above. Note that since the object 2800 is larger than the object illustrated in FIG. 17A, the number of loops of the cord 2802 around the object 2800 is less than the number of loops of the cord 1702 around the object illustrated in FIG. 17A.

Figure 28B:
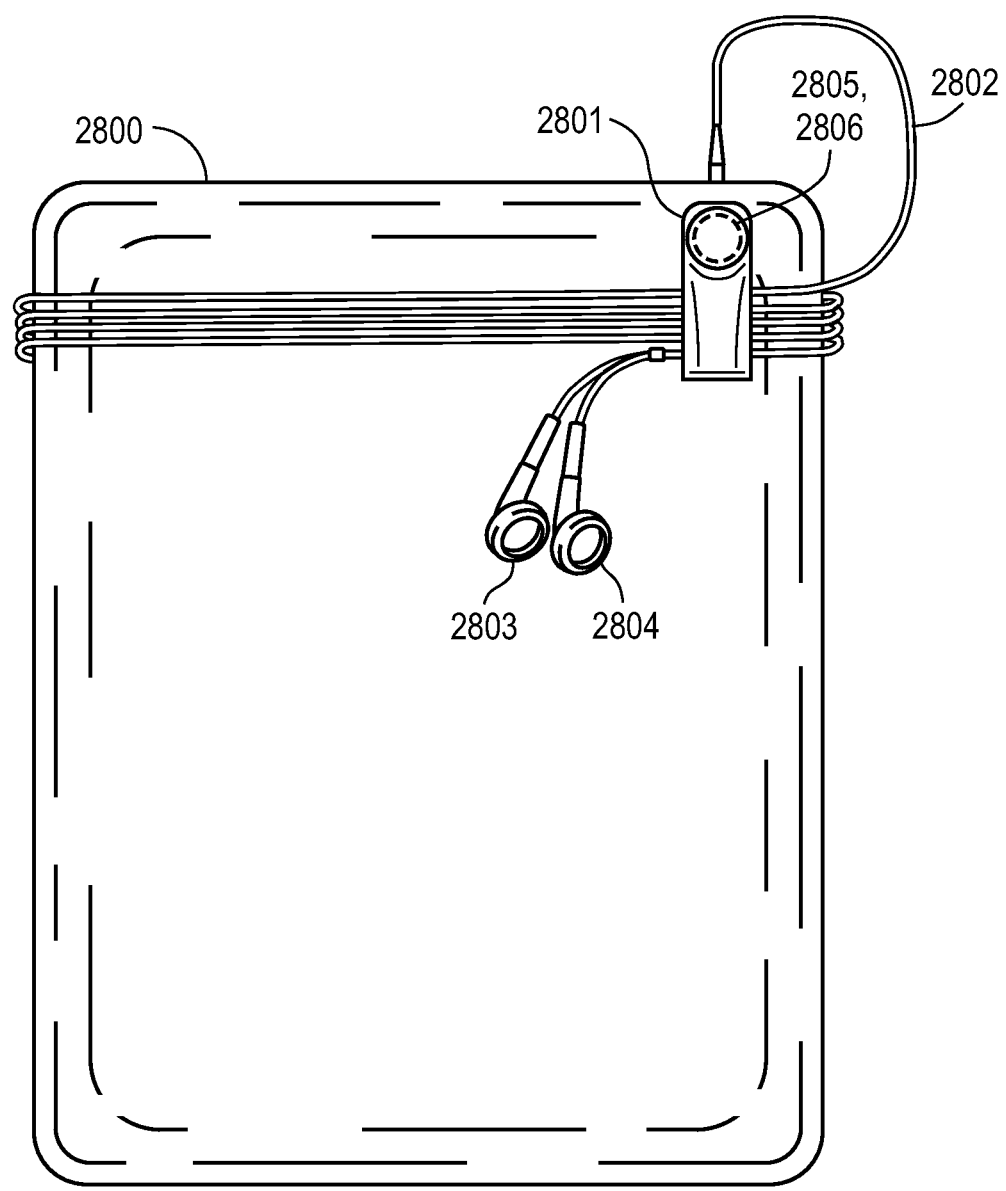
FIG. 28B illustrates the magnetic strap of FIG. 28A folded to form a loop, according to some embodiments.
Figure 28C:
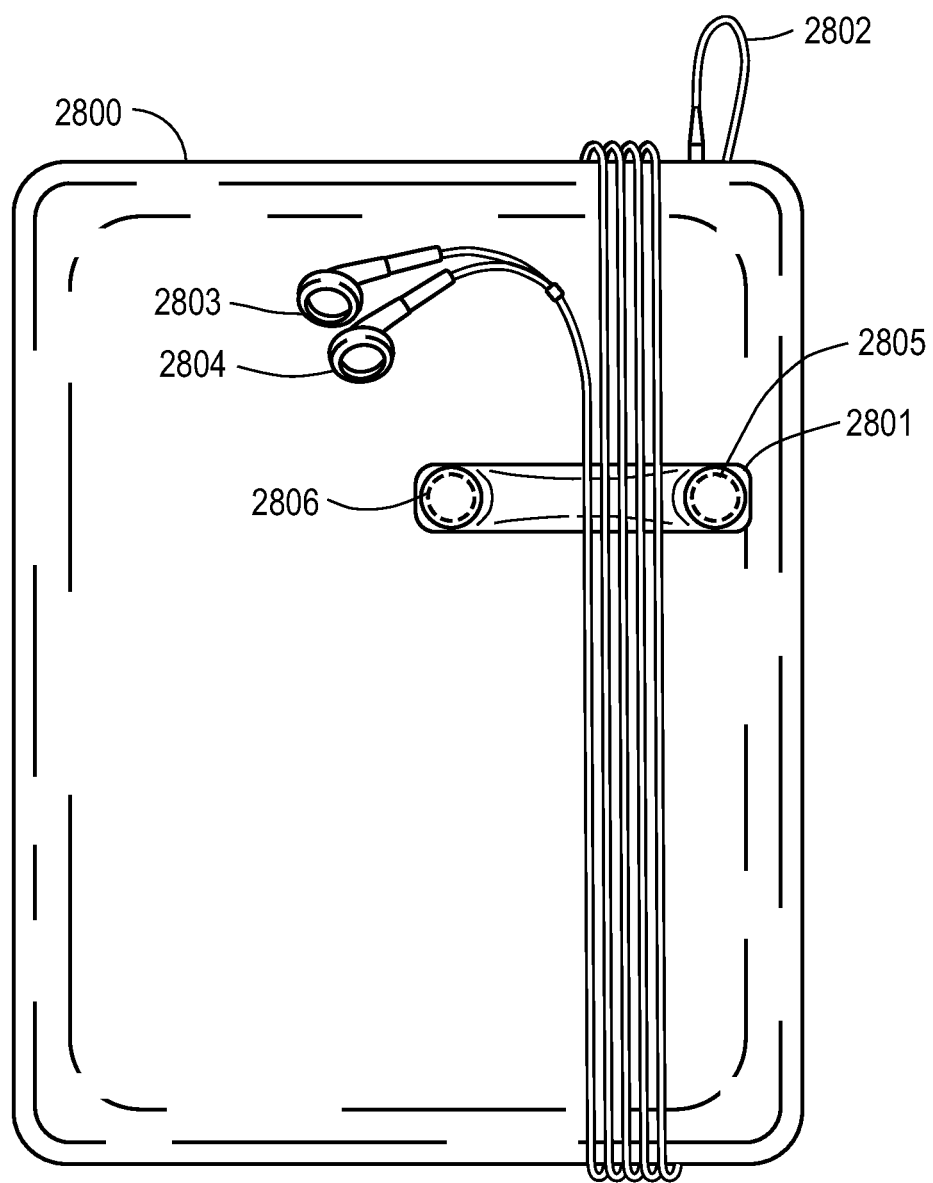
FIG. 28C illustrates the magnetic strap of FIG. 278 rotated 90 degrees, according to some embodiments.
Figure 28D:
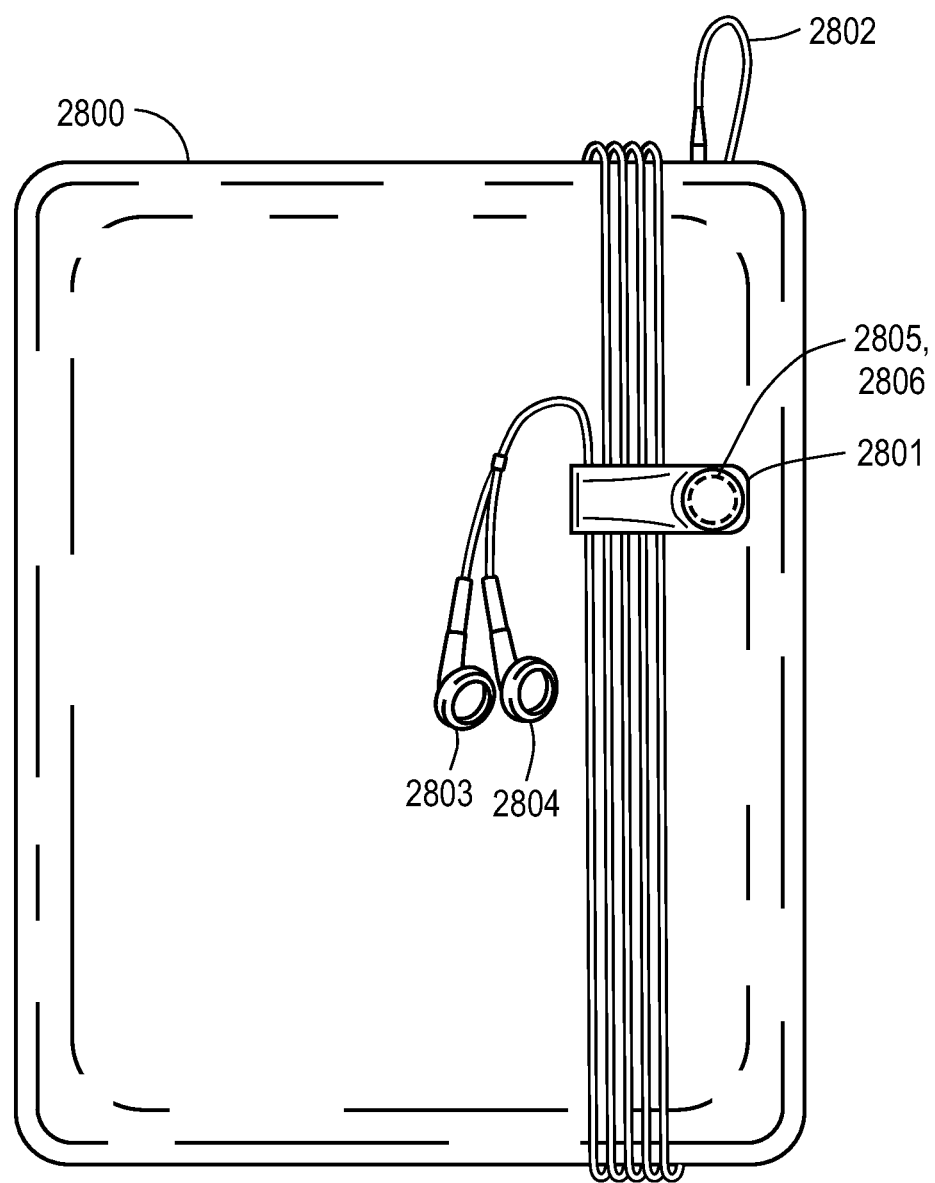
FIG. 28D illustrates the magnetic strap of FIG. 28C folded to form a loop, according to some embodiments.

FIGS. 28C and 28D are analogous to FIGS. 28A and 28B except that the magnetic strap 2801 in FIGS. 28C and 28D is rotated 90 degrees on the object 2800 and the cord 2802 is wrapped vertically around the object 2800.

Figure 28E:
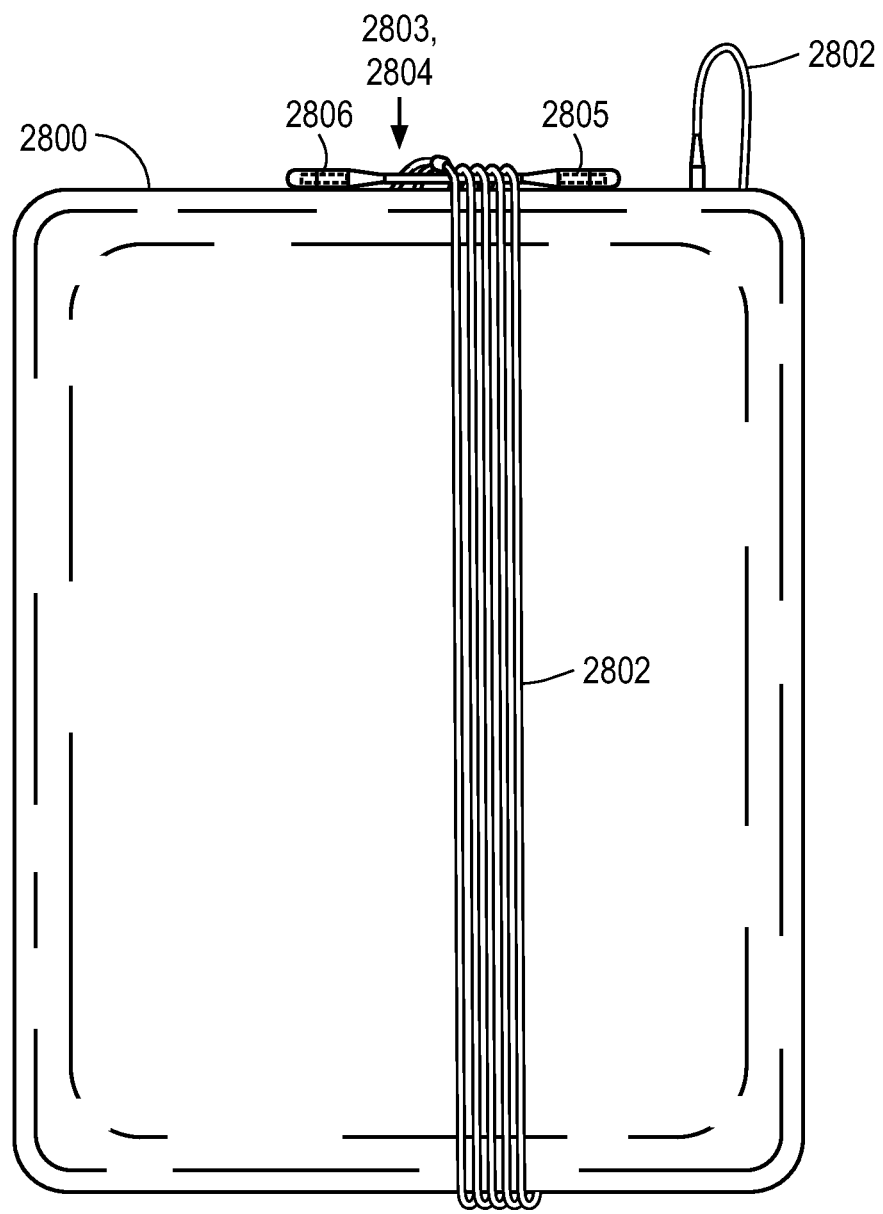
FIG. 28E illustrates the magnetic strap of FIG. 28A attached to a top surface of the object, according to some embodiments.
Figure 28F:
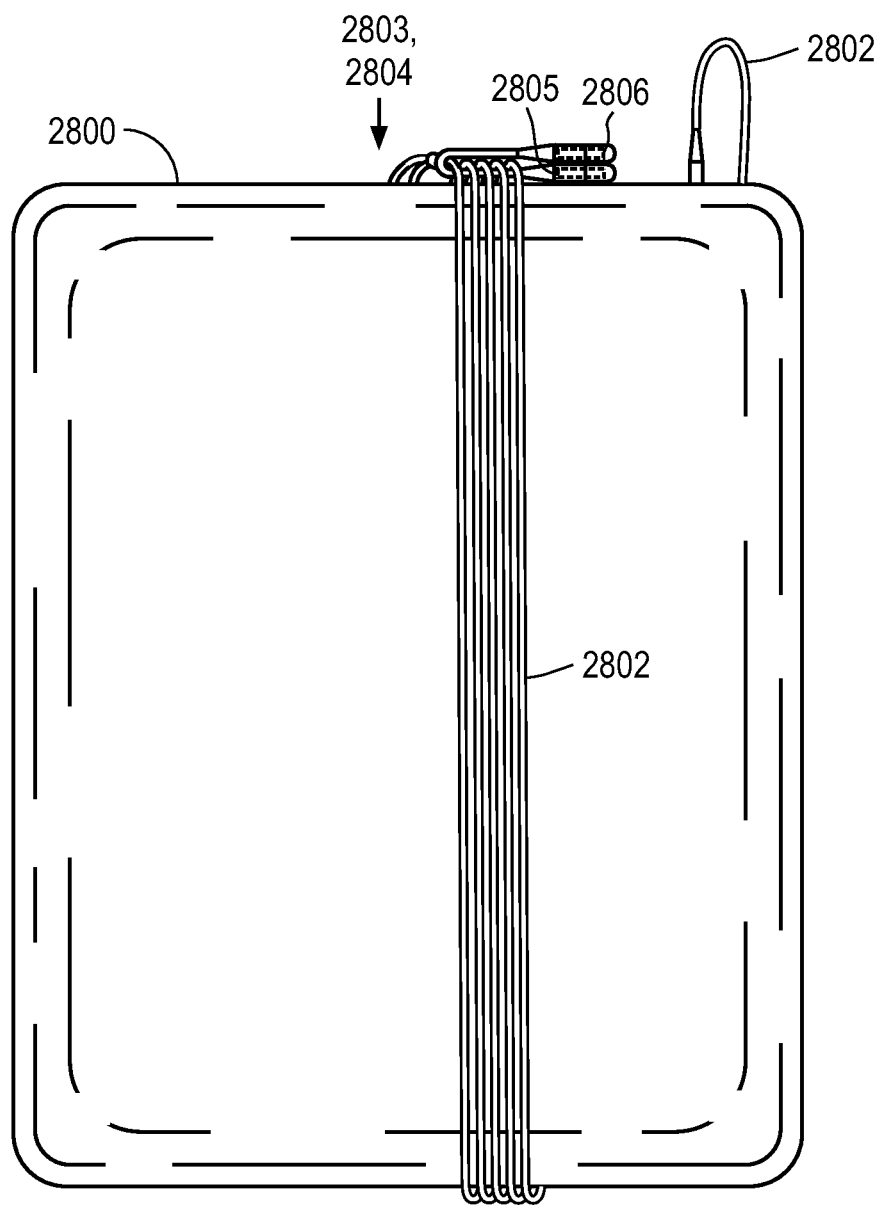

FIGS. 28E and 28F are analogous to FIGS. 28A and 28B except that the magnetic strap 2801 in FIGS. 28E and 28F is attached to the top surface of the object 2800 and the cord 2802 is wrapped vertically around the object 2800. As illustrated in FIGS. 28E and 28F, the connector for the cord 2802 is attached through the cord-attachment mechanism of the magnetic strap 2801 to the corresponding connector on the object 2800.

Figure 28G:
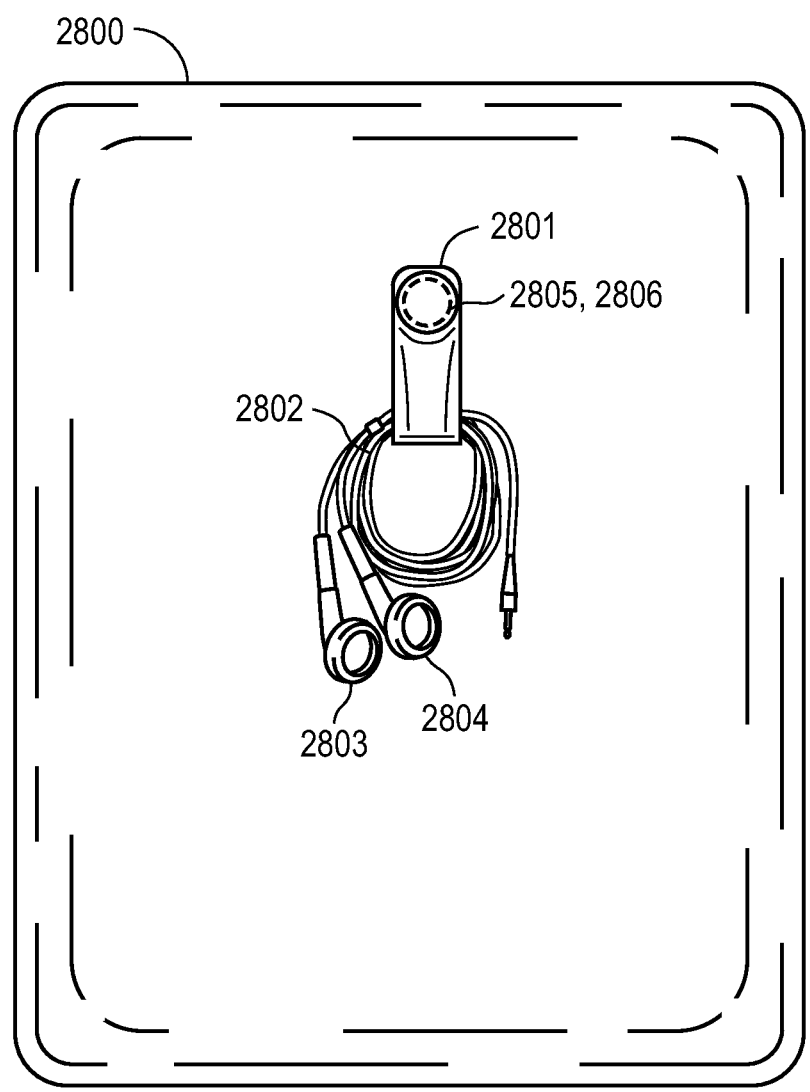

FIG. 28G is analogous to FIG. 26C and illustrates the magnetic strap 2801 securing the cord 2802 and attached to the object 2800, according to some embodiments.

Figure 18B:
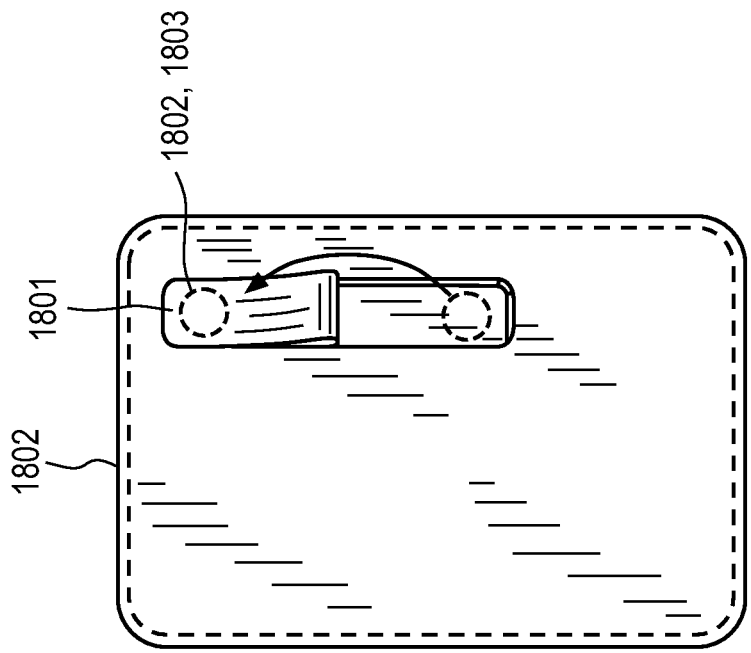
FIG. 18B illustrates the magnetic strap of FIG. 18A folded to form a loop, according to some embodiments.
Figure 18A:
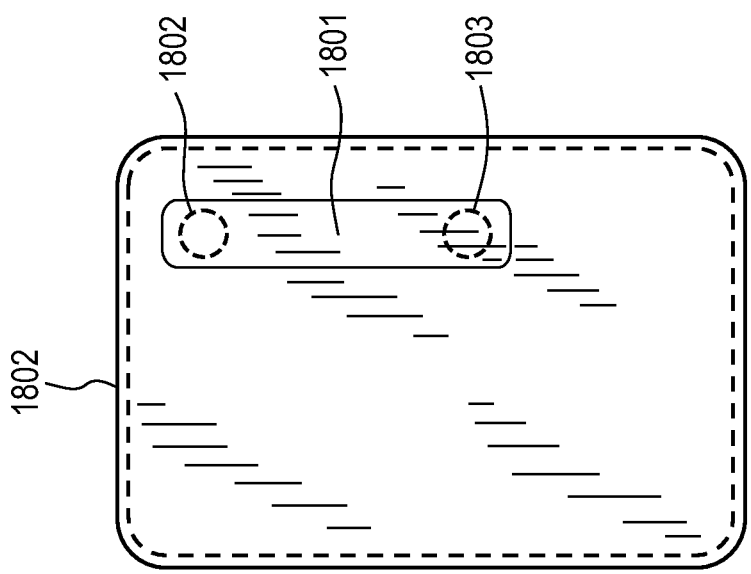
FIG. 18A illustrates a magnetic strap integrated into a case for an object, according to some embodiments.

FIG. 18A illustrates a magnetic strap 1801 integrated into a case 1812 for an object, according to some embodiments. Note that the term "case" refers to any type of material that covers or partially covers the object. For example, the case may include, but is not limited to flip case, a zipper case, a skin, an open-faced case, and the like. The magnetic strap 1801 includes magnets 1802 and 1803. The magnetic strap 1801 illustrated in FIG. 18A cannot be detached from the case 1812. However, the operation of the magnetic strap 1801 is similar to the operation of the magnetic straps described above. For example, the magnetic strap 1801 may be folded to form a loop, as illustrated in FIG. 18B. Note that the magnetic strap 1801 lies in a cavity of the case 1812. For example, FIG. 18B illustrates that the cavity is revealed when the magnetic strap 1801 is folded over to form the loop. In some embodiments, one of the magnets 1802 and 1803 is a magnet and the other is a magnetic material. In some embodiments, the magnetic strap 1801 is integrated into the object (e.g., the back of the object).

Figure 19C:
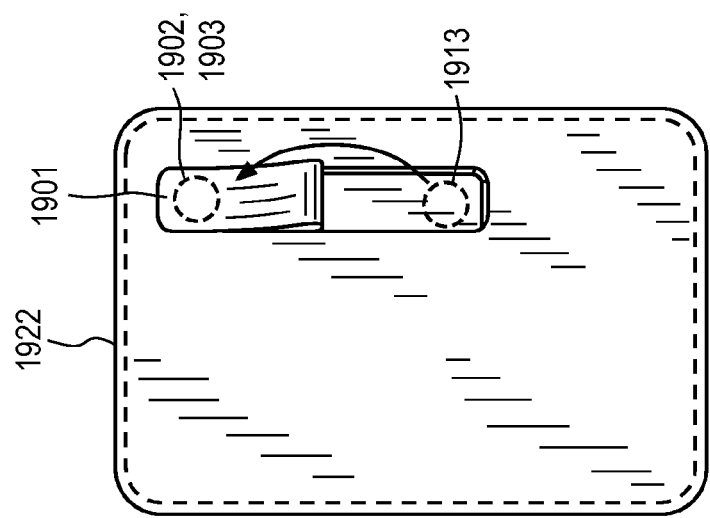
FIG. 19C illustrates the magnetic strap of FIG. 19B folded to form a loop, according to some embodiments.
Figure 19B:
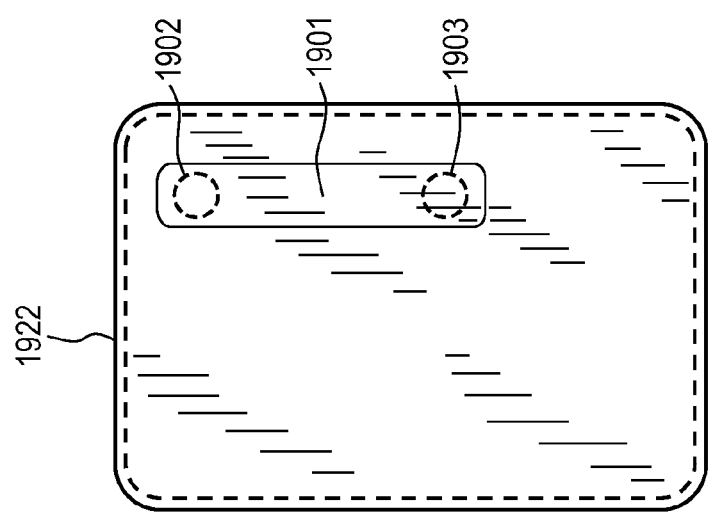
FIG. 19B illustrates a magnetic strap attached to the case illustrated in FIG. 19A, according to some embodiments.
Figure 19A:
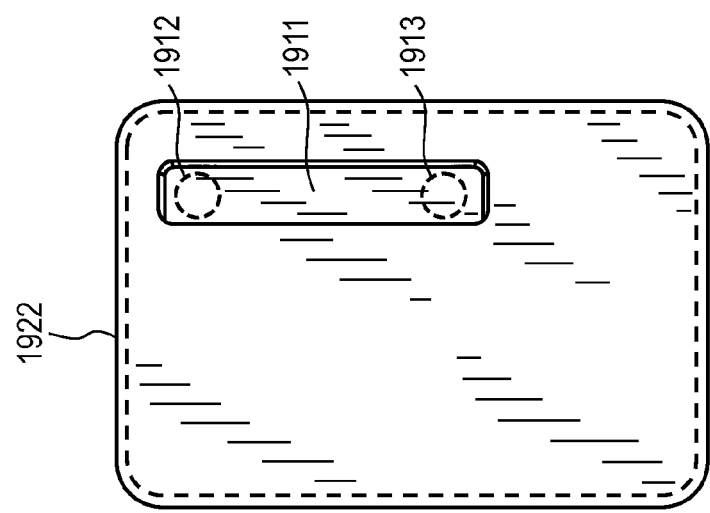
FIG. 19A illustrates a case for an object, according to some embodiments.

FIG. 19A illustrates a case 1922 for an object, according to some embodiments. The case 1922 includes a cavity 1911. Magnets 1912 and 1913 are embedded into cavity 1911 of the case 1922. A magnetic strap 1911 including magnets 1902 and 1903 may be magnetically attached to the case 1922, according to some embodiments. For example, the magnets 1902 and 1903 may be magnetically attached to the magnets 1912 and 1913, respectively. Note that magnetic materials (e.g., as described above) may be substituted for the magnets 1902, 1903, 1912, and 1913. Also note that only one of the pair of magnets 1902 and 1912 may be substituted for the magnetic material. Similarly, only one of the pair of magnets 1903 and 1913 may be substituted for the magnetic material. In other words, at least one magnet is required for each end of the magnetic strap. The operation of the magnetic strap 1901 is similar to the operation of the magnetic straps described above. For example, the magnetic strap 1901 may be folded to form a loop, as illustrated in FIG. 19C. In contrast to the magnetic strap 1801, the magnetic strap 1901 may be removed from the case 1922 (e.g., see FIG. 19A). In some embodiments, the magnetic strap 1901 is integrated into the object (e.g., the back of the object).

Figure 19E:
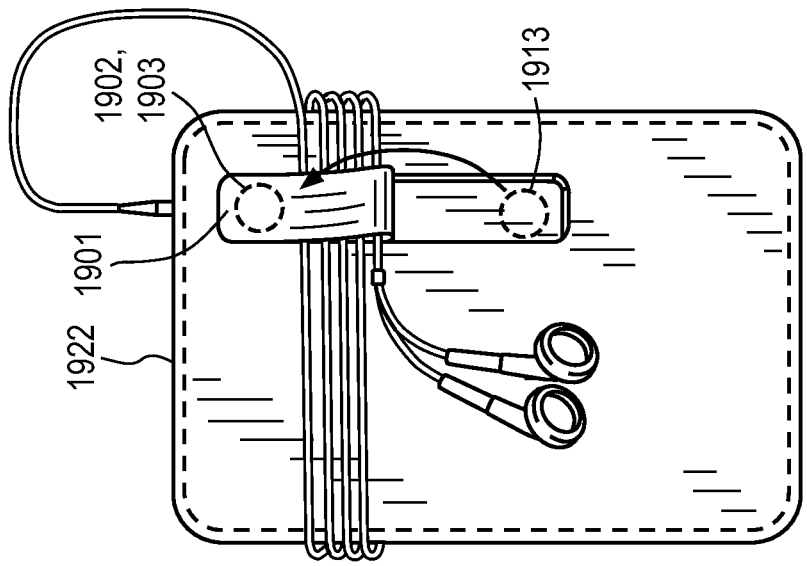
FIG. 19E illustrates the magnetic strap of FIG. 19D folded over to form a loop around the cord, according to some embodiments.
Figure 19D:
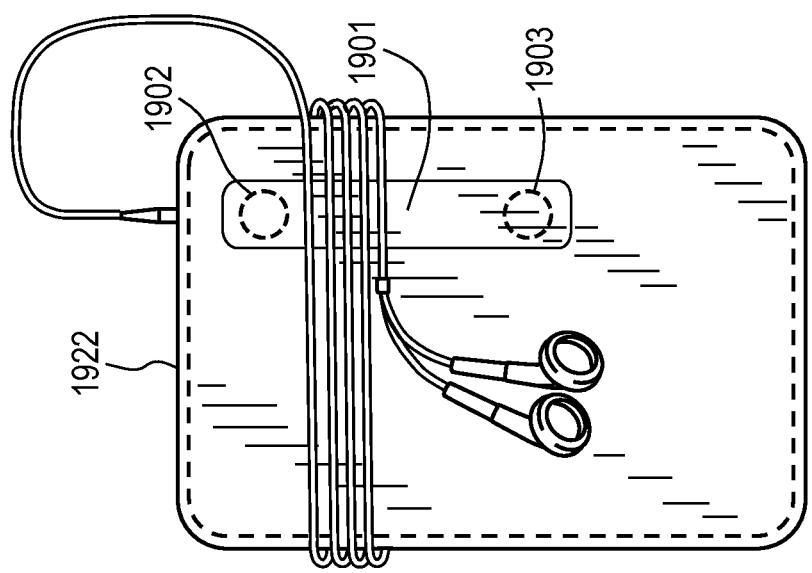
FIG. 19D illustrates a cord wrapped around the magnetic strap and the object of FIG. 19B, according to some embodiments.
Figure 19F:
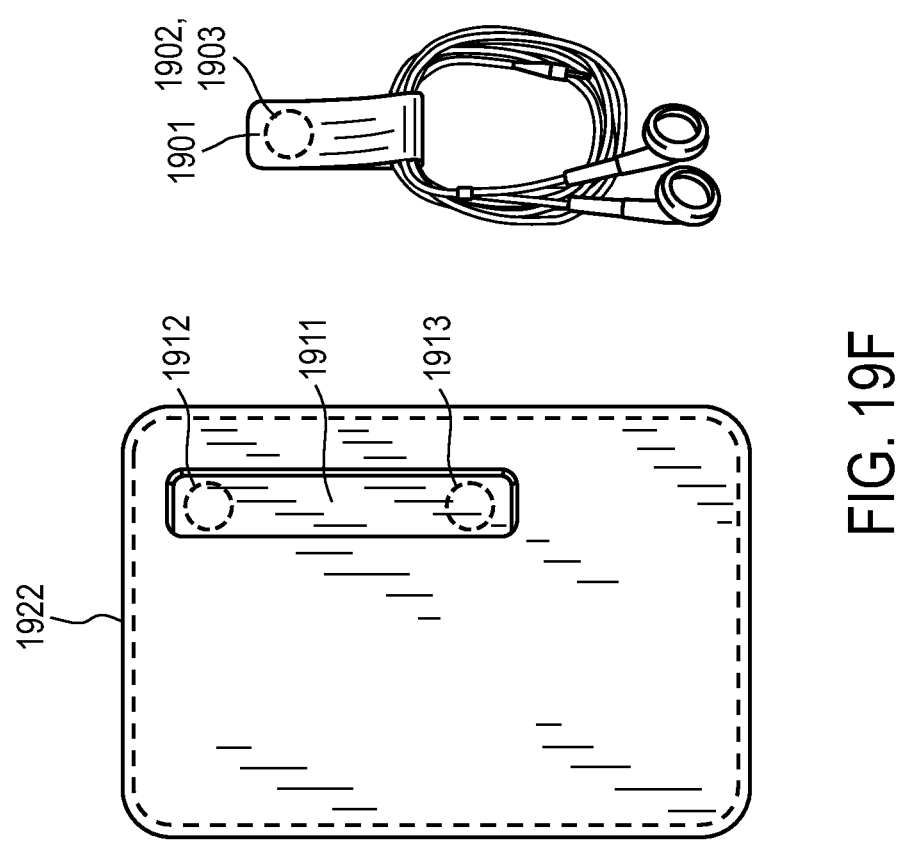
FIG. 19F illustrates the strap securing the cord detached from the object, according to some embodiments.

FIGS. 19D-19F illustrate how the magnetic strap 1901 is used to secure a cord. FIG. 19D illustrates a cord wrapped around the magnetic strap 1901 and the case 1922, FIG. 19E illustrates the magnetic strap 1901 folded over to form a loop around the cord, and FIG. 19F illustrates the magnetic strap 1901 securing the cord and detached from the case 1922, according to some embodiments.

Method of Manufacturing

Figure 24:
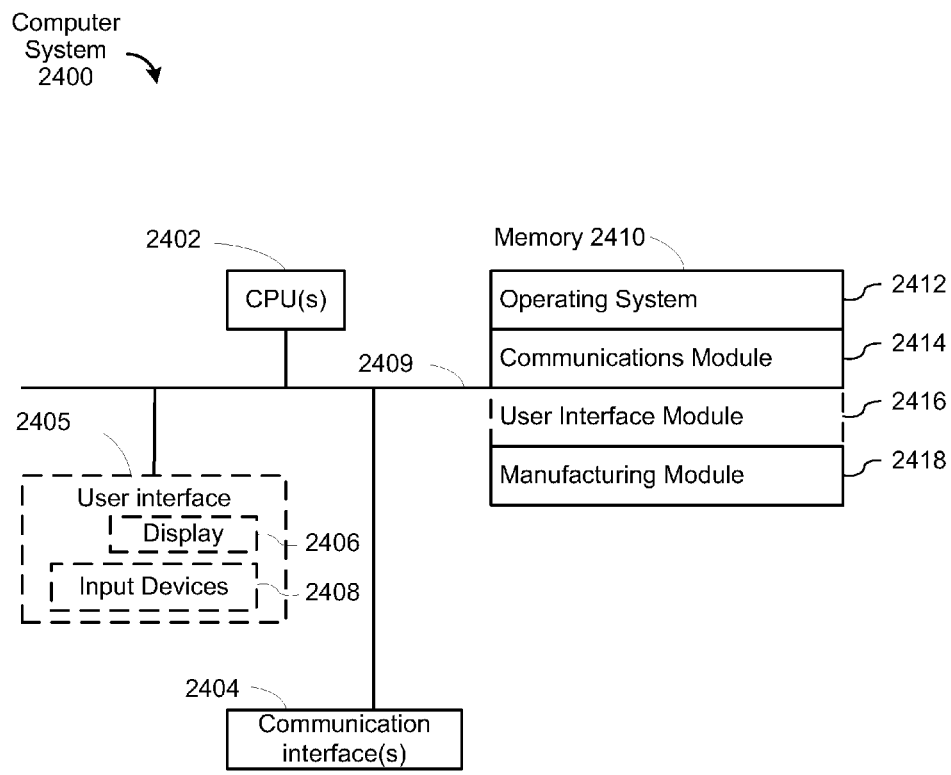
FIG. 24 is a block diagram illustrating a computer system for manufacturing a cord management system, according to some embodiments.

FIG. 24 is a block diagram illustrating a computer system 2400 for manufacturing a cord management system, according to some embodiments. The computer system 2400 typically includes one or more processing units (CPU's) 2402, one or more network or other communications interfaces 2404, memory 2410, and one or more communication buses 2409 for interconnecting these components. The communication buses 2409 may include circuitry (sometimes called a chipset) that interconnects and controls communications between system components. The computer system 2400 optionally may include a user interface 2405 comprising a display device 2406 and input devices 2408 (e.g., keyboard, mouse, touch screen, keypads, etc.). Memory 2410 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 2410 may optionally include one or more storage devices remotely located from the CPU(s) 2402. Memory 2410, or alternately the non-volatile memory device(s) within memory 2410, comprises a computer readable storage medium. In some embodiments, memory 2410 stores the following programs, modules and data structures, or a subset thereof:
- an operating system 2412 that includes procedures for handling various basic system services and for performing hardware dependent tasks;
- a communication module 2414 that is used for connecting the computer system 2400 to other computers via the one or more communication interfaces 2404 (wired or wireless) and one or more communication networks, such as the Internet, other wide area networks, local area networks, metropolitan area networks, and so on;
- an optional user interface module 2416 that receives commands from the user via the optional input devices 2408 and generates user interface objects in the optional display device 2406; and
- a manufacturing module 2418 that manufactures or otherwise controls manufacturing equipment to manufacture a cord management system, as described with respect to FIGS. 25 and 35-37.

Each of the above identified elements may be stored in one or more of the previously mentioned memory devices, and corresponds to a set of instructions for performing a function described above. The set of instructions can be executed by one or more processors (e.g., the CPUs 2402). The above identified modules or programs (i.e., sets of instructions) need not be implemented as separate software programs, procedures or modules, and thus various subsets of these modules may be combined or otherwise re-arranged in various embodiments. In some embodiments, memory 2410 may store a subset of the modules and data structures identified above. Furthermore, memory 2410 may store additional modules and data structures not described above.

Although FIG. 2400 shows a "computer system," FIG. 2400 is intended more as functional description of the various features which may be present in a set of computer systems than as a structural schematic of the embodiments described herein. In practice, and as recognized by those of ordinary skill in the art, items shown separately could be combined and some items could be separated.

Figure 25:
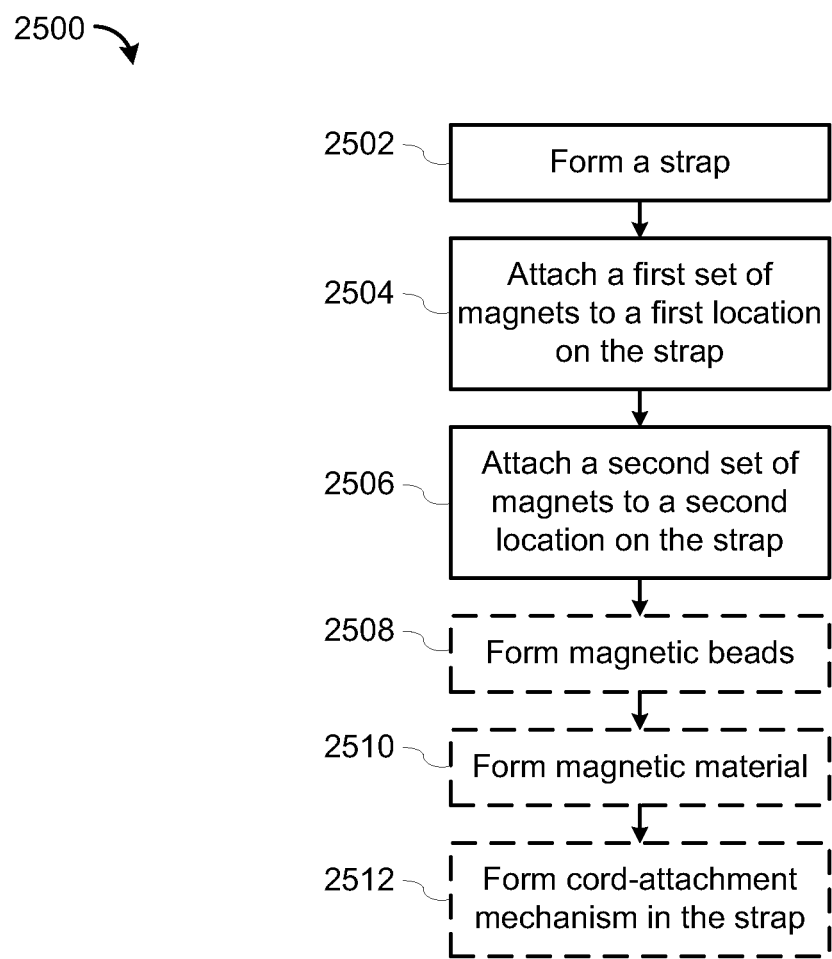
FIG. 25 is a flowchart of a method for manufacturing a cord management system, according to some embodiments.

FIG. 25 is a flowchart of a method 2500 for manufacturing a cord management system, according to some embodiments. In some embodiments, the method of manufacturing the cord management system may be performed by the computer system 2400. The computer system 2400 forms (2502) a strap. The computer system 2400 then attaches (2504) a first set of magnets to a first location on the strap and attaches (2506) a second set of magnets to a second location on the strap. In some embodiments, the strap includes at least two modes of operation. In a first mode of operation, the first set of magnets is magnetically attached to the second set of magnets so that a first segment of the strap located between the first set of magnets and the second set of magnets forms a loop configured to secure a cord that is wrapped around the strap. In a second mode of operation, the first set of magnets is magnetically detached from the second set of magnets so that the first segment no longer forms the loop.

In some embodiments, the computer system 2400 forms (2506) magnetic beads.

In some embodiments, the computer system 2400 forms (2508) magnetic material.

In some embodiments, the computer system 2400 forms (2510) a cord-attachment mechanism in the strap.

The method 2500 may be governed by instructions that are stored in a computer readable storage medium and that are executed by one or more processors of one or more computer systems. Each of the operations shown in FIG. 25 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by one or more processors.

Cases

FIGS. 29-34 illustrate various embodiments of a cord management system that include a case for an object. As disclosed above, there are many types of cases, including, but not limited to, flip cases, zipper cases, skins, open-faced cases, bumpers, and the like. The embodiments illustrated in FIGS. 29-34 provide additional detail to what was described above with relation to the cases of FIGS. 18A-19F. FIGS. 18A-18B illustrate a magnetic strap 1801 integrated into a case 1802. FIGS. 29A-29I and 30A-30I provide more detail regarding integrated strap and case designs. FIGS. 19A-19F illustrate a magnetic strap 1901 removably attached to a case 1922. FIGS. 31A-31J and 32A-32J provide more detail regarding case designs with removable magnetic straps. Furthermore, FIGS. 33A-33L and 34A-34L illustrate another embodiment for a case design which can be used with a removable magnetic strap.

As stated above, FIGS. 29A-29I illustrate another embodiment of an integrated case similar to that of FIGS. 18A-18B. FIG. 29A illustrates a strap 2904 integrated into a case 2902 for an object, according to some embodiments. In some embodiments, the strap 2904 includes magnets (or other magnetic materials) 2908 and 2906 (shown in FIG. 29B) at attachment points 2912 and 2910 (shown in FIG. 29B). It should be noted that in any given embodiment only one of the pair of magnets 2906 and 2908 needs to be a magnet, the other may be any magnetic material. The operation of the strap 2904 is similar to the operation of the magnetic straps described above. For example, the strap 2904 may be folded to form a loop, wherein magnets located at attachment points 2910 and 2912 keep the strap 2904 in the looped position, as illustrated in FIG. 29A.

The case 2902 at least partially covers the back side of an object when the object is located within the case. The strap 2904 is permanently attached to the case 2902. In some embodiments, the strap 2904 is formed as an integral part of the case 2902. For example, in some embodiments, both the case and the strap are formed together by a molding process. In other embodiments, the strap 2904 is permanently attached to the case after being manufactured separately. Permanent attachment mechanisms include sewing, joining, fastening, binding, welding, fusing, and similar permanent attachment techniques. In some embodiments, as shown in FIG. 29A, the case includes a cavity 2914. The cavity 2914 is sized to fit the strap 2904. In some embodiments the case 2902 is a first color, such as black, while the strap 2904 is another color, such as pink, blue, orange, green, etc.

In some embodiments, as shown in FIG. 29B, the strap 2904, when in an unfolded flat position, lies flush with the exterior surface of the case 2902. In other embodiments, as shown in FIG. 29C, the strap 2904 partially protrudes from the cavity 2914, such that a portion of the depth of the strap 2904 protrudes from the exterior surface of the case 2902. In still other embodiments, as shown in FIG. 29D, the case 2902 does not include a cavity, so the strap 2904 sits on top of the exterior surface of the case 2902 when in a flat unfolded position.

As shown in FIG. 29E, in some embodiments, at least one case magnet (or other magnetic material) 2916 is included in the case 2902. When the strap is in an unfolded flat position, strap magnet/magnetic material 2908 will be magnetically attached to the case magnet/magnetic material 2916. When the case magnet/magnetic material 2916 is included in the case 2902, the strap 2904 can be kept in an unfolded position despite gravity and/or movement (as discussed above with respect to FIGS. 15G-H.) The case magnet/magnetic material 2916 may be especially useful in the embodiment shown in FIG. 29E, where no cavity exists in the case because the case magnet/magnetic material 2916 holds the strap 2904 in its unfolded position. However, some embodiments with a cavity having the same depth as the depth of the strap like that of FIGS. 29A-29B will include a case magnet/magnetic material 2916. Similarly, embodiments with a cavity having a smaller depth than the depth of the strap, like that of FIG. 29C, will include a case magnet/magnetic material 2916. FIGS. 29A-29C illustrate embodiments that do not include case magnet/magnetic material 2916. However, alternatives to these figures that include one or more magnets (or other magnetic materials) embedded into the cavity are also envisioned.

It should be noted that while FIG. 29E illustrates only case magnet/magnetic material 2916, which can be magnetically coupled to strap magnet/magnetic material 2908, in other embodiments an additional case magnet/magnetic material can also be embedded in the case 2902 and can be magnetically coupled to strap magnet/magnetic material 2906 for any of the embodiments discussed above. It should be noted that in any given embodiment at least one of the coupled pair of a case magnet/magnetic material and a strap magnet/magnetic material should be a magnet, while the other may be substituted with magnetic material.

In any of the embodiments described herein, the case 2902 can be made of any suitable material such as leather, plastic, rubber, fabric, polymer, metal, etc. In polymer embodiments, the polymer is selected from the group consisting of silicone and an elastomer (e.g., thermoplastic elastomer). In some embodiments, the polymer is resistant to dust. These polymers may be used in manufacturing processes such as injection molding, casting, compression molding, and die cutting (as discussed above with respect to FIGS. 6A-6C). In fabric embodiments, the fabric may be a Neoprene fabric, leather, silk, cotton, denim, foil, Mylar, and the like. The fabric case will likewise be manufactured by any suitable sewing or joining technique, depending on the fabric chosen. In some embodiments, a combination of the above mentioned materials will be used to cover various portions of the case. For example, as discussed in more detail with respect to FIGS. 33A-L and 34A-L, in some embodiments the case will be a combination of plastic, metal, rubber and/or silicone. In some embodiments, at least a portion of the case 2902 includes a non-skid material in order to facilitate easy gripping by the user. In some embodiments, at least a portion of the case 2902 is made of a slippery material having a lower coefficient of friction than another portion of the case 2902, in order to allow the case to slide easily into and out of a pocket. Furthermore, in embodiments including metal, at least the portion of the case covering the object's antenna (if any), will not be made of metal. In some embodiments, the case will also include a separate finish, such as a painted finish, a scratch resistant finish, a mirrored finish, etc. Note that the term "case" refers to any type of material that covers or partially covers the object. For example, the case may include, but is not limited to flip case, a zipper case, a skin, a bumper, an open-faced case illustrated in these figures, and the like.

The strap 2904 will likewise be made of any suitable material, including any of the materials described above for the case. In some embodiments, the strap 2904 will be made of the same material(s) as the case, while in other embodiments the strap will be made of distinct material(s). In some embodiments, the strap is composed of a material that is substantially memoryless. (A material that is memoryless is a material that does not exhibit elastic hysteresis, as discussed above with respect to FIGS. 6A-6C.) In some embodiments, the memoryless material is an elastic polymer.

The elastic polymers embodiments of the case and strap may be manufactured by processes such as injection molding, casting, compression molding, and die cutting (as discussed above with respect to FIGS. 6A-6C). The type of manufacturing process selected may depend on factors such as a desired manufacturing volume, manufacturing time, and manufacturing costs of the strap 2904 and the case 2902. Additionally, the type of manufacturing process selected may depend on a desired aesthetic design of the strap 2904 and case 2902. For example, if the design of the strap requires that the strap magnets/magnetic materials 2906 and 2908 are to be encapsulated in the material of the strap, an injection molding process may be used. For example, in some embodiments, a two-shot injection molding process is used.

In some embodiments, the strap will have dimensions of 3.09 inches in length, by 0.51 inches in width, and a depth sufficiently thick to hold a magnet/magnetic material embedded therein. In other embodiments, the strap will have dimensions of 2.94 inches in length, by 0.51 inches in width, and a depth sufficiently thick to hold a magnet/magnetic material embedded therein. In still other embodiments, the strap will have dimensions of 3.02 inches in length, by 0.51 inches in width, and a depth sufficiently thick to hold a magnet/magnetic material embedded therein. Thus, in many embodiments, the strap will not have a length of greater than 4 inches or a width of greater than 1 inch. Note that the dimensions of the strap 2904 may be selected to accommodate cords of varying lengths and thicknesses. The dimensions of the strap 2904 are also selected to accommodate objects (e.g., portable electronic devices, etc.) of varying sizes. Although not shown in these figures, in some embodiments, the strap 2904 includes a handle at one end, which is a raised portion or high friction of material of the strap 2904 that allows a user to grab onto the end of the strap (as discussed with respect to FIGS. 6A-6C). In some embodiments, the strap includes a notch (e.g., for a fingernail), cut-out, or other surface feature that allows a user to more easily grasp the strap 2904. Furthermore, although not shown in these figures, the straps need not have uniform thicknesses as shown in these figures, but may also include variable cross-sections, like the embodiments shown in FIGS. 6A-9C.

The magnets of the strap or the case may include any element or composition that is capable of producing a magnetic field. For example, the magnets may include one or more of magnetic metallic elements (e.g., iron, cobalt, nickel, etc.), composite magnets (e.g., ceramic or ferrite magnets, alnico magnets, ticonal magnets, injection molded magnets, flexible magnets), rare earth magnets (e.g., samarium-cobalt magnets, neodymium-iron-boron magnets, etc.), electromagnets, sets of any of these magnets, or any material or composition that produces a magnetic field. In some embodiments, the magnets are Neodymium magnets. In some embodiments, the Neodymium magnets are a grade N42. In some embodiments, the magnets are solid magnets. In some embodiments, the magnets are selected from the group consisting of donut (ring) magnets, horseshoe-shaped (U-shaped) magnets, cylindrical magnets, disc-shaped magnets, rectangular magnets, and the like. In some embodiments, the magnets are sets of magnets. The selection of the size, shape, and number of the magnets may depend on factors including, but not limited to, a desired magnetic strength, a desired form factor, a desired aesthetic, and the manufacturing process used to produce the strap.

Although not required, one or more of the case and strap "magnets" (e.g. 2906, 2908, or 2916) can be made of a magnetic material rather than a magnet. The magnetic material can be made of any material that produces a magnetic field in response to an applied magnetic field. In some embodiments, the magnetic material is selected from the group consisting of a ferromagnetic material and a paramagnetic material. In some embodiments, the magnetic material is low-carbon steel. In some embodiments, the magnetic material is Vanadium carbonyl. The magnetic material may be any shape, including, but not limited to, a disc, a square, a rectangle, a decorative shape, and the like. The size and shape of the magnetic material may be selected based on factors including, but not limited to, an aesthetic design of the case and strap. Furthermore, as described in more detail, with respect to FIGS. 33A-33L, the entire case back, or a portion thereof, can be made of a magnetic material.

In some embodiments, as shown in the top view of FIG. 29F, the case 2902 will include a cord-attachment mechanism 2918 to secure a cord (and/or a connector for a cord) to the case 2902. Furthermore, in some embodiments, the cord-attachment mechanism 2918 also secures a cord (and/or a connector for a cord) to the object within the case 2902 in addition to any securing mechanisms the object itself may include to secure a cord (and/or a connector for a cord) to the object. In some embodiments, the cord-attachment mechanism 2918 will have slits such as one slit, two slits configured as an "X" or a "+," slits in the shape of a star etc. to accommodate cords or connectors of cords of varying sizes as discussed with respect to FIGS. 10A-11C. Similarly, other mechanisms to accommodate cords or connectors of cords of varying sizes, such as the grommets discussed with respect to FIGS. 11A-11C may be used. In other embodiments, as shown here, a simple hole 2918 in the case is provided. In some embodiments, this hole 2918 is larger than the cord or connector for the cord, and does not substantially contribute to securing the cord to the object or the case. In other embodiments, the hole 2918 is dimensioned smaller than the cord or the connector for the cord and is made of an elastic material such that the hole 2918 expands as the cord (or the connector for the cord) is inserted into the hole 2918 thus securing the cord to the case. Note that the diameter of the hole 2918 may be determined based on factors including the range of diameters for cords and/or connectors for the cords to be used with the case. In some embodiments, the cord-attachment mechanism 2918 is formed from an elastic polymer (e.g., by injecting an elastic polymer into a mold for the case.) For example, the elastic polymer may be the elastic polymers described above. In some embodiments, the cord-attachment mechanism 2918 is composed of the same polymer as the case or strap. In some embodiments, the cord-attachment mechanism is composed of different, but compatible, polymers.

In some embodiments, as shown in FIG. 29G, the case includes holes for object elements such as speakers, a dock/charger connector, a camera/lens, an LED/flash, a ringer mode switch, an on/off switch, etc. In some embodiments, one hole will accommodate more than one element. For example, in the embodiment of FIG. 29G, a large bottom hole 2920 is configured to expose the dock/charger connector and the speakers. Similarly, in the embodiment of FIG. 29G, a single back hole 2922 is configured to expose the LED/flash and the camera/lens. FIG. 29G also illustrates a side hole 2924 which is configured to expose the ringer mode switch. Alternative embodiments will provide differently shaped holes such as a larger and/or differently shaped hole for the LED/flash and camera/lens and a larger and/or differently shaped hole for the dock/charger connector and the speakers. Similarly, in other embodiments, separate holes are provided for each of the LED/flash and the camera/lens. Likewise, in some embodiments, separate holes are provided for each of the speakers and the dock charger. In some embodiments holes will also be provided for access to volume buttons. The exact dimensions and placement of the holes is determined based on the specific requirements of the object inserted into the case 2902. For example, in cases designed to house an object with a track wheel (e.g., a track wheel for a thumb placed on the side of the object), a track wheel hole is also included in the case. Similarly, for objects that include a touch screen or touch sensitive area for controlling the object's functions, holes will be provided to access these elements as well. In some embodiments, a large hole is provided in the front of the case for viewing the screen (whether touch sensitive or otherwise). In some embodiments, the front of the case may include a transparent screen cover. In some embodiments, the camera hole may include a small built in lens to improve the quality of pictures taken with the object's built-in camera lens. In some embodiments, the edges of the holes are beveled, re-enforced with a stronger material, or covered with a protective coating. These additions allow the holes to withstand greater wear and tear during use than the case could otherwise withstand. In some embodiments, the case may include a hole to allow a support stand element to pass through the case.

As shown in FIGS. 29F and 29G, in some embodiments certain elements, such as buttons, rather than just being available through a hole as described above, are instead covered. FIG. 29F illustrates a cover 2926 over a button on the top edge of an object, and FIG. 29G illustrates covers 2928 and 2930 over buttons on a side edge of the object. In some embodiments, the button covers (e.g., 2926, 2928, and 2930) are made of a pliable material such as rubber or silicone. In other embodiments, the button covers are made of a rigid material such as plastic or metal. Any of the above mentioned materials discussed with respect to the case 2906 may be used for the button covers. The button covers keep the object within the cover more protected from dirt, debris, and moisture which could otherwise accumulate. Furthermore, the button covers protect the buttons from scratches. Similarly, in some embodiments, the holes for the camera, LED/flash, and screen are covered with a transparent material such as glass or transparent plastic to similarly protect the device. In some embodiments, the button covers are recessed with respect to the exterior surface of the case as shown in FIG. 29H, such that the button covers 2928 and 2930 do not stick out past the profile of the case 2902, and are thus less likely to be inadvertently pressed. In other embodiments, as shown in FIGS. 29F and 29G, the button covers are not recessed with respect to the exterior surface of the case. It should be noted that in some embodiments, the button covers are colored differently from the case in order to make them easier for a user to locate, and to add to the aesthetic appeal of the case.

As stated above, the operation of the strap 2904 is similar to the operation of the straps described above with respect to almost all of the figures in this application. For example, the strap 2904 may be folded to form a loop, securing a cord wrapped around the case 2902 as illustrated in FIG. 29I. Also, as discussed above, while magnetic attachment mechanisms are described as existing at the attachment points 2910 and 2912 (shown in FIG. 29B), other attachment mechanisms are also envisioned. In other embodiments snaps, hook and loop mechanisms, Velcro, adhesives, magnetic beads, suction devices, van der Waals force attachment mechanisms, buttons, buckles, springs, bistable springs (e.g., a slap bracelet), sleeves that insert into slots, pegs that are inserted into holes, hinges, and snaps may be used. For example, in some embodiments, a hook portion of a Velcro attachment is provided at attachment point 2910 while a loop portion of a Velcro attachment point is provided at 2912 (or vice versa). When the two attachment points are brought into contact with one another, they will keep the strap 2904 in a looped position as shown in FIG. 29A. In another example, in some embodiments, a stud portion of a snap attachment is provided at attachment point 2910 while a socket portion of a snap attachment point is provided at 2912 (or vice versa). When the two attachment points are brought into contact with one another, they will keep the strap 2904 in a looped position as shown in FIG. 29A. In another example, in some embodiments, a button is provided at attachment point 2910 while a button hole is provided at 2912 (or vice versa). When these two attachment points are brought into contact with one another, they will keep the strap 2904 in a looped position as shown in FIG. 29A.

FIGS. 30A-30I illustrate embodiments of a case similar to FIGS. 29A-29I, with the exception that the object for which the case is made has different dimensions than the object shown in FIGS. 29A-29I.

FIGS. 31A-31J illustrate an embodiment of a case similar to FIGS. 29A-29I above except that in these embodiments the strap is semi-permanently, rather than permanently attached to the case.

In some embodiments, the semi-permanent attachment is done by means of a case magnet 3106 having a strength greater than the case magnets discussed above, or by using larger or multiple magnets. In some embodiments, the stronger case magnet 3106 is three to ten times stronger than the case and strap magnets discussed with respect to FIGS. 29A-I (e.g. 2906, 2908, and 2916). Note that the combination of the grade (i.e., the composition of materials, wherein a higher number for the grade indicates a higher magnetic strength per unit volume), the diameters, the shape, and the thickness of a magnet determines the magnetic strength of the magnet. Thus, the magnetic strength of a larger magnet (e.g., larger surface area, diameter, and/or thickness) may have greater magnetic strength than a smaller magnet of a similar grade. In some embodiments, to achieve a stronger force between case magnet 3106 and strap magnet/magnetic material 3110, case magnet 3106 can comprise high grade magnets (e.g., higher "N" number), or magnets with larger surface area, diameter, or thickness. In some embodiments, case magnet 3106 can comprise multiple magnets or any other configuration, material, or combination of materials that provides a greater magnetic force between case magnet 3106 and strap magnet/magnetic material 3110.

In some embodiments, as shown in FIG. 31A, the stronger case magnet 3106 is embedded within cavity 3114. In other embodiments, no cavity is provided, and the case magnet is embedded into a portion of the case. In some embodiments, the case 3102 also includes another magnet or magnetic material 3108 embedded in the cavity 3114, and being similar to the magnets and magnetic materials discussed above. As discussed above, the magnet/magnetic material 3108 is weak enough that magnet/magnetic material 3112 of the strap 3104 can be easily detached therefrom in order to form a loop for holding a cord (similar to the embodiment shown in FIG. 29I). However, the stronger case magnet 3106 is strong enough that a much greater force must be exerted to detach strap magnet/magnetic material 3110 from stronger case magnet 3106, thus making the strap 3104 unlikely to become detached from the case 3102 unless the user specifically detaches it. It should be noted that in some embodiments, the strap magnet/magnetic material 3110 is also stronger than the magnets discussed with respect to FIGS. 29A-I, thus making the connection between strap magnet/magnetic material 3110 and case magnet 3106 even harder to detach.

FIG. 31B shows a strap, held in a case 3102 having a cavity 3114, which is the depth of the strap 3104 (such that the strap 3104 in an unfolded flat position lies flush with the exterior surface of the case 3102). FIG. 31C shows an embodiment in which the cavity 3114 has a smaller depth than the strap, such that a portion of the depth of the strap 3104 protrudes from the exterior surface of the case 3102. In FIG. 31D, the case 3102 does not include a cavity, so the strap 3104 sits on the surface of the exterior surface of the case 3102 when in a flat unfolded position, as shown. In each of these embodiments, the second magnet/magnetic material, case magnet/magnetic material 3108, is optional.

In other embodiments, as shown in FIG. 31E, the semi-permanent attachment(s) are non-magnetic attachment area(s) 3116 and 3118 on the strap 3104 with a corresponding attachment area(s) 3120 and 3122 on the case 3102. In some embodiments, the non-magnetic attachment mechanisms include snaps (as shown here). In other embodiments, they include hook and loop mechanisms, Velcro, adhesives, magnetic beads, suction devices, van der Waals force attachment mechanisms, buttons, buckles, springs, bistable springs (e.g., a slap bracelet), sleeves that insert into slots, plastic interlocking strip fasteners (e.g., Ziploc® brand closure mechanisms), pegs that are inserted into holes, or hinges. In FIG. 31E, an embodiment of the case is illustrated in which two non-magnetic attachment areas 3120 and 3122 are included within cavity 3114. In other embodiments, only one non-magnetic attachment area 3120 may be used. Furthermore, in some embodiments, a non-magnetic attachment area 3120 is also included in embodiments that do not have a cavity. In some embodiments, when the case 3102 does not have a cavity, the non-magnetic attachment area 3120 can be a separate attachment device (similar to the magnetic material 1524 of FIGS. 15 and 16). The user can then attach this non-magnetic attachment area 3120 on any portion of the device desired. FIG. 31F illustrates a non-magnetic attachment area 3120 located in the center of the back of the case 3102.

In other embodiments, the semi-permanent attachment is a non-magnetic mechanism on one edge 3124 of strap 3104 and cavity 3114 as shown in FIG. 31G. In some embodiments, the edge attachment mechanism 3124 is a zipper, plastic interlocking strip fastener (e.g., Ziploc® brand closure mechanism), hook and loop mechanism, adhesive, magnetic strip, suction device, buckle, sleeve that inserts into a slot, hinges, etc.

FIG. 31H shows an embodiment where the case includes a cavity 3114 that also exposes a headphone jack or similar cord-attachment area 3126 of the object. In these embodiments, any of the straps discussed with respect to FIGS. 6-9 can be used in conjunction with the case. Specifically, the embodiments of FIGS. 6-9 include a cord-attachment mechanism (e.g. 609) located at one end of the strap, where the cord-attachment mechanism is configured to removably attach the strap to the cord and sometimes also to the object. As such, when a strap 3104 with a cord-attachment mechanism 3128 is used with the case 3102 having a cavity 3114 that exposes a cord-attachment area 3126, one mechanism for semi-permanent attachment of the strap 3104 to the case 3102 is the cord-attachment mechanism (609, 709, 810, 909 respectively) of the strap 3104 used in conjunction with a cord (or the connector for the cord) that is inserted therein, as shown in FIG. 31I. In some embodiments the cord-attachment mechanism 3128 is used in conjunction with the magnetic or non-magnetic semi-permanent attachments discussed above. For example, FIG. 31J shows an embodiment of the case 3102 without a cavity 3114 in which the strap 3104 is semi-permanently attached to the case 3102 by means of the cord (or the connector for the cord), cord-attachment mechanism 3128 and at least one magnet/magnetic material of the strap 3112.

FIGS. 32A-32J illustrate embodiments of a case similar to FIGS. 31A-31J, with the exception that the object for which the case is made has different dimensions than the object shown in FIGS. 31A-31J.

FIGS. 33A-33L illustrate other embodiments of a case 3302 that can be paired with a removable, detachable, or semi-permanent strap 3304. FIG. 33A illustrates the case with a back 3306 made of a magnet or of a magnetic material, referred to herein as a magnetic material back 3306. The magnetic material back 3306 can be made of any ferromagnetic material and/or paramagnetic material. In some embodiments, the magnetic material is low-carbon steel. In some embodiments, the magnetic material is Vanadium carbonyl. In some embodiments, the magnetic material back 3306 is made of a pliable material such as rubber, silicone, an elastomer (e.g., thermoplastic elastomer), or other pliable materials discussed above, wherein the pliable material encapsulates small magnets or magnetic material elements within it. For example, in some embodiments the back is made of an elastomer or paint with iron flecks in it. It should be noted that although the back is discussed in detail herein, other portions of the case may also be made of a magnet or magnetic material. For example, in some embodiments, substantially all of the case, including the sides and front, is made of a metal magnetic material (with the exception of portions near or over a device's antenna). Furthermore, in some embodiments only a portion of the back of the case includes the magnetic material back 3306. For example, in alternative embodiments the magnetic material back 3306 covers only three-quarters, half, one quarter, or less of the back of the object.

A case 3302 with a magnetic material back 3306 allows a user to position a strap 3304 on any desired portion of the magnetic material back that the user desires, like magnets on a refrigerator door. In other words, as long as the strap 3304 includes at least one magnet 3308 or 3310, the strap can be placed in any position on the magnetic material back 3306. For example, FIG. 33B illustrates the strap 3304 in a similar position to the straps shown in FIGS. 29A-32J (to facilitate retaining a cord wrapped horizontally around the case). Alternatively, the strap 3304 can be placed horizontally on the magnetic material back 3306 as shown in FIG. 33C, which would facilitate retaining a cord wrapped vertically around the case. Furthermore, as shown in FIG. 33D, the strap 3304 can also be positioned in the middle of the magnetic material back 3306. A variety of other positions of the strap should be apparent to one of skill in the art.

Another advantage of a case 3302 with a magnetic material back 3306 is that various types of the straps can be equally well accommodated. For example, FIG. 33E shows a strap 3304 including a cord-attachment mechanism 3312, like those straps shown in FIGS. 6-9 (e.g. cord-attachment mechanism 609), used in conjunction with the magnetic material back 3306. Whereas FIG. 33B shows a strap 3304 that does not include a cord-attachment mechanism, similar those straps shown in FIGS. 17-19, also used in conjunction with the magnetic material back 3306.

Furthermore, not only can the strap 3304 be positioned by a user such that it neatly holds a wrapped cord when the cord is attached to an object as shown in FIG. 33F, but this design also allows a user to position the strap 3304 in optimal positions for holding the cord when it is not attached to the object. For example, the user may place the strap 3304 in the middle of the magnetic material back 3306 for holding an unplugged looped cord, as shown in FIG. 33G.

In some embodiments, the magnetic material back 3306 is exposed as shown in FIG. 33A, while in other embodiments the magnetic material back 3306 is encapsulated in an encapsulating material 3314 as shown in FIG. 33H. In some embodiment, the encapsulating material 3314 is pliable material such as rubber, leather, plastic, polymer, fabric (silk, cotton, denim, foil, Mylar, Neoprene fabric), etc. In other embodiments, the encapsulating material 3314 is a rigid material such as glass, plastic, metal, mirrored material, etc. In some embodiments, the encapsulating material is waterproof and/or scratch resistant. The encapsulating material 3314 may also protect the metal back while also holding it in place. In some embodiments, the encapsulating material is made of a non-skid type surface (i.e. the material has a high coefficient of friction) such as rubber or silicone to assist the user in holding the object. Alternatively, in some embodiments the encapsulating material has a relatively low coefficient of friction such as leather or plastic in order to allow the case to slide easily into and out of a pocket. Some embodiments include a combination of the above mentioned encapsulating materials on different portions of the case 3302 (as discussed in more detail with respect to FIGS. 30K and 30L). Furthermore, in some embodiments the materials are made of different colors. The different colored portions of the case may add aesthetic appeal to the case, and may serve to distinguish the various portions of the case from one another. In some embodiments, the magnetic material back 3306 is held in place by a rim of encapsulating material stretched around the edge of the magnetic material back 3306. In other words, in these embodiments, the encapsulating material does not cover the back, but instead frames it.

In some embodiments, rather than having an encapsulating material 3314 over the magnetic material back 3306, the magnetic material back 3306 is covered with a coating material such as an opaque or translucent paint, polyurethane, scratch resistant gloss, etc. In some embodiments, the coating is applied directly to the surface of the back prior to the back being joined to the case 3302. In some embodiments, while the coating may protect the back, it does not necessarily hold it in place in the same manner as the encapsulating material. As such, in some embodiments, a portion of the case 3302 is molded over the magnetic material back 3306 such that the magnetic material back 3306 is held in place. The case 3302 can be made of any of the materials discussed with respect to FIGS. 29A-29I. Some of these materials may be especially well suited for holding the metal back in place. For example, in some embodiments, the rim of case 3302 that contacts the magnetic material back 3306 is made of an elastomer material such as rubber or silicone that is molded over the edges of the magnetic material back 3306.

In other embodiments, rather than being over molded, melted, welded, or otherwise permanently attached to the case 3302, the back is slidably connected to the case 3302. For example, in some embodiments, the magnetic material back 3306 fits into a pocket 3316 or tracks in the case 3302 as shown in FIG. 33I. This figure illustrates the magnetic material back 3306 in a position to be inserted into the pocket 3316 to clearly illustrate the pocket element of this embodiment, although when in use the magnetic material back 3306 would be slid entirely or substantially entirely into the pocket 3316. In some embodiments, the back might also slide into place from a side opening pocket rather than the top opening pocket shown in FIG. 33I. Furthermore, in some embodiments, the pocket 3316 itself has one or more holes exposing the back. For example, in some embodiments the pocket 3316 includes a large hole making the pocket more like a picture frame encapsulating the magnetic material back 3306, wherein the magnetic material back 3306 is slid into tracks in the pocket or frame. In other embodiments, the pocket 3316 will include one or two large sides to keep the magnetic material back 3306 more firmly in place, as shown in FIG. 33I. For example, the pocket may include an external transparent plastic side, which can be seen through, and which does not significantly diminish the magnetic properties of the magnetic material back 3306, but which holds the magnetic material back 3306 of the case firmly against the object's back. This transparent plastic side also protects the back from scratches and may also be waterproof.

In some embodiments, as shown in FIG. 33J, one portion 3318 of the magnetic material back 3306 is distinct from the rest of the back. In some embodiments, the portion 3318, is covered in a heartier covering that is more resistant to scratches such as a polymer coating, a translucent paint, polyurethane, a scratch resistant gloss, etc. Additionally or alternatively, in some embodiments the portion 3318 is painted or dyed a different color from the rest of the magnetic material back 3306 to show the ideal spot for the strap 3304 to be attached or for decorative purposes. In some embodiments, the portion 3318 includes a slight indentation (similar to the cavities described above) to indicate a suggested spot for the magnetic strap to attach. Similarly, in some embodiments, the portion 3318 includes a slight raised area to indicate a suggested spot for the magnetic strap to attach. In some embodiments, the portion 3318 is made of one or more magnets, while the remainder of the magnetic material back 3306 is made of a magnetic material.

In some embodiments, the remainder of the case, i.e., the portions of the case excluding the magnetic material back 3306, is made of one or more non-magnetic materials. For example, portions of the case can include a pliable material, which will help facilitate the insertion of an object into the case, especially in embodiments where the magnetic material back 3306 of the case 3302 is rigid. In some embodiments, the remainder of the case is made of a combination of pliable materials and rigid materials. For example, as shown in FIG. 33K, portions of the band surrounding the top, bottom, and side edges of the object are made of pliable or stretchable material such as a rubber material, while other portions are made of a rigid material such as a plastic material. FIG. 33L illustrates the different portions of this embodiment in an exploded view, which further illustrates which portions of the case 3302 are made of plastic (or similar non-magnetic rigid materials) and which are made of silicone/rubber (or similar non-magnetic pliable materials).

FIGS. 34A-34L illustrate embodiments of a case similar to FIGS. 33A-33L with the exception that the object for which the case is made has different dimensions than the object shown in FIGS. 33A-33L.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Method of Manufacturing for Cases

FIG. 35 is a flowchart of a method 3500 for manufacturing a cord management system, according to some embodiments. In some embodiments, the method of manufacturing the cord management system may be performed by the computer system 2400. The computer system 2400 forms (3502) a case for an object. The computer system 2400 then forms (3504) a strap that is permanently attached to the case. In some embodiments, the strap includes a first attachment point at a first location on the strap and a second attachment point at a second location on the strap. In some embodiments, the strap includes at least two modes of operation. In a first mode of operation, the first attachment point is attached to the second attachment point. In a second mode of operation, the first attachment point is detached from the second attachment point.

In some embodiments, the computer system 2400 forms (3506) a cord-attachment mechanism located at a third location on the case.

In some embodiments, the computer system 2400 forms (3508) one or more button covers configured to protect one or more buttons of the object, while allowing the one or more buttons to be operable.

In some embodiments, the computer system 2400 forms (3510) one or more holes configured to expose one or more elements of the object.

FIG. 36 is a flowchart of a method 3600 for manufacturing a cord management system, according to some embodiments. In some embodiments, the method of manufacturing the cord management system may be performed by the computer system 2400. The computer system 2400 forms (3602) a case for an object, comprising a semi-permanent case attachment mechanism at a first location. The computer system 2400 then forms (3604) a strap for semi-permanently attaching to the case, comprising at least one semi-permanent strap attachment element at a first location on the strap, the semi-permanent strap attachment element configured to semi-permanently attach to the semi-permanent case attachment element; at least one first attachment point at a second location on the strap; and at least one second attachment point at a third location on the strap. In some embodiments, the strap includes at least two modes of operation. In a first mode of operation, the first attachment point is attached to the second attachment point. In a second mode of operation, the first attachment point is detached from the second attachment point.

FIG. 37 is a flowchart of a method 3700 for manufacturing a cord management system, according to some embodiments. In some embodiments, the method of manufacturing the cord management system may be performed by the computer system 2400. The computer system 2400 forms (3702) a case for an object, the case having a front, a back, a bottom, a top, a first side, and a second side; wherein at least a portion of the back is made of a magnetic material; and wherein at least a portion of at least one of the front, bottom, top, first side, and second side is made of one or more non-magnetic materials.

In some embodiments, the computer system 2400 forms (3704) a cord-attachment mechanism; one or more button covers; and one or more holes.

The methods 3500-3700 may be governed by instructions that are stored in one or more computer readable storage mediums and that are executed by one or more processors of one or more computer systems. Each of the operations shown in FIGS. 35-37 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by one or more processors.

What is claimed is:
1. A cord management system, comprising:
a case for an object; and
a strap semi-permanently attached to the case;
the case comprising:
  a first attachment region; and
  a second attachment region;
the strap comprising:
  a first case attachment element at a first location on the strap, the first case attachment element configured to semi-permanently attach to the first attachment region of the case;
  a second case attachment element at a second location on the strap, the second case attachment element configured to attach to the second attachment region of the case;
  at least one first attachment point at a third location on the strap; and
  at least one second attachment point at a fourth location on the strap;
  wherein the strap includes at least two modes of operation;
  in a first mode of operation:
    the first attachment point is attached to the second attachment point; and
    the second case attachment element is detached from the second attachment region of the case; and
  in a second mode of operation:
    the first attachment point is detached from the second attachment point; and
    the second case attachment element is semi-permanently attached to the second attachment region of the case.

2. The cord management system of claim 1, wherein in the first mode of operation, a first segment of the strap located between the first attachment point and the second attachment point forms a loop.

3. The cord management system of claim 2, wherein in the second mode of operation, the first segment no longer forms the loop.

4. The cord management system of claim 1, wherein the first case attachment element is a magnet and the first attachment region is a magnetic material.

5. The cord management system of claim 1, wherein the first case attachment element is a first magnet and the first attachment region is a second magnet.

6. The cord management system of claim 5, wherein the first magnet is stronger than the second magnet.

7. The cord management system of claim 1, wherein, in the first mode of operation and in the second mode of operation, the first case attachment element is semi-permanently attached to the first attachment region of the case.

8. The cord management system of claim 1, wherein the strap comprises a cord-attachment mechanism located on the strap.

9. The cord management system of claim 8, wherein the cord-attachment mechanism includes a hole in the strap.

10. The cord management system of claim 9, wherein the hole in the strap includes a grommet.

11. The cord management system of claim 9, wherein the hole is in an elastic portion of the strap, wherein the hole is configured to expand when a cord is inserted into the hole, and wherein when the cord is in the hole, the hole is configured to exert a predetermined force against the cord to removably attach the cord to the strap.

12. The cord management system of claim 1, wherein the strap includes a first magnet and a second magnet, wherein the first magnet and the second magnet are encapsulated in a polymer material.

13. The cord management system of claim 12, wherein the first magnet provides attractive force between the first case attachment element and the first attachment region of the case, and between the first attachment point and the second attachment point.

14. The cord management system of claim 13, wherein the second magnet provides attractive force between the second case attachment element and the second attachment region of the case, and between the first attachment point and the second attachment point.

15. The cord management system of claim 1, wherein the first case attachment element, the second case attachment element, the first attachment region, and the second attachment region are selected from the group consisting of:
  magnets;
  magnetic material;

hook and loop attachment mechanisms;
adhesives;
suction devices;
friction mechanisms;
buckles;
hinges;
springs;
bistable springs;
sleeves that insert into slots;
plastic interlocking strip fasteners;
pegs that insert into holes;
snaps;
buttons; and
a van der Waals force attachment mechanism.

* * * * *